United States Patent
Yuki et al.

(10) Patent No.: US 6,778,557 B1
(45) Date of Patent: Aug. 17, 2004

(54) POINT-TO-MULTIPOINT COMMUNICATION SYSTEM

(75) Inventors: Yoshinori Yuki, Fuchu (JP); Masatoshi Nakao, Hino (JP); Hiroyuki Ibe, Yokohama (JP); Yoshio Hatate, Musashino (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/381,580

(22) PCT Filed: Jan. 25, 1999

(86) PCT No.: PCT/JP99/00272

§ 371 (c)(1),
(2), (4) Date: Sep. 22, 1999

(87) PCT Pub. No.: WO99/38292

PCT Pub. Date: Jul. 29, 1999

(30) Foreign Application Priority Data

Jan. 23, 1998 (JP) .............................................. 10/11429
Jun. 30, 1999 (JP) .......................................... 10/184337

(51) Int. Cl.[7] .................................................. H04J 3/16
(52) U.S. Cl. ........................ 370/468; 370/235; 370/230
(58) Field of Search ................................ 370/230–231, 370/235, 241.1, 351, 395.1, 398, 395.21, 395.41, 395.72, 400, 422, 437–439, 468, 252–253, 409, 379, 419, 229, 395, 396, 465, 389, 413

(56) References Cited

FOREIGN PATENT DOCUMENTS

| JP | 9-233101 | 9/1997 |
|----|----------|--------|
| JP | 10-23055 | 1/1998 |
| JP | 10-126430 | 5/1998 |
| JP | 10-336188 | 12/1998 |
| JP | 11-41269 | 2/1999 |

OTHER PUBLICATIONS

M. Miyabe et al., "A Study of Dynamic Bandwidth Allocations for ATM–PON", The Institute of Electronics, Information and Communication Engineers, vol. 97, No. 471, pp. 65–70, (1988).

S. Karasawa et al., "A study of the Access Method for Bursty Traffic on ATM–PON System", The Institute of Electronics, Information and Communication Engineers, vol. 97, No. 127, pp. 7–12, (1997).

A. Iwamura et al., "A Study of Dynamic Bandwidths Allocation Technique for ATM–PON System", The Institute of Electronics, Information and Communication Engineers, vol. 97, No. 535, pp. 25–30, (1998).

B. Miah et al., "An Economic ATM Passive Optical Network", IEEE Communications Magazine, vol. 35, No. 3, pp. 62–68, (1997).

O. Casals et al., "A Medium Access Control Protocol for an ATM Access Network", IFIP Transactions C–21, High Speed Networks and Their Performance, pp. 289–308, (1994).

Y. Kajiyama et al., "ATM–PON TC Sublayer Specification Based on ITU–T Draft New Recommendations G.983", The Institute of Electronics, Information and Communication Engineers, vol. 98, No. 147, pp. 49–54, (1998).

*Primary Examiner*—Dang Ton
*Assistant Examiner*—Phuc Tran
(74) *Attorney, Agent, or Firm*—Finnegan, Henderson, Farabow, Garrett & Dunner, L.L.P.

(57) ABSTRACT

A point-to-multipoint communication system that is well operative for transmitting megabytes of information in the form of a signal burst. Each slave unit temporarily stores a signal and measures the amount of the signal information before transmitting the signal. A master unit requests that slave units report the measured amounts of information, and they give reports to the master unit. On the basis of the reports from the slave units, the master unit determines an allowable amount of information for each slave unit and permits the slave units to transmit the stored signals according to the request from the master unit. The interval between the reports from the slave units to the master unit can be varied.

36 Claims, 88 Drawing Sheets

FIG. 11b

ENABLING AMOUNT TABLE 400

| SLAVE UNIT NUMBER (i) | ENABLING AMOUNT (Gi) |
|---|---|
| 1 | 0 |
| 2 | 0 |
| ...... | ...... |
| m | 0 |

FIG. 11a

INFORMATION AMOUNT TABLE 300

| SLAVE UNIT NUMBER (i) | INFORMATION AMOUNT (Ri) |
|---|---|
| 1 | 0 |
| 2 | 0 |
| ...... | ...... |
| m | 0 |

FIG.33

| PACKET TYPE | PACKET TYPE NUMBER |
|---|---|
| STORAGE AMOUNT REPORT | 01h |
| INFORMATION AMOUNT NOTIFICATION | 02h |
| INFORMATION SIGNAL | 11h |

FIG.34

| SLAVE UNIT NAME | SLAVE UNIT NUMBER |
|---|---|
| SLAVE UNIT 1 | 01h |
| SLAVE UNIT 2 | 02h |
| ⋮ | ⋮ |
| SLAVE UNIT 32 | 32h |

FIG. 37a

STORAGE AMOUNT TABLE

| SLAVE UNIT (i) | STORAGE AMOUNT ($R_i$) |
|---|---|
| 1 | 0 |
| 2 | 0 |
| ...... | ...... |
| 32 | 0 |

FIG. 37b

INFORMATION AMOUNT TABLE

| SLAVE UNIT (i) | INFORMATION AMOUNT ($N_i$) |
|---|---|
| 1 | 0 |
| 2 | 0 |
| ...... | ...... |
| 32 | 0 |

FIG. 37c

NOTIFICATION TABLE

| SLAVE UNIT (i) | ($n_i$) |
|---|---|
| 1 | 0 |
| 2 | 0 |
| ...... | ...... |
| 32 | 0 |

CALCULATION OF INFORMATION AMOUNT

INITIALIZATION OF INFORMATION AMOUNT CONVEYED TO SLAVE UNITS

CALCULATION OF INFORMATION AMOUNT CONVEYED TO SLAVE UNITS

STORAGE AMOUNT TABLE

| SLAVE UNIT (i) | SERVICE CLASS 1 STORAGE AMOUNT ($R_{i1}$) | SERVICE CLASS 2 STORAGE AMOUNT ($R_{i2}$) | | SERVICE CLASS sc STORAGE AMOUNT ($R_{isc}$) |
|---|---|---|---|---|
| 1 | 0 | 0 | | 0 |
| 2 | 0 | 0 | ......... | 0 |
| ⋮ | ⋮ | ⋮ | | ⋮ |
| 32 | 0 | 0 | | 0 |

FIG. 49a

INFORMATION AMOUNT TABLE

| SLAVE UNIT (i) | SERVICE CLASS 1 INFORMATION AMOUNT ($N_{i1}$) | SERVICE CLASS 2 INFORMATION AMOUNT ($N_{i2}$) | | SERVICE CLASS sc INFORMATION AMOUNT ($N_{isc}$) |
|---|---|---|---|---|
| 1 | 0 | 0 | | 0 |
| 2 | 0 | 0 | ......... | 0 |
| ⋮ | ⋮ | ⋮ | | ⋮ |
| 32 | 0 | 0 | | 0 |

FIG. 49b

NOTIFICATION TABLE

| SLAVE UNIT (i) | SERVICE CLASS 1 $n_{i1}$ | SERVICE CLASS 2 $n_{i2}$ | | SERVICE CLASS sc $n_{isc}$ |
|---|---|---|---|---|
| 1 | 0 | 0 | | 0 |
| 2 | 0 | 0 | ......... | 0 |
| ⋮ | ⋮ | ⋮ | | ⋮ |
| 32 | 0 | 0 | | 0 |

FIG. 49c

| INFORMATION AMOUNT TABLE 1 | |
|---|---|
| SLAVE UNIT NUMBER (i) | INFORMATION CONTENT (Rvi) |
| 1 | 0 |
| 2 | 0 |
| ⋮ | ⋮ |
| m | 0 |

FIG. 58a

| ENABLING AMOUNT TABLE 1 | |
|---|---|
| SLAVE UNIT NUMBER (i) | ENABLING AMOUNT (Gvi) |
| 1 | 0 |
| 2 | 0 |
| ⋮ | ⋮ |
| m | 0 |

FIG. 58c

| INFORMATION AMOUNT TABLE 2 | |
|---|---|
| SLAVE UNIT NUMBER (i) | INFORMATION CONTENT (Rdi) |
| 1 | 0 |
| 2 | 0 |
| ⋮ | ⋮ |
| m | 0 |

FIG. 58b

| ENABLING AMOUNT TABLE 2 | |
|---|---|
| SLAVE UNIT NUMBER (i) | ENABLING AMOUNT (Gdi) |
| 1 | 0 |
| 2 | 0 |
| ⋮ | ⋮ |
| m | 0 |

FIG. 58d

PROCEDURE FOR CALCULATING ENABLING AMOUNT Gdi

PROCEDURE FOR CALCULATING ENABLING AMOUNT Gdi

PROCEDURE FOR ISSUING INSTRUCTIONS
TO TRANSMIT VOICE SIGNALS

PROCEDURE FOR GENERATING INSTRUCTIONS TO TRANSMIT VOICE SIGNALS

INFORMATION AMOUNT TABLE 1

| SLAVE UNIT NUMBER (i) | INFORMATION CONTENT (R0i) |
|---|---|
| 1 | 0 |
| 2 | 0 |
| ⋮ | ⋮ |
| m | 0 |

FIG. 69a

INFORMATION AMOUNT TABLE 2

| SLAVE UNIT NUMBER (i) | INFORMATION CONTENT (R1i) |
|---|---|
| 1 | 0 |
| 2 | 0 |
| ⋮ | ⋮ |
| m | 0 |

FIG. 69b

INFORMATION AMOUNT TABLE 3

| SLAVE UNIT NUMBER (i) | INFORMATION CONTENT (R2i) |
|---|---|
| 1 | 0 |
| 2 | 0 |
| ⋮ | ⋮ |
| m | 0 |

FIG. 69c

ENABLING AMOUNT TABLE 1

| SLAVE UNIT NUMBER (i) | ENABLING AMOUNT (G0i) |
|---|---|
| 1 | 0 |
| 2 | 0 |
| ⋮ | ⋮ |
| m | 0 |

FIG. 69d

ENABLING AMOUNT TABLE 2

| SLAVE UNIT NUMBER (i) | ENABLING AMOUNT (G1i) |
|---|---|
| 1 | 0 |
| 2 | 0 |
| ⋮ | ⋮ |
| m | 0 |

FIG. 69e

ENABLING AMOUNT TABLE 3

| SLAVE UNIT NUMBER (i) | ENABLING AMOUNT (G2i) |
|---|---|
| 1 | 0 |
| 2 | 0 |
| ⋮ | ⋮ |
| m | 0 |

FIG. 69f

PERIOD-MEASURING TIMER PROCEDURE FOR SERVICE CLASS 1

PROCEDURE FOR ISSUING TRANSMISSION
INSTRUCTIONS FOR SERVICE CLASS s0

POINT-TO-MULTIPOINT COMMUNICATION SYSTEM

TECHNICAL FIELD

The present invention relates to a point-to-multipoint communication system in which communication is performed between a single master unit and a plurality of slave units along a transmission line, and more particularly to a point-to-multipoint communication system in which adequate communication can be achieved even when signals containing several megabytes of data are transmitted in bursts.

BACKGROUND ART

Point-to-multipoint communication systems such as LANs, CATV networks, satellite communication networks, and optical subscriber access networks are commonly configured such that a master unit and a plurality of slave units communicate by sharing, for example, transmission lines such as those used in coaxial communication, optical-fiber communication, and radio communication.

Here, an access protocol for allocating the use of a shared transmission line among slave units is important for ensuring smooth communication between the master unit and the slave units via this transmission line. There are various types of access protocols.

For example, the CSMA/CD (Carrier Sense Multiple Access with Collision Detection) protocol is one in which "carrier sense+multiaccess+collision detection" is the basic principle of operation, and the DAMA (Demand Assign Multiple Access) protocol is one in which "transmission start demand/end notification+transmission line sharing/release" is the basic principle of operation.

In such point-to-multipoint communication systems, burst traffic in which signals containing several megabytes of data are generated in bursts is rapidly becoming more widespread because of the increased popularity of personal computers, a larger number of Internet users, and the development of various multimedia services that blend communication and broadcasting.

Conventional access protocols, however, have the following drawbacks that make these protocols incapable of handling burst traffic containing several megabytes of data, which is expected to grow even more in the future.

When, for example, information signals generated in bursts of several megabytes are transmitted according to the CSMA/CD protocol, the information signals are separated into packets of about 64–1500 kB and repeatedly transmitted. Consequently, increased burst traffic results in a markedly lower throughput because of the higher frequency of retransmission due to packet collisions.

Probability calculations conducted under conditions corresponding to a collision of about 15 packets show a throughput of about 40%, and a period that is 1.5–2.5 times the normal time is needed for data transmission accompanied by collisions. As a result, the delay time increases and is not constant any longer.

On the other hand, transmitting information signals generated in bursts according to a TDMA protocol increases the time needed to complete the transmission when the information signals being transmitted contain several megabytes of data, so an increase in burst traffic sometimes makes a transmission-awaiting slave unit to miss its time slot and to fail to operate within the delay time allowed for data transmission. Thus, conventional access protocols for point-to-multipoint communication systems are disadvantageous in that an increase in burst traffic containing several megabytes of data results in a lower throughput and makes it impossible to comply with time requirements for downstream transmission.

DISCLOSURE OF THE INVENTION

With the foregoing in view, it is an object of the present invention to provide a point-to-multipoint communication system in which adequate communication can be achieved even when signals containing several megabytes of data are transmitted in bursts.

According to the access protocol for the point-to-multipoint communication system of the present invention, the main principle of operation is that "a report is issued regarding the information amount necessary for signal transmission+an instruction regarding transmission below a specific maximum value is issued on the basis of the information amount reported."

First, slave units about to transmit signals issue reports on the information amount needed to transmit the signals in accordance with instructions from the master unit. The master unit, upon receipt of the reports from the slave units, issues instructions for the slave units to transmit the signals at no more than a specific maximum number of kilobits on the basis of the reported information amount.

Because such an arrangement allows slave units to transmit signals in accordance with instructions from the master unit, no signal collisions occur in the transmission line and a throughput reduction such as that observed in the case of CSMA/CD is avoided when signals containing several megabytes of data are transmitted in bursts.

Another feature is that because signal transmission instructions are issued dynamically and efficiently on the basis of the information amount reported by slave units, high throughput can be obtained even under complex conditions created by greater burst traffic or an increased number of slave units.

The aforementioned specific maximum number of kilobits is set such that the following relation is satisfied:

$$k \leq (r \times td) \div (\alpha \times m),$$

where m is the total number of slave units (m is an integer), $\alpha$ is the proportion of currently active slave units ($0 < \alpha \leq 1.0$), r (b/s) is the data transfer rate, and td (s) is the delay time allowed for data transmission and determined by the system.

A slave unit can therefore continuously transmit large signals because it has exclusive use of the upstream transmission line during the transmission of signals whose maximum size is measured in k (bits).

Another feature is that when the maximum value is determined on the basis of the above equation and signal transmission instructions are issued for the slave units, a time of td seconds is necessary for the transmission if all the slave units transmit kilobit signals, making it possible to secure an allowed delay time of td seconds for data transmission by all the slave units.

Fairness is also ensured because all the slave units can invariably transmit their signals within the allowed delay time of td seconds.

Yet another feature is that the master unit can instruct the slave units to issue information amount reports in a dynamic mode in accordance with changes in the transmission line load, the information amount reported, and the like.

In the case of low transmission line load, for example, variations in information amount can be identified by the master unit at a higher speed by reducing the interval between the instructions for information amount reporting.

The master unit can therefore be more flexible in issuing signal transmission instructions under conditions of varying information amount from slave units, making it possible to reduce the latency time elapsed before a slave unit transmits a signal and to lower the capacity of the buffer memory required by the slave unit to temporarily store the signal.

In the converse case of high transmission line load, the band that can be used to transmit signals along a transmission line by increasing the interval between the instructions for information amount reporting, making it possible to increase the throughput even further.

Instructions for a slave unit to report information amount can thus be given in a dynamic mode, making it possible to reduce the latency time elapsed before the slave unit can transmit a signal, to reduce the capacity of the buffer memory required for the slave unit to temporarily store signals, and to increase throughput.

Another feature is that when no instructions have been issued for a slave unit to transmit a signal, the same effect can be obtained by issuing instructions for reporting the information amount of the slave unit and performing a look-ahead procedure for the information amount of each slave unit.

Yet another feature of the present invention is that slave units about to transmit information signals temporarily store these information signals in an information signal storage means, and the storage amounts of the stored information signals are reported to the master unit. Upon receipt of the reports from the slave units, the master unit calculates, based on the storage amounts thus reported, the information amount (information amount allowed for transmission) that can be transmitted by each slave unit at no more than a specific maximum value, and each slave unit is notified of the information amount thus calculated.

Upon receipt of the notification from the master unit, the slave units transmit to the master unit the stored information signals at no more than the information amount specified in the notification.

Because such an arrangement allows slave units to transmit information signals in accordance with the information amount specified in the notification from the master unit, no signal collisions at all occur in the transmission line, and a throughput reduction such as that observed i n the case of CSMA/CD is avoided when signals containing several megabytes of data are transmitted in bursts.

Here, the information amount that allows information signals to be transmitted can be calculated dynamically and efficiently on the basis of reports from slave units such that the data transfer rate is utilized with 100% efficiency, so high throughput can be obtained even under complex conditions created by greater burst traffic or an increased number of slave units.

Another feature of the present invention is that the master unit instructs the slave units to transmit signals successively when the information amount reported by all the slave units still has a transfer rate margin after the signal transmission instructions have been issued.

In such an arrangement, the master unit constantly instructs slave units to transmit signals when the information amount reported by the slave units is of low volume and the communications traffic is slow, making it possible to reduce the latency time elapsed before the slave unit can transmit a signal, to lower the capacity of the buffer memory required to temporarily store the signal, and to further enhance communications efficiency.

Here, instructions concerning signal transmission are issued in accordance with the present invention such that individual procedures are executed independently from each other, making it possible to ensure that access fairness is ensured and delay requirements concerning data transmission are satisfied for all the slave units in the same manner as in the above-described invention.

In addition, the point-to-multipoint communication system of the present invention operates on the following basic principle: the information amount needed for transmission is reported for each service class in accordance with instructions from the master unit, and transmission by service class is enabled by the master unit.

In each service class, slave units about to transmit information signals issue reports for the master unit regarding the information amount needed to transmit the information signals in accordance with the instructions from the master unit. Upon receipt of the reports from the slave units, the master unit issues transmission instructions for the slave units in each service class on the basis of the information amount reported for each service class. At this time, the master unit issues instructions to transmit data in sequence from higher-priority service classes.

Upon receipt of transmission instructions from the master unit regarding a certain service class, the slave units transmit the data for the corresponding service class to the master unit.

Such an arrangement involves reporting information amount by service class and issuing transmission instructions in sequence from higher-priority service classes, so the stringent delay requirements imposed on higher-priority service classes can be satisfied because the transmission instructions are issued independently for the higher-priority service classes even when several megabytes or more are transmitted in bursts for a lower-priority service class.

Another feature of the point-to-multipoint communication system of the present invention is that it operates on the basic principle that "a report is issued regarding the information amount necessary for signal transmission in all service classes+an instruction regarding signal transmission below a specific maximum value is issued on the basis of the information amount reported."

First, the master unit establishes a plurality of service classes on the basis of differences in the delay time allowed for data transmission, and signals to be transmitted to the master unit are classified by service class and stored in the buffer memory. Before transmitting the signals stored in the buffer memory, slave units inform the master unit about the information amount needed to transmit the signals for all the service classes in accordance with the instructions from the master unit.

Upon receipt of the reports from the slave units, the master unit instructs the slave units to transmit signals at a specific maximum kilobit value on the basis of the information amount reported.

In addition, the slave units transmit signals in accordance with the instructions from the master unit, starting from signals that are classified as belonging to a higher-priority service class and requiring shorter allowed delay times for data transmission.

With such an arrangement, the master unit issues signal transmission instructions in a dynamic mode in accordance with the information amount reported by the slave units, and the slave units transmit signals in accordance with the instructions from the master unit, making it possible to prevent signal collisions in the transmission line and to maintain high throughput even under conditions of increased traffic. Limitations are imposed on the time during which a signal can be continuously transmitted by a slave unit, so the traffic of one slave unit has no effect on another slave unit. Because the slave units transmit signals in accordance with instructions from the master unit, starting from signals that are classified as belonging to a higher-priority service class and having shorter allowed delay times, it is possible to provide a real-time service such as that employed in telephony or video transmission, a non-real time service such as that employed in file transfer, or other type of communication involving a plurality of classes having different traffic characteristics or requiring different allowed delay times for data transmission, performed simultaneously and with high efficiency.

Another feature of the present invention is that the time slots for transmitting information signals by slave units are calculated by the master unit dynamically and efficiently on the basis of reports from slave units to ensure efficient utilization of data transfer rate, making it possible to obtain high throughput even under complex conditions created by greater burst traffic or an increased number of slave units.

Yet another feature is that because the maximum number of time slots that can secure a circuit in a single session is defined in advance, any slave unit can transmit data within a period based on the product of the maximum number of time slots and the number of the slave units even when different amounts of data are stored in the slave units. Specifically, the maximum data transfer delay time can be specified, and access fairness ensured.

In addition, telephone voice transmission and other types of guaranteed service can be performed simultaneously.

Another feature of the present invention is that the master unit divides terminal-addressed input packets and attaches headers to create fixed-length cells. Each header contains slave unit addresses for use in the point-to-multipoint communication system and retrieved based on the terminal addresses contained in the input packets. Because the slave units operate such that data is retrieved only if the addresses contained in the aforementioned headers match the addresses of the local stations, the transfer rate in the downstream direction for each of the slave units can be varied in a simple manner using the master unit alone. In addition, short bit strings are used and the transfer rate can be utilized efficiently because the addresses of the slave units used in each header are those that have significance solely inside a point-to-multipoint communication system.

Furthermore, the address architecture used in the point-to-multipoint communication system is hierarchized, and the addresses are set such that a subnet is used and the slave units constitute a single network within the entire point-to-multipoint communication system. The structure of the master unit can thus be simplified because the portion of a terminal address for identifying the subnet can be used directly as a slave unit address.

BRIEF DESCRIPTION OF THE DRAWINGS

FIG. 11a is a diagram depicting an exemplary information amount table as part of the structure of the storage unit in the master unit shown in FIG. 3;

FIG. 11b is a diagram depicting an exemplary enabling amount table as part of the structure of the storage unit in the master unit shown in FIG. 3;

FIG. 33 is a diagram depicting the relation between the packet types and packet type numbers adopted in the sixth embodiment aspect of the present invention;

FIG. 34 is a diagram depicting the relation between the slave unit names and slave unit numbers adopted in the sixth embodiment aspect of the present invention;

FIG. 37a is a diagram depicting an exemplary storage amount table for storing the storage amounts reported by slave units according to the sixth embodiment aspect of the present invention;

FIG. 37b is a diagram depicting an exemplary information amount table for storing the information amount that allows the slave units to transmit signals;

FIG. 37c is a diagram depicting an exemplary notification table for storing the information amount used for notifying the slave unit during each frame period;

FIG. 49a is a diagram depicting an exemplary storage amount table for a case in which the band allocation illustrated in FIG. 29 is adopted in the sixth embodiment aspect of the present invention;

FIG. 49b is a diagram depicting an exemplary information amount table for a case in which the band allocation illustrated in FIG. 29 is adopted in the sixth embodiment aspect of the present invention;

FIG. 49c is a diagram depicting an exemplary notification table for a case in which the band allocation illustrated in FIG. 29 is adopted in the sixth embodiment aspect of the present invention;

FIG. 58a is a diagram depicting information amount table 1 corresponding to the structure of the storage unit in the master unit shown in FIG. 3 in connection with the seventh embodiment aspect of the present invention;

FIG. 58b is a diagram depicting information amount table 2 corresponding to the structure of the storage unit in the master unit shown in FIG. 3 in connection with the seventh embodiment aspect of the present invention;

FIG. 58c is a diagram depicting enabling amount table 1 corresponding to the structure of the storage unit in the master unit shown in FIG. 3 in connection with the seventh embodiment aspect of the present invention;

FIG. 58d is a diagram depicting enabling amount table 2 corresponding to the structure of the storage unit in the master unit shown in FIG. 3 in connection with the seventh embodiment aspect of the present invention;

FIG. 69a is a block diagram depicting information amount table 1 corresponding to the structure of the storage unit in the tenth embodiment aspect of the present invention;

FIG. 69b is a block diagram depicting information amount table 2 corresponding to the structure of the storage unit in the tenth embodiment aspect of the present invention;

FIG. 69c is a block diagram depicting information amount table 3 corresponding to the structure of the storage unit in the tenth embodiment aspect of the present invention;

FIG. 69d is a block diagram depicting enabling amount table 1 corresponding to the structure of the storage unit in the tenth embodiment aspect of the present invention;

FIG. 69e is a block diagram depicting enabling amount table 2 corresponding to the structure of the storage u nit in the tenth embodiment aspect of the present invention;

FIG. 69f is a block diagram depicting enabling amount table 3 corresponding to the structure of the storage unit in the tenth embodiment aspect of the present invention;

BEST MODE FOR CARRYING OUT THE INVENTION

Embodiment aspects of the point-to-multipoint communication system according to the present invention will now be described in detail.

Figure 1:
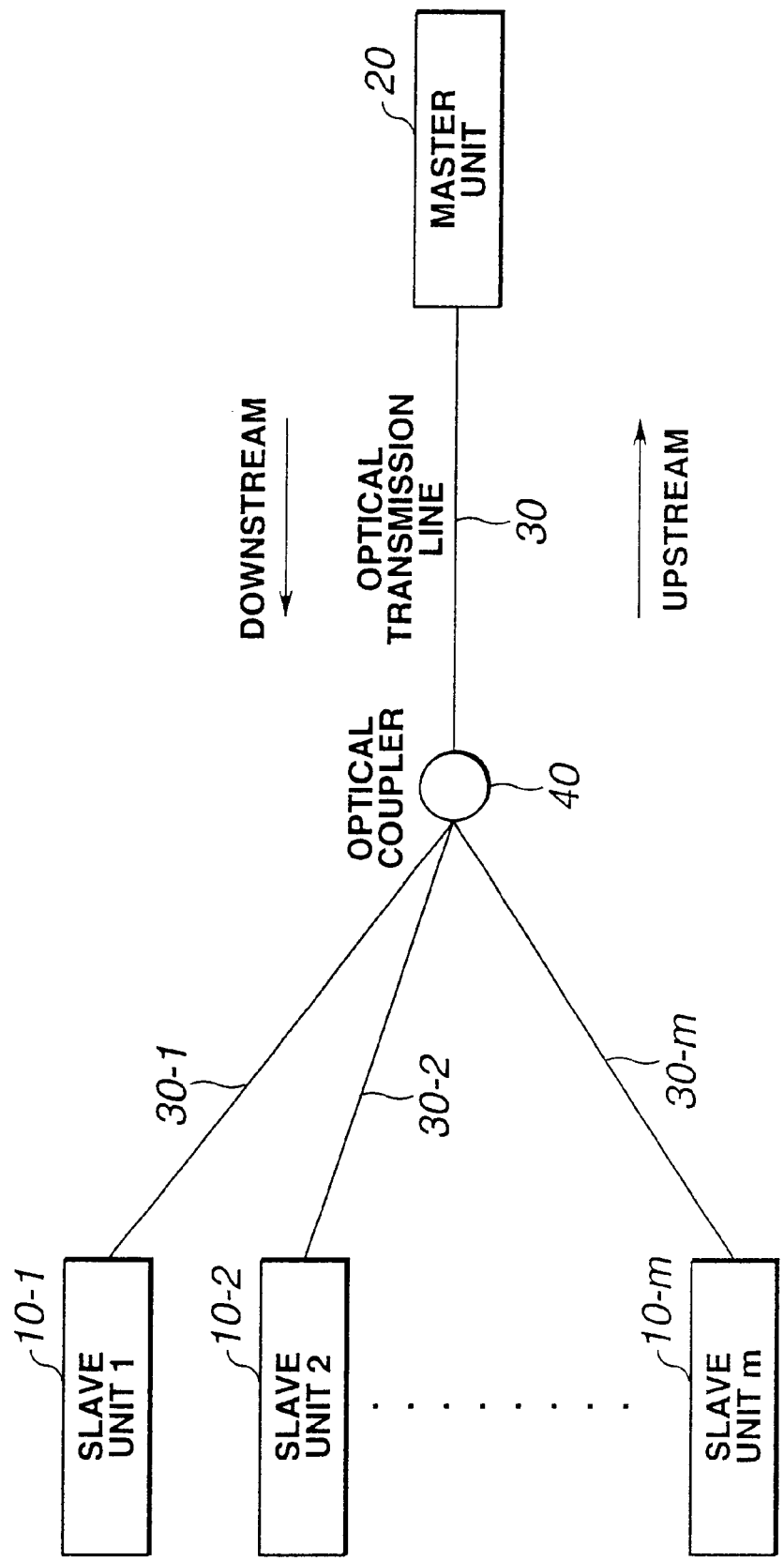
FIG. 1 is a block diagram depicting an embodiment aspect of the point-to-multipoint communication system in accordance with the present invention.

FIG. 1 is a system block diagram depicting an embodiment aspect of the point-to-multipoint communication system according to the present invention.

In FIG. 1, the point-to-multipoint communication system is configured by connecting m slave units 10-1, 10-2, . . . , 10-m and a single master unit 20 by means of an optical transmission line 30. The transmission line 30 connected to the master unit 20 is divided by an optical coupler 40 into m branch lines 30-1, 30-2, . . . , 30-m, which are connected to the slave units 10-1, 10-2, . . . , 10-m, respectively.

Although the point-to-multipoint communication system shown in FIG. 1 is configured as an optical access network in which the master unit 20 and the m slave units 10-1, 10-2, . . . , 10-m are connected by means of the optical transmission line 30, optical coupler 40, and m branch lines 30-1, 30-2, . . . , 30-m, the point-to-multipoint communication system of the present invention is also widely applicable to communication systems composed of a master unit and a plurality of slave units such that the transmission line band is allocated among the slave units by the master unit in a controlled manner. Other possible applications include wireless access networks configured such that part of the transmission line is a landline or a wireless line, such as an arrangement in which a plurality of wireless terminals are connected instead of slave units to the master unit by means of a wireless transmission line.

When a wireless transmission line is used in such a case, the use of the access protocol of the present invention is facilitated by the simple synthesis or distribution of signals among wireless terminals and the master unit.

Figure 2:
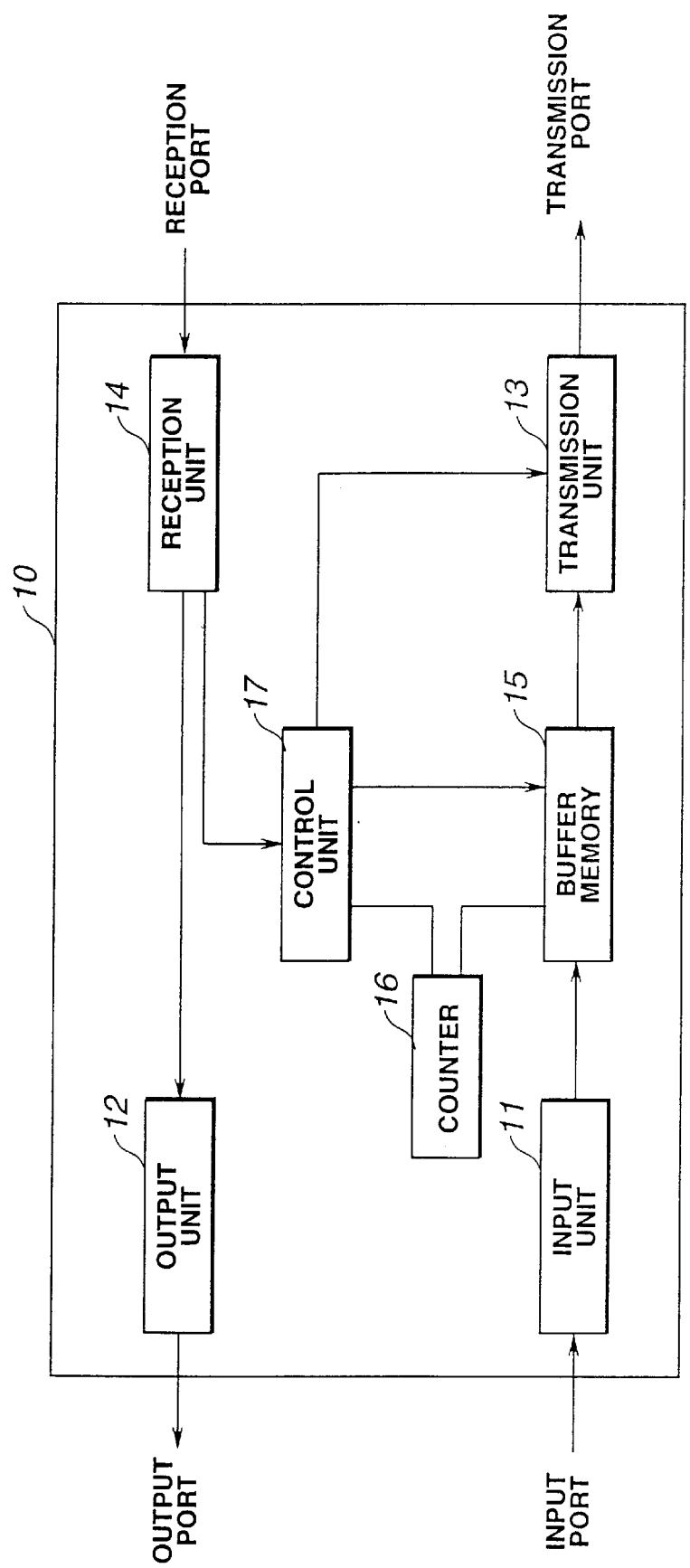
FIG. 2 is a block diagram depicting a detailed structure of a slave unit shown in FIG. 1.

FIG. 2 is a block diagram in which the detailed structure of the slave units 10-1, 10-2, . . . , 10-m shown in FIG. 1 is depicted as a slave unit 10.

In FIG. 2, the slave unit 10 comprises an input unit 11 connected to an input port; an output unit 12 connected to an output port; a transmission unit 13 connected to a transmission port; a reception unit 14 connected to a reception port; a buffer memory 15 for temporarily storing signals from the input unit 11; a counter 16 for counting the information amount needed to transmit the signals stored in the buffer memory 15; and a control unit 17 for providing the master unit 20 with reports regarding the information amount counted by the counter 16 in accordance with the instructions from the master unit 20, transmitting to the master unit 20 the signals temporarily stored in the buffer memory 15, and performing other control procedures.

Figure 3:
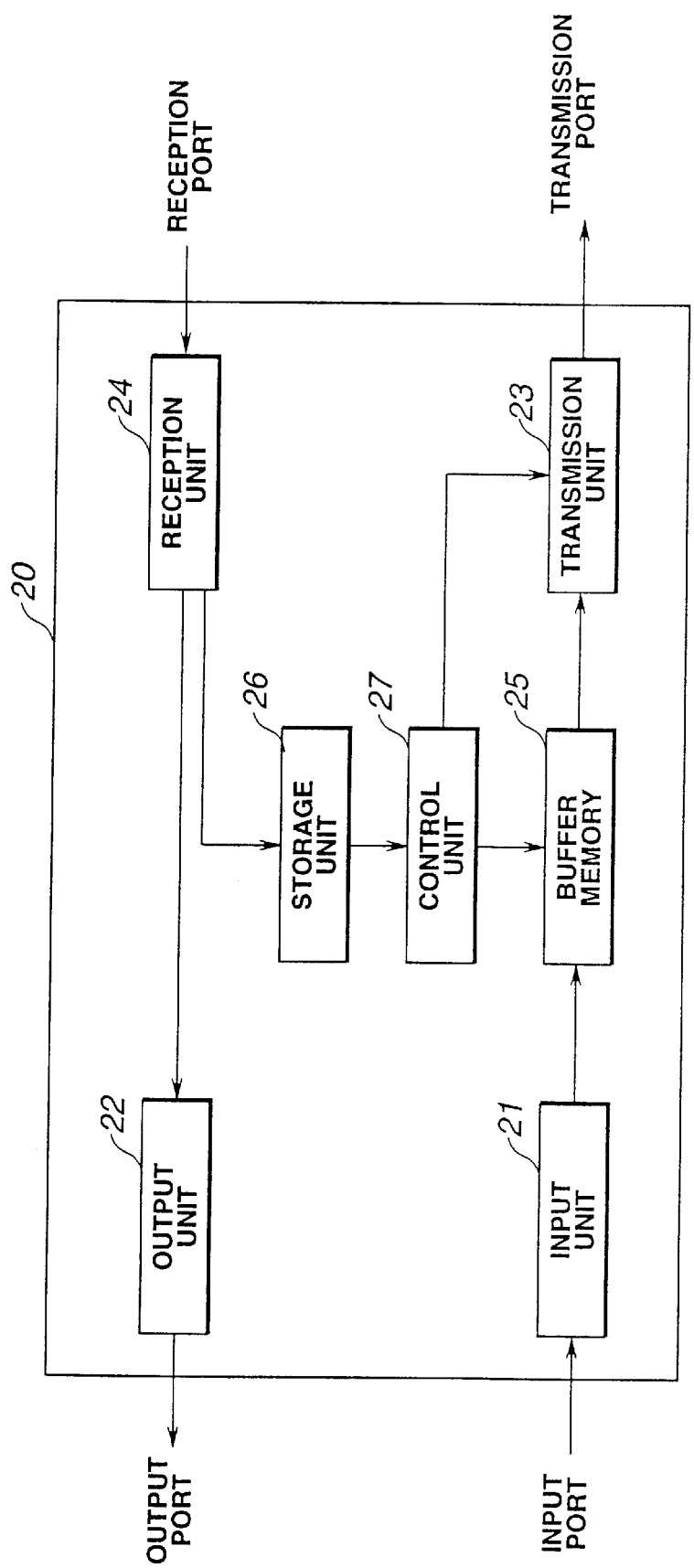
FIG. 3 is a block diagram depicting a detailed structure of the master unit shown in FIG. 1.

FIG. 3 is a block diagram depicting a detailed structure of the master unit 20 shown in FIG. 1.

In FIG. 3, the master unit 20 comprises an input unit 21 connected to an input port; an output unit 22 connected to an output port; a transmission unit 23 connected to a transmission port; a reception unit 24 connected to a reception port; a buffer memory 25 for temporarily storing signals from the input unit 21; a storage unit 26 for storing the storage amounts reported by each slave unit 10, the enabling amounts that allow each slave unit 10 to transmit a signal, and the like; and a control unit 27 for instructing each slave unit 10 to issue a report regarding the information amount needed for signal transmission, issuing instructions concerning signal transmission, and performing other control procedures.

Figure 4:
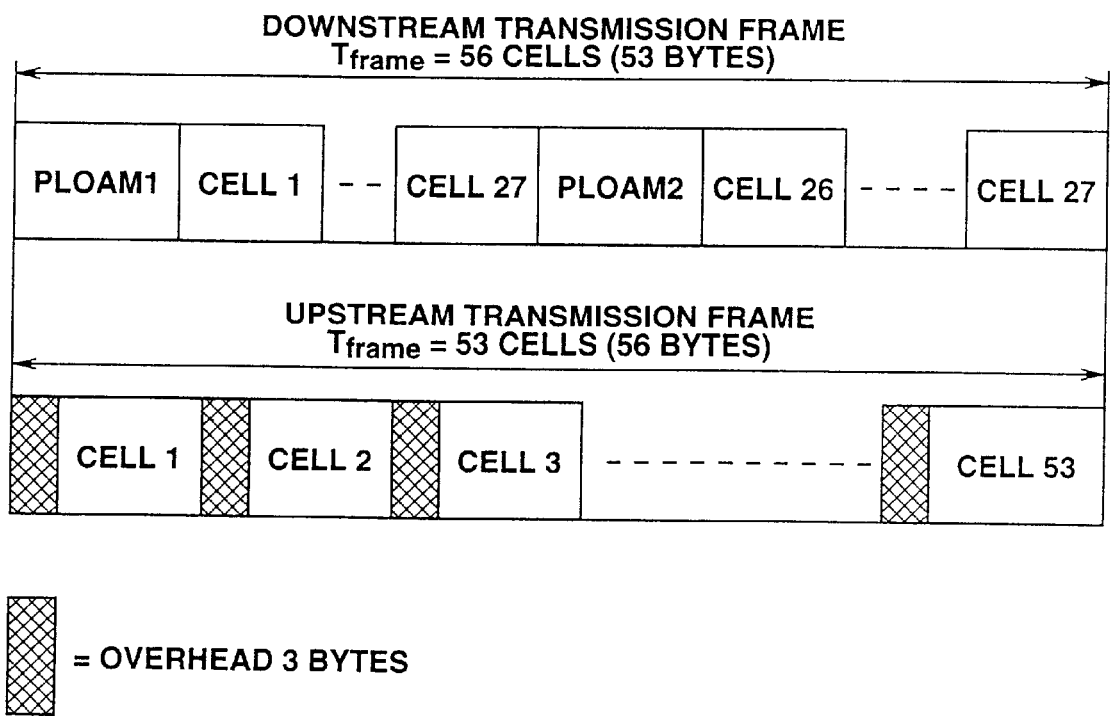
FIG. 4 is a frame block diagram depicting upstream and downstream transmission frames in the transmission line shown in FIG. 1.

FIG. 4 depicts the upstream and downstream transmission frames in the transmission line shown in FIG. 1.

In FIG. 4, a downstream frame comprises 56 slots (56 cells), and an upstream frame comprises 53 slots (53 cells). Based on these transmission frames, 53- and 56-byte cells are exchanged downstream and upstream, respectively, in accordance with the TDM (Time Division Multiplex) multiplexing protocol in the case of the downstream transmission from the master unit 20 to the slave units 10, and in accordance with the TDMA (Time Division Multiple Access) multiplexing protocol in the case of the upstream transmission from the slave units 10 to the master unit 20.

An upstream cell contains a 3-byte overhead, and downstream transmission frames contain two PLOAM cells (PLOAM1, PLOAM2) per frame in a ratio of one cell for every 28 cells.

Figure 5:
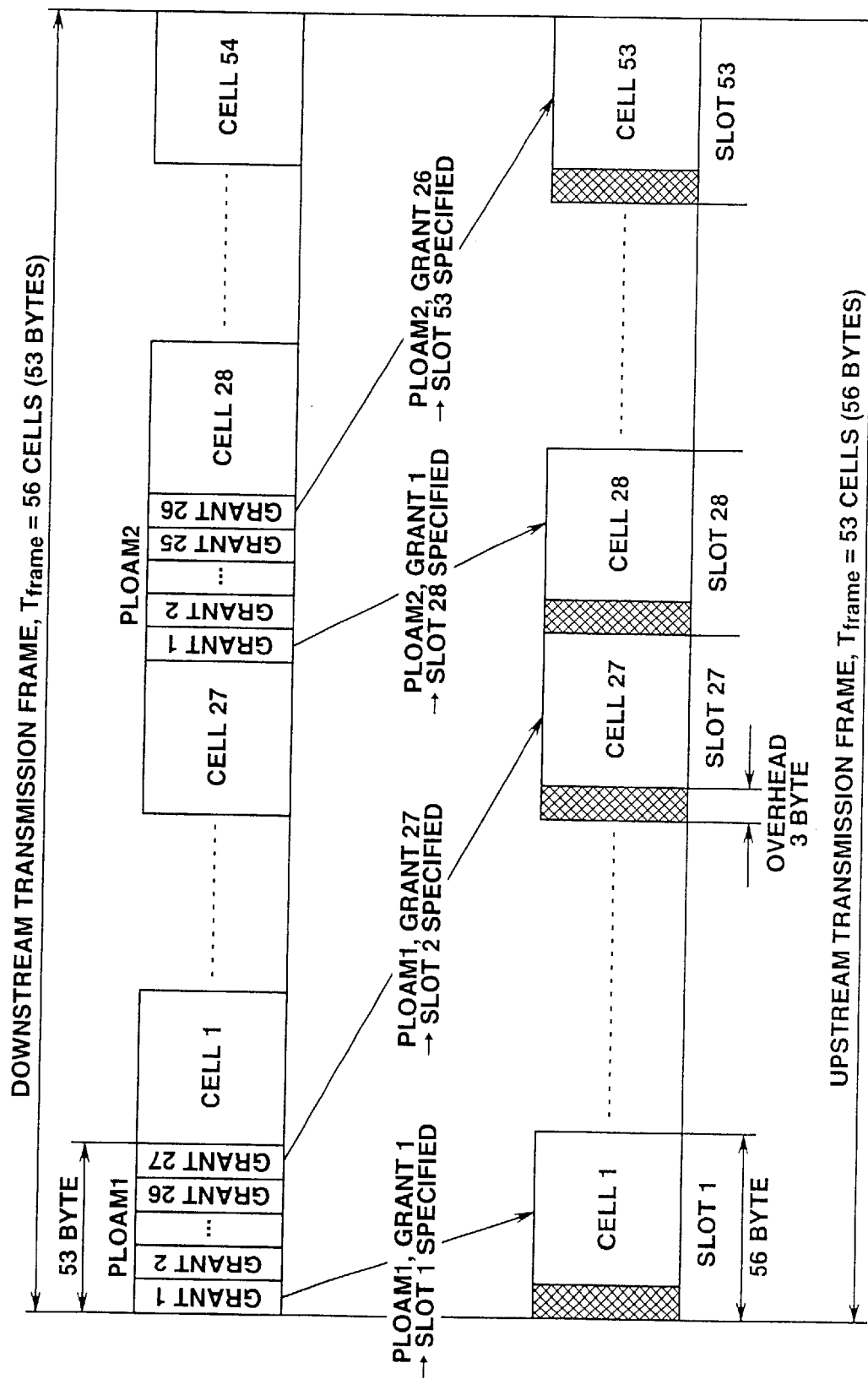
FIG. 5 is a diagram illustrating the correlation between the slots of the upstream transmission frame and the grants of the PLOAM cells shown in FIG. 4.

FIG. 5 illustrates the correlation between the slots of an upstream transmission frame and the grants of a PLOAM cell.

As shown in FIG. 5, the first PLOAM cell (PLOAM1) of the downstream transmission frame has 27 grants for requesting upstream cells from the slave units 10, and the second PLOAM cell (PLOAM2) has 26 grants, to a total of 53 grants.

The master unit 20 issues instructions as to which slave unit 10 can transmit a cell to a particular slot inside the upstream transmission frame by writing the ID number or other identifier of the slave unit 10 to the PLOAM cell PLOAM1 or the PLOAM cell PLOAM2.

The slave unit 10 can transmit the cell to that slot in the upstream transmission frame which corresponds to the aforementioned grants when the identifier of the slave units 10 is written in the PLOAM cell PLOAM1 or the PLOAM cell PLOAM2. This method makes it possible to prevent cell collisions in the optical transmission line.

An access protocol for the point-to-multipoint communication system shown in FIG. 1 will now be described.

In the description that follows, i expresses the ID numbers of the individual slave units 10-1 to 10-m as identifiers for the slave units 10-1 to 10-m. The total number of the slave units 10-1 to 10-m is m, so i=1, 2, . . . , m.

The ID numbers of the slave units 10-1 to 10-m are managed by the master unit 20, and these ID numbers are conveyed during the initial stage to all the slave units 10-1 to 10-m participating in the operation of the system. By virtue of these ID numbers, the master unit 20 can trace a cell to a particular slave unit 10-1 to 10-m, and each of the slave units 10-1 to 10-m can determine whether the cell it has received is addressed to this station.

Signals such as voice, video, or data are input from a terminal or other network to the input port of the slave unit 10 shown in FIG. 2 and to the input port of the master unit 20 shown in FIG. 3, and these signals are sent to the buffer memories 15 and 25 via the input units 11 and 21, and are temporarily stored in the buffer memories 15 and 25.

The signals stored in the buffer memory 15 or 25 may be arranged in cells or packets while stored in the buffer memory 15 or 25, such as ATM cells or Ethernet packets, for example.

Another feature of this embodiment aspect is that the input signals have good consistency when arranged as ATM cells because each slot of the downstream transmission frame and each slot of the upstream transmission frame (excluding the overhead) has 53 bytes, as in the case of the transmission frames shown in FIG. 5.

For example, consistency can be improved by mapping the signals to ATM AAL Type 5 when input signals are Ethernet packets.

In the counter 16 of the slave unit 10 shown in FIG. 2, the information amount necessary to transmit the signals temporarily stored in the buffer memory 15 causes the number of cells or slots necessary for such signal transmission to be counted in integral units.

In the upstream transmission frame shown in FIG. 5, for example, the information amount is counted such that 53 bytes constitute one unit because the signals are transmitted using 53 bytes (excluding the overhead).

Examples of recommended counting methods include methods in which counting is performed as required in accordance with the input of signals to the buffer memory 15 and the output of signals from the buffer memory 15, and methods in which the counting is based on the difference between the start address and the end address of a signal stored as FIFO in the buffer memory 15. The information amount may be the absolute value of a signal stored in the buffer memory 15, or it may be a differential value based on the previous report.

Although the information amount may also be counted as an integral value using bits or bytes as units, counting this amount as the number of cells or slots needed to transmit a signal is effective because it reduces the values reported to the master unit 20.

If the stored signal is less than 53 bytes, a single cell or slot may be counted as the one necessary for transmission, and the counting may be stopped before 53 bytes are reached.

Described below with reference to FIGS. 6 to 10 is a first embodiment aspect, which is configured such that the master unit 20 uses PLOAM cells to instruct slave units 10 to issue reports regarding the information amount necessary to transmit signals.

Figure 6:
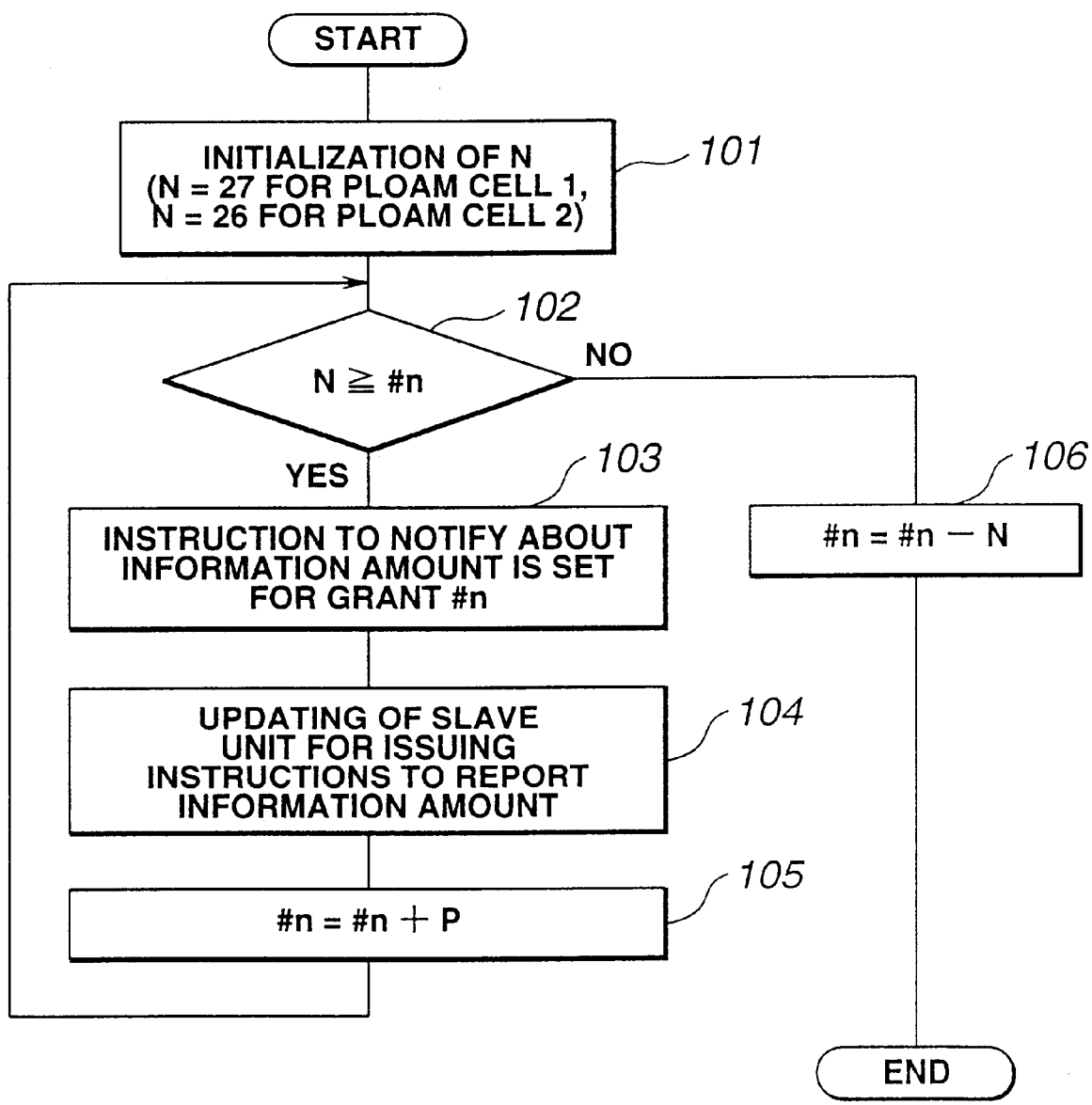
FIG. 6 is a flowchart depicting the procedure whereby the master unit shown in FIG. 1 instructs PLOAM cells to issue information amount reports.

FIG. 6 is a flowchart depicting the method whereby the master unit gives instructions to issue information amount reports to PLOAM cells.

In FIG. 6, N represents the total number of grants in the PLOAM cell PLOAM1 or the PLOAM cell PLOAM2. N=27 in the case of the PLOAM cell PLOAM1, and N=26 in the case of the PLOAM cell PLOAM2. In addition, P indicates the grant interval for giving instructions on information amount reporting, and #n indicates the grant number. P is initialized as an integral value (P≧1), and #n is initialized as #n=P (step 101).

It is checked whether N≧#n (step 102), and if N≧#n (YES in step 102), an instruction to issue an information amount report is set for the grant #n (step 103), and the slave unit instructed to issue an information amount report is updated (step 105). After that #n is changed to #n+P (step 105), and the process returns to step 102.

If it is determined in step 102 that N>#n (NO in step 102), #n is changed to #n−N (step 106), and the process is completed.

It is necessary to distinguish between signal transmission instructions and instructions to submit information amount reports when instructions to submit information amount reports are issued using the PLOAM cell PLOAM1 or the PLOAM cell PLOAM2.

Figure 7:
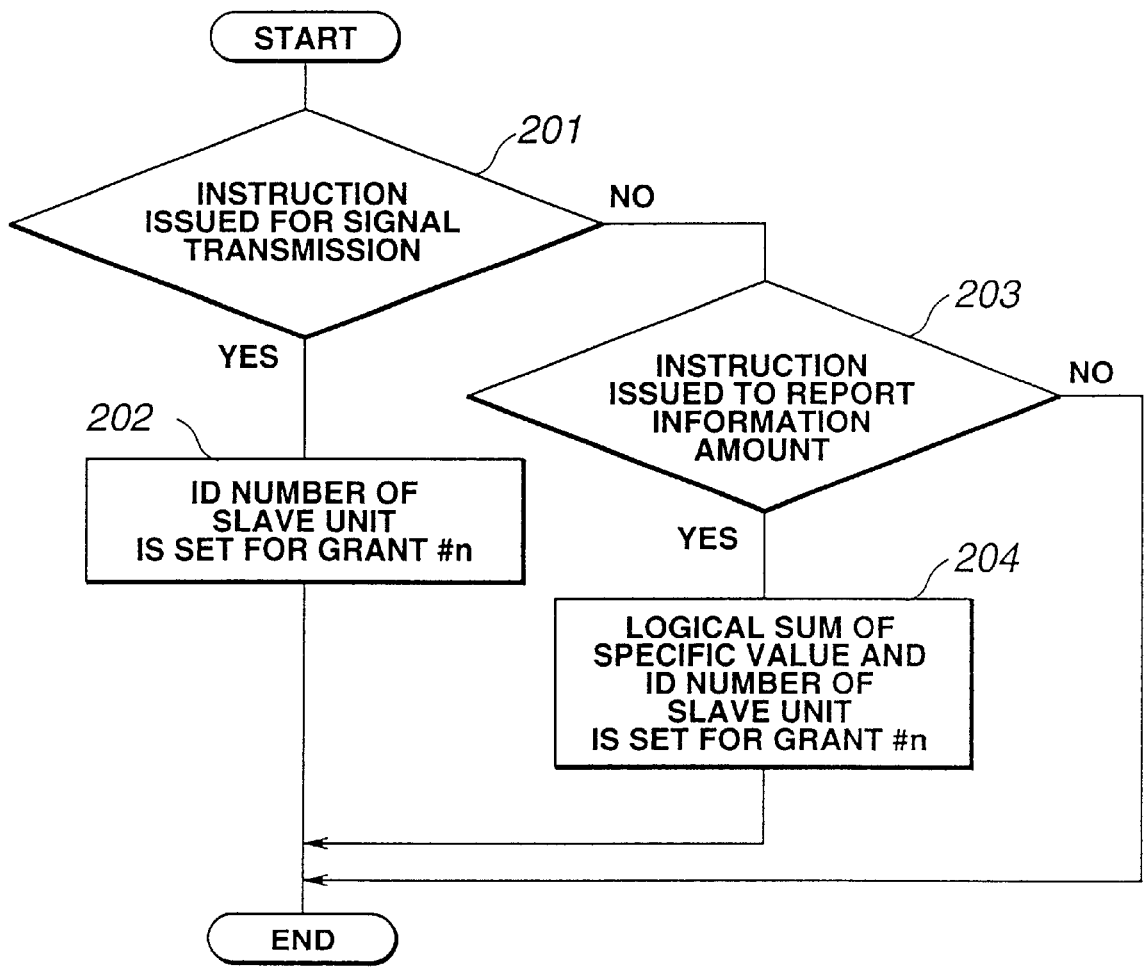
FIG. 7 is a flowchart depicting the procedure whereby the master unit shown in FIG. 1 instructs a slave unit to report information amount.
Figure 8:
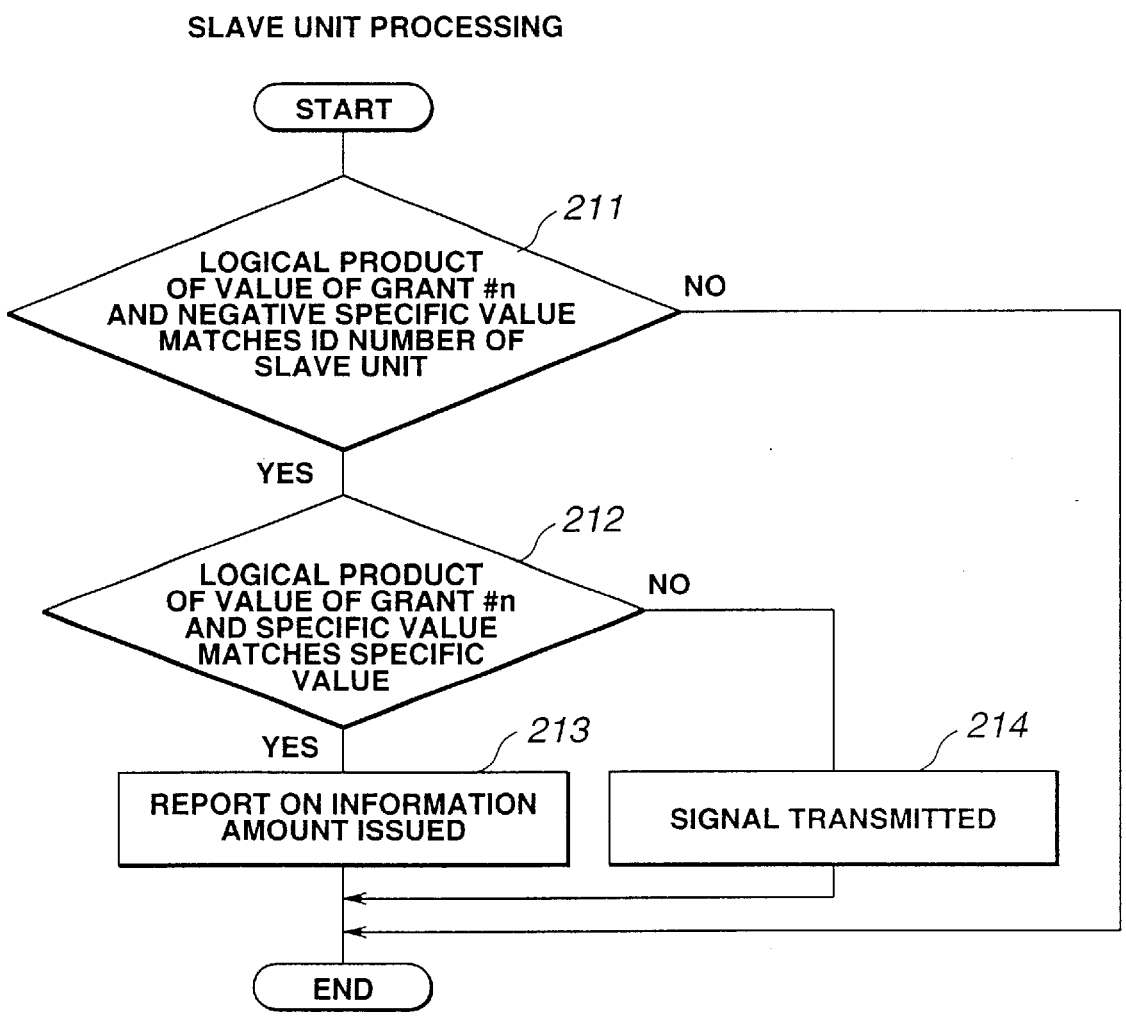
FIG. 8 is a flowchart depicting the procedure performed when a slave unit shown in FIG. 1 has received instructions from the master unit for reporting information amount.

To achieve this distinction, it may be suggested, for example, that the logical sum of a specific value and the ID number of a slave unit 10 be written to a grant, and a flag be raised for a specific bit when an instruction to submit an information amount report is given, as shown in FIGS. 7 and 8.

In the specific case shown in FIG. 7, the master unit 20 first checks whether an instruction to transmit a signal is to be issued (step 201), the ID number of the slave unit is set for the grant #n (step 202) if it is determined here that a signal is to be transmitted (YES in step 201), and the process is completed.

If, however, it is determined in step 201 that no instruction is to be given for signal transmission (NO in step 201), it is then checked whether an instruction is to be given to issue an information amount report (step 203), and the process is completed if it is determined in this case that no instruction is to be given to issue an information amount report (NO in step 203). If, however, it is determined that an instruction is to be given to issue an information amount report (YES in step 203), the logical sum of a specific value and the slave unit ID is set for the grant #n (step 204), and the process is completed.

The specific value used here should be set to a level not yet used as the ID number of the slave unit, such as 0×80 or the like.

The slave unit 10 checks whether a flag has been raised at a specific bit on the basis of the logical product of the specific value and the value written to the grant when the logical product of the negative specific value and the value written to the grant matches the ID number of the slave unit, and it is then determined whether information amount is to be reported or a signal transmitted.

In the specific example shown in FIG. 8, it is first checked whether the logical product of the negative specific value and the value of the grant #n matches the ID number of the slave unit in question (step 211), and if a match is found (YES in step 211), it is then checked whether the logical product of the specific value and the value of the grant #n matches the specific value (step 212).

If a match is found in this case (YES in step 212), it is concluded that an instruction to issue an information amount report is to be given, an information amount report is issued (step 213), and the process is completed.

The instruction is found to be for signal transmission, a signal is transmitted (step 214), and the process is completed if no match is found in step 211 (NO in step 211) or step 212 (NO in step 212).

Figure 9:
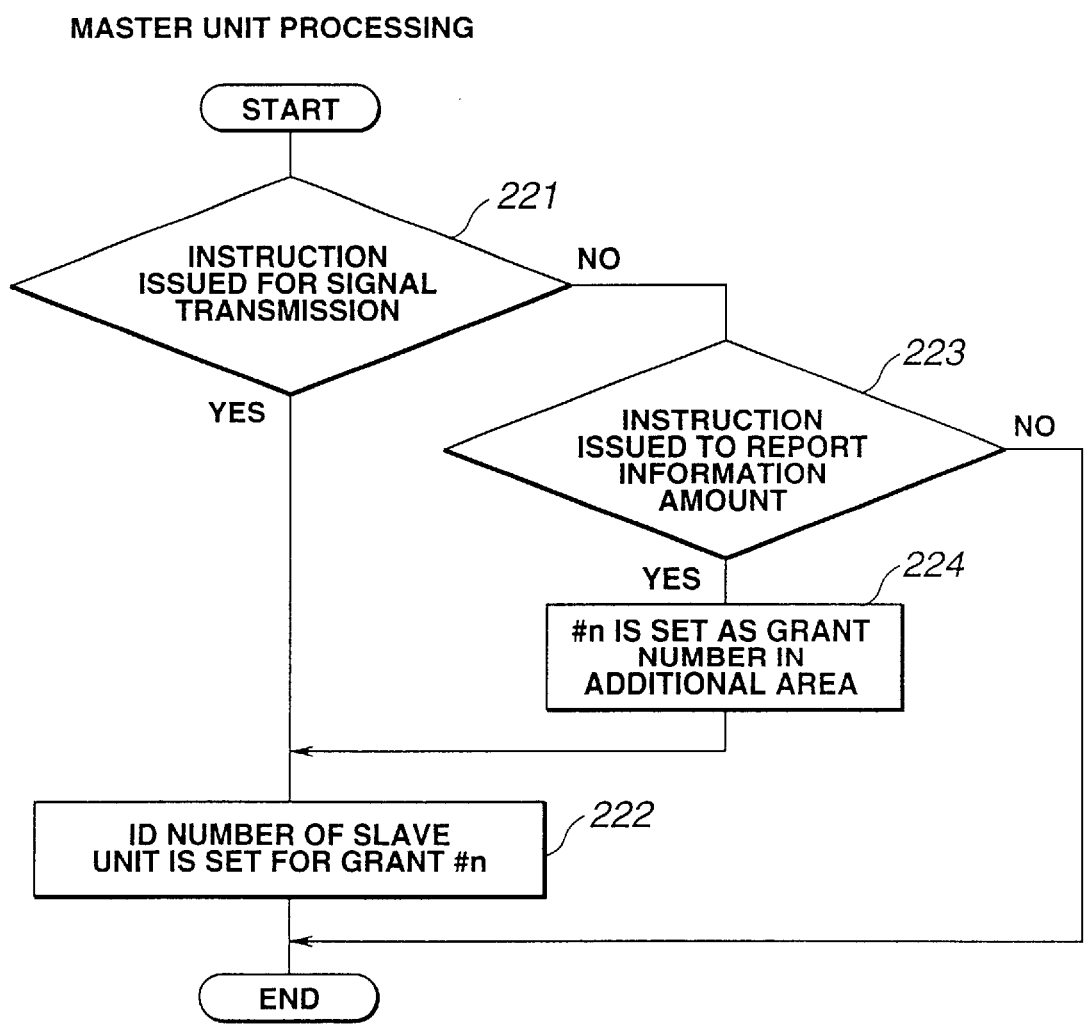
FIG. 9 is a flowchart depicting another example of the procedure whereby the master unit shown in FIG. 1 instructs a slave unit to report information amount.
Figure 10:
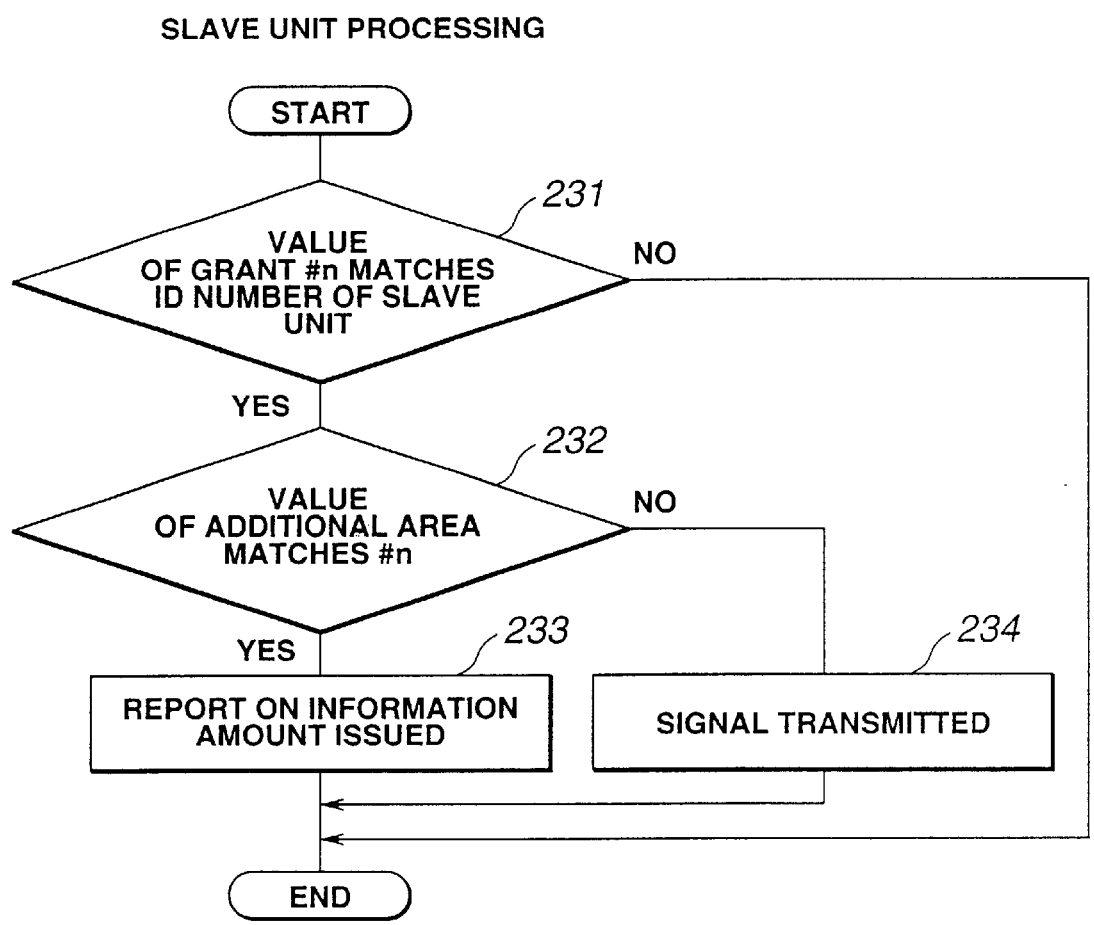
FIG. 10 is a flowchart depicting another example of the procedure performed when a slave unit shown in FIG. 1 has received instructions from the master unit for reporting information amount.

According to another method, it is suggested that the ID number of a slave unit 10 be written to a grant, and the number #n of the grant instructed to submit an information amount report be written to the additional area of the PLOAM cell PLOAM1 or the PLOAM cell PLOAM2, as shown in FIGS. 9 and 10.

In the specific case shown in FIG. 9, the master unit 20 first checks whether an instruction is to be given to transmit a signal (step 221). The ID number of the slave unit is set for the grant #n (step 222), and the process is completed if it is concluded here that a signal is to be transmitted (YES in step 221).

If, however, it is concluded in step 221 that no instruction is to be given to transmit a signal (NO in step 221), it is then checked whether an instruction is to be given to issue an information amount report (step 223), and the process is completed if it is determined here that no instruction is to be given to issue an information amount report (NO in step 223). The parameter #n is set as the grant number in the additional area of the grant (step 224), and the process is completed if it is determined that an instruction is to be given to issue an information amount report (YES in step 223).

The slave unit 10 reads the aforementioned additional area value if the ID number of the slave unit 10 written to the grant matches the ID number of this slave unit 10. This value is compared with the number of the grant for which a transmission instruction has been issued, and it is checked whether information amount is to be reported or a signal transmitted.

In the specific example shown in FIG. 10, it is first checked whether the grant #n matches the ID number of the slave unit in question (step 231), and if a match is found (YES in step 231), it is then checked whether the value in the additional area of the grant matches #n (step 232).

If a match is found in this case (YES in step 232), it is concluded that an instruction to issue an information amount report is to be given, an information amount report is issued (step 233), and the process is completed.

The instruction is found to be for signal transmission, a signal is transmitted (step 234), and the process is completed if no match is found in step 231 (NO in step 231) or step 232 (NO in step 232).

Following is a description of the method whereby slave units 10 present the master unit 20 with reports on the information amount needed to transmit signals according to the first embodiment aspect.

If a slave unit 10 concludes that an instruction to issue an information amount report has been given to this slave unit 10 according to the flowcharts in FIGS. 7 to 10, the result is the creation of a cell to which at least the following data is written: a cell identifier indicating the information amount report, the information amount counted by the counter, and the ID number of the slave unit.

The cell thus created is transmitted to the master unit 20 via the transmission unit 13 by means of the slots in the upstream transmission frame that correspond to the grants instructed to issue a report.

Information amount is reported using either one or both of the absolute values counted by the counter 16 and the differential values based on the previous report.

Following is a description of the method whereby the master unit 20, upon receipt of an information amount report from a slave unit 10, instructs each slave unit 10 to transmit signals in accordance with the information amount reported.

In the description that follows, the maximum specific number of kilobits for the enabling amount that allows a slave unit 10 to transmit a signal is the same for all the slave units 10.

In the master unit 20 shown in FIG. 3, cells received from the slave units 10 via the reception port are identified based on the cell identifiers written to the cells. This is done after headers are removed in the reception unit 24.

The cells thus identified are sent to the storage unit 26 when they are for issuing information amount reports, and to the output unit 22 when they are for transmitting signals.

FIGS. 11a and 11b depict an exemplary information amount table 300 and an exemplary enabling amount table 400 corresponding to the structure of the storage unit 26 in the master unit 20 shown in FIG. 3.

The information amount table 300 (see FIG. 11a) contains the information amount reported by the slave units 10, and with the exemplary enabling amount table 400 (see FIG. 11b) contains enabling amounts that allow the slave units 10 to transmit signals.

In this case, the information amounts $R_i$ in the information amount table 300 and the enabling amounts $G_i$ in the enabling amount table 400 are initially set to zero, and the values of information amount $R_i$ and enabling amount $G_i$ individually assigned to the slave units 10 are written to the slave unit numbers i (ID numbers i) of the information amount table 300 and enabling amount table 400.

Upon receipt of the cells for issuing information amount reports from the reception unit 24, the storage unit 26 reads the ID numbers of the slave units 10 and the reported information amount $R_i$ written to the cells, and, based on the values thus read, updates the information amount $R_i$ matching the ID numbers of the slave units 10 in the information amount table 300.

With the control unit 27 of the master unit 20, the enabling amounts $G_i$ that allow the slave units 10 to transmit signals are calculated as specific maximum numbers of kilobits on the basis of the information amount table 300 of the storage unit 26.

Figure 12:
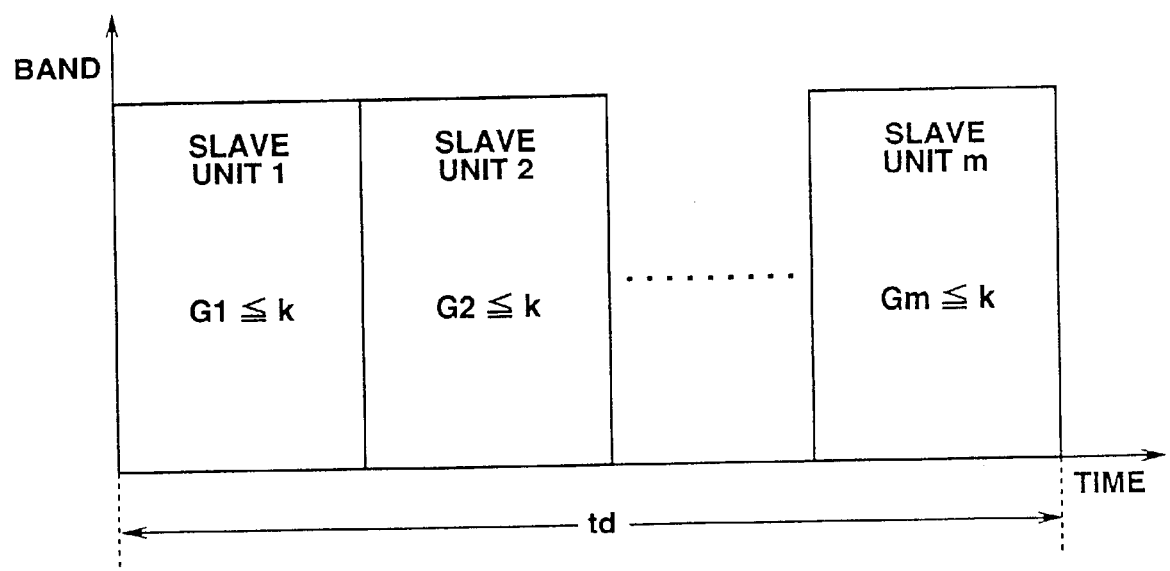
FIG. 12 is a diagram depicting band allocation in the point-to-multipoint communication system shown in FIG. 1.

Here, the specific maximum value k is set such that the following relation is satisfied:

$$k \leq (r \times td) \div (\alpha \times m) \tag{1},$$

where m is the total number of slave units 10, $\alpha$ is the proportion of currently active slave units 10 ($0 < \alpha \leq 1.0$), r (b/s) is the data transfer rate, and td (s) is the delay time allowed for data transmission and determined by the system, as in the band allocation shown in FIG. 12.

The proportion a of currently active slave units 10 is given by $$\alpha = (\text{Number of currently active slave units}) \div m \quad (2),$$

where $\alpha = 1.0$ when all the slave units 10 are currently active.

The data transfer rate r in Eq. (1) is the rate at which signals can actually be transmitted as upstream transmission frames. With the transmission frames shown in FIG. 4, for example, r=144.4 Mb/s in a case in which information amount is reported at a rate of one cycle per frame.

Furthermore, the delay time td allowed for data transmission is set on the basis of the type of service or the like handled by the system. For example, a value of about 0.001–0.1 s is considered appropriate for a voice service, in which no delay is allowed. By contrast, a value of about 0.1–1 s is considered appropriate for a data-based service in which some delay is allowed, taking into account, among other things, the imperceptible time that elapses until a signal transmission is completed.

The number of currently active slave units 10 in Eq. (2) is counted by the master unit 20 shown in FIG. 1. To achieve this, it may be suggested, for example, that cells arriving from the slave units 10 be monitored, and the slave units 10 that have transmitted the cells in accordance with the instructions from the master unit 20 be counted as being currently active.

According to another method, the master unit 20 polls the slave units 10, and the slave units 10 that have responded to this polling are counted as being currently active.

Figure 13:
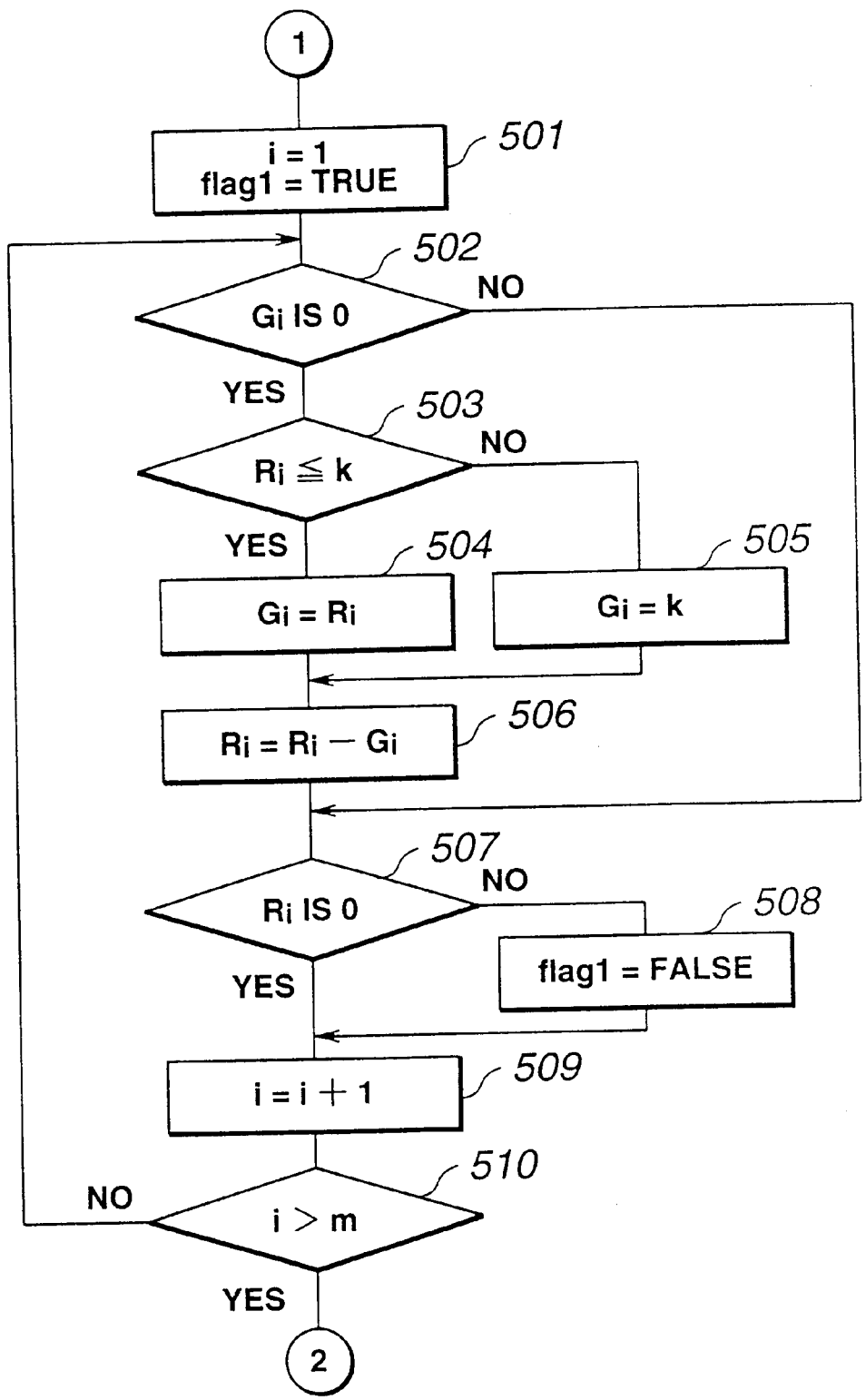
FIG. 13 is a flowchart depicting the procedure for calculating the enabling amounts Gi in the master unit shown in FIG. 1.
Figure 14:
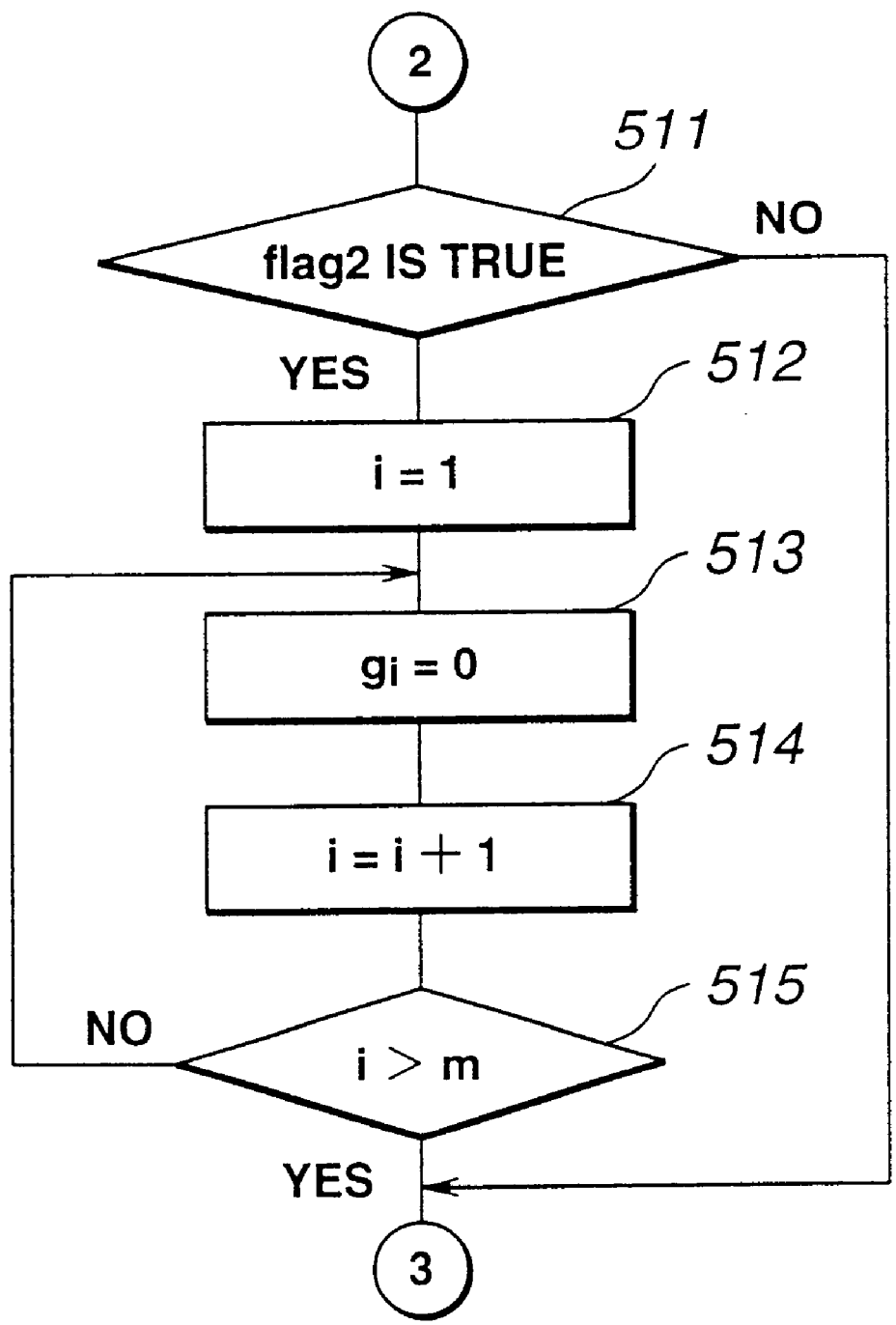
FIG. 14 is a flowchart depicting the procedure for initializing an instructional amount gi for instructing a slave unit to transmit a signal during transmission of a PLOAM cell in the master unit shown in FIG. 1.
Figure 15:
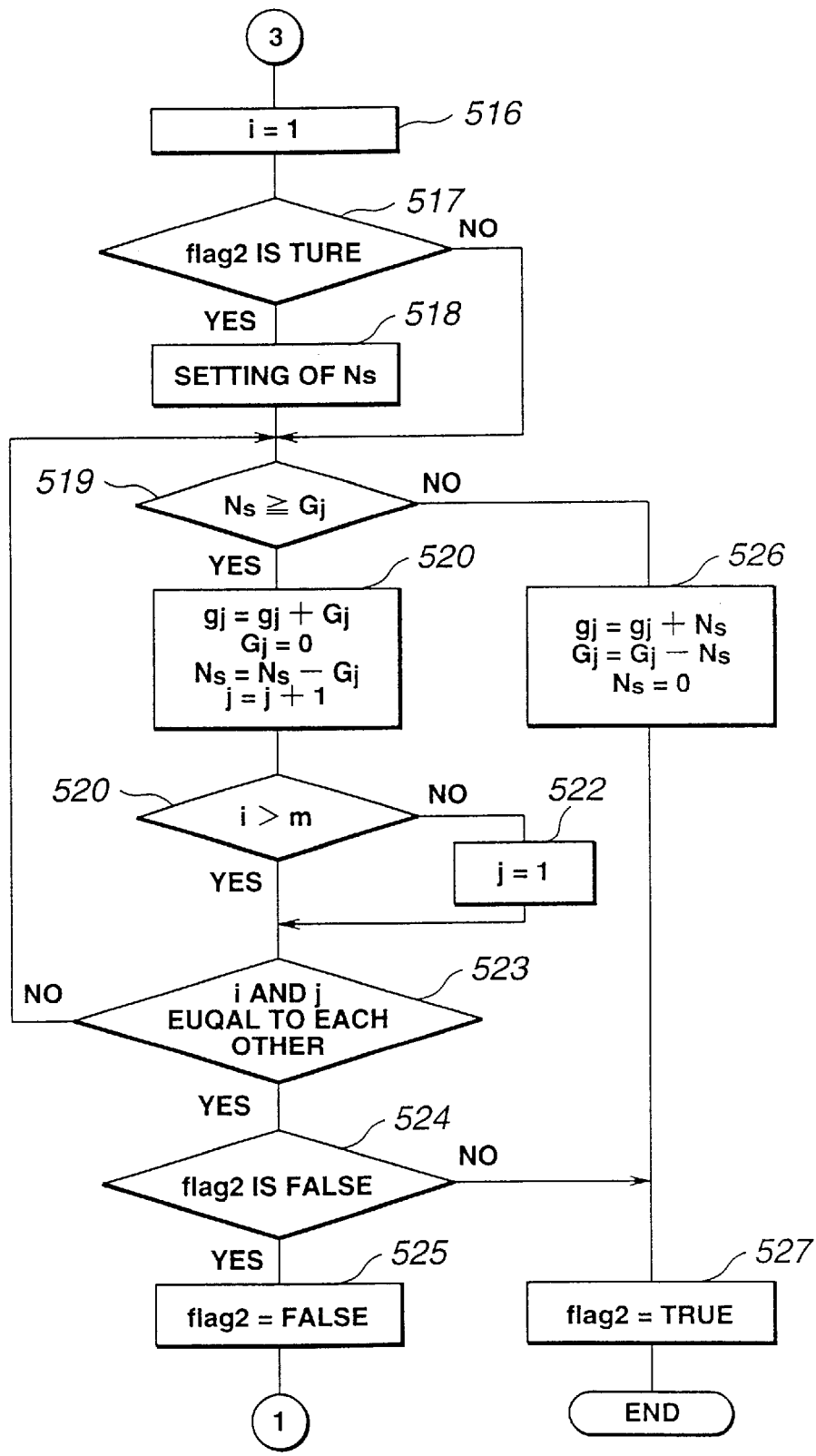
FIG. 15 is a flowchart depicting the procedure for calculating the instructional amount gi for instructing a slave unit to transmit a signal during transmission of a PLOAM cell in the master unit shown in FIG. 1.

FIGS. 13 to 15 depict as flowcharts the procedure for calculating the enabling amounts Gi in the master unit (FIG. 13), the procedure for initializing an instructional amount gi for instructing a slave unit to transmit a signal during transmission of a PLOAM cell in the master unit (FIG. 14), and the procedure for calculating the instructional amount gi for instructing a slave unit to transmit a signal during transmission of a PLOAM cell in the master unit (FIG. 15).

The enabling amount Gi may also be calculated such that cells for submitting information amount reports are received by the control unit 27 directly from the reception unit 24 without any calculations being made based on the information amount table 300 of the storage unit 26, and the enabling amount Gi is calculated sequentially every time an information amount report is received.

In FIGS. 13 to 15, i and j are the ID numbers of slave units 10, m is the total number of the slave units 10, Ns is the number of grants for allowing instructions for signal transmission to be issued for the PLOAM cell PLOAM1 or the PLOAM cell PLOAM2, Ri is the information amount of the slave unit i, Gi is the enabling amount of the slave unit i, "flag 1" indicates whether the information amount Ri of all the slave units 10 is zero, and "flag 2" is a flag that indicates whether gi calculations have been completed.

In FIGS. 13 to 15, $1 \leq i \leq m$, $1 \leq j \leq m$, and the conditions j=0, Gi=0, and flag 2=TRUE are set as initial values.

Ns is 27 when the PLOAM cell is PLOAM1, and 26 when the PLOAM cell is PLOAM2 if neither the grants of the PLOAM cell PLOAM1 nor the grants of the PLOAM cell PLOAM2 are used, and the value obtained by subtraction from the number of grants used is set as Ns when the grants are used to issue instructions to submit information amount reports or the like.

The flowcharts in FIGS. 13 to 15 will now be described.

In FIG. 13, i–1 and flag 1=TRUE are first initialized (step 501), and it is then checked whether Gi is zero (step 502).

If it is concluded here that Gi is zero (YES in step 502), it is then checked whether Ri sk (step 503). Gi=Ri is set (step 504) if Ri≦k (YES in step 503), and Gi=k is set (step 505) if the condition Ri≦k does not hold true (NO in step 503).

Ri=Ri−Gi is set (step 506), and the operation proceeds to step 507.

If, however, it is concluded in step 502 that Gi is no zero (NO in step 502), the operation proceeds to step 507 without updating Gi because the grants of the PLOAM cell PLOAM1 or the PLOAM cell PLOAM2 are insufficient, and the master unit 20 has refrained from instructing the slave unit i to transmit a signal that corresponds to the enabling amount Gi.

It is checked in step 507 whether the Ri of any slave unit 10 is zero (step 507). The operation proceeds to step 509 if Ri is indeed 0 (YES in step 507). FALSE is set for flag 1 (step 508) if Ri is no zero (NO in step 507), and the operation proceeds to step 509.

In step 509, i is incremented by 1 (i=i+1), and it is then checked whether i>m (step 510). The operation returns to step 502 if it is concluded here that the condition i>m does not hold true (NO in step 510), and proceeds to step 511 in FIG. 14 if it is concluded that i>m (YES in step 510).

In step 511 in FIG. 14, it is checked whether flag 2 is TRUE. If it is concluded here that flag 2 is indeed TRUE (YES in step 511), i=1 is set (step 512), gi=0 is then set (step 513), and i is incremented by 1 (i=i+1).

It is checked whether i>m (step 515), and the operation returns to step 513 if it is concluded that the condition i>m does not hold true (NO in step 515), and proceeds to step 516 in FIG. 15 if it is concluded that i>m (YES in step 515).

If flag 2 is not TRUE, that is, is FALSE, in step 511 (NO in step 511), the operation proceeds to step 516 in FIG. 15 without initializing the aforementioned gi because in this case the instructional amount gi of the slave unit i is being calculated repeatedly.

In step 516 in FIG. 15, i=j is set, and it is then checked whether flag 2 is TRUE (step 517). Ns is set (step 518) and the operation proceeds to step 519 if it is concluded here that flag 2 is indeed TRUE (YES in step 517). The operation proceeds to step 519 without setting NS if it is concluded in step 517 that flag 2 is not TRUE (NO in step 517).

It is checked in step 519 if Ns=Gj. If it is concluded here that Ns=Gj (YES in step 519), then gj=gj+Gj, Gj=0, and Ns=NS−Gj are set, and j is incremented by 1 (j=j+1) (step 520). It is checked whether j>m (step 512), and the operation proceeds to step 523 if j>m (YES in step 512). If the condition j>m does not hold true (NO in step 521), then j=1 is selected (step 522), and the operation proceeds to step 523.

It is checked in step 523 whether i and j are equal to each other, and the operation returns to step 519 if i and j are not equal to each other (NO in step 523). If they are equal to each other (YES in step 523), it means that the calculation of the instructional amount gj for issuing instructions related to signal transmission has come a full circle. For this reason, it is then checked whether flag 1 is FALSE (step 524), and if it is concluded that flag 1 is indeed FALSE (YES in step 524), the operation proceeds to step 501 in FIG. 13, and the enabling amount Gi and instructional amount gi are again calculated according to the flowchart in FIG. 13.

If flag 1 is FALSE, that is, TRUE, in step 524 (NO in step 524), it means that all the grants have been used or that instructions for signal transmission have been issued for all the information amounts Ri, so flag 2 is set to TRUE (step 527), and the process is completed.

If the condition Ns=Gj does not hold true in step 519, that is, the inequality Gj>Ns is satisfied (NO in step 519), it means that an instruction to transmit a signal corresponding to the enabling amount Gj cannot by issued by a single PLOAM cell 1 or PLOAM cell 2, so the conditions gj=gj+Ns, Gj=Gj−Ns, and Ns=0 are set (step 526), flag 2 is set to TRUE (step 527), and the process is completed. In this case, a slave unit j is instructed to transmit signals with continuous PLOAM cells 1 or PLOAM cells 2.

Figure 16:
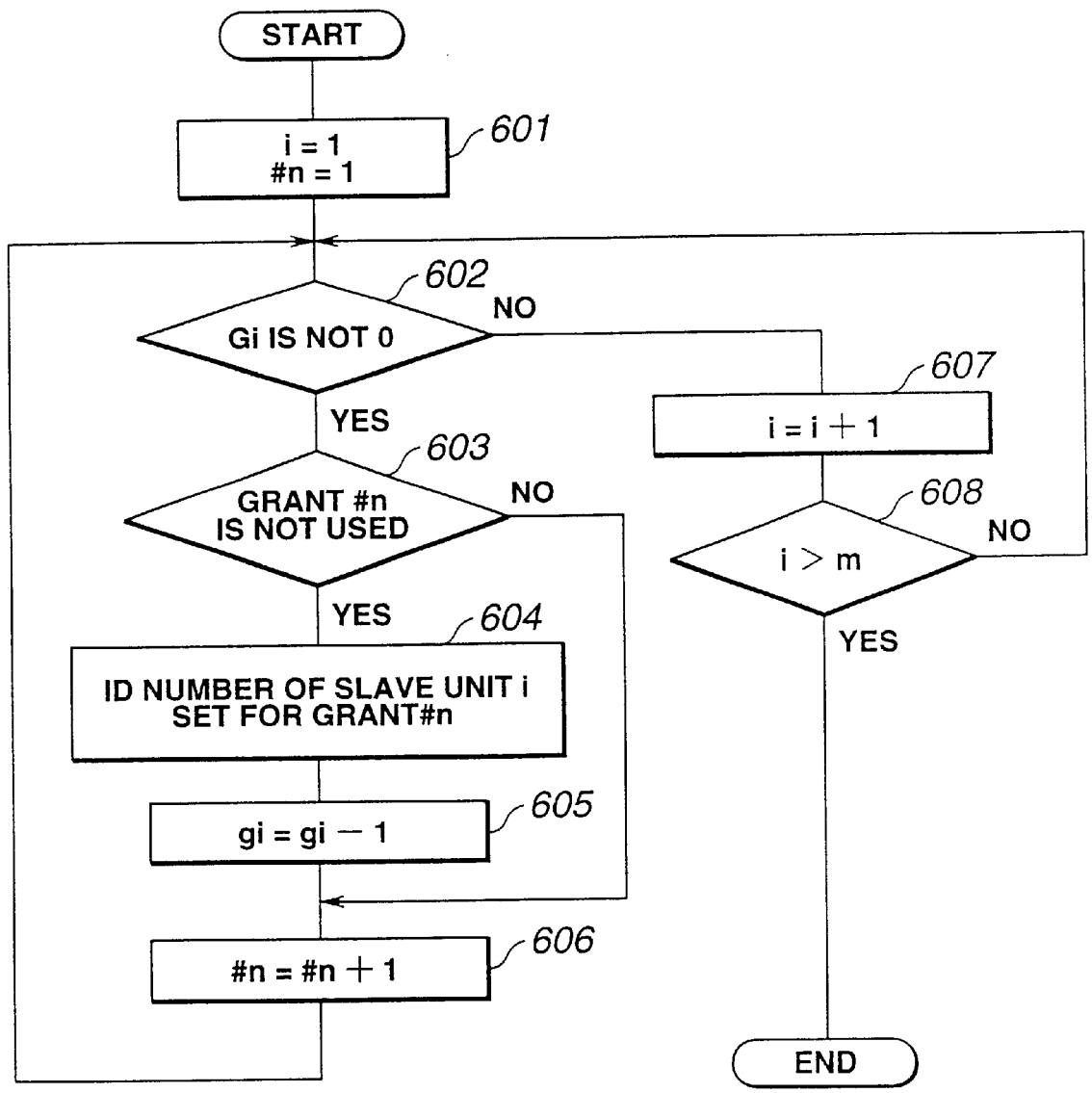
FIG. 16 is a flowchart depicting the procedure for issuing signal transmission instructions for the PLOAM cells in the master unit shown in FIG. 1.

FIG. 16 is a flowchart depicting the method by which the master unit 20 issues signal transmission instructions for PLOAM cells.

Base on the gi obtained by the calculation procedure in FIGS. 13 to 15 above, the master unit 20 creates the PLOAM cell PLOAM1 or the PLOAM cell PLOAM2 in accordance with the flowchart in FIG. 16, and transmits the result to slave units 10 via a transmission unit 23.

Specifically, i=1 and #n=1 are first set (step 601), and it is then checked whether gi is zero (step 602). If gi is not zero in this case (YES in step 602), it is then checked whether the grant #n is unused (step 603), and if this is true (YES in step 603), the ID number of a slave unit i is set for the grant #n (step 604).

The value gi is then decremented by 1 (gi=gi−1) (step 605), #n is incremented by 1 (#n=#n+1) (step 606), and the operation returns to step 602.

If it is concluded in step 602 that gi is zero (NO in step 602), i is incremented by 1 (i=i+1) (step 607), and it is checked whether i>m (step 608). The operation returns to step 602 if it is concluded here that the condition i>m does not hold true (NO in step 608), and the process is concluded if it is concluded that i>m (YES in step 608).

Following is a description of the method for transmitting signals in accordance with the instructions given by the master unit 20 to slave units 10.

In the slave unit 10 shown in FIG. 2, cells are received by the reception unit 14 via the reception port. In the reception unit 14, it is determined based on the addresses written to the cells whether the received cells are addressed to the slave unit 10 in question.

If the cells are indeed addressed to the slave unit 10 in question, cell type is determined based on the cell identifiers written to the cells. The identified cells are sent to the output unit 12 if they are signal cells, and to the control unit 17 they are PLOAM cells.

Once the PLOAM cells are received by the control unit 17 via the reception unit 14, it is checked whether an instruction has been issued to transmit a signal or to submit an information amount report in accordance with the flowcharts in FIGS. 7 to 10.

If it is concluded that a signal transmission instruction has been issued, the signal temporarily stored in the buffer memory 15 is retrieved, a signal-transmitting cell is created, and this cell is transmitted via the transmission unit 13.

Thus, the point-to-multipoint communication system shown in FIG. 1 operates according to an access protocol in which a slave unit 10 instructed to transmit a signal has exclusive use of the upstream transmission line and can continuously transmit signals at no more than the enabling amount Gi calculated by the master unit 20, as in the band allocation shown in FIG. 12.

Following is a description of comparison results obtained by simulating TDMA and CSMA/CD, which are conventional access protocols, and the access protocol based on the first embodiment aspect of the present invention described above.

Figure 17:
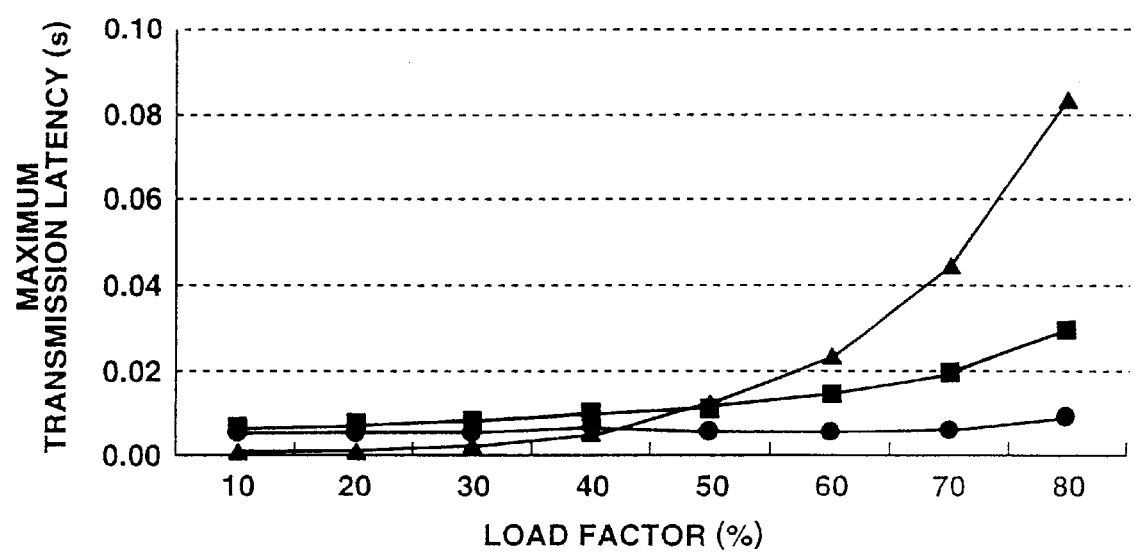
FIG. 17 is a diagram depicting the results of a comparison of maximum transmission latency times elapsed before signals are transmitted from a slave unit and a terminal in accordance with the transmission line load factor when bursty signals are generated by the slave unit and the terminal in the access protocol based on a first embodiment aspect of the present invention and in the access protocols based on conventional TDMA and CSMA/CD.

FIG. 17 depicts the results of a comparison of maximum transmission latency times elapsed before signals are transmitted from a slave unit and a terminal in accordance with the load factor of the transmission line when bursty signals are generated by the slave unit and the terminal according to the access protocol based on the first embodiment aspect of the present invention and according to the access protocols based on conventional TDMA and CSMA/CD.

The simulation was conducted on the assumption that the access protocol based on the present invention involved a point-to-multipoint communication system in which, based on FIG. 1, 32 slave units 10 and a single master unit 20 were connected by an optical transmission line 30, the transfer rate was 155.52 Mb/s, the distance between the master unit 20 and the slave units 10 was 20 km, and the propagation delay time was 100 $\mu$s.

In addition, CSMA/CD was assumed to involve a point-to-multipoint communication system in which, based on 100 Base-T, 32 terminals were connected to a single hub, the transfer rate was 100 Mb/s, the distance between the terminals and the hub was 200 m, and the propagation delay time was 1 $\mu$s.

According to another assumption regarding the access protocol based on the present invention, the maximum number of kilobits for the enabling amount that allows a slave unit to transmit a signal was determined using the following simulation parameters: the grant interval for issuing instructions for information amount reporting was set to 53, slave units issued information amount reports at a rate of one cycle per upstream transmission frame, and the delay time allowed for data transmission and determined by the system was set to td=0.1 s.

With respect to the access protocol based on conventional TDMA, it was assumed that the transfer rate of the optical transmission line was divided by the total number of slave units and that each of the slave units was allocated a fixed share of 4.86 Mb/s.

In FIG. 17, the load factor of the transmission line is plotted on the horizontal axis, and the maximum transmission latency time elapsed prior to transmission of signals generated by a slave unit and a terminal is plotted on the vertical axis.

It is apparent in FIG. 17 that the access protocol of the first embodiment aspect according to the present invention allows maximum transmission latency time to be stabilized at a comparatively low level without the increase observed in the access protocol of conventional TDMA or CSMA/CD, and can easily accommodate burst traffic even when the load factor of the transmission line reaches a high level (50% or higher) and the burst traffic increases in volume.

At a load factor of 80%, the maximum transmission latency time according to the access protocol of the present invention is about ⅓ that provided by the TDMA-based access protocol, and about ⅙ that provided by the CSMA/CD-based access protocol.

Figure 18:
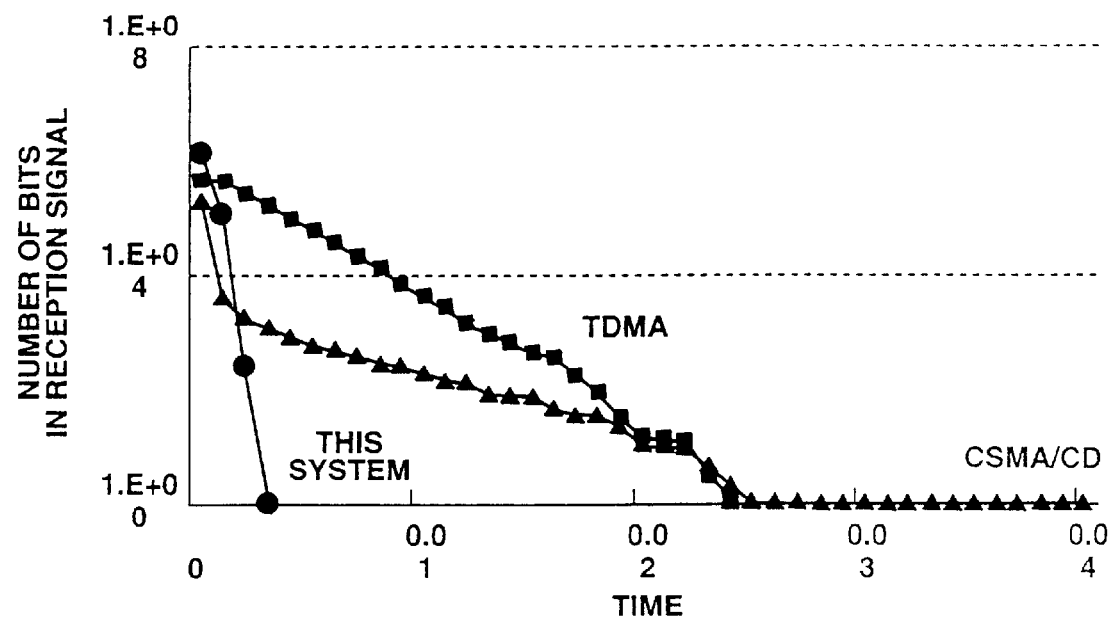
FIG. 18 is a diagram depicting the results of a comparison of the times needed for the master unit and a terminal to receive a 90-Mb signal at a transmission line load factor of 50% according to the access protocol of the present invention and access protocols based on conventional TDMA and CSMA/CD.

FIG. 18 depicts the results of a comparison of the times needed for the master unit and a terminal to receive a 90-Mb signal at a transmission line load factor of 50% according to the access protocol of the first embodiment aspect of the present invention and according to access protocols based on conventional TDMA and CSMA/CD.

In FIG. 18, time is plotted on the horizontal axis, and the number of bits received each time is plotted on the vertical axis.

It is apparent in FIG. 18 that whereas the access protocol of the first embodiment aspect of the present invention allows signal reception to be completed in a short time even when burst traffic on the order of several megabytes is generated, the conventional access protocols take fairly long for such signal reception to be completed.

According to the above-described simulation, the time elapsed until signal reception is completed in the case of the access protocol of the present invention is $\frac{1}{12}$ that achieved with the access protocol based on TDMA, and $\frac{1}{20}$ that achieved with the access protocol based on CSMA/CD.

It can be seen with regard to the access protocol based on CSMA/CD that when signals on the order of several megabits are generated in bursts, these signals are segmented into packets of about 64–1500 kB and repeatedly transmitted, prolonging signal transmission due to retransmissions caused by packet collisions and failing to ensure satisfactory access fairness even when the load factor of the transmission line is about 50%.

It can also be seen with regard to the TDMA-based access protocol, which is characterized by fixed band allocation, that the utilization ratio of the transmission line is low for signals generated in bursts and that even when the load factor of the transmission line is about 50%, a transmission-awaiting slave unit is incapable of using the time slots of other slave units and takes longer to transmit signals.

By contrast, it can be seen with regard to the access protocol of the first embodiment aspect of the present invention that the master unit allocates the band dynamically among the slave units when signals on the order of several megabytes are generated in bursts, so the utilization ratio of the transmission line is markedly improved and signal transmission can be completed in a short time even when the load factor of the transmission line is about 50%.

It can therefore be seen that the access protocol of the first embodiment aspect of the present invention ensures access fairness for all slave units, satisfies requirements concerning the delay time allowed for data transmission, and is superior in terms of absorbing burst traffic.

A second embodiment aspect of the point-to-multipoint communication system of the present invention will now be described.

The second embodiment aspect allows communications efficiency to be improved by adopting a structure in which the grant interval P at which the master unit 20 instructs slave units 10 to issue information amount reports is dynamically updated in accordance with the busy condition of the grants in the PLOAM cell PLOAM1 or the PLOAM cell PLOAM2.

This means that when, for example, a large number of unused grants are present in the PLOAM cell PLOAM1 or the PLOAM cell PLOAM2, the information amount reported by the slave units 10 is low, as is the load factor of the optical transmission line 30.

In such cases, the master unit 20 can identify in greater detail variations in the information amount of the slave units 10 by reducing the grant interval P for issuing instructions on information amount reporting or by issuing instructions on information amount reporting by utilizing unused grants.

The master unit 20 can therefore be more flexible in issuing signal transmission instructions under conditions of varying information amount from slave units 10, making it possible to reduce the latency time elapsed before a slave unit 10 transmits a signal and to lower the capacity of the buffer memory required by the slave unit 10 to temporarily store the signal.

Conversely, the information amount reported by the slave units 10 is substantial and the load factor of the optical transmission line 30 is high when the PLOAM cell PLOAM1 or the PLOAM cell PLOAM2 has only few unused grants or none at all.

In such cases, the band that can be used to transmit signals along the optical transmission line 30 can be broadened and the throughput improved by increasing the grant interval P for issuing instructions on information amount reporting. As noted above, it is possible to reduce the latency time elapsed before a slave unit 10 transmits a signal, to lower the capacity of the buffer memory required by the slave unit 10 to temporarily store the signal, and to increase throughput by dynamically instructing the slave units 10 to issue information amount reports.

Figure 19:
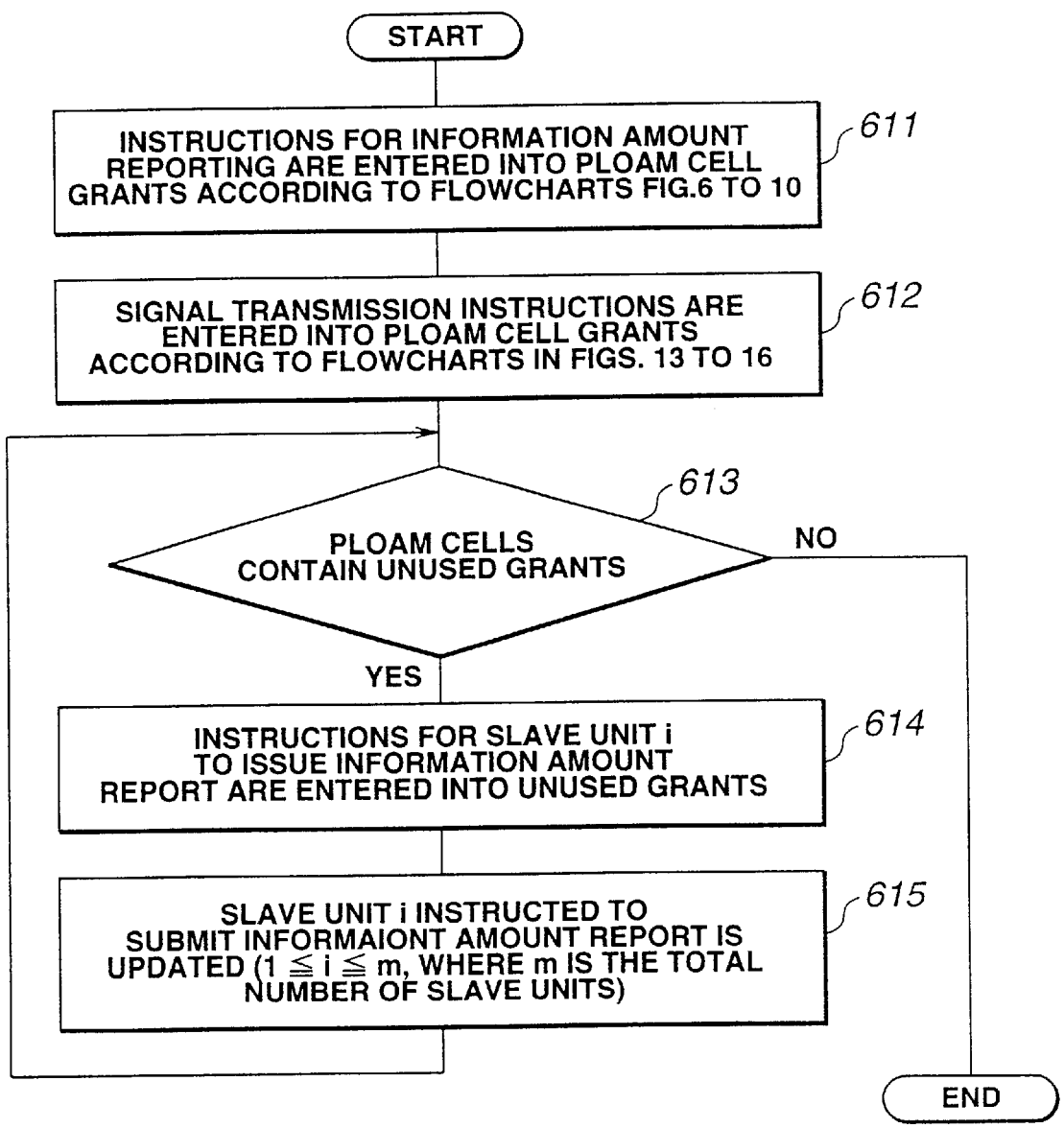
FIG. 19 is a flowchart depicting the sequence according to which transmission instructions are set for the grants of PLOAM cells according to a second embodiment aspect of the present invention, and the procedure whereby instructions for submitting information amount reports are issued for the unused grants of the PLOAM cells.

FIG. 19 is a flowchart depicting the sequence according to which transmission instructions are set for the grants of PLOAM cells, and the method whereby instructions for reporting information amount are issued for the unused grants of the PLOAM cells.

In FIG. 19, instructions issued to slave units 10 to submit information amount reports are performed independently as procedures based on the grant interval P for issuing instructions to submit information amount reports and as procedures performed when unused grants are present, making it possible to achieve efficiency and to ensure fairness in issuing reporting instructions for the slave units 10.

In the specific case shown in FIG. 19, instructions for information amount reporting are first entered into the PLOAM cell PLOAM1 or the PLOAM cell PLOAM2 in accordance with the procedures of the flowcharts shown in FIGS. 6 to 10 (step 611).

Instructions for transmitting the signals of the PLOAM cell 1 or PLOAM cell 2 are then entered in accordance with the procedures of the flowcharts in FIGS. 10 to 16 (step 612).

It is then checked whether the PLOAM cell 1 or PLOAM cell 2 contain unused grants (step 613). If it is found in this case that the PLOAM cell PLOAM1 or the PLOAM cell PLOAM2 contain unused grants (YES in step 613), instructions for a slave unit i to issue an information amount report are entered into the unused grants (step 614), the slave unit i instructed to submit an information amount report is updated (step 615), and the operation returns to step 703. In the procedure of step 705, $1 \leq i \leq m$, where m is the total number of slave units.

The procedure is completed if it is thus concluded in step 703 that there are no unused grants in the PLOAM cell PLOAM1 or the PLOAM cell PLOAM2 (NO in step 613).

Following is a description of comparison results obtained by simulating conventional TDMA and CSMA/CD access protocols and an access protocol based on the second embodiment aspect of the present invention described above.

Figure 20:
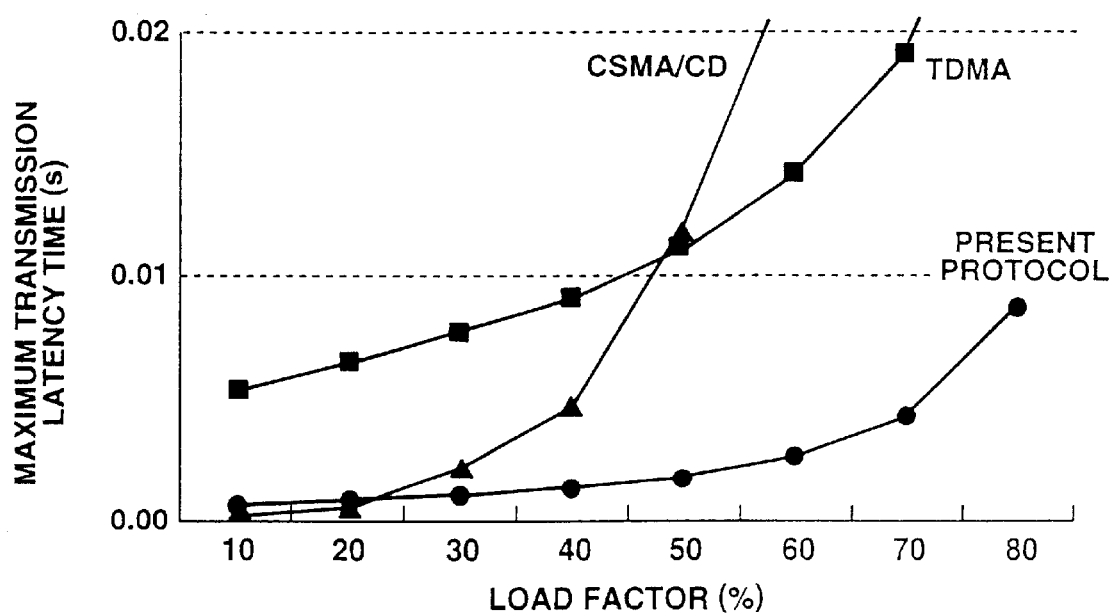
FIG. 20 is a diagram depicting the results of a comparison between an access protocol based on the second embodiment aspect of the present invention, and access protocols based on conventional TDMA and CSMA/CD.

FIG. 20 depicts the results of a comparison between the access protocol based on the second embodiment aspect of the present invention and access protocols based on conventional TDMA and CSMA/CD, obtained using the same simulation structure as that described with reference to the first embodiment aspect of the present invention.

In the simulation, instructions to submit information amount reports by employing unused grants were given in accordance with the access protocol of the present invention, and maximum transmission latency times were compared in accordance with the load factor of the transmission line in the same manner as in the case described with reference to the first embodiment aspect.

In FIG. 20, the vertical axis is shown in magnified form to make it easier to understand the difference resulting from the use of a low load factor.

It is apparent in FIG. 20 that the access protocol based on the second embodiment aspect of the present invention allows the maximum transmission latency time to be stabilized at a comparatively low level without the increase observed in the access protocols based on TDMA or CSMA/CD, and can easily accommodate burst traffic even when the load factor of the transmission line is high and the burst traffic increases in volume.

It can also be seen that results substantially indistinguishable from those provided by an access protocol based on CSMA/CD at a low load factor can be obtained using a dynamic mode for issuing instructions to submit information amount reports.

Figure 21:
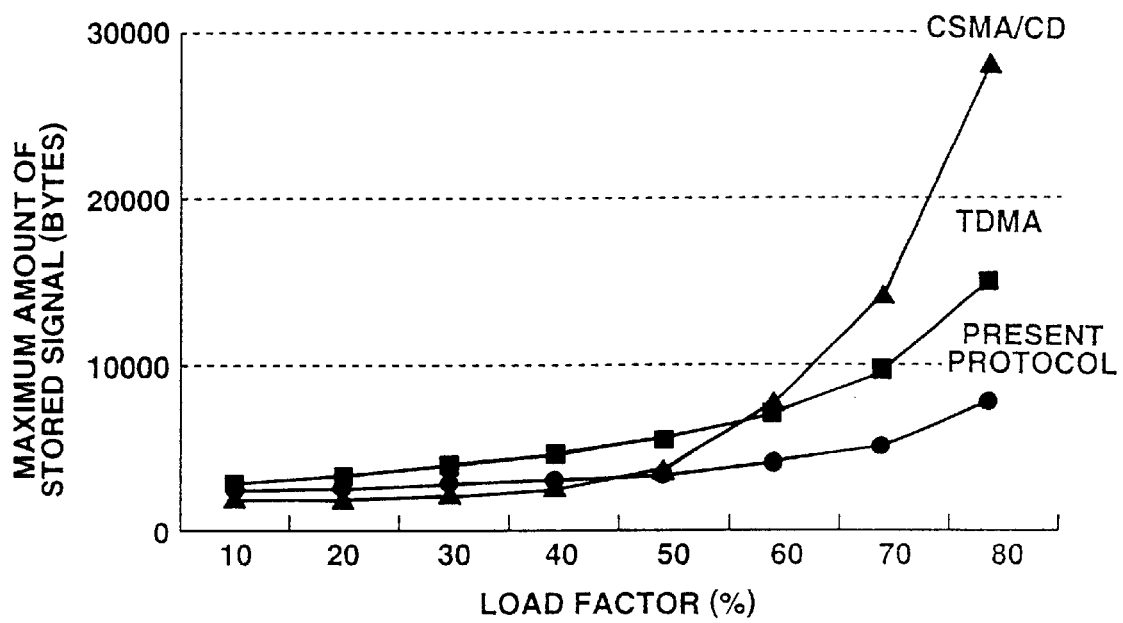
FIG. 21 is a diagram depicting the results of a comparison between the amounts of signals stored in the buffer memories of a slave unit and a terminal in the second embodiment aspect of the present invention.

FIG. 21 depicts results obtained using the same simulation to compare the amounts of signals stored in the buffer memories of a slave unit and a terminal. The maximum amount of signal stored in the buffer memory is plotted on the vertical axis.

It is apparent in FIG. 21 that the access protocol based on the second embodiment aspect of the present invention allows the maximum amount of stored signal to be stabilized at a comparatively low level without the increase observed in the access protocol based on TDMA or CSMA/CD, can easily accommodate burst traffic, and is capable of reducing the buffer memory requirements of slave units when the load factor of the transmission line is high and the burst traffic increases in volume.

It can also be seen that even when the load factor is low, the proposed protocol is better than the TDMA-based access protocol and yields results substantially indistinguishable from those of the CSMA/CD-based access protocol.

At a load factor of 80%, the maximum amount of stored signal according to the access protocol of the present invention is about ½ that provided by the TDMA-based access protocol, and about ⅓ that provided by the CSMA/CD-based access protocol.

A third embodiment aspect of the point-to-multipoint communication system of the present invention will now be described.

The third embodiment aspect of the point-to-multipoint communication system in accordance with the present invention is obtained by configuring the above-described first and second embodiment aspects such that slave units are sequentially instructed by the master unit to transmit signals when a transfer rate margin still remains after instructions for signal transmission have been issued for the information amount reported by all the slave units.

Such a structure allows the slave unit to be constantly instructed by the master unit about signal transmission when the information amount reported by the slave unit is small and communications traffic is low, so the latency time elapsed before a slave unit transmits a signal can be reduced, the capacity of the buffer memory for temporary signal storage lowered, and communications conducted with higher efficiency.

In addition, the signal transmission instructions based on the first or second embodiment aspect described above, and the signal transmission instructions based on the third embodiment aspect are performed as separate procedures, making it possible to ensure access fairness and to meet data transmission delay requirements for all slave units.

In the third embodiment aspect, a downstream frame comprises 56 slots, and an upstream frame comprises 53 slots, as shown in FIG. 4. Based on these transmission frames, 53 bytes and 56 bytes are exchanged downstream and upstream, respectively, in accordance with the TDM (Time Division Multiplex) multiplexing protocol in the case of the downstream transmission from the master unit 20 to the slave units 10-1 to 10-m, and in accordance with the TDMA (Time Division Multiple Access) multiplexing protocol in the case of the upstream transmission to the master unit 20 from the slave units 10-1 to 10-m.

In addition, downstream transmission frames contain two PLOAM cells per frame in a ratio of one cell for every 28 cells, the initial PLOAM cell (PLOAML) has 27 grants for requesting upstream cells from the slave units 10-1 to 10-m, and the second PLOAM cell (PLOAM2) has 26 grants, to a total of 53 grants, as shown in FIG. 5.

The grants of the PLOAM cell PLOAM1 correspond to cells 1–27 of the upstream transmission frame, and the grants of the PLOAM cell PLOAM2 correspond to cells 28–53 of the upstream transmission frame.

The master unit 20 is capable of issuing instructions as to which of the slave units 10-1 to 10-m can transmit a cell to a particular slot inside the upstream transmission frame by writing the ID numbers or other identifiers of the slave units 10-1 to 10-m to the grants of the PLOAM cells shown in FIG. 5.

The ID numbers of the slave units 10-1 to 10-m are managed by the master unit 20, and these ID numbers are conveyed during the initial stage to all the slave units 10-1 to 10-m participating in the operation of the system.

By virtue of these ID numbers, the master unit 20 can trace a cell to a particular slave unit 10-1 to 10-m, and each of the slave units 10-1 to 10-m can determine whether the cell it has received is indeed addressed to this station.

The slave units 10-1 to 10-m can transmit cells to those slots of the upstream transmission frame that correspond to the aforementioned grants when identifiers of these slave units 10-1 to 10-m are written to the PLOAM cells. This method makes it possible to avoid cell collisions in the optical transmission line.

Instructed by the master unit 20, the slave units 10-1 to 10-m issue reports on the information amount needed for cell transmission before the cells are actually transmitted.

The specifics of the method whereby the master unit 20 instructs the slave units 10-1 to 10-m on how to report information amount are the same as in the first or second embodiment aspect, as are the specifics of the method whereby the slave units 10-1 to 10-m submit information amount reports to the master unit 20.

Upon receipt of an information amount report from a slave unit 10-1 to 10-m, the master unit 20 calculates on the basis of the reported information amount the enabling amounts that allow the slave units 10-1 to 10-m to transmit cells below a specific maximum value, and, based on these enabling amounts, the slave units 10-1 to 10-m are instructed regarding such cell transmission using the grants of the PLOAM cells shown in FIG. 5.

Specifics of the method for calculating the enabling amounts in the master unit 10 and the method for issuing transmission-related instructions using PLOAM cells are the same as in the first or second embodiment aspect.

The master unit 20 can handle bursty communications better by sequentially providing the slave units 10-1 to 10-m with cell transmission instructions when the PLOAM cells contain unused grants after the cell-transmission instructions have been issued based on the above-described enabling amounts.

This means that when, for example, the PLOAM cells contain a large number of unused grants, the information amount reported by the slave units 10-1 to 10-m is low, and the volume of communications traffic is low as well.

In such cases, cells generated in bursts can be transferred at a higher speed by sequentially providing the slave units 10-1 to 10-m with cell transmission instructions, making it possible to reduce the latency time elapsed before the slave units 10-1 to 10-m can transmit a signal, to reduce the capacity of the buffer memory needed to temporarily store signals, and to increase communications efficiency.

Another feature is that because signals are transmitted at random intervals during bursty communication, the PLOAM cells contain unused grants even under conditions of high communications traffic.

The same effects can also be obtained in the above cases because the unused grants can be used to sequentially provide each slave unit with cell transmission instructions.

Figure 22:
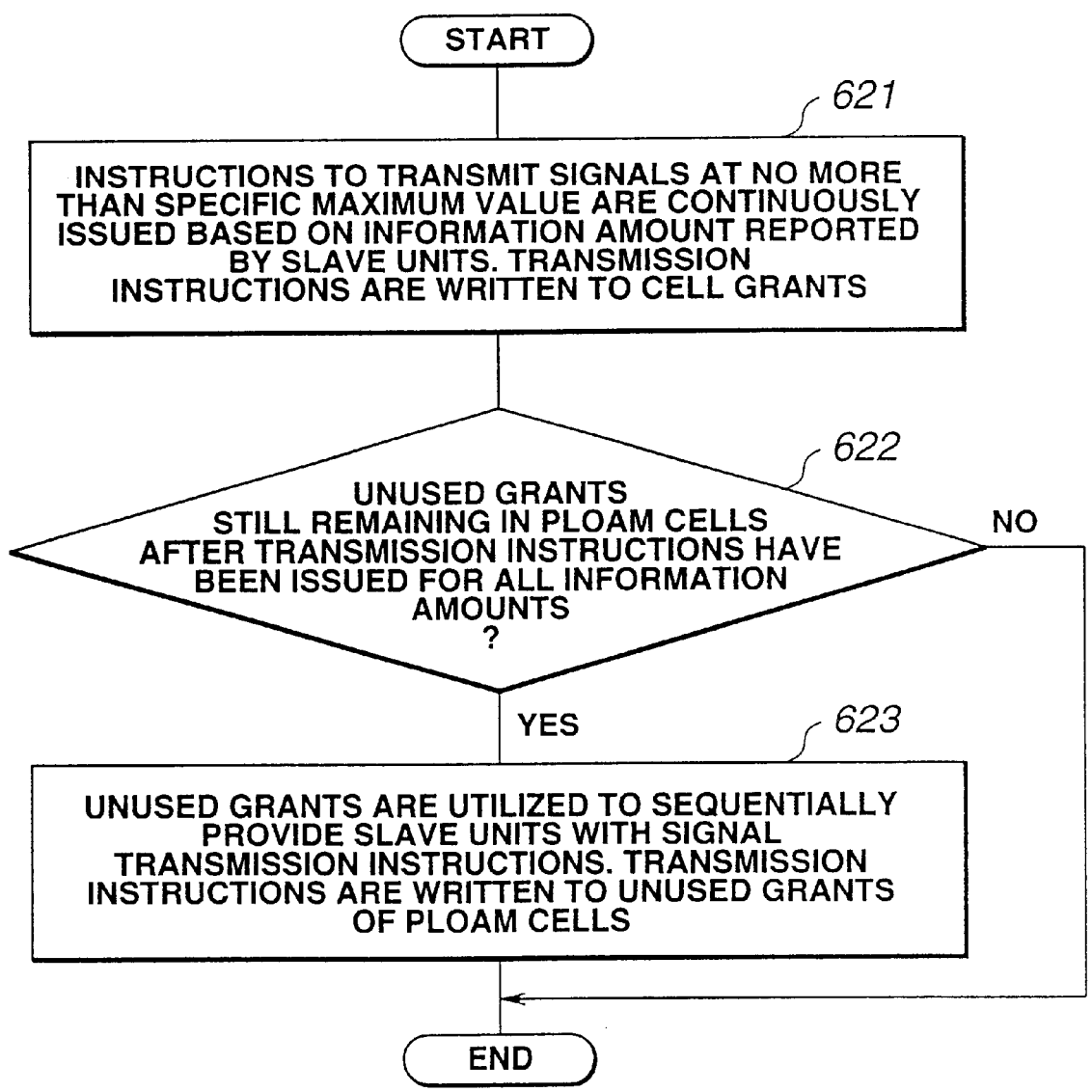
FIG. 22 is a flowchart depicting the method of a third embodiment aspect of the present invention for setting signal transmission instructions for slave units with the aid of the grants of PLOAM cells.

FIG. 22 is a flowchart of the above-described third embodiment aspect for setting signal transmission instructions for the slave units 10-1 to 10-m with the aid of the grants of PLOAM cells.

Here, sequential instruction regarding cell transmission can be easily accomplished by allocating the ID numbers or other identifiers of the slave units 10-1 to 10-m in order among the unused grants of the PLOAM cells after instructions on cell transmission have been issued based on enabling amounts. In addition, such sequential instruction regarding cell transmission can be accomplished more efficiently by limiting this instruction to active slave units.

When this process is started (FIG. 22), instructions to transmit signals at no more than a specific maximum value are first continuously issued based on the information amount reported by the slave units 10-1 to 10-m. These instructions are written to the grants of a PLOAM cell (step 621).

After transmission instructions have been issued for all information amounts, it is checked whether the POLAM cell contains unused grants (step 622).

If it is concluded here that the POLAM cell contains unused grants (YES in step 622), these unused grants are utilized to sequentially provide the slave units 10-1 to 10-m with signal transmission instructions. These transmission instructions are written to the unused grants of the PLOAM cell (step 623). The process is completed unchanged if the POLAM cell is free of unused grants (step 623).

In addition, sequential instructions on communications traffic can be issued with higher efficiency by limiting this procedure to active slave units.

In FIG. 22, separate operations are performed as a method for issuing instructions on signal transmission at no more A than a specific maximum value, and a method for sequentially providing the grants of PLOAM cells with cell transmission instructions.

It is therefore possible to ensure access fairness and to meet data transmission delay requirements for all slave units even when cell transmission instructions are issued sequentially.

With such a structure, the slave units 10-1 to 10-m have exclusive use of the upstream transmission line and can continuously transmit signals at no more than a specific maximum value.

In addition, transmission of signals can be sequentially assigned to the slave units 10-1 to 10-m when low information amount is reported by the slave units 10-1 to 10-m and there are vacancies in the grants of the PLOAM cells. As a result, cells generated in bursts can be transferred at a higher speed, the latency time elapsed before the slave units 10-1 to 10-m transmit signals can be reduced, the capacity of the buffer memory needed to temporarily store signals can be lowered, and communications efficiency can be improved.

Following is a description of comparison results obtained by simulating TDMA, which is a conventional access protocol, and an access protocol based on the above-described third embodiment aspect.

Figure 23:
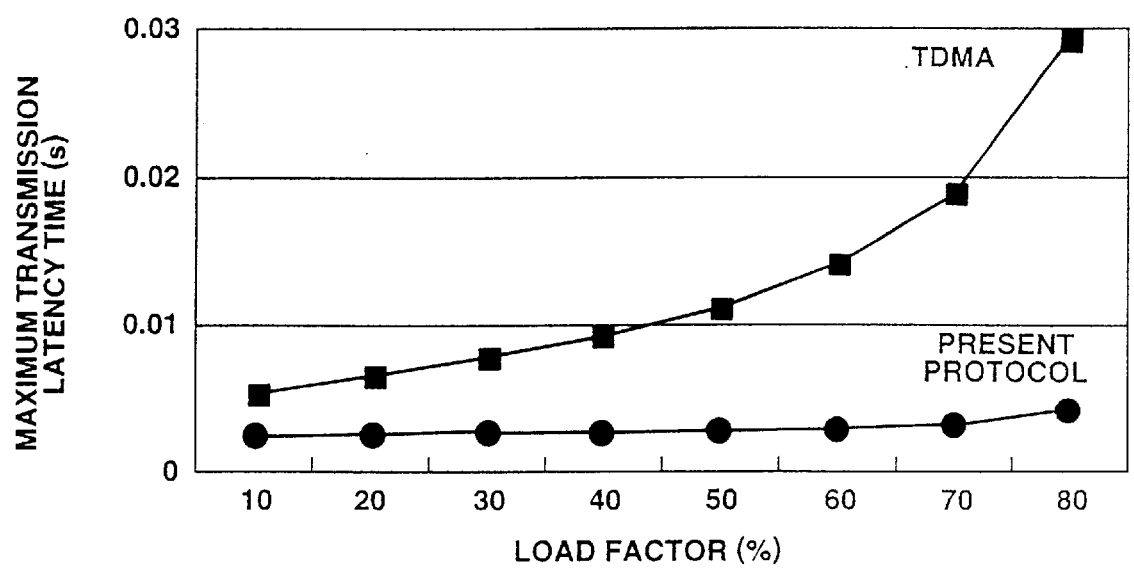
FIG. 23 is a diagram depicting the results of a comparison of maximum transmission latency times elapsed before signals are transmitted from slave units in accordance with the transmission line load factor when bursty signals are generated by the slave units according to the access protocol based on the third embodiment aspect of the present invention and according to TDMA with fixed slot allocation.

FIG. 23 depicts the results of a comparison of maximum transmission latency times elapsed before signals are transmitted from slave units 10-1 to 10-m in accordance with the transmission line load factor when bursty signals are generated by the slave units according to the access protocol based on the second embodiment aspect and according to TDMA with fixed slot allocation.

The simulated structures were point-to-multipoint communication systems operating according to TDMA and the access protocol based on the third embodiment aspect in which, based on FIG. 1, 32 slave units 10-1 to 10-32 and a single master unit 20 were connected by an optical transmission line 30, the transfer rate was 155.52 Mb/s, the distance between the master unit and the slave units was 20 km, and the propagation delay time was 100 $\mu$s.

Another feature of the access protocol based on the third embodiment aspect was that the grant interval for issuing instructions for information amount reporting was set to 53, slave units issued information amount reports at a rate of one cycle per upstream transmission frame, the delay time allowed for data transmission and determined by the system was set to 0.1 s, and the maximum value of the enabling amount that allows slave units to transmit signals was determined.

With TDMA, the transfer rate of the optical transmission line was divided by the total number of slave units, and each of the slave units was allocated a fixed share of 4.86 Mb/s.

In FIG. 23, the load factor of the transmission line is plotted on the horizontal axis, and the maximum transmission latency time elapsed prior to the transmission of signals generated by slave units 10-1 to 10-m and terminals is plotted on the vertical axis.

It is apparent in FIG. 23 that the access protocol of the third embodiment aspect allows maximum transmission latency time to be stabilized at a comparatively low level without the increase observed in the case of TDMA, and can easily accommodate burst traffic even under conditions of increased communications traffic. This is because the master unit 20 dynamically allocates the band among the slave units 10-1 to 10-32.

At a load factor of 80%, the maximum transmission latency time according to the access protocol of the present invention is about ⅕ that provided by TDMA.

Figure 24:
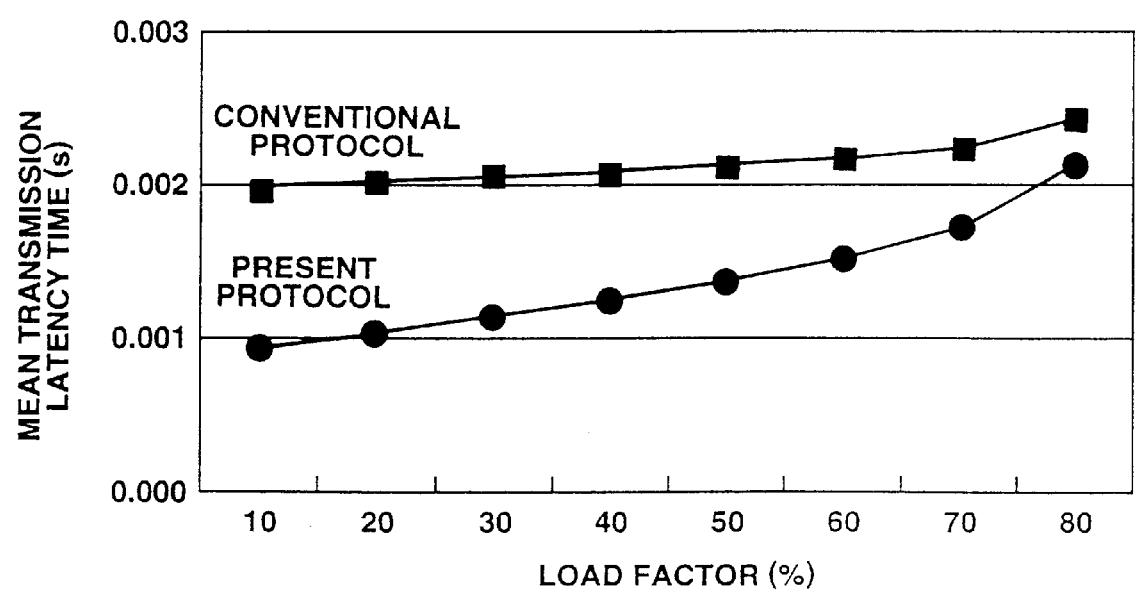
FIG. 24 is a diagram depicting the results of a comparison obtained by simulating mean transmission latency times in a case in which no signal transmission instructions are issued by means of unused grants and in a case involving the use of the access protocol pertaining to the third embodiment aspect of the present invention.

FIG. 24 depicts the results of a comparison obtained by simulating mean transmission latency times in a case in which no signal transmission instructions are issued by means of unused grants and in a case involving the use of the access protocol pertaining to the above-described third embodiment aspect. The simulated structure is the same as that described above.

It is evident in FIG. 24 that the mean transmission latency time can be reduced by sequentially issuing signal transmission instructions to the slave units 10-1 to 10-m by means of unused grants in accordance with the access protocol of the third embodiment aspect.

It can therefore be seen that the latency time elapsed before a slave unit 10-1 to 10-m transmits a signal can be reduced, the capacity of the buffer memory needed for temporary signal storage can be lowered, and excellent results can be obtained in terms of absorbing burst traffic.

It can also be seen that when the transmission line has a high load factor, the mean transmission latency time can still be reduced and the same effects can be obtained by utilizing the unused grants of PLOAM cells.

Following is a description of a fourth embodiment aspect of the point-to-multipoint communication system according to the present invention.

In the upstream transmission frame shown in FIG. 4, cells from each of the slave units 10-1 to 10-m are transmitted as single slots, but the fourth embodiment aspect is configured such that cells from a plurality of slave units 10-1 to 10-m can be transmitted as single slots by segmenting each slot into a plurality of mini-slots.

Figure 25:
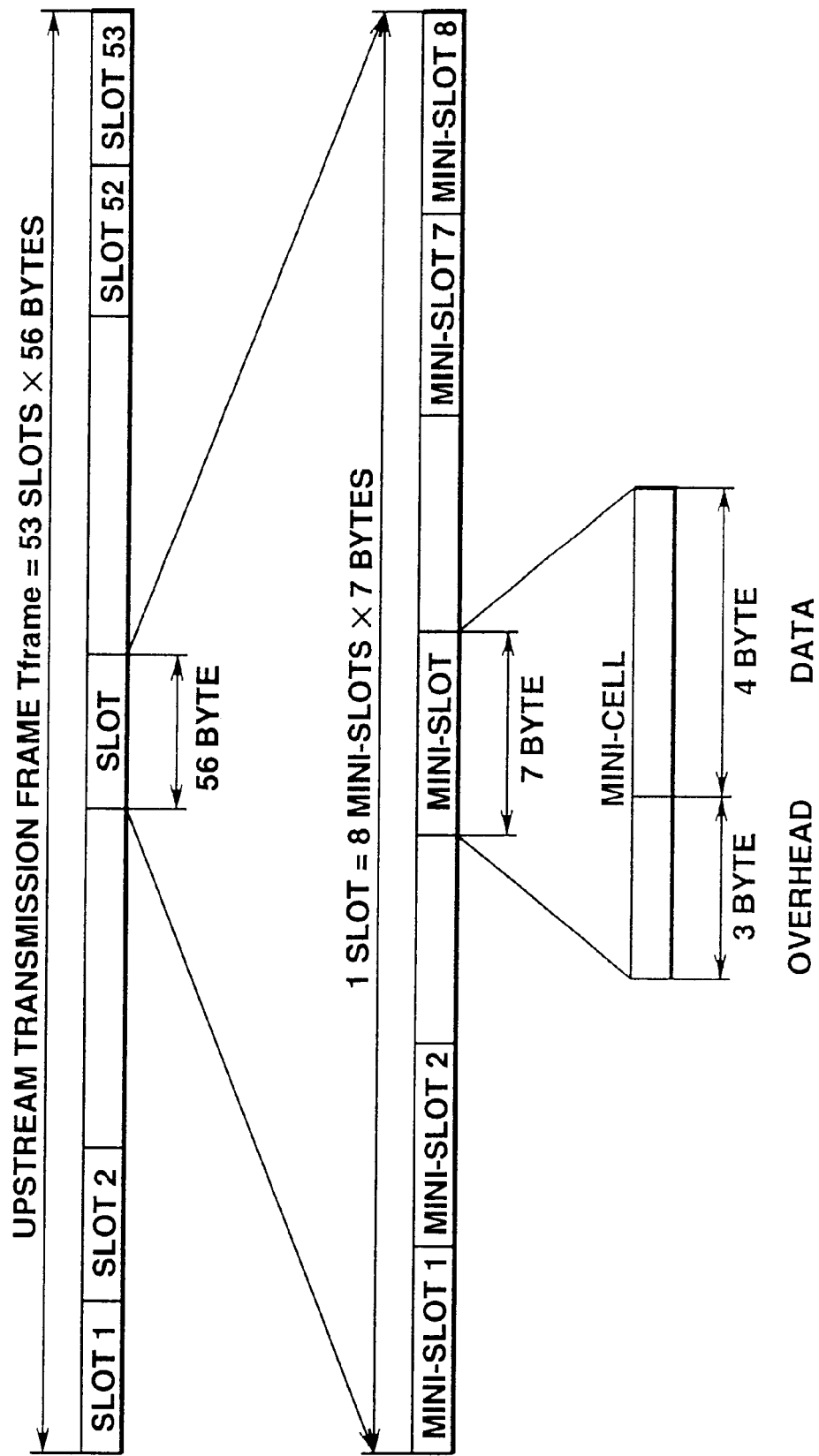
FIG. 25 is a diagram depicting an example in which a single slot of the upstream transmission frame according to the third embodiment aspect of the present invention is split into eight mini-slots.

FIG. 25 depicts an example in which a single slot of the upstream transmission frame shown in FIG. 4 is split into eight mini-slots.

For the sake of convenience, an arrangement is adopted in which a single mini-slot contains 7 bytes, and such mini-slots are used to transmit mini-cells comprising a 3-byte overhead and 4 bytes of data.

The result is that although 56-byte cells transmitted by a single slave unit 10-1 to 10-m are commonly transmitted as single slots, using the above-described mini-slots allows 7-byte mini-cells transmitted by a maximum of eight slave units 10-1 to 10-m to be transmitted as single slots.

The size of the mini-slots and mini-cells can be arbitrarily set by the system. For example, 14-byte mini-cells transmitted by a maximum of four slave units 10-1 to 10-m can be transmitted as single slots when one mini-slot is 14 B.

Following is a description of a method whereby the master unit 20 instructs the slave units 10-1 to 10-m to submit information amount reports using the above-described mini-slots, and the slave units 10-1 to 10-m thus submit these information amount reports to the master unit 20.

When mini-slots are used, it is first necessary to divide the slave units 10-1 to 10-m into a plurality of groups and to pre-assign a group ID number to each of the slave units 10-1 to 10-m in order to specify the slave units 10-1 to 10-m for transmitting mini-cells in accordance with the instructions from the master unit 20.

Here, the group ID numbers can be calculated using Eq. (3) on the basis of the ID numbers of the slave units 10-1 to 10-m and the total number S of mini-slots in a single slot.

$$\text{Group ID number} = \text{ID number of slave unit} \div S + 1 \qquad (3)$$

The ID number of a slave unit 10 is such that if m is the total number of slave units 10-1 to 10-m, non-overlapping values satisfying the condition "$1 \leq$ ID number of slave unit $\leq m$" are assigned to the slave units 10-1 to 10-m.

When, for example, the total number of slave units 10-1 to 10-m is 32 and each slot is segmented into eight mini-slots as shown in FIG. 22, four groups, each comprising eight slave units 10-1 to 10-m, can be created, and any value satisfying the condition "$1 \leq$ Group ID numbers $\leq 4$" can be assigned on the basis of Eq. (3) to the slave units 10-1 to 10-m.

When the master unit 20 instructs the slave units 10-1 to 10-m to submit information amount reports by means of mini-slots, the procedure whereby specific slave units 10-1 to 10-m are instructed to submit information amount reports should be changed to a procedure whereby specific groups are instructed to submit information amount reports in the flowcharts shown in FIGS. 6 to 10.

In the processing portion for identifying instructions from the master unit 20 to the slave units 10-1 to 10-m according to the flowcharts in FIGS. 7 to 10, identification based on the ID numbers of the slave units 10-1 to 10-m should be changed to identification based on the group numbers of the slave units 10-1 to 10-m.

Mini-cells to which at least the following data is written are created if it is concluded by the slave units 10-1 to 10-m that these slave units 10-1 to 10-m have been instructed to submit information amount reports using mini-slots: cell identifiers indicating the information amount reports, information amount counted by the counter, and the ID numbers of the slave units 10. The mini-cells thus created are transmitted to the master unit 20 via a transmission unit by means of the mini-slots in the upstream transmission frame.

The number #s of the mini-slots used by the slave units 10-1 to 10-m can be calculated using Eq. (4) based on the ID numbers of the slave units 10-1 to 10-m, group ID numbers, and the total number S of mini-slots contained in each slot.

$$\#s = \text{ID number of slave unit} - ((\text{Group ID number} - 1) \times S) \qquad (4)$$

Figure 26:
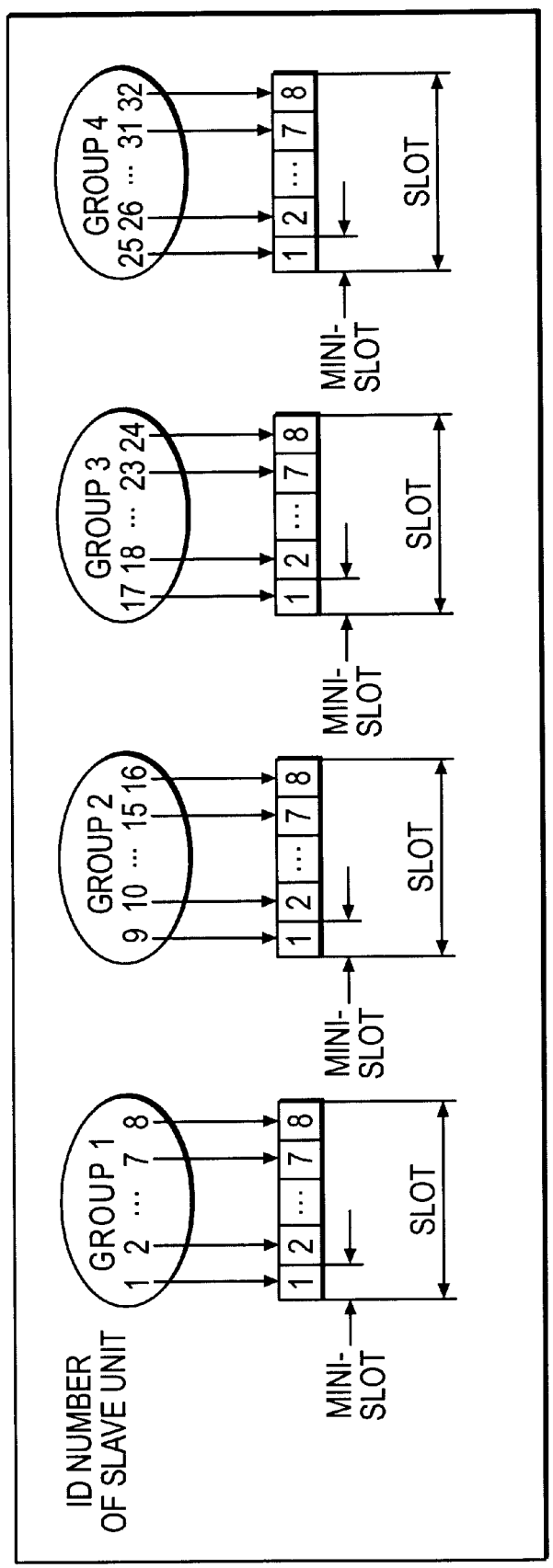
FIG. 26 is a diagram depicting the correlation between the ID numbers and the numbers #s of mini-slots according to a fourth embodiment aspect of the present invention.

FIG. 26 depicts the correlation between the ID numbers of the slave units 10-1 to 10-m and the numbers #s of the mini-slots calculated by Eq. (4) according to the fourth embodiment aspect described above.

In addition, the intervals at which the master unit 20 instructs the slave units 10-1 to 10-m to submit information amount reports using mini-slots can be obtained by applying the same method as that described with reference to the first or second embodiment aspects, and communications efficiency can be further improved by dynamically updating the intervals in accordance with the busy condition of the grants of PLOAM cells.

Although the fourth embodiment aspect was described with reference to a method in which mini-slots were used for information amount reporting, such mini-slots may also be used where the master unit 20 gives the slave units 10-1 to 10-m instructions on signal transmission, and the slave units 10-1 to 10-m transmit signals to the master unit 20.

Following is a description of comparison results obtained by simulating access protocols based on conventional TDMA and CSMA/CD, and an access protocol based on the fourth embodiment aspect of the present invention described above.

Figure 27:
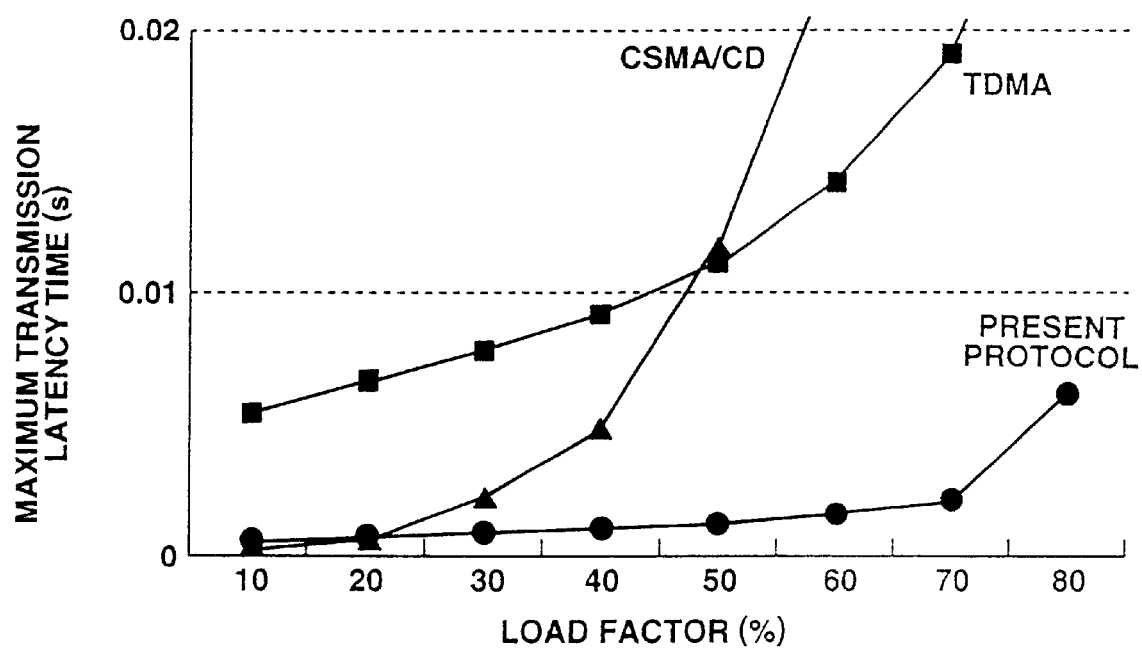
FIG. 27 is a diagram depicting the results of a comparison between the access protocol based on the fourth embodiment aspect of the present invention and the access protocols based on conventional TDMA and CSMA/CD.

FIG. 27 depicts the results of a comparison between an access protocol based on the fourth embodiment aspect of the present invention and access protocols based on conventional TDMA and CSMA/CD, obtained using the same simulation structure as that described with reference to the first embodiment aspect.

In the simulation, the maximum transmission latency times corresponding to the load factor of the transmission line were compared in the same manner as in the first embodiment aspect by applying mini-slots to information amount reporting in accordance with the access protocol of the fourth embodiment aspect of the present invention.

In FIG. 27, the vertical axis is shown in magnified form to make it easier to understand the difference resulting from the use of a low load factor.

It is apparent in FIG. 27 that the access protocol based on the fourth embodiment aspect of the present invention allows the maximum transmission latency time to be stabilized at a comparatively low level without the increase observed in the access protocol based on TDMA or CSMA/CD, and can easily accommodate burst traffic even when the load factor of the transmission line is high and the burst traffic increases in volume.

It can also be seen that even when the load factor is low, substantially the same effects as in the access protocol based on CSMA/CD can be obtained by applying mini-slots to information amount reporting.

At a load factor of 10%, the maximum transmission latency time according to the access protocol of the fourth embodiment aspect of the present invention is about $\frac{1}{10}$ that provided by the TDMA-based access protocol, and about the same as that provided by the CSMA/CD-based access protocol. At a load factor of 80%, the maximum transmission latency time according to the access protocol of the fourth embodiment aspect of the present invention is about 1/5 that provided by the TDMA-based access protocol, and about 1/14 that provided by the CSMA/CD-based access protocol, indicating that the use of such mini-slots improves communications efficiency.

Figure 28:
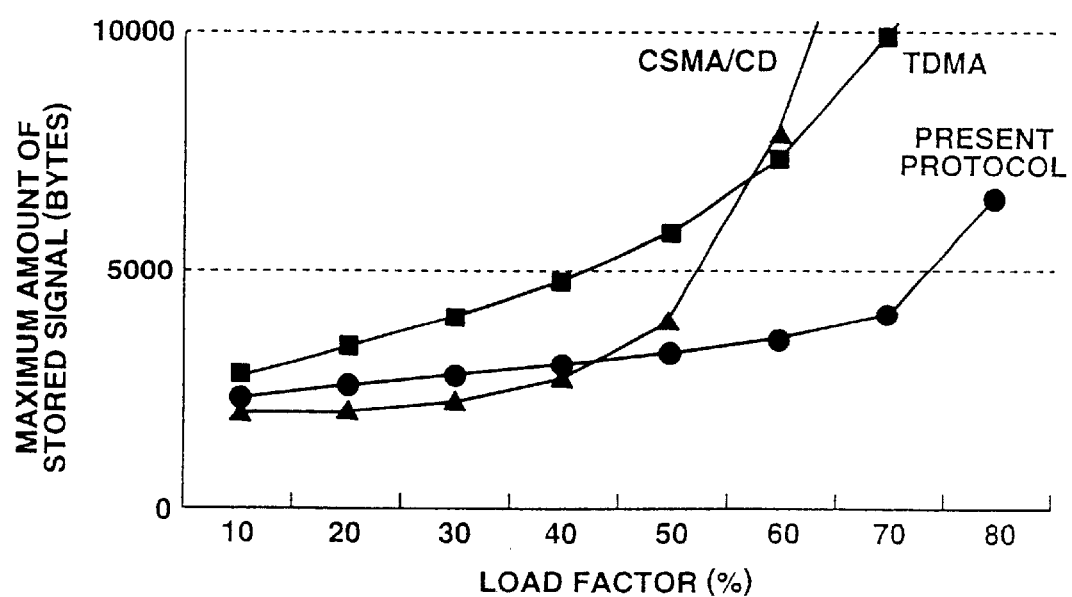
FIG. 28 is a diagram depicting the results of a comparison of the amounts of signals stored in the buffer memory of a terminal and a slave unit according to the fourth embodiment aspect of the present invention.

FIG. 28 depicts the results of a comparison of the amounts of signals stored in the buffer memories of a terminal and a slave unit 10-1 to 10-m, obtained by performing the same simulation. The maximum amount of signal stored in the buffer memories is plotted on the vertical axis.

In FIG. 28, the vertical axis is shown in magnified form to make it easier to understand the difference resulting from the use of a low load factor.

It is apparent in FIG. 28 that the access protocol based on the fourth embodiment aspect of the present invention allows the maximum amount of stored signal to be stabilized at a comparatively low level without the increase observed in the access protocol based on TDMA or CSMA/CD, can easily accommodate burst traffic, and is capable of reducing the buffer memory requirements of the slave units 10-1 to 10-m when the load factor of the transmission line is high and the burst traffic increases in volume.

It can also be seen that even when the load factor is low, the proposed protocol is better than the TDMA-based access protocol and yields results substantially indistinguishable from those of the CSMA/CD-based access protocol.

At a load factor of 80%, the maximum amount of stored signal according to the access protocol of the fourth embodiment aspect of the present invention is about ½ that provided by the TDMA-based access protocol, and about ¼ that provided by the CSMA/CD-based access protocol, indicating that the use of mini-slots can improve communications efficiency and reduce the buffer memory requirements of slave units.

Following is a description of a fifth embodiment aspect of the point-to-multipoint communication system according to the present invention.

In the fifth embodiment aspect, the specific maximum values k of the enabling amounts that allow information signals to be transmitted for the slave units 10-1 to 10-m are selected such that individual values can be calculated for each of the slave units 10-1 to 10-m, depending on the financial charges, contract type, urgency, priority level, and other differences among the slave units 10.

Figure 29:
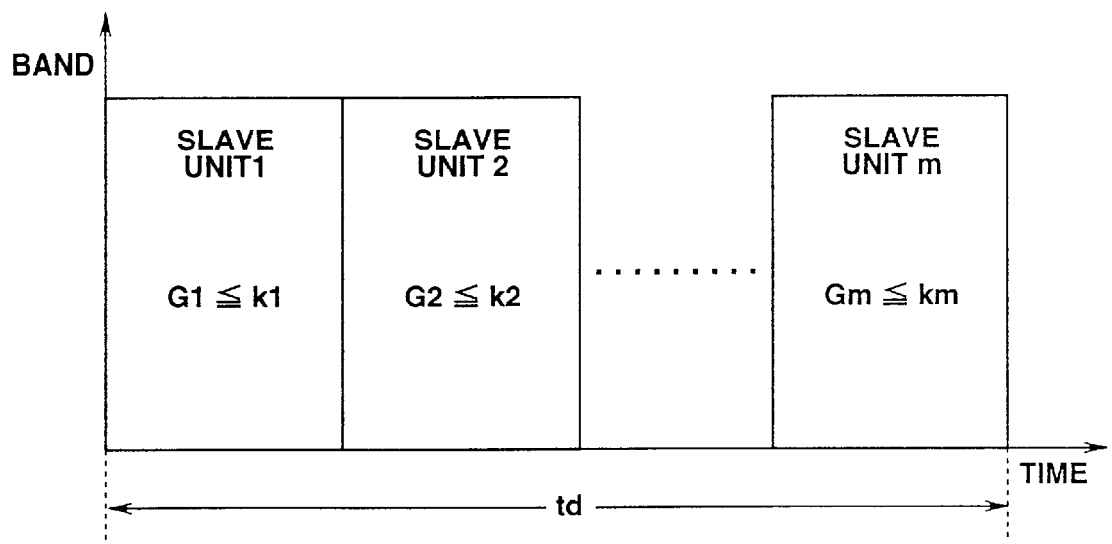
FIG. 29 is a diagram depicting band allocation according to a fifth embodiment aspect in the point-to-multipoint communication system of the present invention.

In this case, the specific maximum value ki (bits) for each of the slave units 10-1 to 10-m (i=1, . . . , m) is determined for each of these slave units 10-1 to 10-m such that the following relation is satisfied:

$$\Sigma k_i \leq r \times td \quad (5),$$

where m is the total number of slave units 10 (m is an integer), α is the proportion of currently active slave units 10-1 to 10-m (0<α≦1.0), r (b/s) is the data transfer rate of the point-to-multipoint communication system, and td (s) is the delay time allowed for data transmission and determined by the system, as in the band allocation shown in FIG. 29. Here, Σ indicates the sum of i's from 1 to αm. The proportion α of currently active slave units 10-1 to 10-m is calculated in the same manner using Eq. (2).

The enabling amount Gi is calculated by substituting ki for k in the flowchart shown in FIG. 13.

The instructional amount gi for giving instructions on signal transmission to a slave unit i during the transmission of a PLOAM cell is calculated in the same manner in accordance with the flowcharts shown in FIGS. 14 and 15.

Although the first to fifth embodiment aspects above were described with reference to cases in which TDM and TDMA were used as cell multiplexing protocols, the access protocol in accordance with the present invention can be easily adapted, for example, to FDM (Frequency Division Multiplex), FDMA (Frequency Division Multiple Access), CDMA (Code Division Multiple Acces), and the like.

Thus, according to the first to fifth embodiment aspects described above, slave units 10-1 to 10-m submit reports on the information amount necessary for signal transmission to the master unit 20, and, based on the information amount reported by the slave units 10-1 to 10-m, the master unit 20 issues signal transmission instructions, completely eliminating signal collisions in the transmission line and preventing the throughput from decreasing in the manner observed with CSMA/CD when signals on the order of several megabytes are transmitted in bursts.

It is also possible to achieve further improvements in communications efficiency by dynamically updating the intervals for giving the slave units 10-1 to 10-m instructions on information amount reporting, or by segmenting slots into a plurality of mini-slots.

Here, the enabling amounts for permitting signal transmission are calculated dynamically and efficiently on the basis of reports from slave units 10-1 to 10-m such that the data transfer rate can be utilized with 100% efficiency, so high throughput can be obtained even under complex conditions created by greater burst traffic or an increased number of slave units 10-1 to 10-m.

The specific maximum number of kilobits k is set such that the following relation is satisfied:

$$k \leq (r \times td) \div (\alpha \times m),$$

where m is the total number of slave units 10-1 to 10-m (m is an integer), α is the proportion of currently active slave units 10-1 to 10-m (0<α≦1.0), r (b/s) is the data transfer rate, and td (s) is the delay time allowed for data transmission and determined by the system.

Slave units 10-1 to 10-m can therefore continuously transmit large signals because these stations have exclusive use of the upstream transmission line during the transmission of signals whose maximum size is measured in k (bits).

Another feature is that when an enabling amount is determined on the basis of the above equation, a time of td seconds is necessary for the transmission if all the slave units 10-1 to 10-m transmit k (bit) signals, making it possible to secure an allowed delay time of td seconds for data transmission by all the slave units 10-1 to 10-m.

All the slave units 10-1 to 10-m can invariably transmit their signals within the allowed delay time of td seconds, making it possible to ensure access fairness and to yield the delay time allowed for data transmission.

In addition, the maximum transmission latency time elapsed until a slave unit 10-1 to 10-m transmits a signal can be kept stable at a low level without the increase observed with TDMA or CSMA/CD when the transmission line has a high load factor and the burst traffic increases in volume. Results that are superior to those provided by TDMA and are substantially indistinguishable from those yielded by CSMA/CD can also be obtained at a low load factor.

Another feature of this embodiment aspect is that the maximum amount of signal stored in the buffer memory of the slave units 10-1 to 10-m can be kept stable at a low level without the increase observed with conventional protocols when the transmission line has a high load factor and the burst traffic increases in volume. Results that are superior to those provided by TDMA and are substantially indistinguishable from those yielded by CSMA/CD can also be obtained at a low load factor, making it possible to reduce the buffer memory requirements of the slave units 10-1 to 10-m.

Such an arrangement can provide an access protocol for a point-to-multipoint communication system that possesses exceptional capabilities in terms of accommodating bursty traffic.

Figure 30:
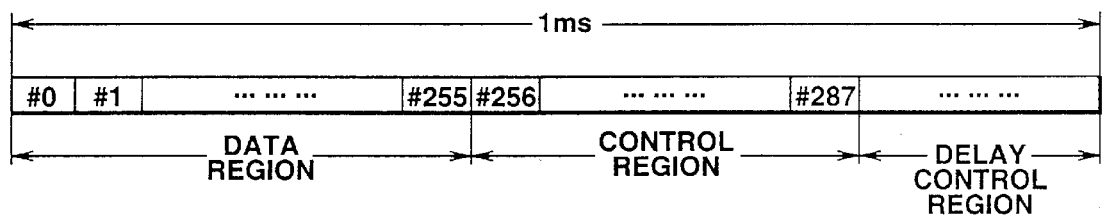
FIG. 30 is a diagram illustrating the frame periods for TDM and TDMA, which are the packet multiplexing protocols adopted in a sixth embodiment aspect of the point-to-multipoint communication system according to the present invention.

FIG. 30 is a diagram illustrating the frame periods for TDM and TDMA, which are the packet multiplexing protocols adopted in the point-to-multipoint communication system pertaining to a sixth embodiment aspect of the present invention.

In the sixth embodiment aspect, the system structure is the same as the structure in FIG. 1, and the structures of the master unit 20 and slave units 10-1 to 10-m are the same as the structures shown in FIGS. 2 and 3.

In FIG. 30, 1 ms is selected as the frame period for TDM or TDMA, which is a packet multiplexing protocol. A data region, control region, and delay control region are established within each frame.

In the example shown in FIG. 30, the data region and the control region consist of 256- and 32-packet time slots, respectively, and the #n in the drawing indicates the time slot number, assuming that the total number of slave units 10-1 to 10-m is 32, the transfer rate is 155.52 M(b/s), the fixed-length packet size is 60 (B), and the delay control region is 111 (s).

The data region is used to exchange data packets between the master unit 20 and the slave units 10-1 to 10-m. The control region is used to exchange control packets between the master unit 20 and the slave units 10-1 to 10-m, providing enough time slots to allow all 32 slave units 10-1 to 10-m to exchange control packets during each frame period.

The delay control region is used to adjust the packet transmission time when there are variations in the transmission distance between the master unit 20 and the slave units 10-1 to 10-m. A size that is presumed to correspond to a transmission distance of 10 (km) is provided. In this case, there is no particular reason to provide a delay control region if the transmission distance is short and the packet transmission delay remains invariable.

The frame periods of TDM and TDMA, the configuration of regions within the frames, and the position and size of each region may be arbitrarily set by the system. One possible option is to insert delay control regions into the frames at a specific time period without providing each frame with a region, and thus to yield a multiframe structure having larger data regions. In addition, the frame format can be configured differently in the upstream and downstream directions.

Figure 31:
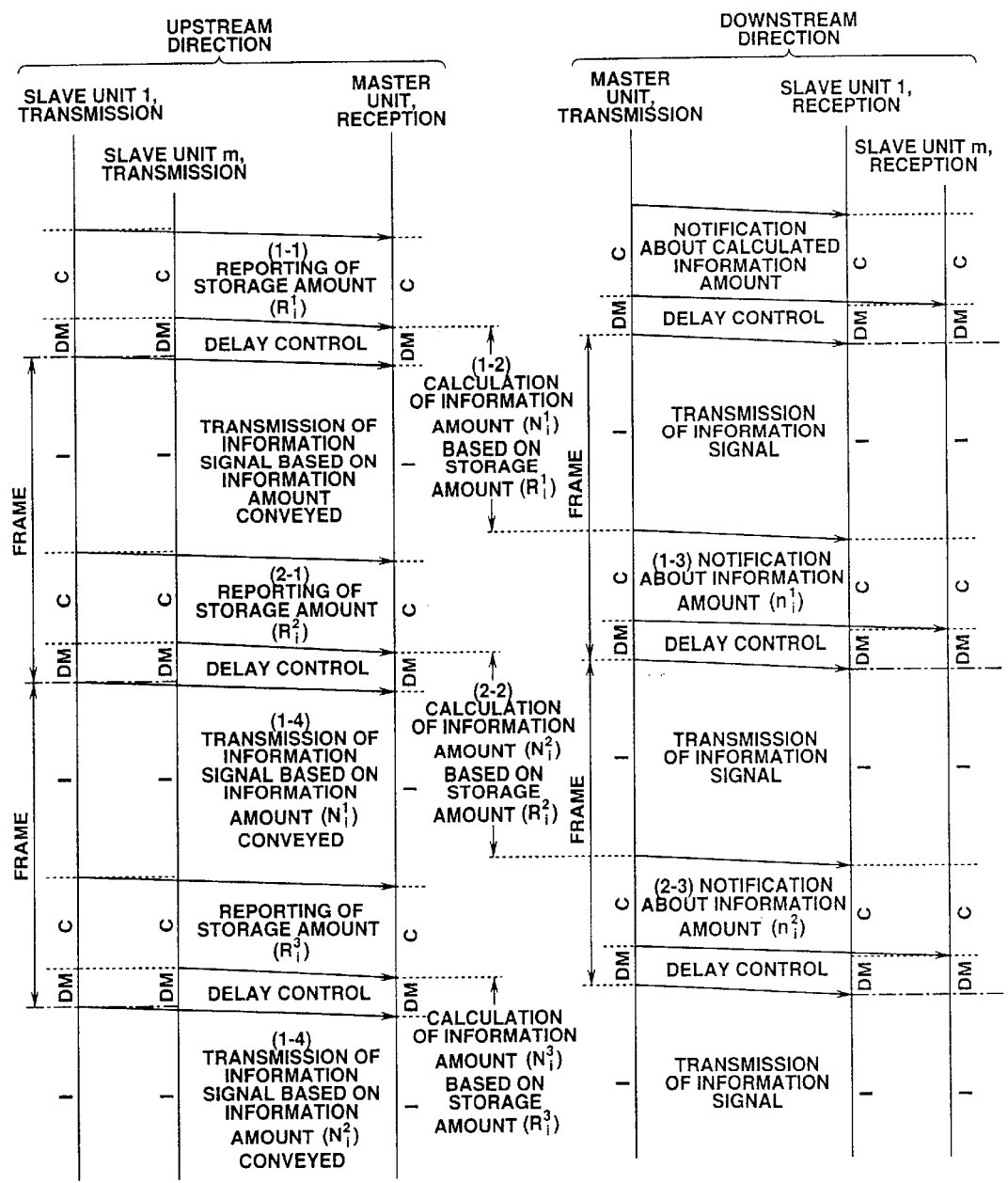
FIG. 31 is a sequence diagram depicting a control routine for the access protocol in the point-to-multipoint communication system according to the sixth embodiment aspect of the present invention.

FIG. 31 is a sequence diagram depicting a control routine for the access protocol in the point-to-multipoint communication system according to the sixth embodiment aspect.

In FIG. 31, the slave units 10-1 to 10-m, which send information signals to the master unit 20, temporarily store the information signals to be sent in a buffer memory 15, and the storage amounts of the information signals thus stored are reported to the master unit 20 via a transmission unit 13 (FIG. 31(1-1)). Here, i indicates an individual slave unit, and i=1, 2, ..., m, where m is the total number of slave units (m is an integer).

Upon receipt of the reports from the slave units 10-1 to 10-m, the master unit 20 calculates, based on the storage amounts Ri thus reported, the information amount Ni that allows each slave unit 10-1 to 10-m to transmit signals at no more than a specific maximum value k (bits) (FIG. 31(1-2)). Here, the specific maximum value k is set such that the relation expressed by Eq. (1) is satisfied. In this equation, m is the total number of slave units, α is the proportion of currently active slave units ($0<\alpha\leq 1.0$), r (b/s) is the data transfer rate, and td (s) is the delay time allowed for data transmission and determined by the system. The proportion a of currently active slave units 10-1 to 10-m is given by Eq. (2), where α=1.0 when all the slave units 10-1 to 10-m are currently active.

After calculating the information amount Ni, the master unit calculates, based on the information amount Ni, the information amount ni to be sent as a notification to the slave units during each frame period, and the slave units 10-1 to 10-m are notified of this information amount ni (FIG. 31(1-3)).

Here, the reason that the information amount ni is calculated separately from the information amount Ni is that the slave units 10-1 to 10-m are exhaustively notified of the information amount Ni in the form of continuous frames if the information amount Ni thus calculated exceeds the data transfer rate at which transmission can be performed using single frames.

Upon being notified of the information amount ni by the master unit 20, the slave units 10-1 to 10-m send temporarily stored information signals to the master unit 20. The volume of these signals does not exceed that of the information amount ni (FIG. 31(1-4)).

The above-described procedures are then sequentially repeated as indicated by (2-1) to (2-4) in FIG. 31.

Alternatively, the information amount ni is a parameter that is needed to facilitate mounting and to ensure the following: that the slave units 10-1 to 10-m are notified of the information amount Ni by the master unit 20, that it is checked on the side of the slave units 10-1 to 10-m whether information signals whose volume is equal to or less than the information amount Ni can be transmitted within a single frame, and that the transmission of the information signals is optionally controlled.

With the access protocol of the point-to-multipoint communication system of the sixth embodiment aspect, the slave units 10-1 to 10-m notified of the information amount have exclusive use of the upstream transmission line and can continuously transmit signals at no more than the information amount calculated by the master unit 20, as in the band allocation shown in FIG. 12.

For the sake of convenience, 32 is selected as the total number of slave units 10-1 to 10-m, and 155.52 M(b/s) is selected as the transfer rate of the optical transmission line 30 for a downstream transmission from the master unit 20 to the slave units 10-1 to 10-m and for an upstream transmission from the slave units 10-1 to 10-m to the master unit 20.

It is also possible, for example, to adopt a structure in which the downstream transfer rate used here is set to 622.08 M(b/s), and the upstream and downstream transfer rates are mutually asymmetrical. In addition, the transfer rate and the total number of the slave units 10-1 to 10-m may also be arbitrarily set by the system.

Another alternative is to exchange 60-byte fixed-length packets between the master unit 20 and the slave units 10-1 to 10-m via the above-described optical transmission line 30 in accordance with a multiplexing protocol in which the downstream transmission is TDM (Time Division Multiplex) and the upstream transmission is TDMA (Time Division Multiple Access).

Figure 32:
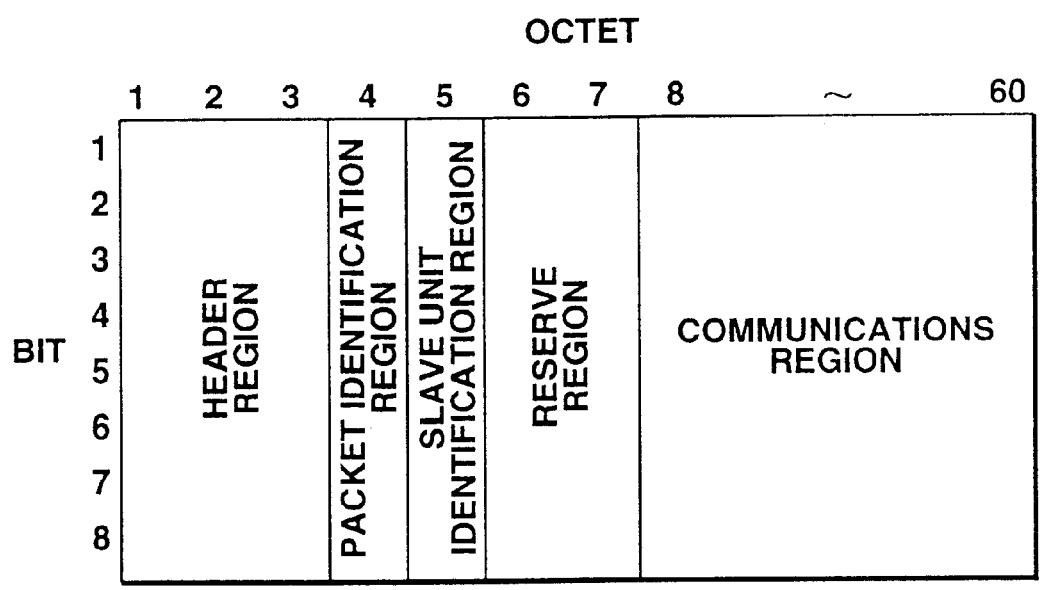
FIG. 32 is a diagram illustrating the frame periods for TDM and TDMA, which are the packet multiplexing protocols adopted in the sixth embodiment aspect of the present invention.

This packet contains at least a header region, a packet identification region, a slave unit identification region, a reserve region reserved for extensions, and a communications region, as shown in FIG. 32.

Written to the header region are a guard for preventing packet collisions in the optical transmission line 30, a preamble for receiving burst signals, and a delimiter for distinguishing between packet headers and other segments.

In addition, written in the packet identification region are packet classification numbers for identifying packet types by the master unit 20 and the slave units 10-1 to 10-m.

With these packet classification numbers, an individual value is predetermined by the system for each packet type, as shown in FIG. 33.

Furthermore, written in the slave unit identification region are slave unit numbers individually assigned to the slave units 10-1 to 10-m, as shown in FIG. 34. The numbers of the slave units are managed by the master unit 20, and the numbers of the slave units are conveyed during the initial stage from the master unit 20 to all the slave units 10-1 to 10-m participating in the operation of the system.

By virtue of these slave unit numbers, the master unit 20 can trace a packet to a particular slave unit 10-1 to 10-m, and each of the slave units 10-1 to 10-m can determine whether the packet it has received is addressed to this station.

The reserve region is used to exchange anti-eavesdropping security keys or packet time stamps (transmission time, number of transmissions, etc.) between the master unit 20 and the slave units 10-1 to 10-m.

The communications region is used to exchange information signals between the master unit 20 and the slave units 10-1 to 10-m, to issue storage amount reports or information amount notifications, or to perform OAM (Operation Administration & Maintenance) such as configuration management, fault control, billing, traffic control, security management, and the like.

Packet size and format may be set arbitrarily in accordance with the characteristics of the service handled by the system, and packet classification numbers and slave unit numbers may also be set arbitrarily in accordance with the makeup of the system.

It is also possible to appropriately use packet reserve regions or communications regions for exchanging security keys or time stamps, performing various types of OAM, or the like in accordance with the specifics of actual implementation or the like.

As shown in FIG. 30, 1 ms is selected as the frame period of TDM and TDMA, which are packet multiplexing protocols, and each frame contains a data region, a control region, and a delay control region.

In the example shown in FIG. 30, the data region and the control region consist of 256- and 32-packet time slots, respectively, and the #n in the drawing indicates the time slot number, assuming that the total number of slave units 10-1 to 10-m is 32, the transfer rate is 155.52 M(b/s), the fixed-length packet size is 60 (B), and the delay control region is 111 (s).

The data region is used to exchange data packets between the master unit 20 and the slave units 10-1 to 10-m. The control region is used to exchange control packets between the master unit 20 and the slave units 10-1 to 10-m, providing enough time slots to allow all 32 slave units 10-1 to 10-m to exchange control packets during each frame period.

The delay control region is used to adjust the packet transmission time when there are variations in the transmission distance between the master unit 20 and the slave units 10-1 to 10-m. A size that is presumed to correspond to a transmission distance of 10 (km) is provided. In this case, there is no particular reason to provide a delay control region if the transmission-distance is short and the packet transmission delay remains invariable.

The frame periods of TDM and TDMA, the configuration of regions within the frames, and the position and size of each region may be arbitrarily set by the system. One possible option is to insert delay control regions into the frames at a specific time period without providing each frame with a region, and thus to yield a multiframe structure having larger data regions. In addition, the frame format can be configured differently in the upstream and downstream directions.

Voice, video, data, or other such information signals can be input from a terminal or other network to the input port of a slave unit 10 (10-1 to 10-m) shown in FIG. 2 or to the input port of the master unit 20 shown in FIG. 3.

These information signals are sent to the buffer memories 15 and 25 through the input units 11 and 21, respectively, and are temporarily stored in the buffer memories 15 and 25.

FIFO (First In First Out) or the like can be suggested as a method for storing information signals in the buffer memories 15 and 25.

These information signals may be arranged in cells or packets while stored in the buffer memories 15 and 25, such as ATM cells or Ethernet packets, for example.

Figure 35:
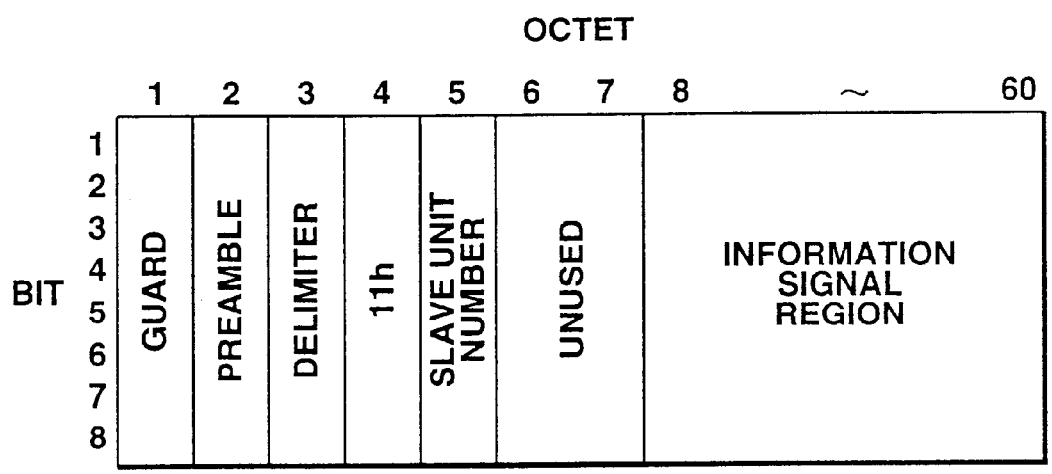
FIG. 35 is a diagram depicting an example of an information packet adopted in the sixth embodiment aspect of the present invention.

Another feature of the sixth embodiment aspect is that the input information signals have good consistency when arranged as ATM cells because the size of the communications region of a data packet is set to 53 (bytes), as shown in FIG. 35. In addition, consistency can be improved by mapping data as ATM AAL Type 5 when the information signal is an Ethernet packet.

In the slave unit 10 shown in FIG. 2, the storage amounts of the information signals temporarily stored in the buffer memory 15 are sequentially counted by the counter 16. These storage amounts are counted as integral units of packets needed to transmit the information signals.

For example, information signals are transmitted with the communications region (53 B) of the packet format shown in FIG. 32 in the case of the information package shown in FIG. 35. With such storage amounts, therefore, signals containing 53 bytes of information are converted to single packets and counted.

Examples of recommended counting methods include methods in which counting is performed as required in accordance with the input of information signals to the buffer memory 15 and the output of information signals from the buffer memory 15, and methods in which the counting is based on the difference between the start address and the end address of an information signal stored as FIFO in the buffer memory 15.

If the stored information signal is less than 53 bytes, a single packet may be counted as the one necessary for transmission, and the counting may be stopped before 53 bytes are reached. The storage amounts may be obtained by counting bits or bytes in integral units.

As noted above, counting the storage amounts of information signals as the numbers of packets necessary for transmission is effective because lower values are reported to the master unit 20.

The storage amounts of information signals counted by the storage amount counter 16 are read by the control unit 17. The control unit 17 crates control packets for reporting these storage amounts to the master unit.

Figure 36:
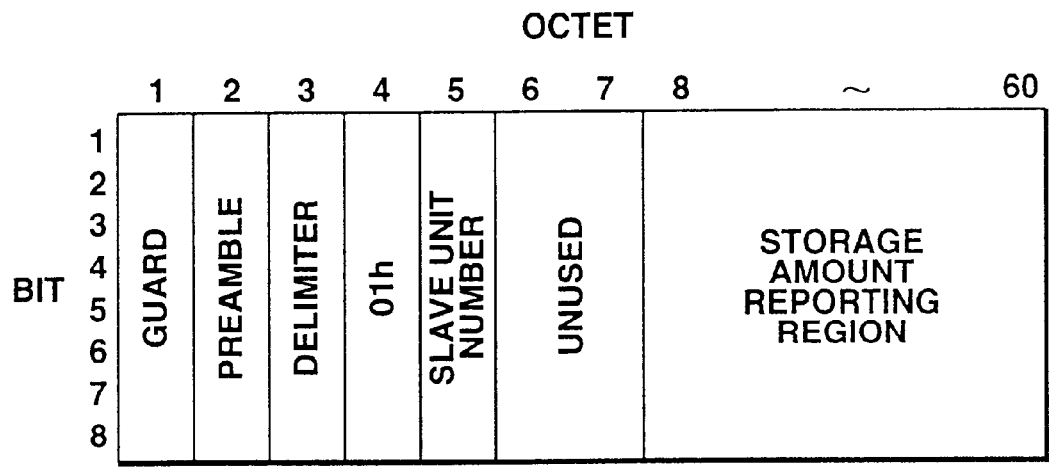
FIG. 36 is a diagram depicting an example of a control packet adopted in the sixth embodiment aspect of the present invention.

In the control packets, the communications region of the packet format shown in FIG. 32 serves as a storage amount reporting region for reporting storage amounts, as shown in FIG. 36.

The storage amounts read from the storage amount counter 16 are written to the storage amount reporting region.

Packet classification numbers 01h, which indicate that the packets are for reporting storage amounts, are written to a packet identification region. Slave unit numbers preassigned to the slave units 10-1 to 10-m by the master unit 20 are written to a slave unit identification region. With the storage amounts, it is also possible to report differential values based on previous reports.

As noted above, the necessary information is written to each region of the control packet in the control unit 17, and this control packet is then sent to the transmission unit 13. In the header region, a procedure in which the necessary information is written by means of the transmission unit 13 may be substituted for the procedure in which the information is written by means of the control unit 17.

In addition, the storage amount reporting region may optionally be used for purposes other than submitting storage amount reports, and the use of a reserve region may be substituted for the reporting of storage amounts by means of the communications region shown in FIG. 32.

The control packet sent from the control unit 17 to the transmission unit 13 is transmitted to the master unit 20 by the time slots of a control region provided inside the frame.

The control unit 17 issues instructions regarding time slot numbers and transmission timing.

For example, the control region of the frame shown in FIG. 30 is provided with enough time slots to allow all 32 slave units 10-1 to 10-m to exchange control packets during each frame period. Where control packets are transmitted according to this frame format, control is implemented such that information is transmitted using the positions of the time slots conveyed in advance to the master unit 20.

These time slots are arranged such that individual positions are assigned to slave units 10-1 to 10-m to prevent the control packets of the slave units 10-1 to 10-m from colliding in the optical transmission line 30.

The periods for reporting storage amounts may be arbitrarily set by the system in accordance with the total number of the slave units 10-1 to 10-m, the type of service class, and the like, and part of a frame format such as that shown in the example in FIG. 30 is determined based on this setting.

In the master unit 20 shown in FIG. 3, packets received from the slave units 10-1 to 10-m via the reception port are identified based on the packet classification numbers written to the packets. This is done after headers are removed in the reception unit 24.

The packets thus identified are sent to the output unit 22 when they are information packets, and to the storage unit 26 when they are control packets for submitting storage amount reports.

The interior of the storage unit 26 comprises a storage amount table (FIG. 37a) for storing the storage amounts reported by the slave units 10-1 to 10-m, an information amount table (FIG. 37b) for storing the information amount that allows the slave units 10-1 to 10-m to transmit signals, and a notification table (FIG. 37c) for storing the information amount used for notifying the slave units 10-1 to 10-m during each frame period.

The initial values of the storage amount Ri, information amount Ni, and in the tables are zeroes, and values individually assigned to the slave units 10-1 to 10-m are written to the slave unit numbers i.

In the storage unit 26, where control packets for submitting storage amount reports are received from the reception unit 24, the slave unit numbers and storage amounts written to the corresponding packets are read from the slave unit identification regions and storage amount reporting regions of the control packets. The storage amounts having matching slave unit numbers in the storage amount table are updated based on the storage amounts thus read.

Figure 38:
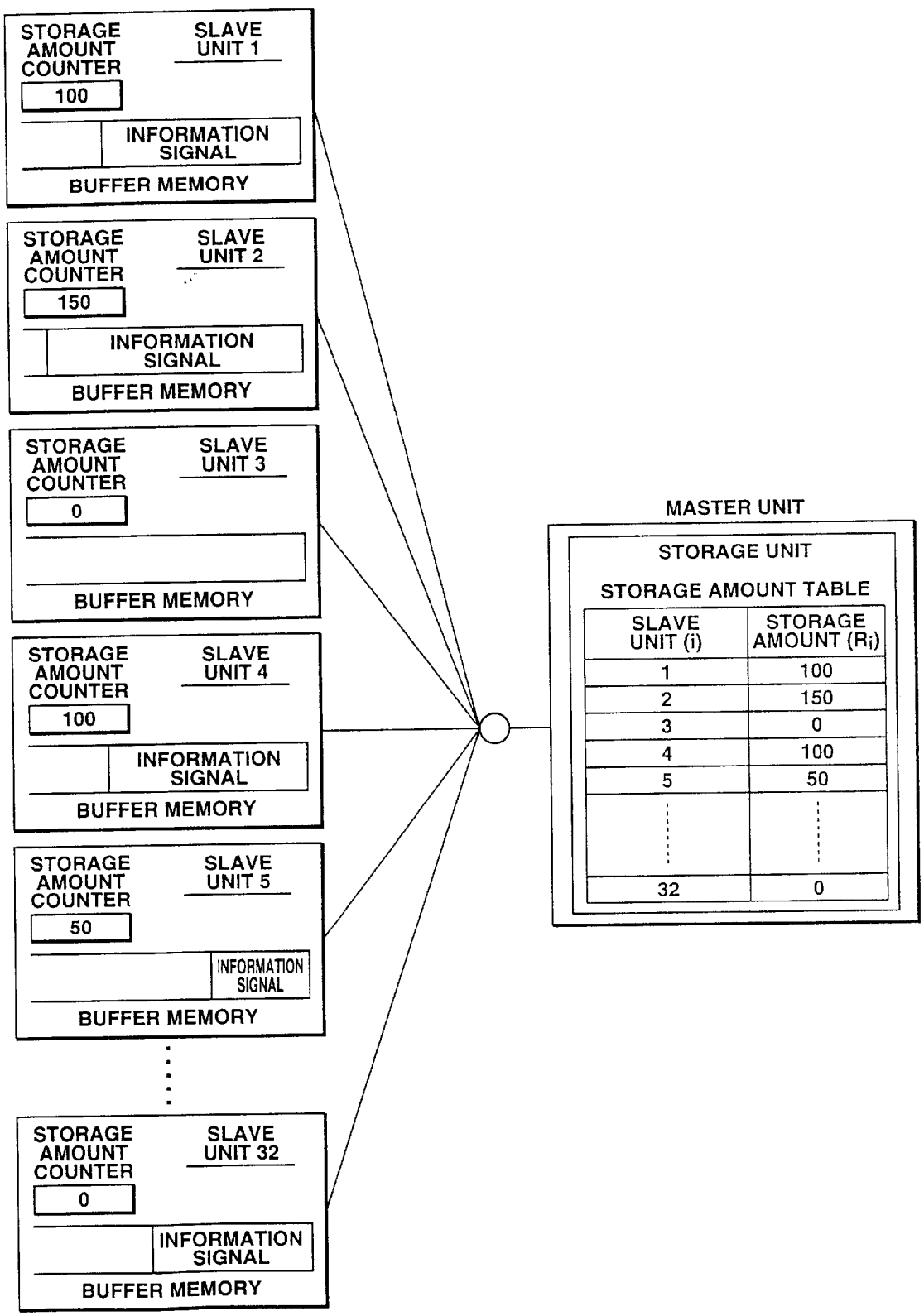
FIG. 38 is a diagram illustrating the storage amount of information signals stored in the buffer memory of a slave unit according to the sixth embodiment aspect of the present invention, and the manner in which the storage amount table is updated after the master unit has received a control packet.

For example, the storage amount table resulting from the receipt of control packets by the master unit 20 is updated as shown in FIGS. 37a and 38 when the storage amounts of information signals stored in the buffer memories 15 of the slave units 10-1 to 10-m are counted, as shown in FIG. 38. The storage amounts shown in FIGS. 37a and 38 are measured in packets.

With the control unit 27, the information amount that allows the slave units 10-1 to 10-m to transmit signals is calculated based on the storage amount table of the storage unit 26. This information amount is calculated such that the specific maximum value k given by Eq. (1) does not exceed a certain amount. The data transfer rate r in Eq. (1) is the rate at which signals can be transmitted in the data region of a frame. For example, r=108.544 Mb/s for the data packet shown in FIG. 35 or the frame format shown in FIG. 30.

Furthermore, the delay time td allowed for data transmission is set on the basis of the service class or the like handled by the system. For example, a value of about 0.001–0.1 s is considered appropriate for a voice-based service class, in which no delay is allowed. By contrast, a value of about 0.1–1 s is considered appropriate for a data-based service class in which some delay is allowed, taking into account, among other things, the imperceptible time that elapses until information a signal transmission is completed.

When, for example, m=32, $\alpha$=1.0, r=108.544 Mb/s, and td=0.0125 s, the maximum value k of the information amount that allows slave units to transmit signals is 42,400 bits, which is 100 packets in terms of the number of data packets shown in FIG. 34.

The number of currently active slave units in Eq. (2) is counted by the control unit 27 of the master unit 20. To achieve this, it may be suggested, for example, that control packets arriving from the slave units 10-1 to 10-m be monitored, and the slave units that transmit these control packets during each frame cycle be counted as being currently active. According to another method, the master unit 20 polls the slave units, and the slave units that have responded to this polling are counted as being currently active.

Figure 39:
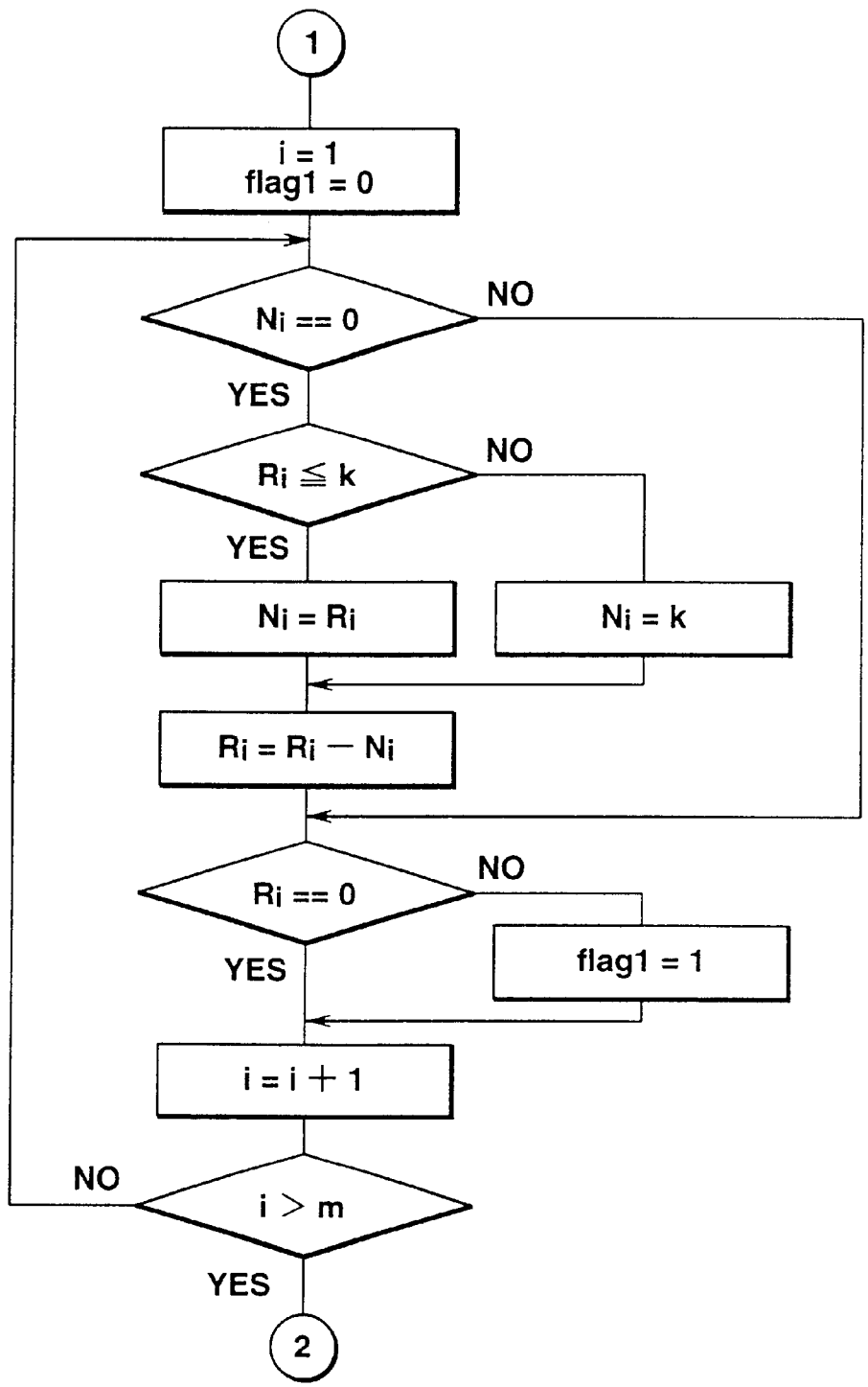
FIG. 39 is a flowchart depicting the procedure for calculating information amounts whereby slave units are allowed to transmit data by the master unit in the sixth embodiment aspect of the present invention, with all the slave units actively operating.
Figure 40:
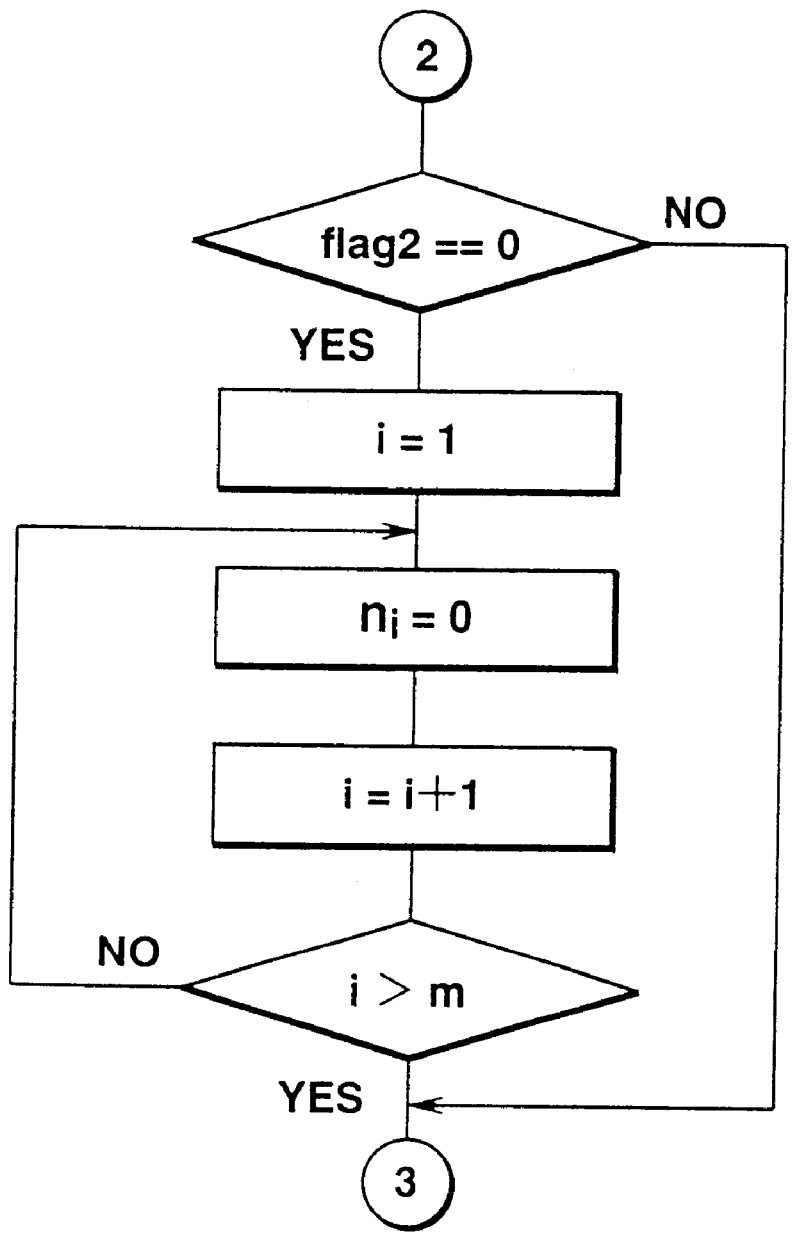
FIG. 40 is a flowchart depicting the procedure for initializing information amounts for notifying the slave units by the master unit in the sixth embodiment aspect of the present invention.

FIG. 39 is a flowchart depicting the procedure for calculating information amounts whereby the slave units 10-1 to 10-m are allowed to transmit data by the master unit 20 when all the slave units 10-1 to 10-m are active; FIG. 40 is a flowchart depicting the procedure for initializing information amounts for notifying the slave units 10-1 to 10-m; and FIG. 41 is a flowchart depicting the procedure for calculating information amounts for notifying the slave units.

The information amount may also be calculated by the master unit 20 such that control packets for submitting storage amount reports are received by the control unit 27 directly from the reception unit 24 without any calculations being made based on the storage amount table of the storage unit 26, and calculations are performed sequentially every time a storage amount report is received.

Figure 41:
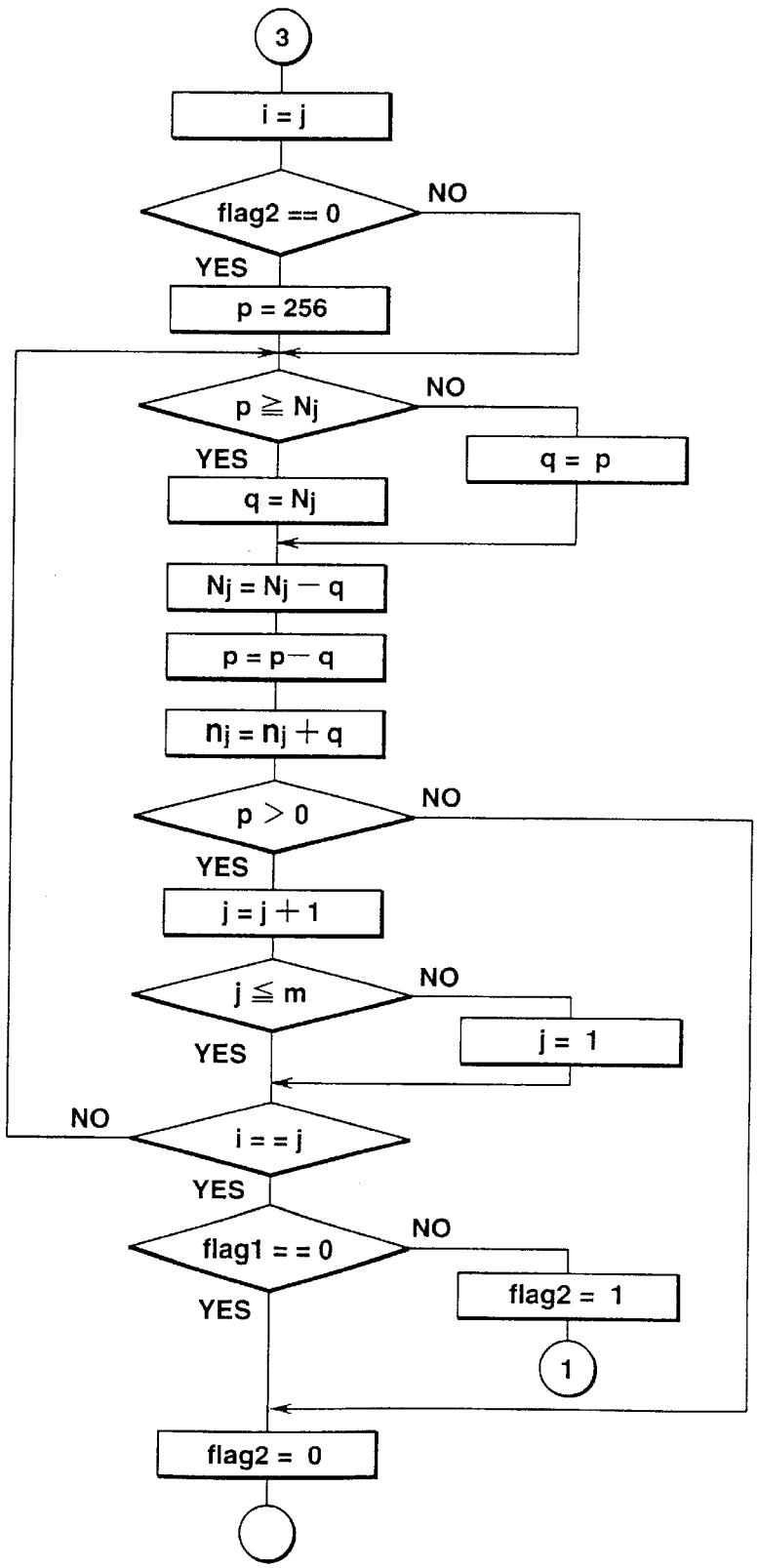
FIG. 41 is a flowchart depicting the procedure for calculating information amounts for notifying the slave units by the master unit in the sixth embodiment aspect of the present invention.

In FIGS. 39 to 41, i and j are slave unit numbers, m is the total number of the slave units 10-1 to 10-m, p is the number of packets (time slots) for allowing information signals to be transmitted as one frame, q is the information amount being calculated for conveyance to the slave units 10-1 to 10-m during each frame period, Ri is the storage amount of a slave unit having a slave unit number i that is stored in the storage amount table, Ni is the information amount that allows a slave unit whose slave unit number i is stored in the information amount table to transmit a signal, ni is the information amount that is stored in the information amount table and conveyed to the slave unit having a slave unit number i during each frame period, "flag 1" indicates whether the storage amounts Ri of all the slave units 10-1 to 10-m are zeroes, and "flag 2" is a flag that indicates whether calculation of the information amounts ni conveyed to the slave units 10-1 to 10-m during each frame period have been completed.

In FIGS. 39 to 41, m=32 (all slave units 10-1 to 10-m are currently active), $1 \leq i, j \leq m$, the initial value of j is 1, and the initial values of Ni and flag 2 are zeroes. In addition, the information amount Ni is calculated according to the flowchart in FIG. 39 during each frame period, as shown FIGS. 31(1-2) and 31(2-2).

If Ni≠0 in FIG. 39, it means that a single-frame data region has an insufficient number of time slots and that the master unit 20 is incapable of completely conveying the information amount Ni to the slave unit i.

Consequently, the information amount Ni is not updated when Ni≠0 in the flowchart in FIG. 39. "1" is set for flag 1 when all the storage amounts Ri of the slave units are different from zero following the calculation of the information amount Ni.

The information amount ni conveyed to the slave units 10-1 to 10-m during each frame period is calculated-in accordance with the flowchart shown in FIG. 41 following the initialization in accordance with the flowchart shown in FIG. 40. If flag 2≠0, ni is not initialized because of the fact that the information amount ni for conveyance to the slave units (that is, the procedure of the flowchart shown in FIG. 41) is calculated two or more times.

In FIG. 41, the initial value of the number of packets p for allowing data packets to be transmitted within the data region of a single frame corresponds to the number of time slot in the data region. Here, this number is equal to 256, based on the flowchart shown in FIG. 30.

The condition Nj>p corresponds to a case in which the information amount Nj cannot be confined to the data region of a single frame, so the slave unit whose slave unit number is j is notified about the information amount nj in the form of a continuous frame.

If p>0 and flag 1 is not zero when calculations of the information amount for conveyance to m slave units have come a full circle (i=j), the time slots of the data region still have a margin, and the storage amount Ri of a slave unit is not zero. In this case, "1" is set for flag 2, and the information amounts Ni and ni are repeatedly calculated using the flowchart shown in FIG. 39 to achieve efficient use of the time slots in the data region.

If flag 1 is zero when p is zero or when calculations of the information amount for conveyance to the m slave units 10-1 to 10-m have come a full circle, the calculations are completed because all the time slots of the data region have been assigned or because the information amounts Ni have been assigned with respect to all storage amounts Ri.

The information amount ni determined according to the above-described sequence for conveyance to the slave units during each frame period is read by the control unit 28. The information amount ni is sent together with the slave unit number i to the control unit 27 the moment the calculation of the information amount ni is completed.

In the control unit 27, the information amount ni for conveyance to the slave units 10-1 to 10-m during each frame period is read from the notification table of the storage unit 26, and a control packet is created for reporting this information amount ni to each of the slave units 10-1 to 10-m.

Figure 42:
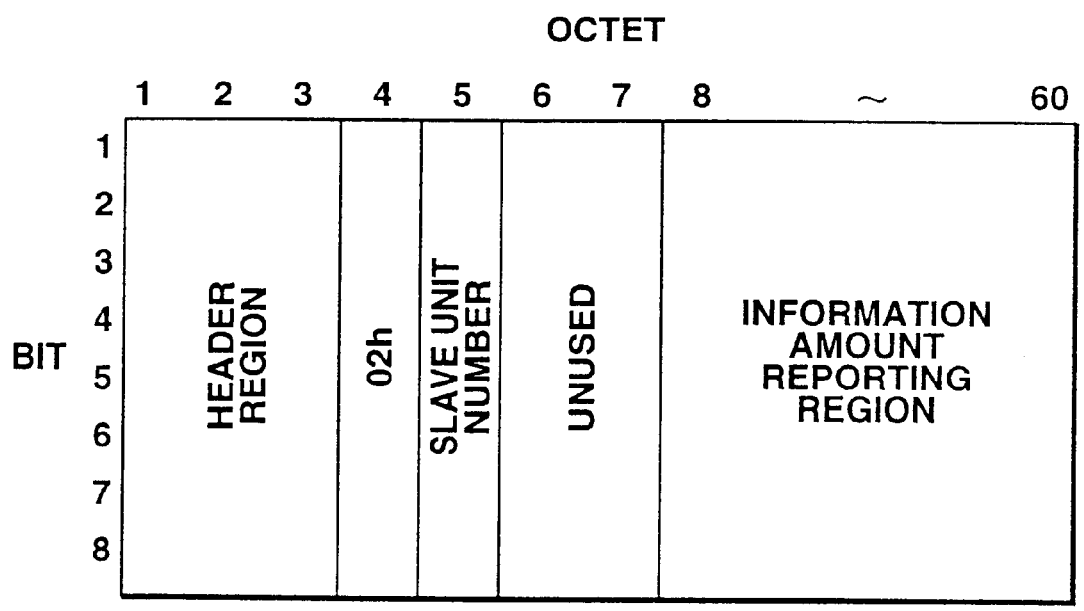
FIG. 42 is a diagram depicting an example of a control packet transmitted to a slave unit by the master unit in the sixth embodiment aspect of the present invention.
Figure 43:
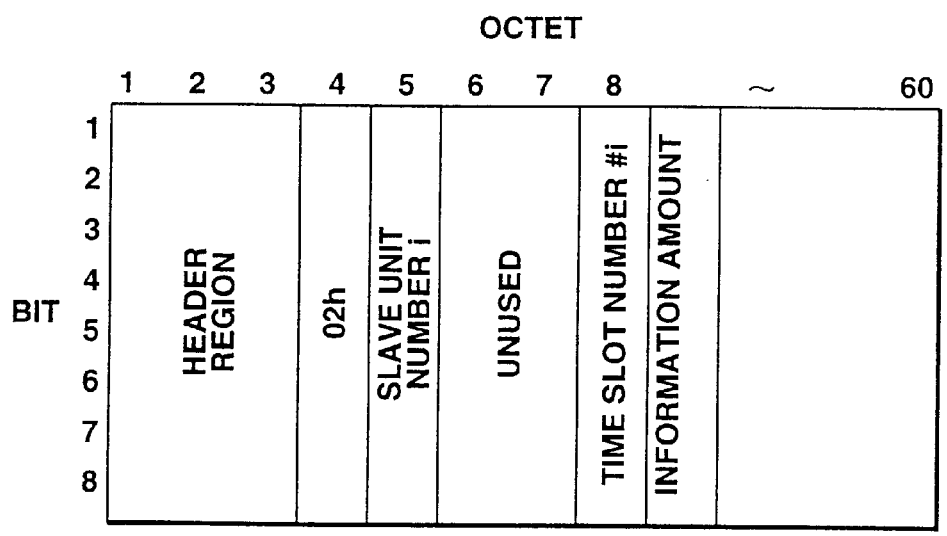
FIG. 43 is a diagram depicting a specific example of data loaded in the information amount reporting region of the control packet shown in FIG. 42.

In the control packet, the communications region of the packet format shown in FIG. 32 serves as the information amount notification region for submitting information amount reports, as shown in FIG. 42. Information amount ni and the numbers #i of the time slots for starting the transmission of data packets are written to this information amount notification region, as shown in FIG. 43.

Figure 44:
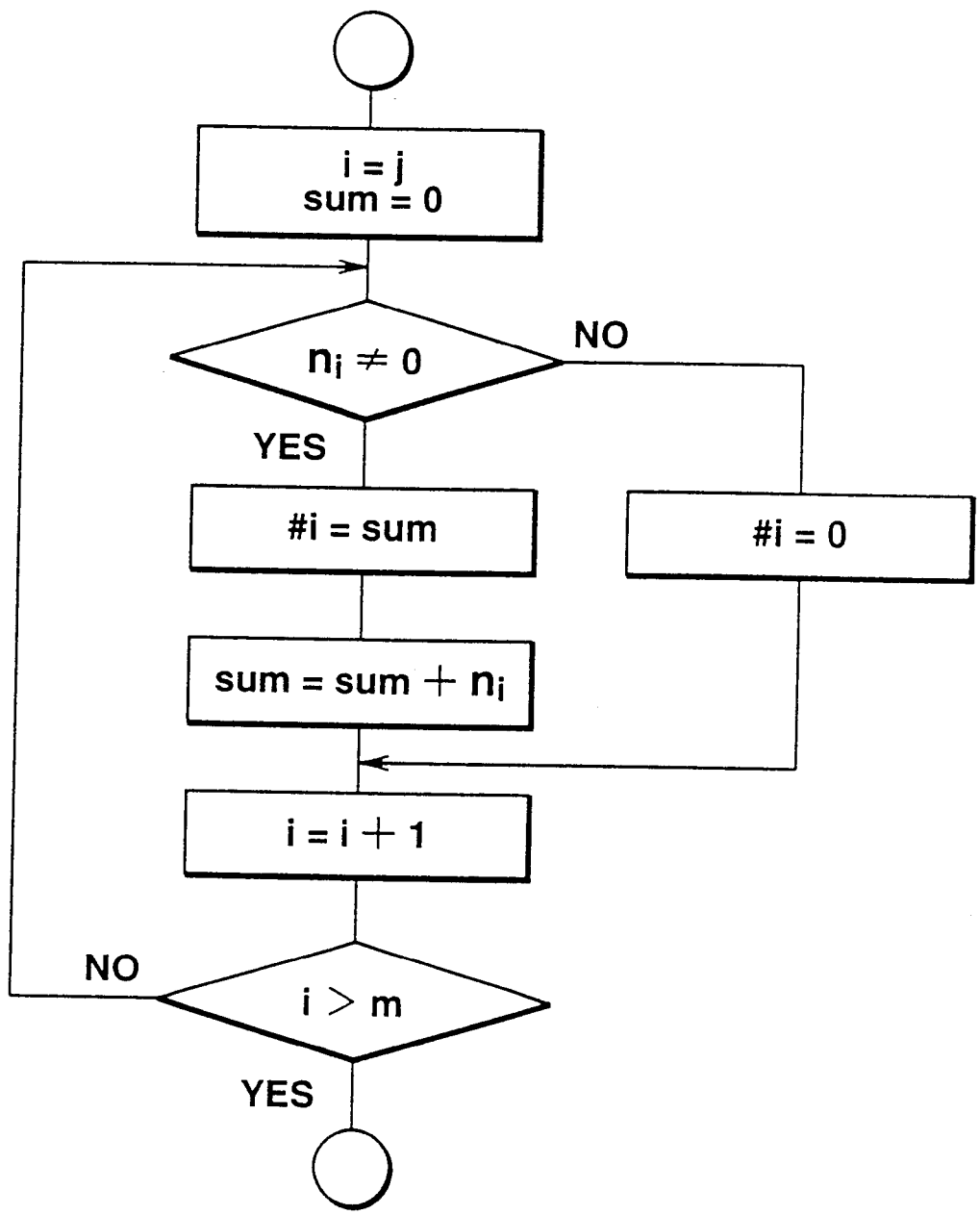
FIG. 44 is a flowchart depicting a procedure for determining the time slot number according to which a slave unit begins transmitting an information packet in the sixth embodiment aspect of the present invention.

The positions #i of the time slots where the slave units 10-1 to 10-m begin transmitting data packets are determined in accordance with the flowchart shown in FIG. 44.

Packet classification numbers 02h, which indicate that the packets are for issuing information amount notifications, are written to a packet identification region. The slave unit identification numbers of the slave units for issuing notifications about the information amounts ni are written to a slave unit identification region.

As noted above, the necessary information is written to each region of the control packet in the control unit 28, and this control packet is then sent to the transmission unit 23.

In the-header region, a procedure in which the necessary information is written by means of the transmission unit 13 may be substituted for the procedure in which the information is written by means of the control unit. In addition, the information amount notification region may optionally be used for purposes other than submitting information amount notifications, and the use of a reserve region may be substituted for submitting information amount notifications by means of the communications region shown in FIG. 32.

The control packet sent from the control unit 27 to the transmission unit 23 is transmitted to the slave units 10-1 to 10-m by the time slots of a control region provided inside the frame. Transmission timing and time slot numbers are controlled by the control unit 28.

In the slave unit 10 shown in FIG. 2, the packets from the master unit 20 are received by the reception unit 14 via the reception port. In the reception unit 14, the header is removed, and it is then determined based on the slave unit numbers written to the received packet whether the received packet is indeed addressed to this slave unit 10. The type of packet is identified on the basis of the packet type number written to the packet if the packet is indeed addressed to the slave unit 10.

The identified packet is sent to the output unit 12 if it is a data packet, and to the control unit 17 if it is a control packet for submitting an information amount notification.

Once the control packet for submitting an information amount notification such as that shown in FIG. 18 is received by the control unit 17 from the reception unit 14, the time slot number for starting a data packet transmission and the information amount ni for allowing these packets to be transmitted are read from the information amount notification region of the control packet. If i≠0, the control unit 17 instructs the buffer memory 15 to output the stored information signals to the transmission unit at no more than the information amount ni. For example, an instruction to output an information signal of less than 5300 bytes to the transmission unit 13 is given if ni is 100.

In the transmission unit 13, a data packet such as that shown in FIG. 35 is created in order to transmit to the master unit 20 the information signal sent from the buffer memory 15. In the data packet, the communications region of the packet format shown in FIG. 32 serves as the information signal region for transmitting information signals.

The information signals sent from the buffer memory 15 are written in the information signal region. Packet classification numbers 11h, which indicate that the packets are for transmitting information signals, are written to a packet identification region. Slave unit identification numbers assigned in advance to the slave units 10 are written to a slave unit identification region. The necessary information is written to each region of the data packet in the transmission unit 13, and this data packet is then sent to the master unit 20 by the time slots of a data region provided inside the frame. Transmission timing and time slot numbers are controlled by the control unit 17.

Figure 45:
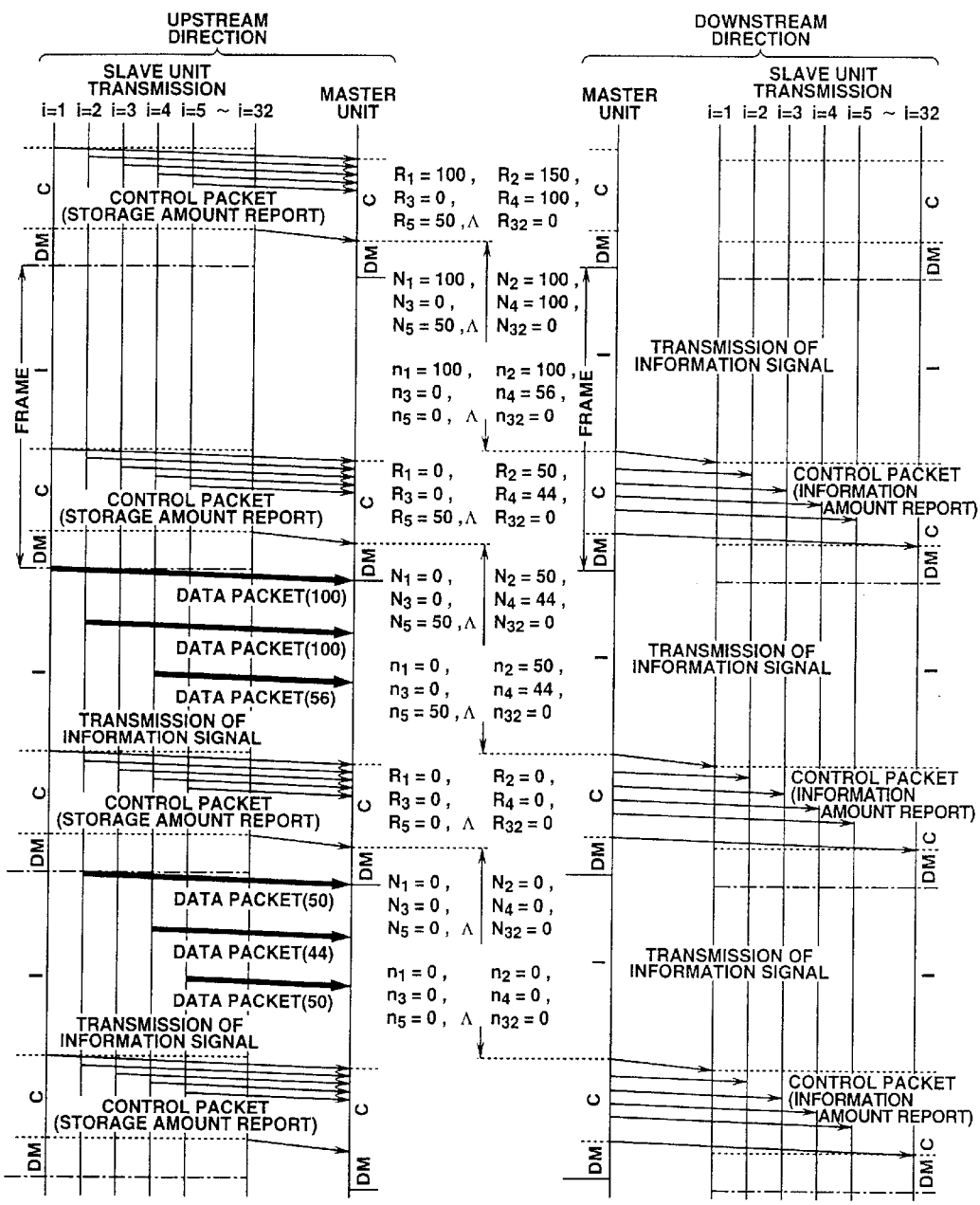
FIG. 45 is a sequence diagram depicting the manner in which information signals stored in a slave unit are transmitted to the master unit in the sixth embodiment aspect of the present invention.

FIG. 45 is a sequence diagram depicting the manner in which information signals such as those in FIG. 38, which have been stored according to the above-described process, are transmitted to the master unit 20.

Following is a description of the process for determining the specific maximum value ki for each of the slave units 10-1 to 10-m.

The specific maximum values k of the information amount that allows information signals to be transmitted for the slave units 10-1 to 10-m are selected such that individual values can be calculated for each of the slave units 10-1 to 10-m, depending on the financial charges, contract type, urgency, priority level, and other differences among the slave units 10-1 to 10-m.

In this case, the specific maximum number value ki (bits) for each of the slave units 10-1 to 10-m (i=1, . . . , m) is determined for each of the slave units such that Eq. (5) is satisfied, where m is the total number of slave units 10-1 to 10-m (m is an integer), $\alpha$ is the proportion of currently active slave units 10-1 to 10-m ($0<\alpha\leq1.0$), r (b/s) is the data transfer rate of the point-to-multipoint communication system, and td (s) is the delay time allowed for data transmission and determined by the system, as in the band allocation shown in FIG. 29. Here, $\Sigma$ indicates a sum of i's from 1 to m. The proportion $\alpha$ of currently active slave units is calculated in the same manner using Eq. (2).

The information amount Ni can be calculated in accordance with the flowchart in FIG. 39 by substituting ki for k, and the information amount ni for notifying the slave units 10-1 to 10-m during each frame period can be calculated in the same manner in accordance with the flowchart shown in FIG. 14.

Following is a description of the procedure for setting the specific maximum values ki for individual slave units 10-1 to 10-m and service class units.

The buffer memory 15 of the slave unit 10 shown in FIG. 2 is configured such that input information signals can be individually stored as mutually different service class units, depending on categories such as voice, video, data, or the like; categories such as analog voice signals, ATM cells, Ethernet packets, and the like; and categories such as best effort service (where delay is allowed) and guaranteed service (where delay is not allowed).

Figure 46:
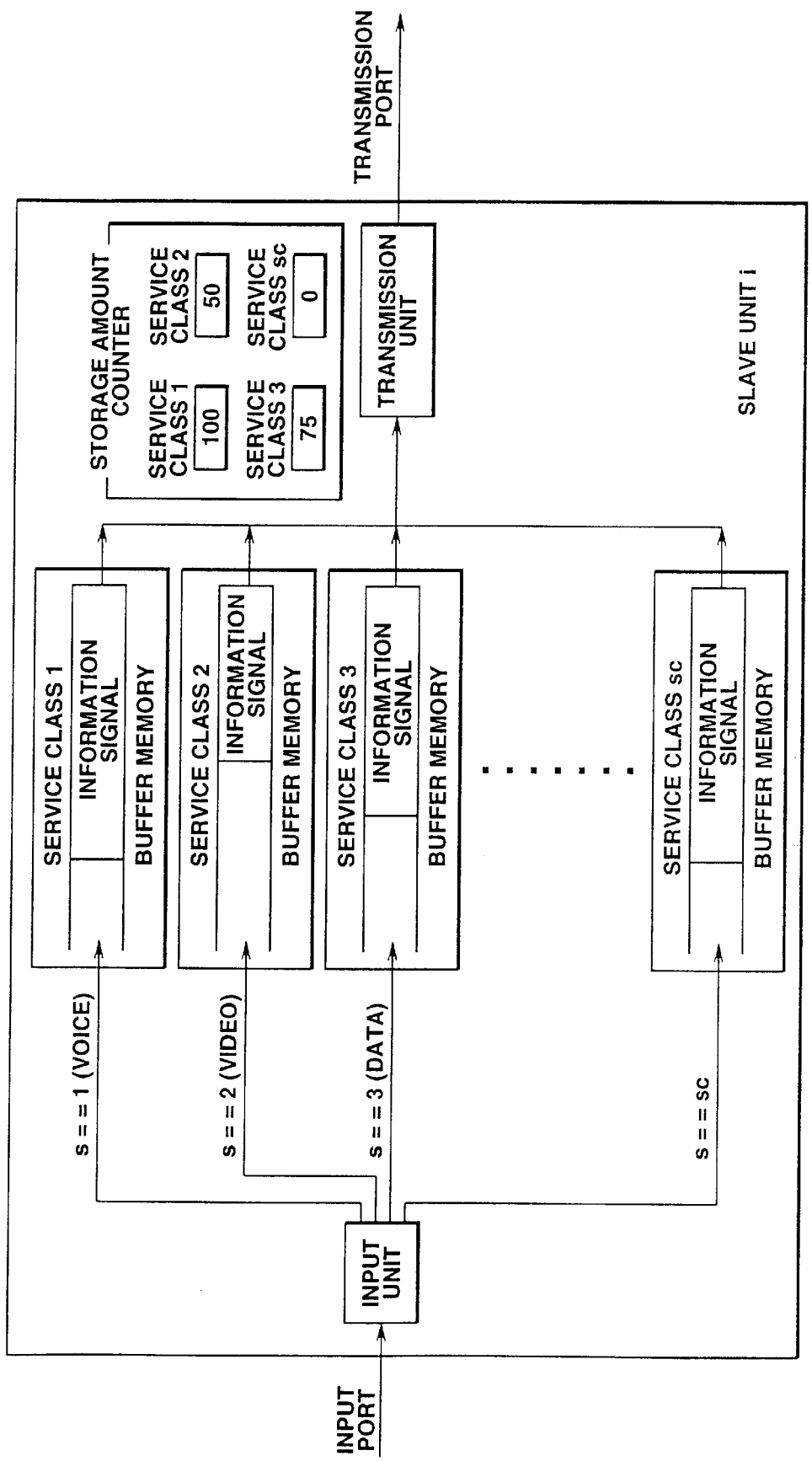
FIG. 46 is a diagram depicting an example of the buffer memory structure of a slave unit for a case in which the band allocation illustrated in FIG. 29 is adopted in the sixth embodiment aspect of the present invention.
Figure 47:
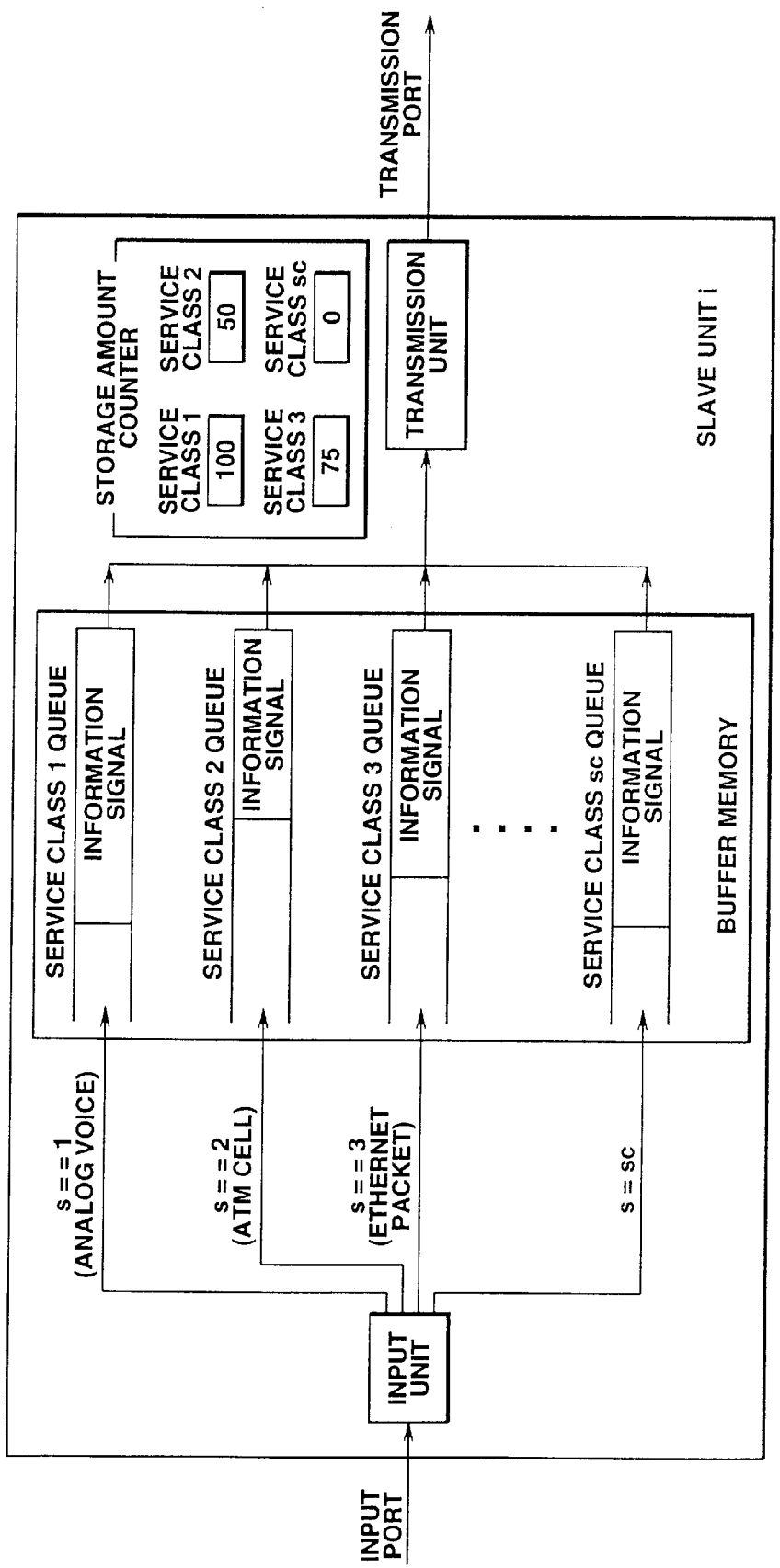
FIG. 47 is a diagram depicting another example of the buffer memory structure of a slave unit for a case in which the band allocation illustrated in FIG. 29 is adopted in the sixth embodiment aspect of the present invention.

In this case, the structure of the buffer memory 15 can be divided into a plurality of physical memories (as shown in FIG. 46) or into a plurality of logical queues (as shown in FIG. 47).

When information signals are stored for each service class, the input information signals are divided among the service classes at a preceding stage of the buffer memory 15.

When information signals are stored in the buffer memory 15 as mutually different service class units, the corresponding storage amounts are counted by the storage amount counter of each service class, as shown in FIGS. 46 and 47.

Figure 48:
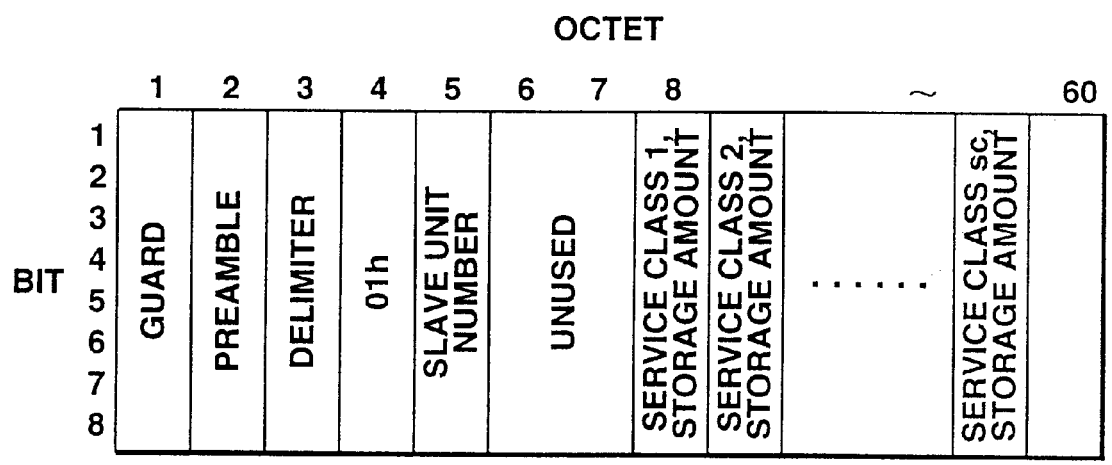
FIG. 48 is a diagram depicting an example of the control packet used when information amount is reported by a slave unit to the master unit in a case in which the band allocation illustrated in FIG. 29 is adopted in the sixth embodiment aspect of the present invention.

When the storage amount of each service class is reported to the master unit 20, the storage amount of each service class is written to the storage amount reporting region of a control packet, as shown in FIG. 48. In FIGS. 46 to 48, sc indicates the total number of service classes.

The storage unit 26 of the master unit 20 shown in FIG. 3 comprises a storage amount table (FIG. 49a) for each service class, an information amount table (FIG. 49b), and a notification table (FIG. 49c) for submitting an information amount report during each frame period to ensure that the information amount relayed to the slave units 10-1 to 10-m is calculated in mutually different service class units.

In FIGS. 49a, 49b, and 49c, respectively, Ris is the storage amount of each service class in a slave unit, Nis is the information amount of each service class that allows the slave unit to transmit signals, and nis is the information amount of each service class for issuing a notification to the slave unit during each frame period. It is assumed that s=1, 2, . . . , sc, where s indicates a service class, and sc is the total number of service classes.

In the master unit 20, where control packets for reporting the storage amounts of individual service classes (an example is shown in FIG. 48) have been received, the slave unit numbers and the storage amounts of each service class written to the corresponding packets are read from the slave unit identification regions and storage amount reporting regions of the control packets. The storage amounts Ris belonging to each service class and having matching slave unit numbers in the storage amount table are updated based on the storage amounts thus read.

The specific maximum values of the information amount Nis (i=1, 2, . . . , m, s=1, 2, . . . , sc) that allows the slave units 10-1 to 10-m to transmit information signals in service class units can be determined for service class units and individual slave units 10-1 to 10-m.

In this case, the specific maximum values kis (i=1, 2, . . . , m; s=1, 2, . . . , sc) can be determined for individual slave units and service classes unit such that the following relation is satisfied:

$$\Sigma kis \leq rs \times tds \ (s=1, 2, \ldots, sc) \qquad (6),$$

where m is the total number of slave units 10-1 to 10-m (m is an integer), sc is the total number of service classes determined by the delay time (sc is an integer), $\alpha s$ is the proportion of currently active slave unit service classes ($0<\alpha s\leq1.0$), rs (b/s) is the data transfer rate of each service class in a point-to-multipoint communication system, and tds (s) is the delay time allowed for the data transmission in each service class and determined by the system. Here, $\Sigma$ indicates the sum of i's from 1 to $\alpha s \times m$.

Figure 50:
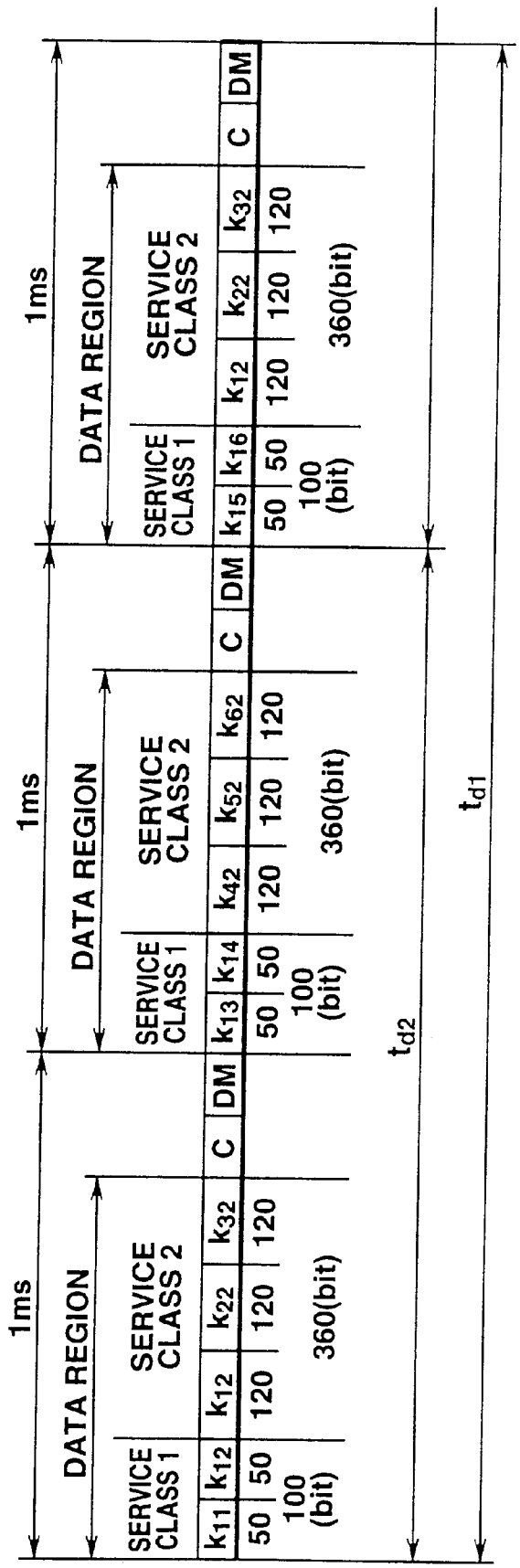
FIG. 50 is a diagram illustrating an example of a frame period for a case in which the band allocation illustrated in FIG. 29 is adopted in the sixth embodiment aspect of the present invention.

If, for example, m=6, sc=2, $\alpha 1$=1.0, $\alpha 2$=1.0, r1=100 kb/s, r2=360 kb/s, td1=0.003 s, and td2=0.002 s, the maximum values of the information amount that allows a slave unit having a slave unit number i to transmit signals are ki1=50 b and ki2=120 b, as shown in FIG. 50. In FIG. 50, C indicates a control region, and DM indicates a delay control region. The proportion $\alpha s$ of currently active slave unit service classes is given by $$\alpha s=(\text{Number of slave units with currently active service classes } s)/m \qquad (7)$$

In Eq. (6), the number of slave units with currently active service classes s is assumed to be counted by the master unit.

To achieve this, it may be suggested, for example, that the number of slave units involved in handling a service class s be counted as the number of currently active stations at a stage during which the slave units 10-1 to 10-m are registered by the system. Other suggested methods include those in which control packets arriving from the slave units 10-1 to 10-m are monitored, slave units (in which the storage amounts reported for a service class s are different from zero for a fixed period of time) are counted as currently active stations, or counting is conducted by causing the master unit 20 to poll slave units 10-1 to 10-m and confirming that a service class s is currently active.

The information amount Nis that allows individual slave units 10-1 to 10-m to transmit signals in the form of service class units can be calculated by substituting ki for k in the flowchart shown in FIG. 39, and performing sc cycles of operations for mutually different service class units.

The information amount nis for conveyance to the slave units 10-1 to 10-m during each frame period can be calculated by performing sc cycles of the flowchart shown in FIG. 41 for mutually different service class units. A number that enables data packets to be transmitted in each service class is set in the data region of a frame as the initial value of p.

Figure 51:
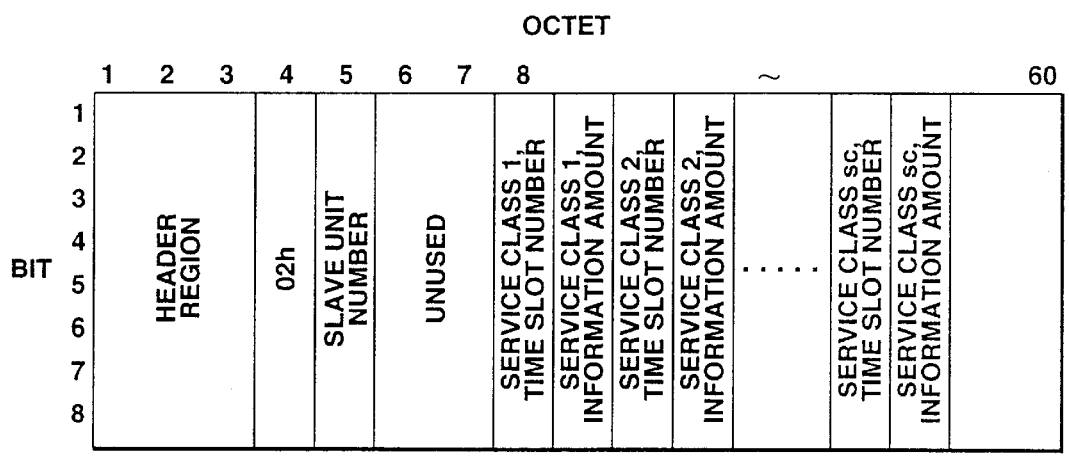
FIG. 51 is a diagram depicting an example of a control packet transmitted by the master unit to a slave unit for a case in which the band allocation illustrated in FIG. 29 is adopted in the sixth embodiment aspect of the present invention.

The information amount nis of each service class calculated by the control unit 27 is read by the transmission unit 23, written to a control packet such as that shown in FIG. 51, and conveyed to a slave unit.

The information amount nis written to the control packet is read by a slave unit 10 that have received this control packet. Such control packets are used to convey the information amounts nis of various service class units.

The control unit 17 issues instructions for the information signals stored in the buffer memory 15 at no more than the information amount nis to be output in the direction of the transmission unit 13 for a buffer memory of service class s or for a queue of service class s inside the buffer memory if nis≠0 in an arrangement such as that shown in FIG. 46 or 47.

For example, an instruction to output an information signal of less than 5300 bytes in the direction of the transmission unit 13 is given to the buffer memory or queue of service class 1 if ni1 is 100, and an instruction to output an information signal of less than 2650 bytes is given to the buffer memory or queue of service class 2 if ni2 is 50.

In the transmission unit 13, a data packet such as that shown in FIG. 35 is created in order to transmit to the master unit 20 the information signal of each service class sent from the buffer memory 15, and the result is transmitted to the master unit 20 by means of the time slots of a control region in a frame. The control unit 17 issues instructions regarding time slot numbers and transmission timing.

Following is a description of the procedure used when the information amount for conveyance to slave units 10-1 to 10-m is multicast.

In the example of a frame format shown in FIG. 30, a sufficient number of time slots are provided as a control region to allow all 32 slave units 10-1 to 10-m to exchange control packets during each frame period.

Figure 52:
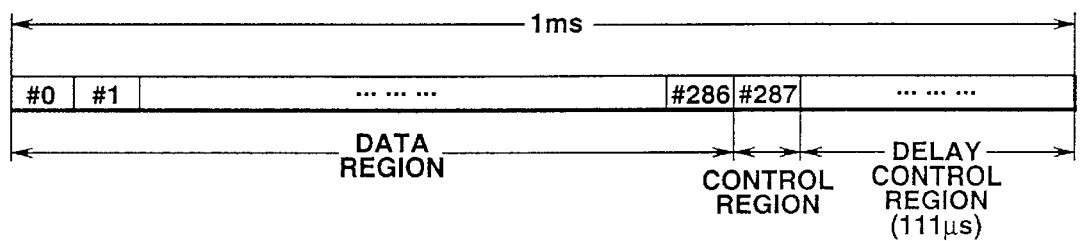
FIG. 52 is a diagram depicting an example of a frame format for a case in which information amount used for notification purposes is multicast by the master unit to the slave units in the sixth embodiment aspect of the present invention.

As shown, for example, in FIG. 52, the frame format in question is such that the control region is limited to one packet, but the data region can be extended over 286 packets. To allow slave units 10-1 to 10-m to report storage amounts to the master unit 20 using this frame format, control is implemented such that control packets are transmitted either in response to polling by the master unit 20 or at regular periods individually set for the slave units 10-1 to 10-m.

Because the control region comprises a single packet, control packets for issuing notifications about the information amount ni can be multicast as control packets addressed to all slave units instead of being individually transmitted to specific slave units when the master unit 20 notifies the slave units 10-1 to 10-m of the information amount ni using a frame format such as that shown in FIG. 52.

Figure 53:
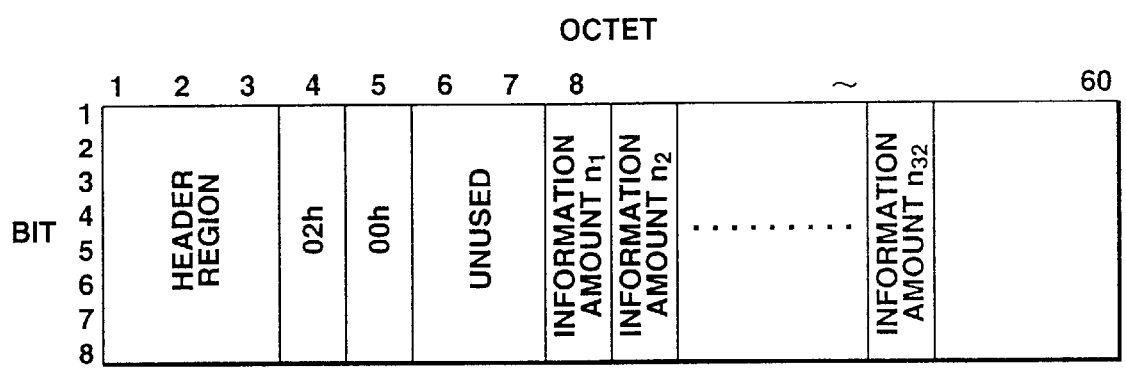
FIG. 53 is a diagram depicting an example of a control packet transmitted by the master unit to the slave units in the case of the structure illustrated in FIG. 52.

The control packets used in this case are illustrated in FIG. 53, where the information amounts ni of all the slave units are written in the information amount notification region. A value (for example, 00h) indicating that control packets are addressed to all stations is written in the slave unit identification region. In the drawing, C indicates a control region, and DM indicates a delay control region.

Necessary information is written to each region of the control packet in the control unit 27, and this control packet is sent first to the transmission unit 23 and then to the slave units 10-1 to 10-m.

When a control packet such as that shown in FIG. 53 is received from the reception unit 14 by the control unit 17 of the slave unit 10 shown in FIG. 2, the information amounts ni for all the slave units 10-1 to 10-m are read from the information amount notification region of the control packet. The time slot number for starting a data packet transmission is calculated according to the flowchart in FIG. 44 when the information amount for the slave units 10-1 to 10-m satisfies the condition ni≠0. The buffer memory 15 is then instructed to output stored information signals in the direction of the transmission unit 13 at no more than the notified information amount ni.

Following is a description of another multicasting process for issuing information amount notifications to slave units 10-1 to 10-m.

Figure 54:
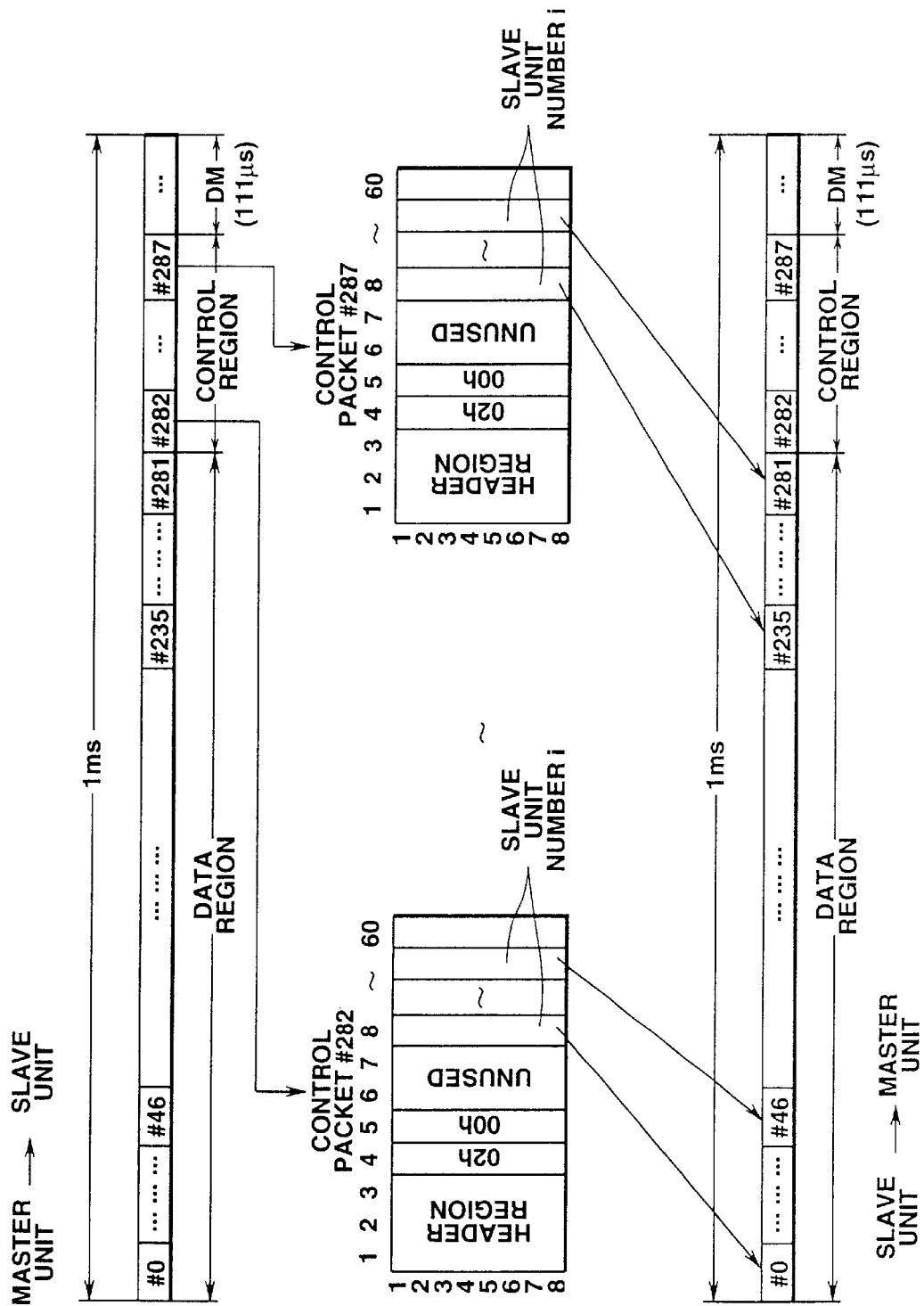
FIG. 54 is a diagram depicting another example of a frame format for a case in which information amount used for notification purposes is multicast by the master unit to the slave units in the sixth embodiment aspect of the present invention.
Figure 55:
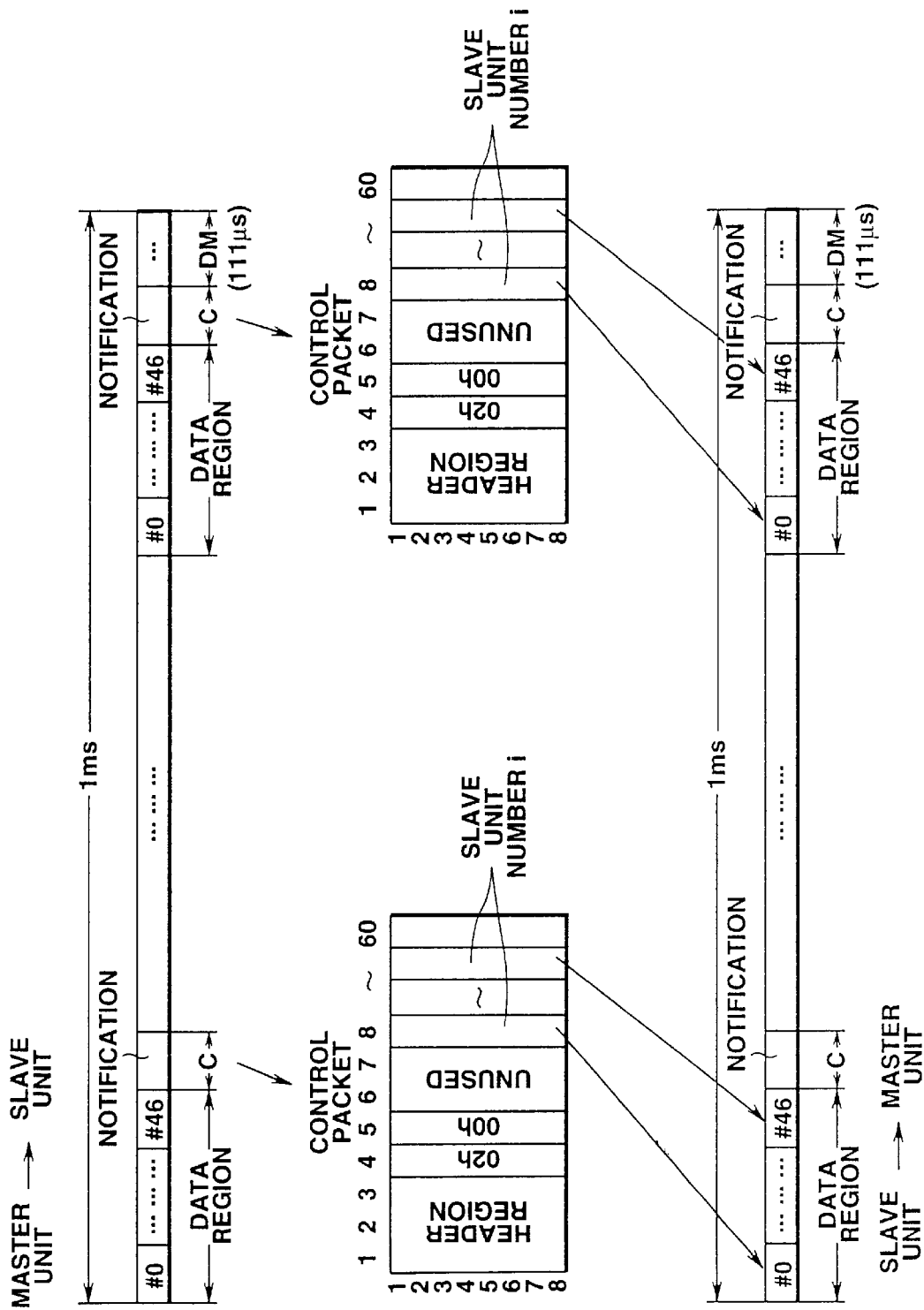
FIG. 55 is a diagram depicting another example of a frame format for a case in which information amount used for notification purposes is multicast by the master unit to the slave units in the sixth embodiment aspect of the present invention.

Sending information amount notifications to the slave units 10-1 to 10-m from the master unit 20 can also be accomplished by providing specific time slots with instructions regarding the slave units for which transmission is allowed, as shown in FIG. 54 or 55. In the master unit 20, the slave unit numbers of the slave units 10-1 to 10-m notified of the transmission-enabling information amount are written in the information amount notification region of the control packet. The same slave unit number is continuously written when the information amount conveyed corresponds to a plurality of time slot numbers.

The transmission-enabling slave unit numbers are read from the information amount notification region to specific time slots when the slave units 10-1 to 10-m receive control packets for issuing information amount notifications in accordance with a frame format such as that shown in FIG. 54 or 55. If the slave unit numbers thus read match the numbers assigned to the slave units 10-1 to 10-m, the buffer memory 15 is instructed to output information signals corresponding to a single packet (in this case, 53 bytes) in the direction the transmission unit 13.

The aforementioned process is sequentially repeated for the slave unit numbers read by the slave units 10-1 to 10-m.

Although the above embodiment aspect was described with reference to cases in which TDM and TDMA were used as packet multiplexing protocols, the access protocol in accordance with the sixth embodiment aspect can be easily adapted, for example, to FDM (Frequency Division Multiplex), FDMA (Frequency Division Multiple Access), CDMA (Code Division Multiple Acces), and the like.

Thus, according to the sixth embodiment aspect, slave units 10-1 to 10-m transmit information signals in accordance with the information amount conveyed by the master unit 20, completely eliminating signal collisions in the transmission line and preventing the throughput from decreasing in the manner observed with CSMA/CD when information signals on the order of several megabytes are transmitted in bursts.

Furthermore, the information amount that allows information signals to be td can be calculated dynamically and efficiently on the basis of reports from the slave units 10-1 to 10-m such that the data transfer rate is utilized with 100% efficiency, so high throughput can be obtained even under complex conditions created by greater burst traffic or an increased number of slave units 10-1 to 10-m.

In addition, the maximum value k (bits) of information amount is set such that the following relation is satisfied:

$$k \leq (r \times td) \div (\alpha \times m),$$

where m is the total number of slave units 10-1 to 10-m (m is an integer), α is the proportion of currently active slave units 10-1 to 10-m (0<α≦1.0), r (b/s) is the data transfer rate, and td (s) is the delay time allowed for data transmission and determined by the system.

Slave units 10-1 to 10-m can therefore continuously transmit large information signals because these stations have exclusive use of the upstream transmission line during the transmission of information signals whose maximum size is measured in k (bits).

Another feature is that when the information amount is determined on the basis of the above equation, a time of td seconds is necessary for the transmission if all the slave units 10-1 to 10-m transmit kilobit-size information signals, making it possible to secure an allowed delay time of td seconds for data transmission by all the slave units 10-1 to 10-m.

In addition, a point-to-multipoint communication system access protocol capable of sustaining access fairness can be provided because all the slave units 10-1 to 10-m can invariably transmit their information signals within the allowed delay time td.

A seventh embodiment aspect of the point-to-multipoint communication system of the present invention will now be described.

In the seventh embodiment aspect of the point-to-multipoint communication system of the present invention, the system structure is the same as the structure shown in FIG. 1.

Specifically, the entire system structure according to the seventh embodiment aspect of the present invention is configured by connecting m slave units 10-1, 10-2, ..., 10-m and a single master unit 20 by means of an optical transmission line 30, as shown in FIG. 1. The transmission line 30 connected to the master unit 20 is divided by an optical coupler 40 into m branch lines 30-1, 30-2, ..., 30-m, which are connected to the slave units 10-1, 10-2, ..., 10-m, respectively.

Although the point-to-multipoint communication system shown in FIG. 1 is configured as an optical access network in which the master unit 20 and the m slave units 10-1, 10-2, ..., 10-m are connected by means of the optical transmission line 30, optical coupler 40, and m branch lines 30-1, 30-2, ..., 30-m, the seventh embodiment aspect is also widely applicable to communication systems composed of a master unit 20 and a plurality of slave units 10-1 to 10-m such that the transmission line band is allocated among the slave units 10-1 to 10-m by the master unit 20 in a controlled manner. Other possible applications include wireless access networks configured such that part of the transmission line is a landline or a wireless line, such as an arrangement in which a plurality of wireless terminals are connected instead of the slave units 10-1 to 10-m to the master unit 20 by means of a wireless transmission line.

When a wireless transmission line is used in such a case, the use of the access protocol of the seventh embodiment aspect is facilitated by the simple synthesis or distribution of signals among wireless terminals and the master unit.

In the seventh embodiment aspect, the slave units 10-1 to 10-m temporarily store signals by service type and report the storage amounts when instructed by the master unit 20. The master unit 20 calculates transmission-enabling amounts below a certain value and gives the slave units 10-1 to 10-m signal transmission instructions on the basis of these enabling amounts. In the process, the master unit 20 gives instructions to transmit signals in sequence from higher-priority service classes, and then gives instructions to transmit signals for other types of services using the remaining band. Upon receipt of instructions from the master unit 20, the slave units 10-1 to 10-m transmit the stored signals to the master unit 20 for each type of service in accordance with the instructions.

Specifically, the access protocol according to the point-to-multipoint communication system of the seventh embodiment aspect operates on the following basic principle: the information amount needed to ensure transmission for each service class is reported in accordance with instructions from the master unit 20, and transmission by service class is enabled by the master unit 20.

In each service class, slave units 10-1 to 10-m about to transmit information signals issue reports for the master unit 20 regarding the information amount needed to transmit the information signals in accordance with the instructions from the master unit 20. Upon receipt of the reports from the slave units 10-1 to 10-m, the master unit 20 issues transmission instructions for the slave units 10-1 to 10-m in each service class on the basis of the information amount reported for each service class. At this time, the master unit 20 issues instructions to transmit data in sequence from higher-priority service classes.

Upon receipt of transmission instructions from the master unit 20 regarding a certain service class, the slave units 10-1 to 10-m transmit the data for the corresponding service class to the master unit 20.

Because such an arrangement allows slave units 10-1 to 10-m to transmit signals in accordance with instructions from the master unit 20, no signal collisions at all occur in the transmission line, and a throughput reduction such as that observed in the case of CSMA/CD is avoided when signals containing several megabytes of data are transmitted in bursts.

Here, the information amount that allows information signals to be transmitted can be calculated dynamically and efficiently on the basis of reports from the slave units 10-1 to 10-m such that the data transfer rate is utilized with 100% efficiency, so high throughput can be obtained even under complex conditions created by greater burst traffic or an increased number of slave units 10-1 to 10-m.

Information amount is reported by service class and transmission instructions are given in sequence from higher-priority service classes, so the stringent delay requirements imposed on higher-priority service classes can be satisfied because the instructions to transmit data are issued independently for the higher-priority service classes even when several megabytes or more are transmitted in bursts for a lower-priority service class.

Another feature of the seventh embodiment aspect is that the information amount reported by each slave unit 10-1 to 10-m is limited to one for issuing an instruction to transmit a signal within a certain time period. When a particular slave unit 10-1 to 10-m reports a high information amount in excess of several megabytes, the data transmission of this particular slave unit 10-1 to 10-m has very little effect on the transmission of other slave units 10-1 to 10-m because the transmission does not exceed a certain limiting value and because no instruction is issued concerning data transmission.

The maximum value k (bits) of data transmission within a certain time period is set such that the following relation is satisfied:

$$k \leq (r \times td)/m,$$

where m is the total number of slave units 10-1 to 10-m (m is an integer), r (b/s) is the data transfer rate, and td (s) is the delay time allowed for the data transmission and determined by the system. In the presence of inactive slave units 10-1 to 10-m, the proportion α of active slave units is assumed to be 0<α≦1.0, and the maximum value k of data transmission within a certain time period is determined such that the following relation is satisfied:

$$k \leq (r \times td)/(\alpha \times m).$$

The slave units 10-1 to 10-m can therefore continuously transmit large information signals because these stations have exclusive use of the upstream transmission line during the transmission of information signals whose maximum size is measured in k (bits). Another feature is that when the information amount is determined on the basis of the above equation, a time of td seconds is necessary for the transmission if all the slave units 10-1 to 10-m transmit kilobits of data, making it possible to secure an allowed delay time td for data transmission by all the slave units 10-1 to 10-m.

All the slave units 10-1 to 10-m can invariably transmit their information signals within the allowed delay time of td seconds, and are thus assured access fairness.

The seventh embodiment aspect of the point-to-multipoint communication system of the present invention will now be described in detail.

In the seventh embodiment aspect, the buffer memory 15 of the slave unit 10 shown in FIG. 2 temporarily stores the information signals from the input port by service class, and a counter 16 counts, also by service class, the storage amounts of the information signals stored in the buffer memory 15 for each service class. In addition, a control unit 17 informs the master unit 20 of the storage amounts pertaining to each service class of the information signals counted by the counter 16 and performs other types of control, and the information signals stored in the buffer memory 15 are output by service class to a transmission unit 13 in accordance with instructions from the master unit 20.

The storage unit 26 of the master unit 20 shown in FIG. 3 stores the storage amounts reported for each service class by the slave units 10-1 to 10-m. A control unit 27 calculates, based on the storage amounts for each service class of the slave units 10-1 to 10-m stored in the storage unit 26, the information amount for each service class that allows the slave units 10-1 to 10-m to transmit data, provides the slave units 10-1 to 10-m with transmission instructions in accordance with the information amounts calculated for each service class, and instructs the stations to issue reports regarding each type of service. As shown in FIG. 4, the upstream and downstream frames in the transmission line shown in FIG. 1 are such that the transfer rate of the transmission line is 155.52 Mb/s both for the downstream transmission from the master unit 20 to the slave units 10-1 to 10-m and for the upstream transmission from the slave units 10-1 to 10-m to the master unit 20. The transmission frame and cell format are set according to tentative guidelines G.983 in ITU-T SG15.

A downstream frame comprises 56 slots, and an upstream frame comprises 53 slots. Based on these transmission frames, 53 bytes and 56 bytes are exchanged downstream and upstream, respectively, in accordance with the TDM (Time Division Multiplex) multiplexing protocol in the case of the downstream transmission from the master unit 20 to the slave units 10-1 to 10-m, and in accordance with the TDMA (Time Division Multiple Access) multiplexing protocol in the case of the upstream transmission to the master unit 20 from the slave units 10-1 to 10-m. An upstream cell contains a 3-byte overhead, and downstream transmission frames contain two PLOAM cells per frame in a ratio of one cell per every 28 cells.

The initial PLOAM cell (PLOAML) has 27 grants for requesting upstream cells from the slave units 10-1 to 10-m, and the second PLOAM cell (PLOAM2) has 26 grants, to a total of 53 grants.

The master unit 20 is capable of issuing instructions as to which of the slave units 10-1 to 10-m can transmit a cell to a particular slot inside the upstream transmission frame by writing the ID numbers or other identifiers of the slave units 10-1 to 10-m to the grants of the PLOAM cells shown in FIG. 5.

The slave units 10-1 to 10-m can transmit cells to those slots of the upstream transmission frame that correspond to the aforementioned grants when identifiers of these slave units 10-1 to 10-m are written to the PLOAM cells. This method makes it possible to avoid cell collisions in the optical transmission line.

The seventh embodiment aspect is not limited to instruction methods involving upstream transmissions, and methods such as those described below may also be used as the upstream transmission methods.

One example is a method in which, in a frame structure in which there is a one-to-one correspondence between downstream slots and upstream slots, upstream transmissions are specified for each service class by providing each upstream slot corresponding to a downstream slot with the ID numbers of the slave units 10-1 to 10-m using these downstream slots, and with identifiers that specify these service classes.

Instructions regarding upstream transmissions can also be given by issuing notifications regarding the number of slots for allowing signals to be continuously transmitted by specific slave units 10-1 to 10-m for specific service classes with the aid of downstream slots.

Figure 56:
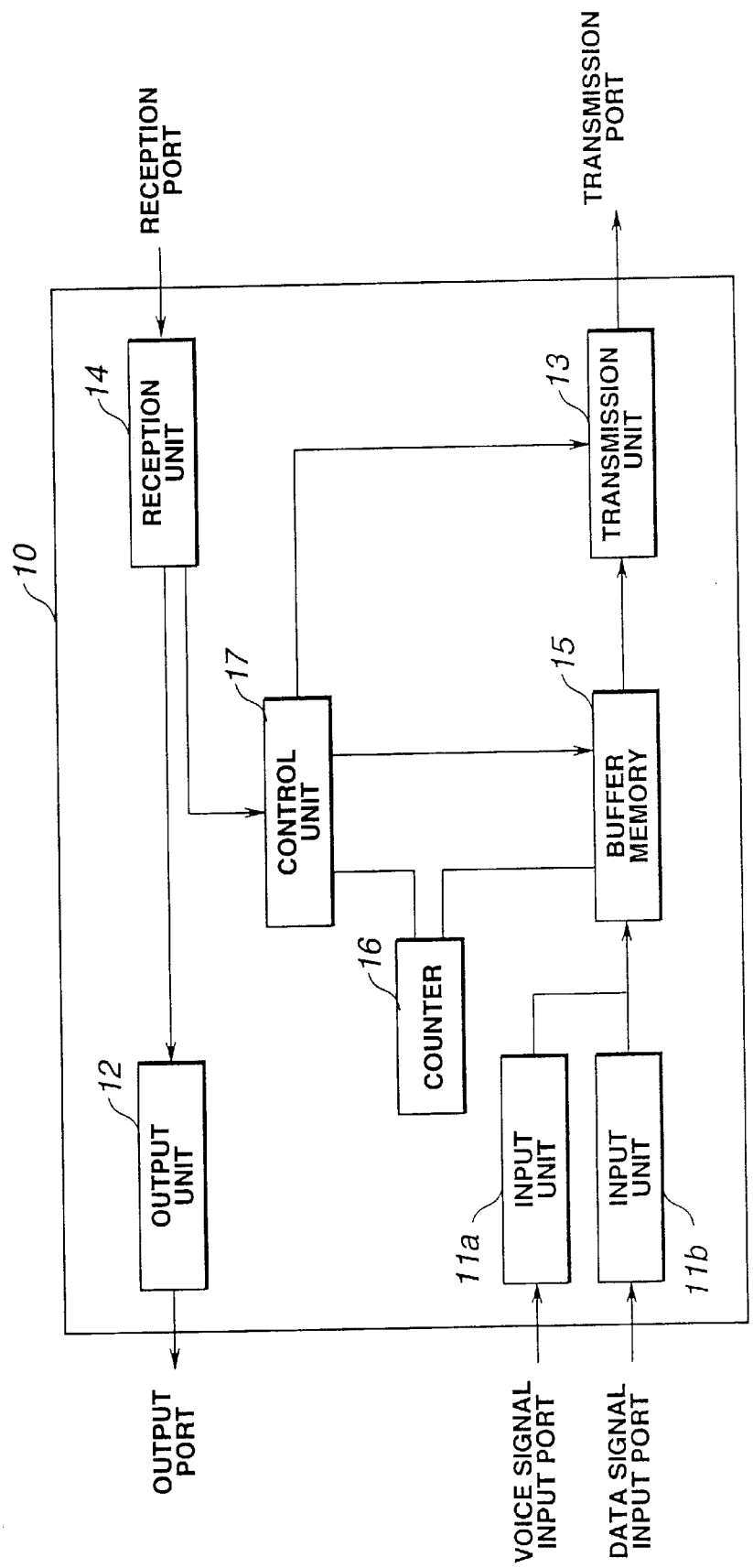
FIG. 56 is a block diagram depicting the structure of a slave unit for accommodating voice signals as a service class requiring periodic fixed-length data transmissions, and for accommodating data signals as a service class with sporadic transmission of variable-length data in a seventh embodiment aspect of the present invention.

FIG. 56 is a diagram depicting the structure of a slave unit 10-1 to 10-m for accommodating voice signals as a service class requiring periodic fixed-length data transmissions, and for accommodating data signals as a service class with sporadic transmission of variable-length data in the seventh embodiment aspect of the present invention.

In FIG. 56, the slave unit 10 comprises input units 11a, 11b connected to a voice signal input port and a data signal input port; an output unit 12 connected to an output port; a transmission unit 13 connected to a transmission port; a reception unit 14 connected to a reception port; a buffer memory 15 for temporarily storing information signals from the input ports as separately grouped voice signals and data signals; a counter 16 for counting the storage amounts of the data signals stored in the buffer memory 15; and a control unit 17 for informing the master unit 20 of the information amounts of the voice signals and the storage amounts of the data signals counted by the counter 16, performing other control procedures, and outputting the data signals and voice signals stored in the buffer memory 15 to the transmission unit 13 for each service class in accordance with the instructions from the master unit 20.

In the above-described structure, the slave units 10-1 to 10-m for transmitting data signals to the master unit 20 first temporarily store data signals to be transmitted in the buffer memory 15, and then report the storage amounts of the data signals thus stored to the master unit 20 via the transmission unit 13 in accordance with the instructions from the master unit 20. Here, i=1, 2, . . . , m, where i indicates individual slave units 10-1 to 10-m, and m is the total number of the slave units 10-1 to 10-m (m is an integer).

The service class identifiers and ID numbers of the slave units 10-1 to 10-m are managed by the master unit 20, and these service class identifiers and ID numbers are conveyed during the initial stage to all the slave units 10-1 to 10-m participating in the operation of the system. By virtue of these ID numbers and identifiers, the master unit 20 can trace an information signal within a service class to a particular slave unit 10-1 to 10-m, and each of the slave units 10-1 to 10-m can determine whether the information signal it has received is indeed addressed to this station.

The signals stored in the buffer memory 15 may be arranged in cells or packets while stored in the buffer memory, such as ATM cells or Ethernet packets, for example.

Another feature of the seventh embodiment aspect is that the input signals have good consistency when arranged as ATM cells because each slot of the downstream transmission frame and each slot of the upstream transmission frame (excluding the overhead) has 53 bytes, as with the transmission frames shown in FIG. 4.

For example, consistency can be improved by mapping voice signals to ATM AAL Type 1, and data signals to AAL Type 5 when input signals are Ethernet packets.

In the counters 16 of the slave units 10 shown in FIGS. 2 and 6, the information amount necessary to transmit the signals temporarily stored in the buffer memory 15 causes the number of cells or slots necessary for such signal transmission to be counted in integral units.

For example, in the upstream transmission frame shown in FIG. 4, the information amount is counted such that 53 bytes constitute one unit because the signals are transmitted using 53 bytes (excluding the overhead).

Examples of recommended counting methods include methods in which counting is performed as required in accordance with the input of signals to the buffer memory 15 and the output of signals from the buffer memory, and methods in which the counting is based on the difference between the start address and the end address of a signal stored as FIFO in the buffer memory 15. The information amount may be the absolute value of a signal stored in the buffer memory 15, or it may be a differential value based on the previous report.

Although the information amount may also be counted as an integral value using bits or bytes as units, counting this amount as the number of cells or slots needed to transmit a signal is effective because it reduces the values reported to the master unit 20.

If the stored signal is less than 53 bytes, a single cell or slot may be counted as the one necessary for transmission, and the counting may be stopped before 53 bytes are reached.

In addition, the method in which the master unit 20 uses PLOAM cells to provide slave units 10-1 to 10-m with instructions on reporting the information amount necessary to transmit a signal is the same as the method described with reference to FIGS. 6 to 10 and related to the first embodiment aspect.

Specifically, FIG. 6 is a flowchart depicting the method whereby the master unit 20 gives instructions to issue information amount reports to PLOAM cells. In FIGS. 7 and 8, N represents the total number of grants in a PLOAM cell. N=27 for the PLOAM cell 1, and N=26 for the PLOAM cell 2. P indicates the grant interval for giving instructions on information amount reporting, and #n indicates the grant number. P is assumed to be initialized as an integral value ($P \geq 1$), and #n as #n=P.

It is necessary to distinguish between signal transmission instructions and instructions to submit information amount reports when instructions to submit information amount reports are issued using the grants of the PLOAM cells.

To achieve this distinction, it may be suggested, for example, that the logical sum of a specific value and the ID number of a slave unit 10-1 to 10-m be written to a grant, and a flag be raised for a specific bit when an instruction to submit an information amount report is given, as shown in FIGS. 7 and 8.

The specific value should be set to a level not yet used as the ID number of the slave unit 10- to 10-m, such as 0×80 or the like.

The slave unit 10-1 to 10-m checks whether a flag has been raised at a specific bit on the basis of the logical product of the specific value and the value written to the grant when the logical product of the negative specific value and the value written to the grant matches the ID number of the slave unit, and it is then determined whether information amount is to be reported or a signal transmitted.

According to another method, it is suggested that the ID number of a slave unit 10-1 to 10-m be written to a grant, and the number #n of the grant instructed to submit an information amount report be written to the additional area of a PLOAM cell, as shown in FIGS. 9 and 10.

The slave unit 10-1 to 10-m reads the aforementioned additional area value if the ID number of the slave unit 10-1 to 10-m written to the grant matches the ID number of this slave unit. This value is compared with the number of the grant for which a transmission instruction has been issued, and it is checked whether information amount is to be reported or a signal transmitted.

Following is a description of the method whereby slave units 10-1 to 10-m present the master unit 20 with reports on the information amount needed to transmit signals.

If a slave unit 10-1 to 10-m concludes that an instruction to issue an information amount report has been given to this slave unit 10-1 to 10-m according to the flowcharts in FIGS. 7 to 10, the result is the creation of a cell to which at least the following data is written: a cell identifier indicating the information amount report, the information amount of voice signals, the storage amount of the data signals counted by the counter 16, and the ID number of the slave unit.

The arrangement described here is not limited to voice signals as a service class requiring periodic fixed-length data transmissions, and can also accommodate common circuit-switching types of services such as ordinary telephone systems or ISDN. To create a cell, the information amount of voice signals is set to 64 kb/s for an ordinary telephone system, and 144 kb/s for an ISDN basic rate service.

The cell thus created is transmitted to the master unit 20 via the transmission unit 13 by means of those slots in the upstream transmission frame that correspond to the grants instructed to issue a report. The storage amount of data signals is reported using either one or both of the absolute values counted by the counter 16 and the differential values based on the previous report.

In the master unit 20 that has received notifications about the storage amounts of data signals and the information amounts of voice signals from the slave units 10-1 to 10-m, these notifications are received by the reception unit 24 shown in FIG. 3, and the information amounts of voice signals and the storage amounts of data signals thus received are stored in the storage unit 26.

Figure 57:
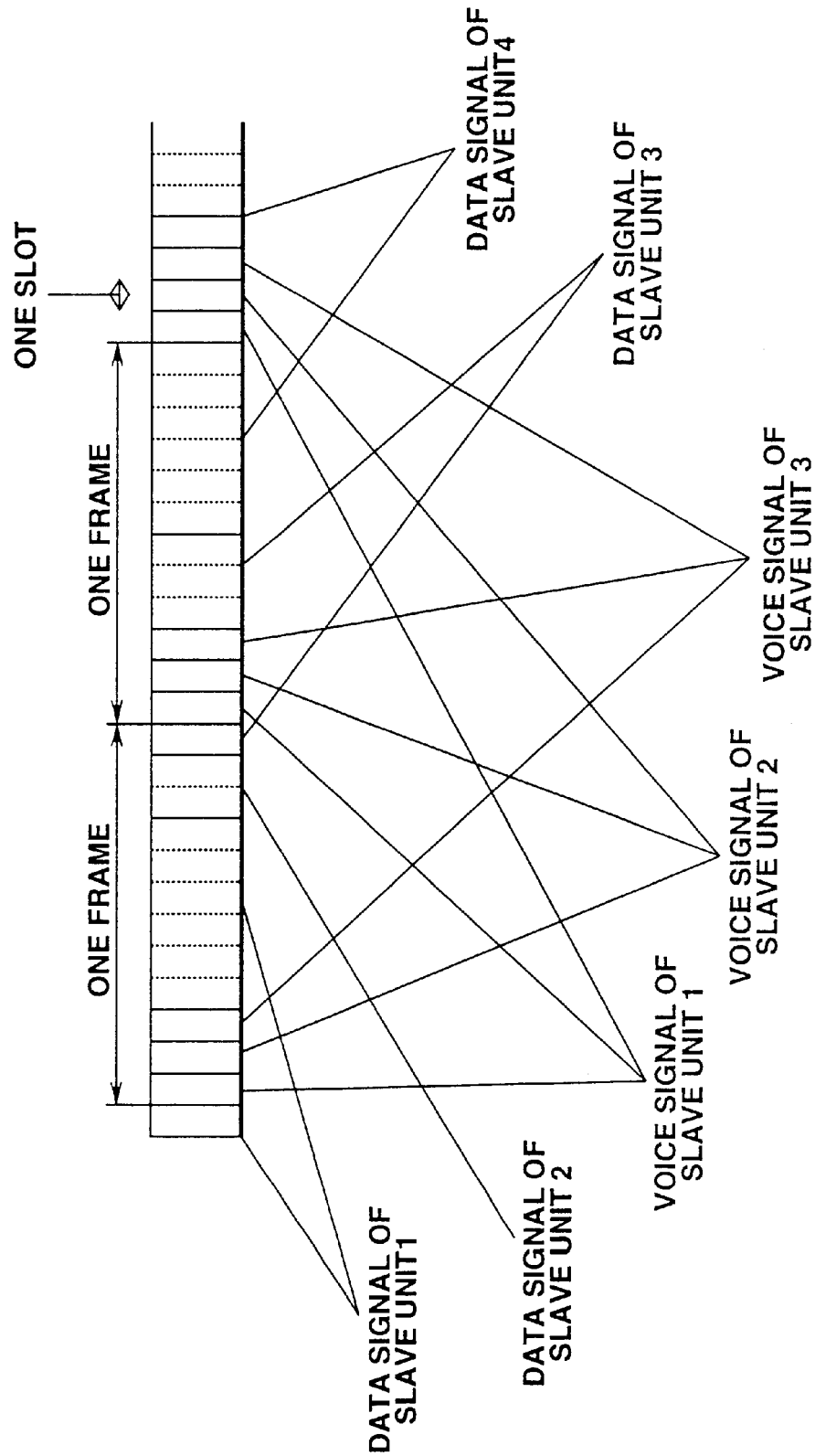
FIG. 57 is a frame block diagram depicting the upstream transmission frame for the point-to-multipoint communication system according to the seventh embodiment aspect of the present invention, in which voice signals are stored in a service class requiring periodic fixed-length data transmissions, and data signals are accommodated by a service class with sporadic transmission of variable-length data.

FIG. 57 is a diagram depicting the upstream transmission frame for the point-to-multipoint communication system according to the seventh embodiment aspect of the present invention, in which voice signals are accommodated by a service class requiring periodic fixed-length data transmissions, and data signals are accommodated by a service class with sporadic transmission of variable-length data.

In FIG. 57, the transmission frame is a fixed-length frame subdivided into fixed-length slots. Transmission instructions for the data signals in FIG. 57 will now be described.

In the master unit 20 shown in FIG. 3, information signals received from the slave units 10-1 to 10-m via the reception port are identified based on the cell identifiers written to the cells. This is done after headers are removed in the reception unit 24. The cells thus identified are sent to the storage unit 26 when they are for issuing information amount reports, and to the output unit 22 when they are for transmitting signals.

FIGS. 58a, 58b, 58c, and 58d depict the structure of the storage unit 26 in the master unit 20 shown in FIG. 3 in connection with the seventh embodiment aspect.

In the seventh embodiment aspect, the storage unit 26 is provided with an information amount table 1 (FIG. 58a) for storing the information amount for the voice signals reported by the slave units 10-1 to 10-m, an information amount table 2 (FIG. 58b) for storing the storage amounts for data signals, an enabling amount table 1 (FIG. 58c) for storing the transmit voice signals, and an enabling amount table 2 (FIG. 58d) for storing the enabling amounts that allow the slave units 10-1 to 10-m to transmit data signals.

The initial values of the information amounts Rvi, Rdi and the enabling amounts Gvi, Gdi in the tables are zeroes, and values individually assigned to the slave units 10-1 to 10-m are written to the ID numbers i of the slave units 10-1 to 10-m.

In the storage unit 26, where cells for submitting information amount reports are received from the reception unit 24, the storage amounts reported and the ID numbers of the slave units 10-1 to 10-m written to the cells are read for each service class, and, based on the values thus read, the storage amounts Rdi for the data signals are updated, as are the information amounts Rvi for the voice signals that match the ID numbers of the slave units 10-1 to 10-m in the information amount tables.

In the control unit 27 of the master unit 20, the enabling amounts Gdi that allow the slave units 10-1 to 10-m to transmit data signals are calculated at no more than a specific maximum value k (bits) on the basis of the information amount tables in the storage unit 26.

Here, the specific maximum value k is set such that the following relation is satisfied:

$$k \leq (r d\min \times td) \div (\alpha \times m) \quad (8),$$

where m is the total number of the slave units 10-1 to 10-m, α is the proportion of currently active slave units 10-1 to 10-m (0<α≦1.0), rdmin (b/s) is the minimum value of the data transfer rate for data signals, and td (s) is the delay time allowed for data transmission and determined by the system. The proportion α of currently active slave units is given by Eq. (2), where α=1.0 when all the slave units 10-1 to 10-m are currently active.

When the voice signals are telephone or ISDN signals, the service band is established when the contract is taken out. Consequently, the sum total rvc (b/s) of the contract bands of such voice signals is given by $$rvc = \Sigma rvci \quad (9),$$

where rvci (b/s) is a contract band of voice signals accommodated by a slave unit 10-1 to 10-m. The minimum value rdmin of the transfer rate for data signals can be defined as $$rd\min = r - rvc \quad (10)$$

In addition, the transfer rate r of the entire transmission line can be used as rdmin when the band for using voice signals is sufficiently narrow compared with the transfer rate of the entire transmission line (for example, ¹⁄₁₀ or less), the allowed delay time td for data signals is several milliseconds or greater, and the allowed value of the delay time for data signals is not strictly defined.

Furthermore, the delay time td allowed for data signals is set on the basis of the type of service or the like handled by the system. A value of about 0.1–1 s is considered appropriate for regular Internet access or another type of data-based service in which some delay is allowed, taking into account, among other things, the imperceptible time that elapses until a signal transmission is completed.

The number of currently active slave units in Eq. (2) is counted by the master unit 20. To achieve this, it may be suggested, for example, that the slave units 10-1 to 10-m responding to transmission instructions issued by the master unit 20 for these slave units 10-1 to 10-m be counted as being currently active.

Figure 59:
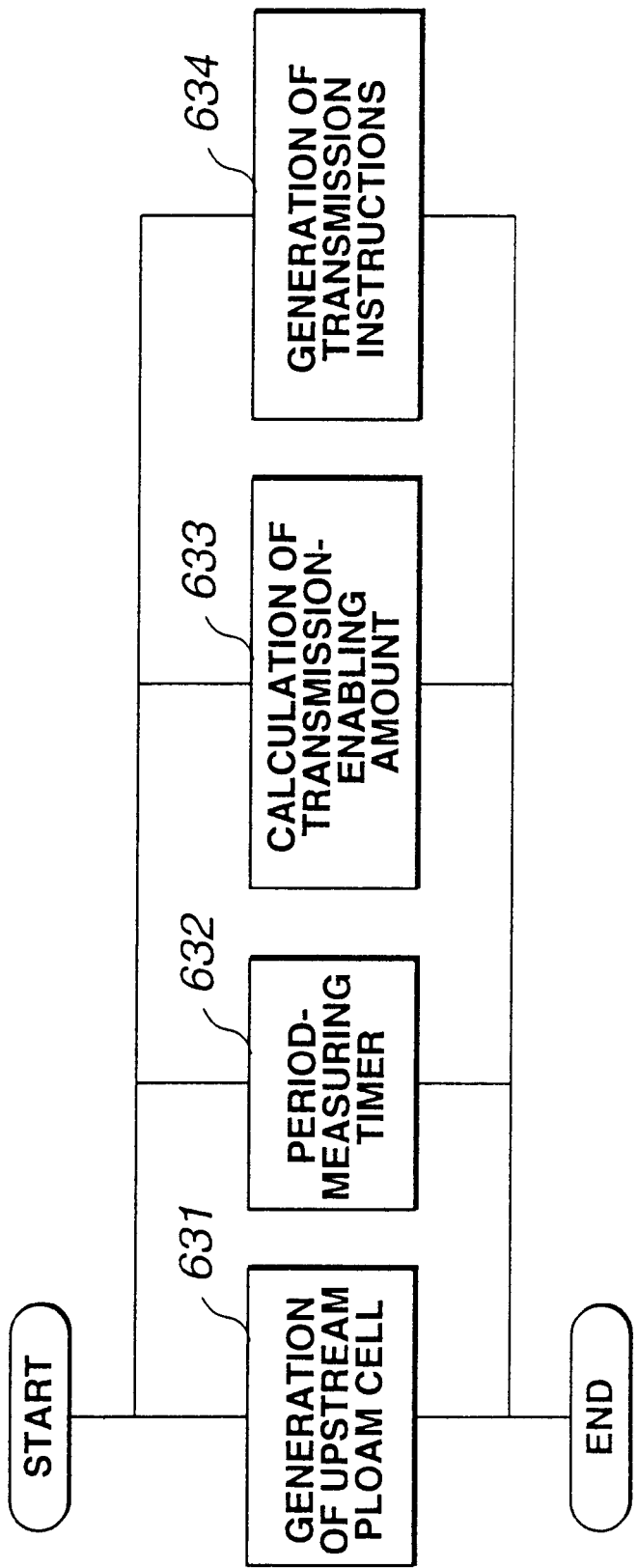
FIG. 59 is a flowchart depicting the overall relation among the procedures pertaining to transmission instructions in the seventh embodiment aspect of the present invention.
Figure 60:
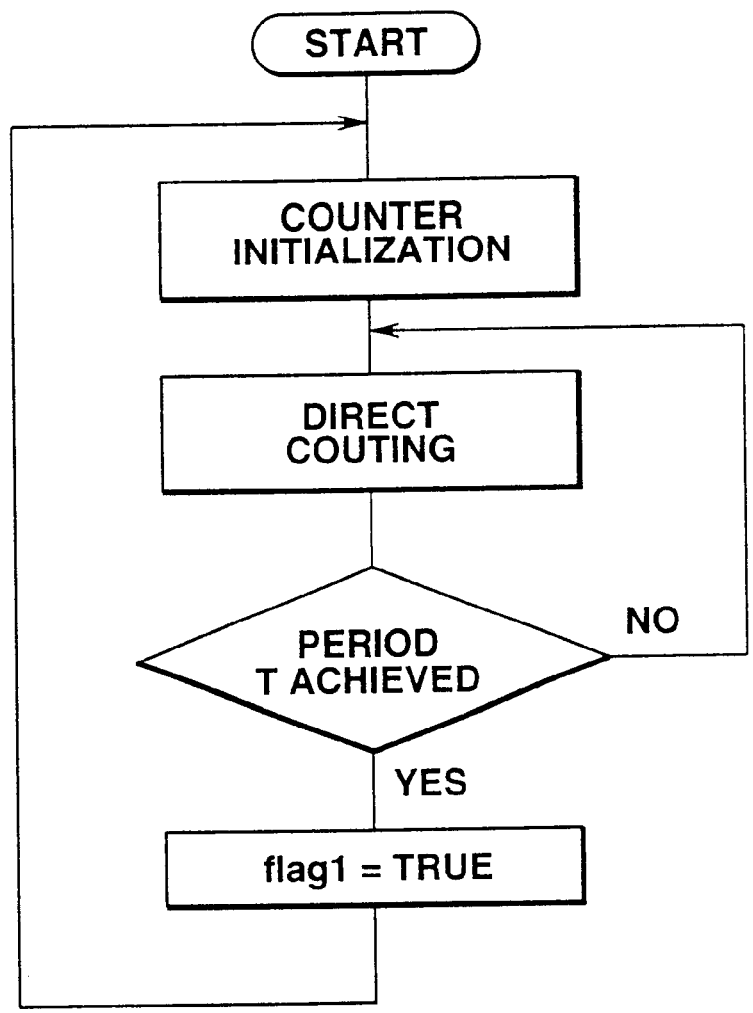
FIG. 60 is a flowchart depicting the procedure for measuring the period with which instructions are issued to transmit voice signals in the seventh embodiment aspect of the present invention.
Figure 61:
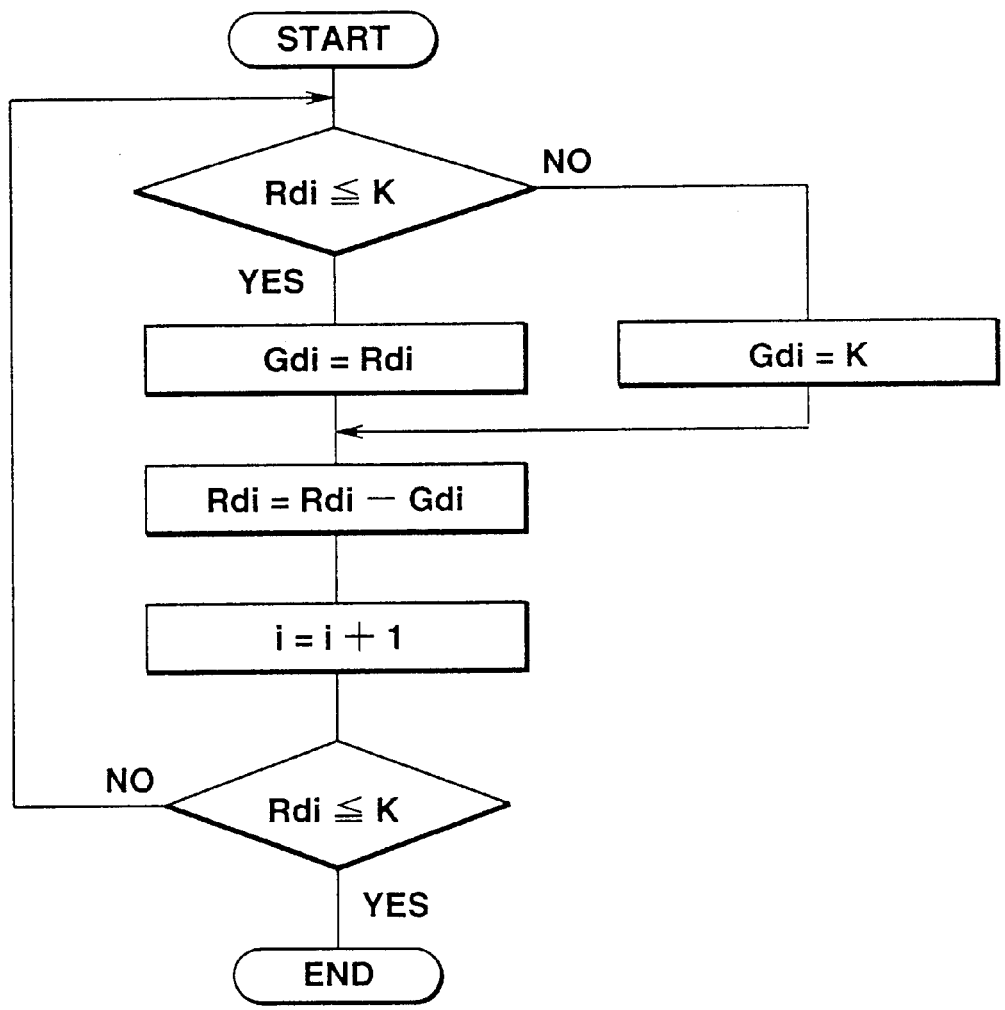
FIG. 61 is a flowchart depicting the procedure for calculating the enabling amount Gdi in the seventh embodiment aspect of the present invention.
Figure 62:
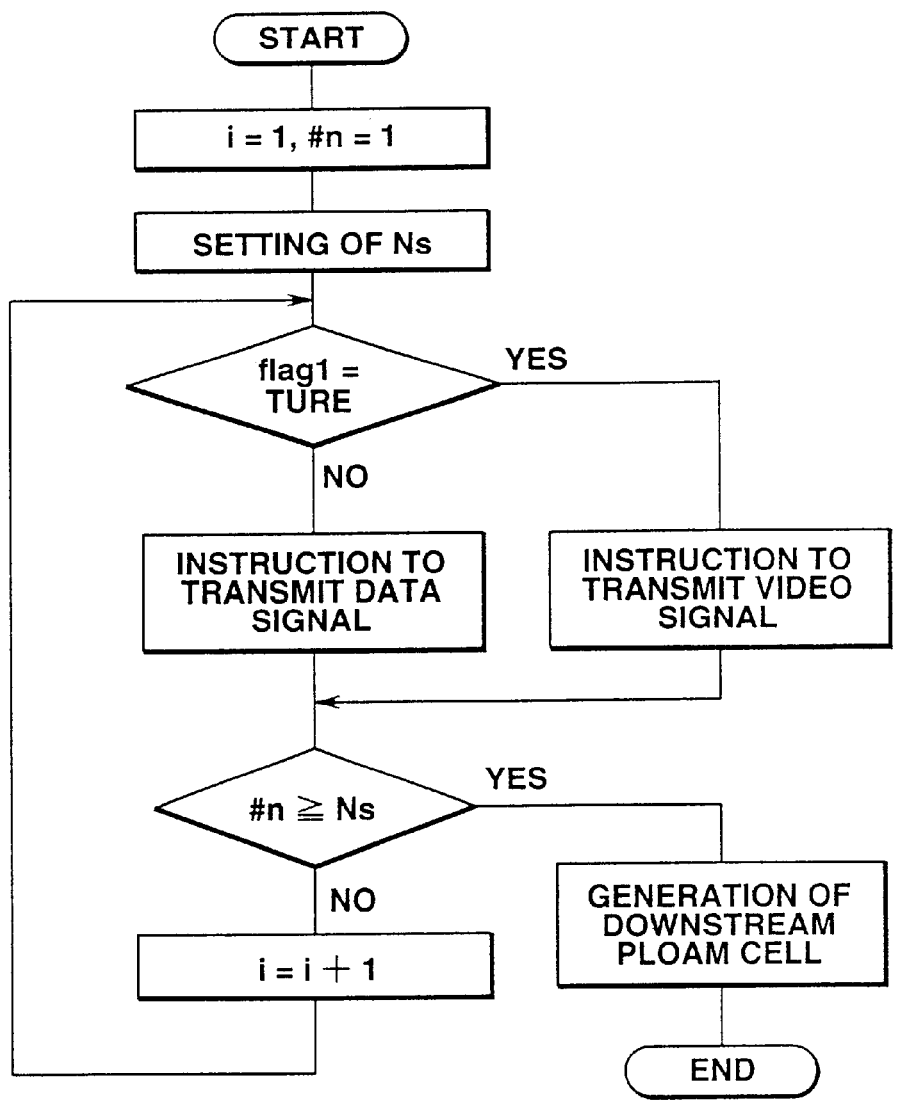
FIG. 62 is a flowchart depicting the procedure for issuing transmission instructions, or grants, in the seventh embodiment aspect of the present invention.
Figure 63:
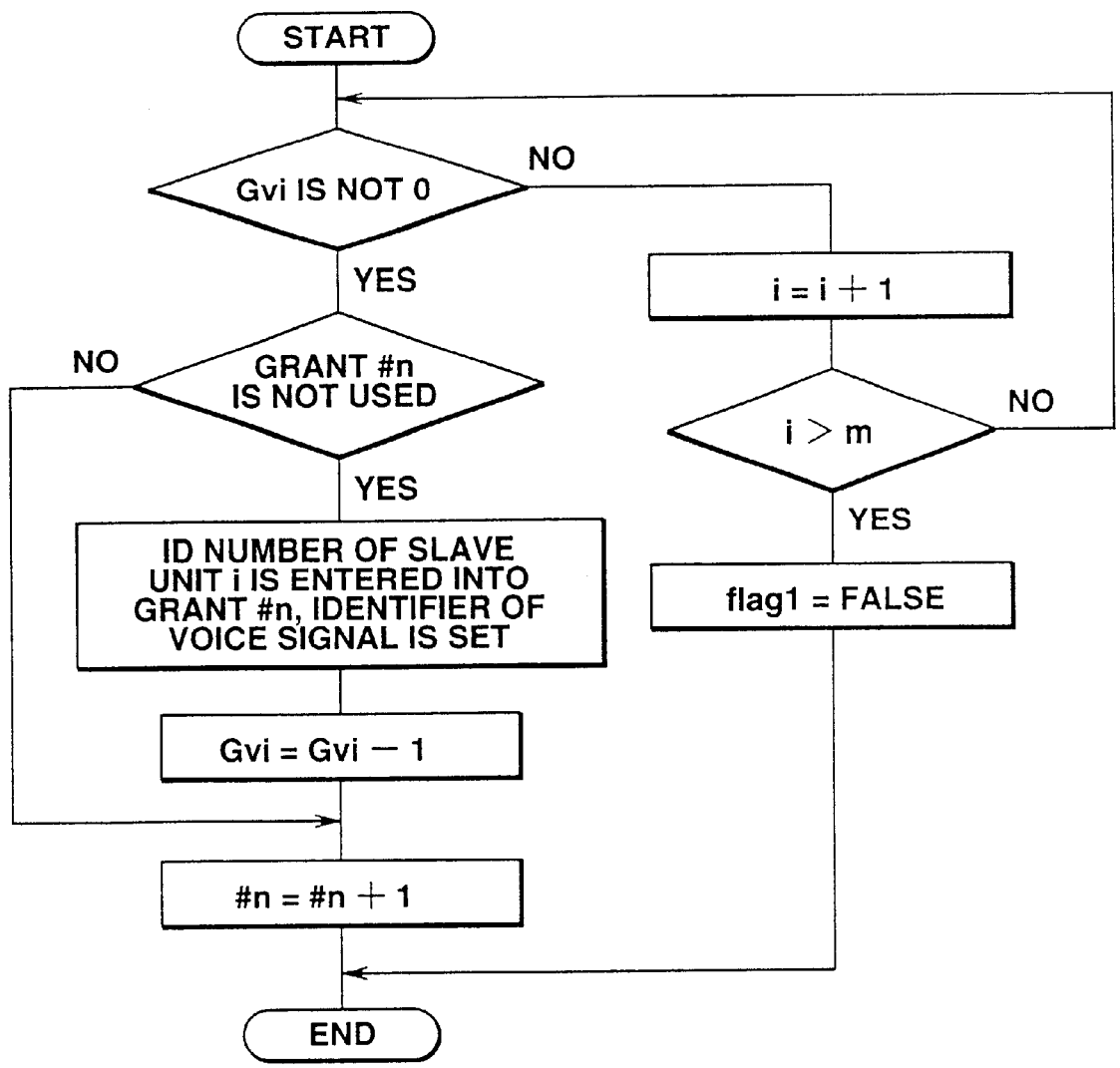
FIG. 63 is a flowchart depicting the procedure for issuing voice signal transmission instructions in the seventh embodiment aspect of the present invention.
Figure 64:
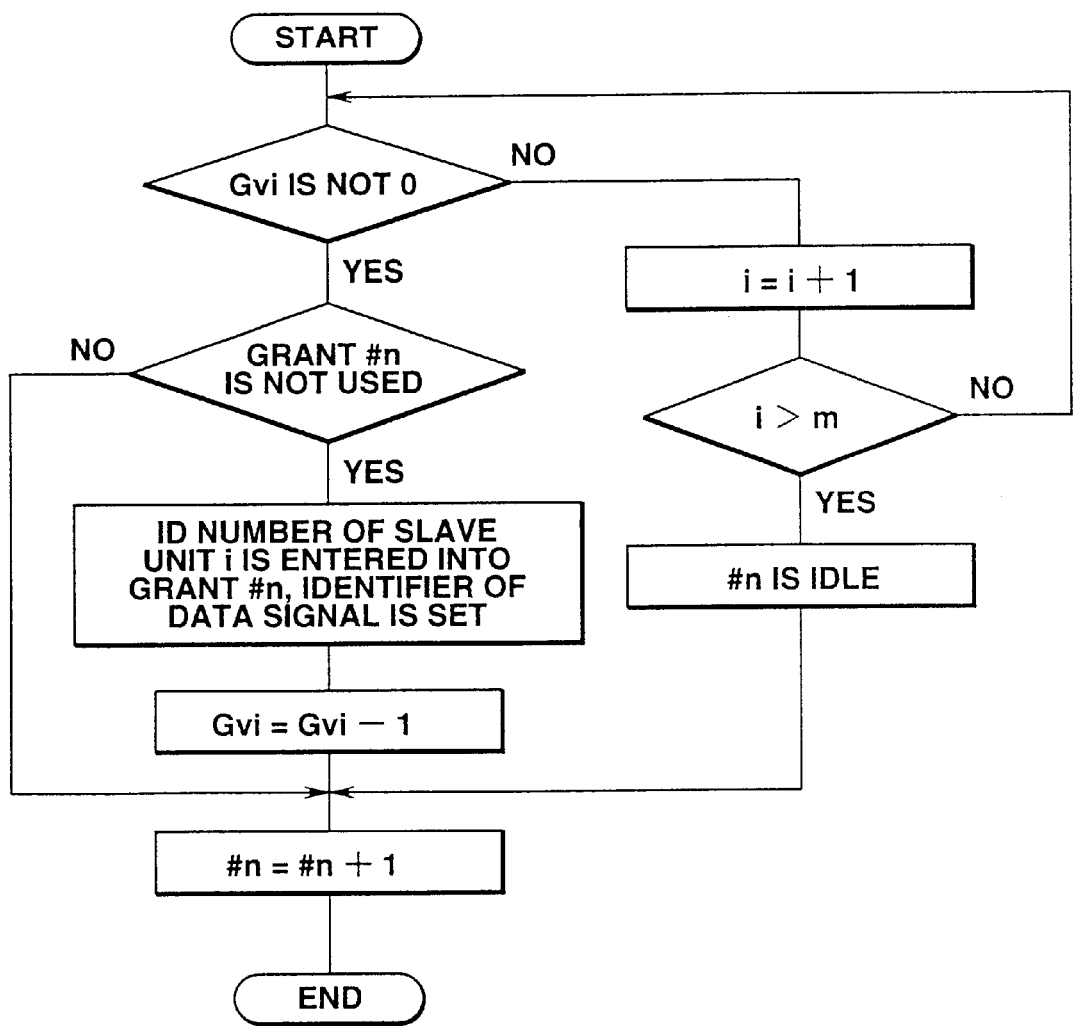
FIG. 64 is a flowchart depicting the procedure for issuing data signal transmission instructions in the seventh embodiment aspect of the present invention.

FIG. 59 is a flowchart depicting the overall relation among the procedures pertaining to such transmission instructions. FIG. 60 is a flowchart depicting the procedure for measuring the period with which transmission instructions are issued for voice signals; FIG. 61 is a flowchart depicting the procedure for calculating the enabling amount Gdi; FIG. 62 is a flowchart depicting the procedure for issuing transmission instructions, or grants; FIG. 63 is a flowchart depicting the procedure for issuing voice signal transmission instructions; and FIG. 64 is a flowchart depicting the procedure for issuing data signal transmission instructions.

As shown in FIG. 59, the procedure pertaining to transmission instructions is a multitasking arrangement in which the following four routines are carried out simultaneously: generation of upstream PLOAM instructions in accordance with the flowchart in FIG. 6 (step 631), generation of transmission instructions (step 634), operation of a period-measuring timer (step 632), and calculation of transmission-enabling amounts (step 633).

FIG. 60 illustrates the operation of the period-measuring timer. In FIG. 60, the specific period needed to transmit a voice signal is measured with a counter, and direct counting is continued up to the specific period, at which point "flag 1=TRUE" is set, and the counter is reset.

FIG. 61 depicts the procedure for calculating the enabling amount Gdi. In the procedure shown in FIG. 61, Gdi is calculated within a range not exceeding the value of k from the storage amount Rdi.

FIG. 62 depicts the procedure for issuing transmission instructions. In FIG. 62, a voice signal transmission instruction procedure is performed when flag 1=TRUE, and a data signal transmission instruction procedure is performed when flag 1=FALSE. Here, Ns indicates the number of slots that can be indicated with a single PLOAM cell. According to the aforementioned tentative guidelines G.983 in ITU-T SG15, Ns=27 for PLOAM1 and Ns=26 for PLOAM2. A PLOAM cell is formed when the grant number #n is equal to Ns (#n=1, . . . , Ns).

FIG. 63 depicts the voice transmission instruction procedure. In FIG. 63, the condition flag 1=FALSE is established after voice transmission instructions have been issued for all slave units. This procedure makes it possible to prevent instructions to transmit data signals from being issued before voice transmission instructions have been given to all the slave units.

FIG. 64 depicts the data signal transmission instruction procedure. In FIG. 64, instructions to perform transmission continuously (with the exception of voice signal transmission or PLOAM transmission) are issued until a given enabling amount Gdi reaches the level Gdi=0. In addition, an idle is inserted when no transmission instructions are given.

Following is a description of the method for transmitting signals in accordance with the instructions given by the master unit 20 to slave units 10-1 to 10-m.

In the slave units 10 shown in FIGS. 2 and 56, cells are received by the reception unit 14 via the reception port. In the reception unit 14, it is determined based on the addresses written to the cells whether the received cells are addressed to the slave units 10-1 to 10-m in question. If the cells are indeed addressed to the slave units 10-1 to 10-m in question, cell type is determined based on the cell identifiers written to the cells. The identified cells are sent to the output unit 12 if they are signal cells, and to the control unit 17 if they are PLOAM cells.

Once the PLOAM cells are received by the control unit 17 via the reception unit 14, it is checked whether an instruction has been issued to transmit a signal or to submit an information amount report in accordance with the flowcharts in FIGS. 6 to 8.

If it is concluded that a signal transmission instruction has been issued, the service class for which this transmission instruction has been issued is identified. Following such identification, the signal of the pertinent service class temporarily stored in the buffer memory 15 is retrieved, a signal-transmitting cell is created, and this cell is transmitted via the transmission unit 13.

The seventh embodiment aspect will now be described in further detail with reference to FIG. 57.

In FIG. 57, a single frame comprises 12 slots. The voice signal ports of the slave units 1–3 are active, as are the data signal ports of the slave units 1–4. Seven slots are assigned to the specific maximum value k for the enabling amount Gdi that allows data signals to be transmitted.

In FIG. 57, time progresses from left to right. At the time corresponding to the left end of FIG. 57, the information amounts of the voice signals of the slave units 1–3 each correspond to a single slot, and the storage amounts Rdi of the data signals of the slave units 1–4 are Rd1=100 slots, Rd2=2 slots, Rd3=4 slots, and Rd4=150 slots, respectively.

The enabling amounts that allow data signals to be transmitted are first calculated. Here, k=7 slots, so Gd1=7, Gd2=2, Gd3=4, and Gd4=7. In addition, the following values are selected as the storage amounts Rdi of data signals when the Gdi values are calculated: Rdi=93, Rd2=0, Rd3=0, and Rd4=143. For the sake of simplicity, the time needed for calculation and allocation procedures is ignored here.

At the time corresponding to the left end of FIG. 57, slot allocation is started for the data signals of the slave unit 1, and the slots of the data signals of the slave unit 1 are allocated at the left end of FIG. 57.

With the next slot, flag 1 is raised to indicate the start of the period during which voice signals are transmitted as a result of the timer procedure shown in FIG. 60. In the procedure for issuing transmission instructions that is shown in FIG. 62, flag 1 is detected, and instructions to transmit voice signals are issued. As a result, instructions for the slot-wise transmission of the voice signals in the slave units 1–3 are issued according to the information amounts Gv1–Gv3 for the slave units 1–3 stored in the storage unit 26 of the master unit 20.

Transmission of the data signals in the slave unit 1 is restarted after transmission instructions have been issued for the voice signals. In the process, Gd1 is limited to the maximum value k=7, and a single-slot transmission is already completed prior to voice transmission, so an instruction is issued for the continuous transmission of 6 slots.

For a voice signal, a slot is subsequently assigned to a transmission in the same manner every time the timer raises flag 1, and for a data signal, Gdi values (Gdi≦k) are individually assigned to transmissions in a continuous manner, with the exception of the slots for voice signals.

It thus follows with respect to the access protocol of the point-to-multipoint communication system of the seventh embodiment aspect that voice signals are periodically transmitted and data signals are continuously transmitted according to an arrangement in which the slave units instructed to transmit signals have exclusive use of the upstream transmission line below the enabling amount Gdi calculated by the master unit 20 for the regions remaining after the transmission of voice signals, as in the band allocation shown in FIG. 57.

An eighth embodiment aspect will now be described in detail with reference to FIGS. 65 to 67.

Figure 65:
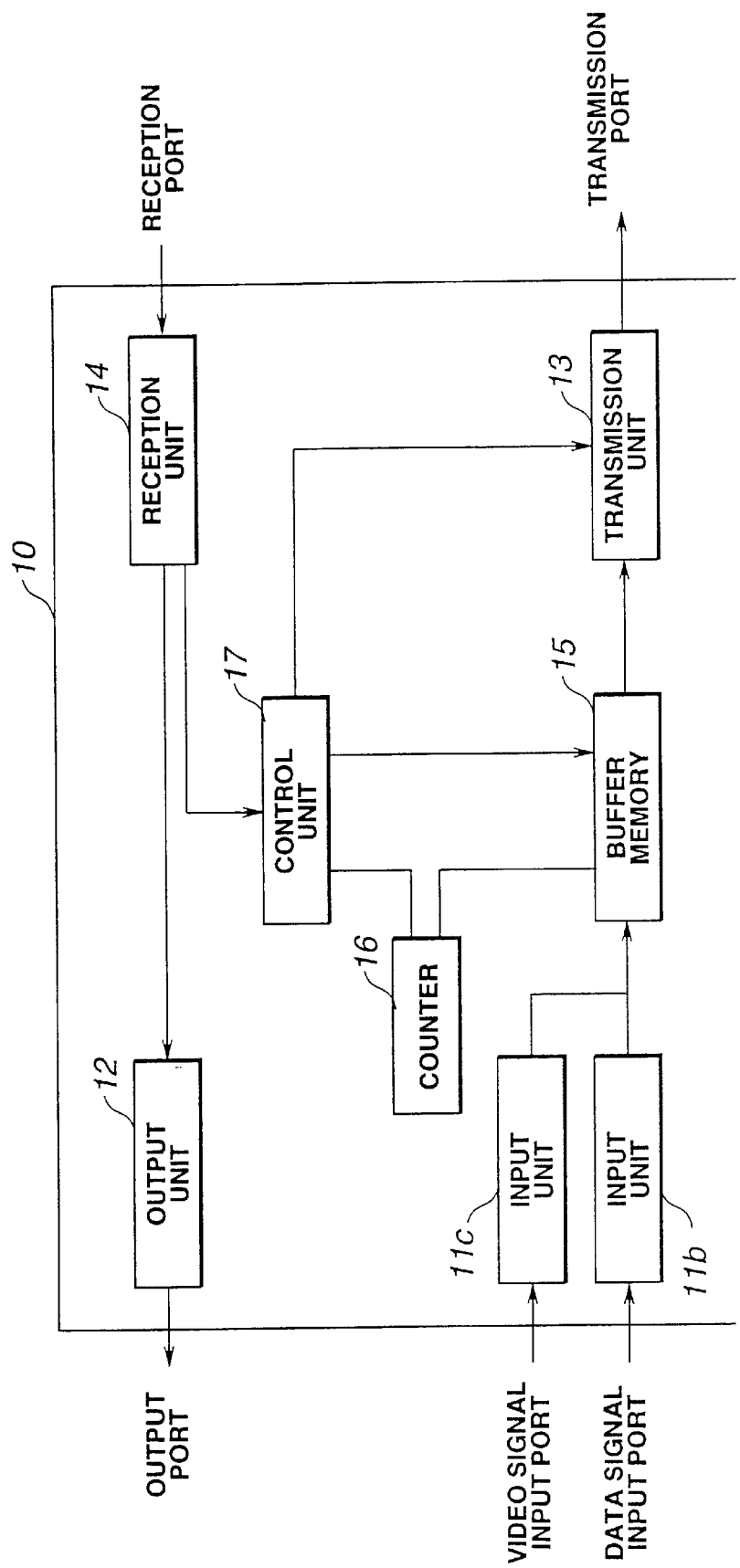
FIG. 65 is a block diagram depicting a slave unit pertaining to an eighth embodiment aspect of the point-to-multipoint communication system according to the present invention, in which voice signals generated by a variable-rate signal compression protocol are stored as a service class in which variable-length data must be transmitted with a prescribed period T, and in which information signals are stored as a service class in which data is sporadically transmitted.

FIG. 65 is a diagram depicting a slave unit 10 of the eighth embodiment aspect of a point-to-multipoint communication system for accommodating video signals generated by a variable-rate signal compression protocol as a service class requiring variable-length data transmissions at a specific period T, and for accommodating data signals as a service class with sporadic data transmissions.

Variable-rate signal compression is a sign format in which a large number of signs are used per unit of time when the original video signal is a rapidly changing image, and the number of signs per unit of time is kept low when, conversely, the image changes only slightly. Excluding special cases, video signals generated by the variable-rate signal compression protocol will be referred to hereinbelow merely as video signals when mentioned in connection with the eighth embodiment aspect.

In FIG. 65, the slave unit 10 comprises input units 11b, 11c connected to a video signal input port and a data signal input port; an output unit 12 connected to an output port; a transmission unit 13 connected to a transmission port; a reception unit 14 connected to a reception port; a buffer memory 15 for temporarily storing information signals from the input ports as separately grouped video signals and data signals; a counter 16 for counting the storage amounts of the data signals and video signals stored in the buffer memory 15; and a control unit 17 for informing the master unit 20 about the storage amounts of data signals and the storage amounts of the video signals counted by the counter 16, performing other control procedures, and outputting the video signals and data signals stored in the buffer memory 15 to the transmission unit 13 for each service class in accordance with the instructions from the master unit 20.

In the eighth embodiment aspect, the slave units 10 for transmitting video signals and data signals to the master unit 20 first temporarily store the video signals and data signals to be transmitted in the buffer memory 15, and then report the storage amounts of the video signals and data signals thus stored to the master unit 13 via the transmission unit 13 in accordance with the instructions from the master unit 20. Here, i=1, 2, . . . , m, where i indicates individual slave units 10-1 to 10-m, and m is the total number of the slave units 10-1 to 10-m (m is an integer).

In the eighth embodiment aspect, the transfer rate of video signals varies from one moment to the next, so the storage amounts of video signals are reported to the master unit 20 in the same manner as the storage amounts of data signals according to the instructions from the master unit 20. The reporting is performed in a manner identical to the seventh embodiment aspect in accordance with the flowchart shown in FIGS. 6 to 10.

Figure 66:
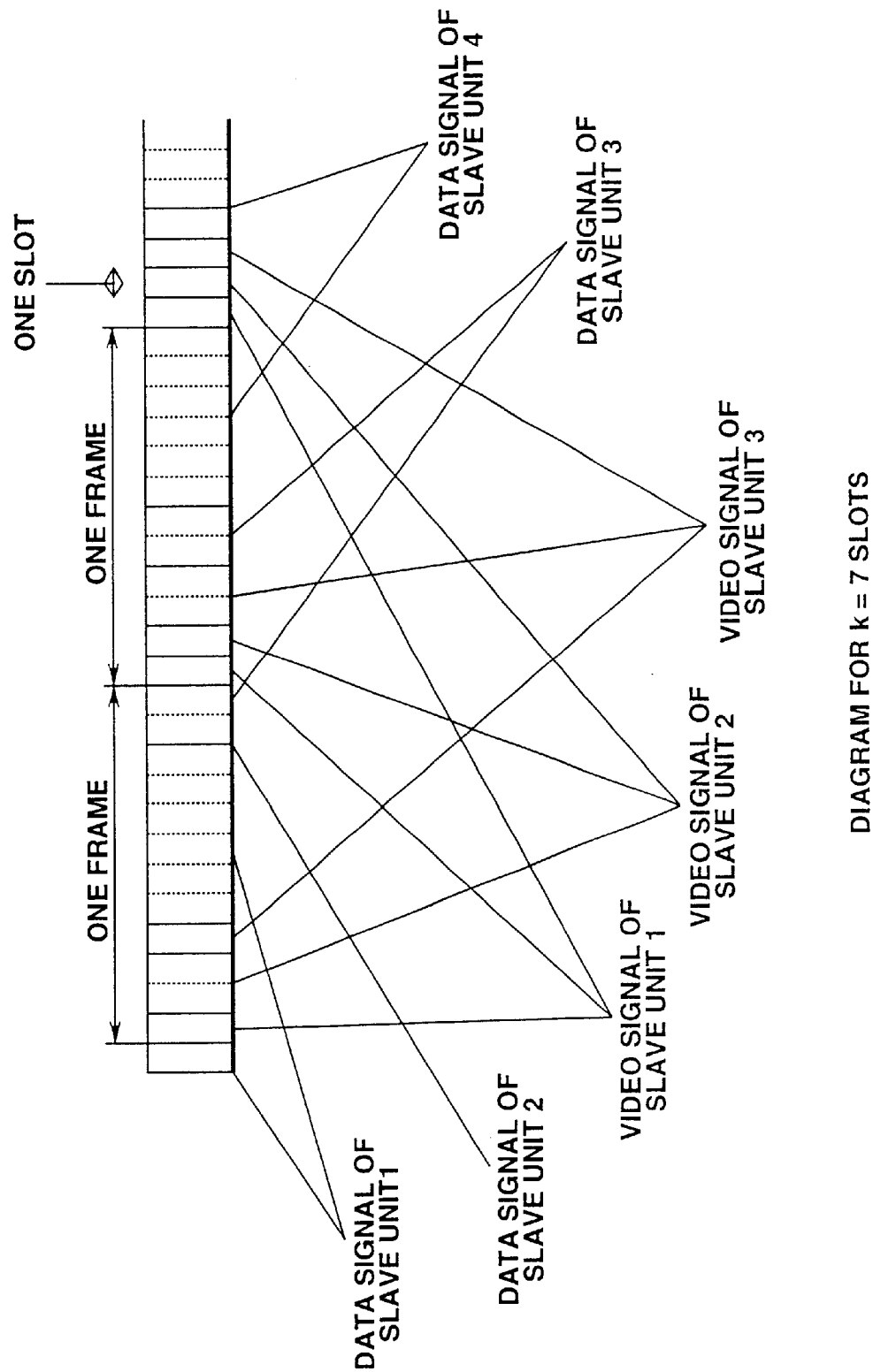
FIG. 66 is a frame block diagram depicting an upstream transmission frame for the point-to-multipoint communication system according to the eighth embodiment aspect of the present invention.

FIG. 66 is a diagram depicting an upstream transmission frame for the point-to-multipoint communication system according to the eighth embodiment aspect.

Here, the eighth embodiment aspect differs from the seventh embodiment aspect in that the periodically assigned video signal slots have variable length.

Specifically, the eighth embodiment aspect differs from the seventh embodiment aspect in that two slots are used for the video signals of the slave unit 2 in a frame, and another two slots are used for the video signals of the slave unit 3 in a subsequent frame.

Similar to the seventh embodiment aspect, the master unit 20 is configured as shown in FIG. 3. In addition, the storage unit 26 of the master unit 20 is configured as shown in FIG. 58 in the same manner as in the seventh embodiment aspect.

The storage unit 26 is provided with an information amount table 1 (FIG. 58(*a*)) for storing the storage amounts for the video signals reported by the slave units 10-1 to 10-m, an information amount table 2 (FIG. 58(*b*)) for storing the storage amounts for data signals, an enabling amount table 1 (FIG. 58(*c*)) for storing the enabling amounts that allow the slave units to transmit video signals, and an enabling amount table 2 (FIG. 58(*d*)) for storing the enabling amounts that allow the slave units to transmit data signals.

The initial values of the information amounts Rvi, Rdi and the enabling amounts Gvi, Gdi in the tables are zeroes, and values individually assigned to the slave units 10-1 to 10-m are written to the ID numbers i of the slave units 10-1 to 10-m.

In the storage unit 26, where cells for submitting information amount reports are received from the reception unit 24, the storage amounts reported and the ID numbers of the slave units 10-1 to 10-m written to the cells are read for each service class, and, based on the values thus read, the storage amounts Rdi for the data signals are updated, as are the storage amounts Rvi for the voice signals that match the ID numbers of the slave units 10-1 to 10-m in the information amount tables.

In the control unit of the master unit 20, the enabling amounts Gdi that allow the slave units 10-1 to 10-m to transmit data signals are calculated at no more than a specific maximum value k (bits) on the basis of the information amount tables of the storage unit 26.

Here, the specific maximum value k is set such that Eq. (8) is satisfied, where m is the total number of the slave units 10-1 to 10-m, $\alpha$ is the proportion of currently active slave units 10-1 to 10-m ($0<\alpha \leq 1.0$), rdmin (b/s) is the minimum value of the data transfer rate for data signals, and td (s) is the delay time allowed for data transmission and determined by the system. The allowed delay time td for a service class requiring variable-length data transmissions at period T can be made equal to the period T. Specifically, $$td=T \qquad (11)$$

The proportion $\alpha$ of currently active slave units 10-1 to 10-m is given by Eq. (2), where $\alpha=1.0$ when all the slave units are currently active.

For a video signal transmission service, which differs from a data signal service by more rigorous specifications related to delay and data loss, the maximum value of the service range is often established when the contract is taken out. For a service whose maximum band is established when a contract is taken out in such a manner, the sum total rvc (b/s) of the maximum band of video signals is given by Eq. (9), where rvci (b/s) is the maximum band of the video signals accommodated by the slave units 10-1 to 10-m.

The minimum value rdmin of the transfer rate for data signals can be defined as Eq. (10).

In addition, the video signals of slave units 10-1 to 10-m are usually unrelated to each other, and the sum total of the transfer rates of video signals can be expected to be rvce, which is a value that is commonly lower than the aforementioned rvc as a result of a statistical multiplexing effect. For this reason, the statistical multiplexing effect is added, and the parameter can be defined as $$rd\text{min}=r-rvce \qquad (12)$$

In addition, the transfer rate r of the entire transmission line can be used as rdmin when the band for using video signals is sufficiently narrow compared with the transfer rate of the entire transmission line (for example, $\frac{1}{10}$ or less), the allowed delay time td for data signals is several milliseconds or greater, and the allowed value of the delay time for data signals is not strictly defined.

The number of currently active slave units in Eq. (2) is counted by the master unit 20. To achieve this, it may be suggested, for example, that the slave units 10-1 to 10-m responding to transmission instructions issued by the master unit 20 for these slave units 10-1 to 10-m be counted as being currently active.

The transmission instructions in the eighth embodiment aspect are identical to those of the seventh embodiment aspect, and can be performed in the same manner by the processes shown in FIGS. 59 to 64.

A ninth embodiment aspect of the present invention will now be described.

In the transmission of images and other video signals via the Internet, a certain amount of delay or data loss is often tolerated. The ability to periodically transmit data is required in these cases as well because of the presence of periodic changes in the images relayed by such video signals. The ninth embodiment aspect will be described with reference to a point-to-multipoint communication system in which some delay or data loss is tolerated but in which data signals and video signals are transmitted in a manner such that the data is transmitted with a specific period T.

A distinctive feature of the ninth embodiment aspect is that enabling amounts are calculated in the same manner as in FIG. 61 for video signals as well. Specifically, enabling amounts Gvi that allow the slave units 10-1 to 10-m to transmit signals are also calculated for video signals by the control unit 27 of the master unit 20 at no more than a specific maximum value kv (bits) on the basis of the information amount tables of the storage unit 26.

Here, the specific maximum value kv is set such that the following relation is satisfied:

$$kv \leq (rv\text{max} \times tv) \div (\alpha v \times m) \qquad (13),$$

where m is the total number of slave units, $\alpha v$ is the proportion of the currently active video signal input ports of the slave units ($0<\alpha v \leq 1.0$), rvmax (b/s) is the maximum value of the data transfer rate for video signals, and tv (s) is the delay time allowed for data transmission and determined by the system. The delay time tv allowed for video signals can be made equal to the period T. Specifically, $$tv=T \qquad (14)$$

The proportion $\alpha v$ of the currently active video signal ports of slave units 10-1 to 10-m is given by $$\alpha v = (\text{Number of currently active slave units}) \div m \qquad (15),$$

where αv=1.0 when the video signal ports of all the slave units are currently active. In addition, rvmax is set by the system in accordance with, among other things, the number of subscribers who transmit video signals.

After a maximum value kv has been established for video signals in such a manner, the enabling amounts Gdi that allow the slave units 10-1 to 10-m to transmit data signals are calculated by the control unit 27 of the master unit 20 at no more than the specific maximum value k (bits) on the basis of the information amount tables of the storage unit 26.

Here, the specific maximum value k is set such that Eq. (8) is satisfied, where m is the total number of the slave units 10-1 to 10-m, α is the proportion of currently active slave units 10-1 to 10-m (0<α≦1.0), rdmin (b/s) is the minimum value of the data transfer rate for data signals, and td (s) is the delay time allowed for data transmission and determined by the system. The proportion α of currently active slave units 10-1 to 10-m is given by Eq. (2), where α=1.0 when all the slave units 10-1 to 10-m are currently active.

The following can also be written.

$$rd\mathrm{min}=r-rv\mathrm{max} \quad (16)$$

Furthermore, the delay time td allowed for data signals is set on the basis of the type of service or the like handled by the system. A value of about 0.1–1 s is considered appropriate for regular Internet access or another type of data-based service in which some delay is allowed, taking into account, among other things, the imperceptible time that elapses until a signal transmission is completed.

About 30 ms is appropriate as the allowed delay time for video signals, taking into account the frame pitch of regular TV signals.

Figure 67:
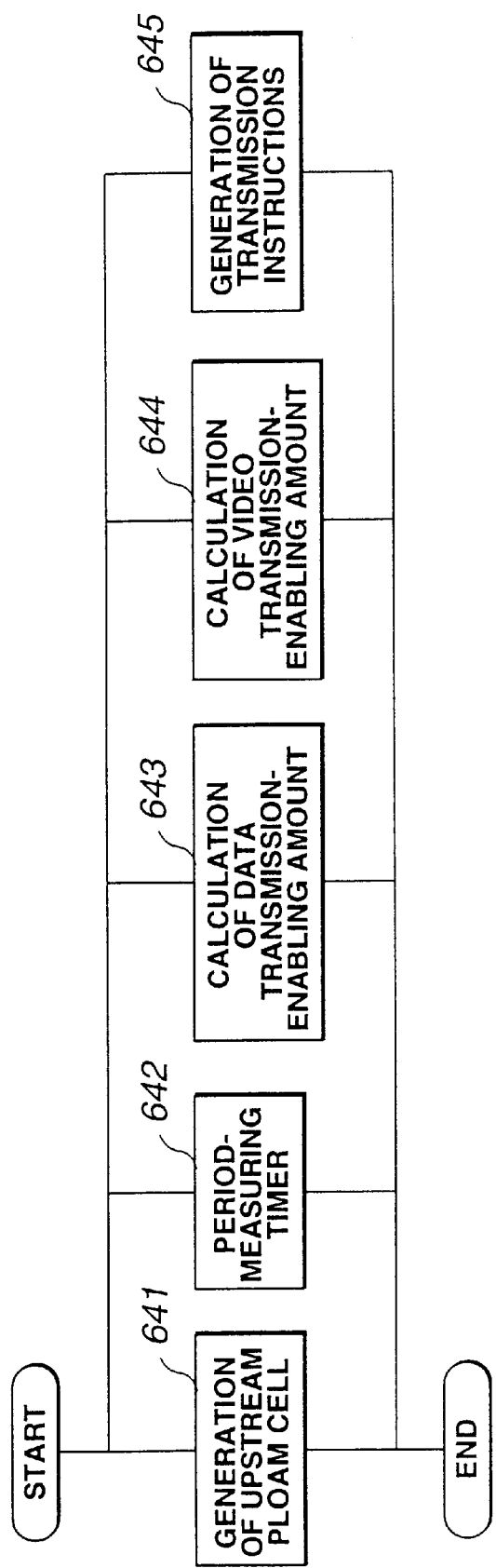
FIG. 67 is a flowchart depicting the overall relation among the procedures pertaining to transmission instructions in a ninth embodiment aspect of the present invention.

FIG. 67 is a flowchart depicting the overall relation among the procedures pertaining to transmission instructions in a ninth embodiment aspect. The ninth embodiment aspect is different from the seventh embodiment aspect in that the transmission-enabling amounts are calculated for video signals as well.

In FIG. 67, the following features are identical to those of the seventh embodiment aspect: the operation of the period timer shown in FIG. 60, the procedure for calculating the enabling amounts for data transmission shown in FIG. 61, the transmission instruction procedure shown in FIG. 62, and the data signal transmission procedure shown in FIG. 64.

In addition, the procedure for calculating the enabling amounts for video signals (step 644) is arrived at by substituting the data storage amount Rdi for Rvi, the enabling amount Gdi for Gvi, and the specific maximum value k for kv in the procedure for calculating the enabling amounts for data transmission shown in FIG. 61.

Although the seventh to ninth embodiment aspects above were described with reference to voice signals as the service class requiring periodic fixed-length data transmissions, and video signals as the service class requiring periodic variable-length data transmissions, it is also possible to accommodate service classes in which the voice signals must be subjected to voice coding at a variable rate, and variable-length data transmissions performed periodically.

It is also possible to accommodate service classes in which the video signals must be subjected to image coding at a fixed rate, and fixed-length data transmissions performed periodically.

Service classes requiring periodic fixed-length data transmissions may also be accommodated by the point-to-multipoint communication system of the eighth or ninth embodiment aspect, in which periodic variable-length data transmissions are required.

A tenth embodiment aspect of the present invention will now be described with reference to FIGS. 68 to 73.

The point-to-multipoint communication system of the tenth embodiment aspect of the present invention comprises a service class s0 requiring data transmissions at a specific period T, and two service classes s1 and s2 for sporadic data transmissions.

The two service classes accommodated are a service class s1 in which the delay time allowed for data transmissions is t1, and a service class s2 in which the delay time allowed for data transmissions is t2.

Information signals for the real-time transmission of voice, video, and other multimedia signals over the Internet using a protocol referred to as UDP can be cited as an example of signals accommodated by a service class whose allowed delay time is t1.

Information signals for regular Web access or file transfer can be cited as an example of signals accommodated by a service class whose allowed delay time is t2. Such transmission is commonly accomplished using a set of protocols referred to as TCP.

Figure 68:
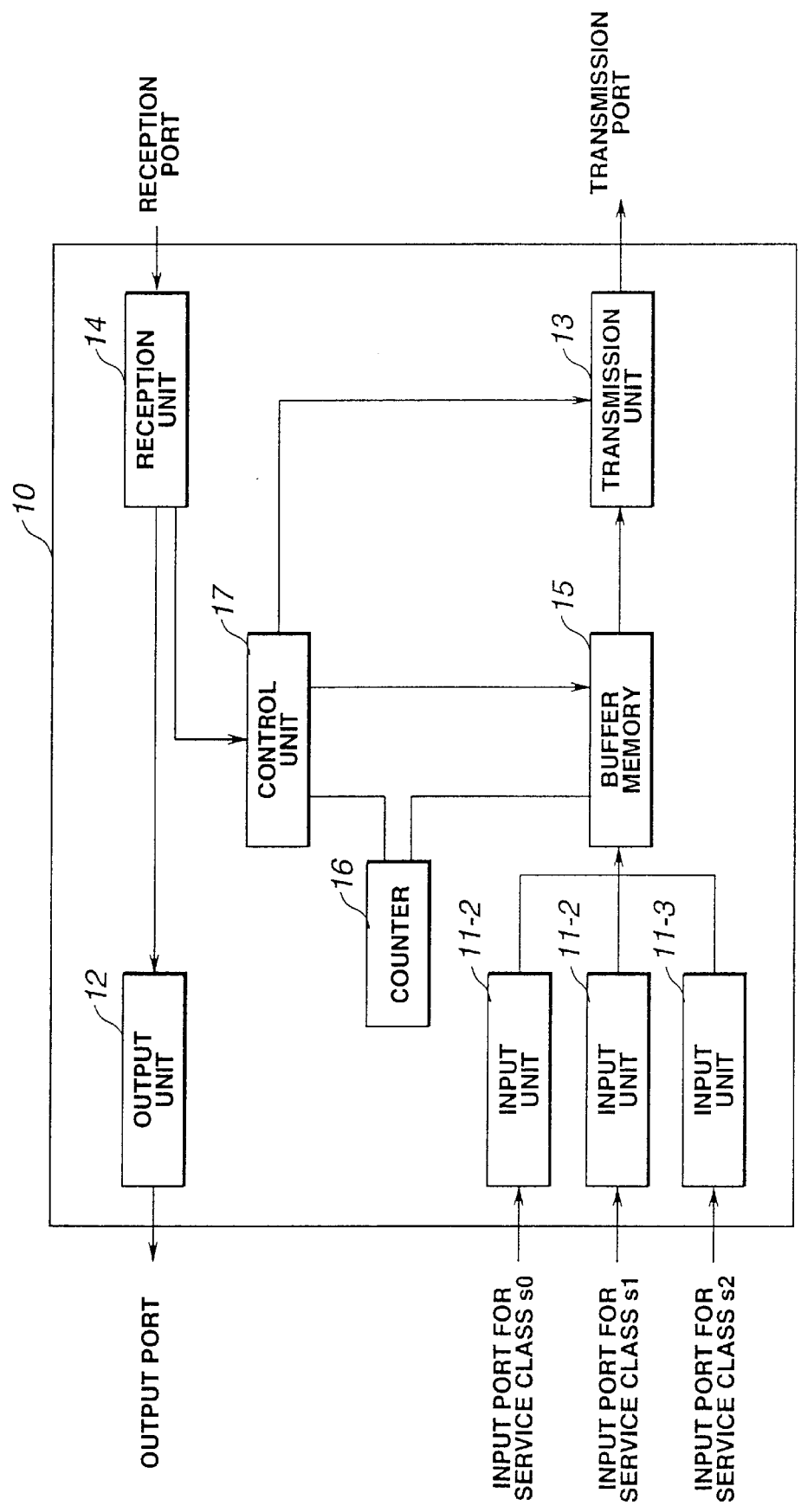
FIG. 68 is a block diagram depicting a slave unit for a tenth embodiment aspect of the present invention.

In FIG. 68, the slave unit 10 comprises input units 11-1, 11-2, and 11-3 connected to an input port for the service class s0, an input port for the service class s1, and an input port for the service class s2; an output unit 12 connected to an output port; a transmission unit 13 connected to a transmission port; a reception unit 14 connected to a reception port; a buffer memory 15 for temporarily storing information signals from the input ports for each service class; a counter 16 for counting the storage amounts of the information signals of each service class stored in the buffer memory 15; and a control unit 17 for informing the master unit 20 about the storage amounts of the information signals of each service class counted by the counter 16, performing other control procedures, and outputting the information signals of each service class stored in the buffer memory 15 to the transmission unit 13 for each service class in accordance with the instructions from the master unit 20.

In the structure in FIG. 68, it is not always necessary to provide an input port for each service class. In particular, when the service class s1 is the aforementioned UDP, and the service class s2 is the aforementioned TCP, it is possible to adopt an arrangement in which the two service classes can be distinguished from each other using protocol numbers attached to the input packets of the service classes.

In the structure in FIG. 68, the storage amounts classified by service class and counted by the counter 16 are conveyed by the slave units 10-1 to 10-m to the master unit 20 via the transmission unit 13 in accordance with instructions from the master unit 20.

In the master unit 20 that have received a notification concerning the storage amounts for each service class from the slave units 10-1 to 10-m, this notification is received by the reception unit 24 shown in FIG. 3, and the storage amounts for each of the service classes thus received are stored in the storage unit 26.

FIGS. 69a, 69b, 69c, 69d, 69e, and 69f depict the structure of the storage unit 26 according to the tenth embodiment aspect.

Consistent with this embodiment, the storage unit 26 is provided with information amount tables 1–3 (FIGS. 69a to 69c) for storing, as a separate category for each service class, storage amounts related to the data signals reported by the slave units 10-1 to 10-m; and enabling amount tables 1–3 (FIGS. 69d to 69f) for storing, as a separate category for each service class, enabling amounts that allow the slave units 10-1 to 10-m to transmit data signals.

The initial values of the information amounts R0i, R1i, R2i and the enabling amounts G0i, G1i, G2i in the tables are zeroes, and values individually assigned to the slave units 10-1 to 10-m are written to the ID numbers i of the slave units 10-1 to 10-m.

In the storage unit 26, where cells for submitting storage amount reports are received from the reception unit 24, the storage amounts reported and the ID numbers of the slave units 10-1 to 10-m written to the cells are read for each service class, and, based on the values thus read, the storage amounts R0i–R2i for the data signals of each service class are updated where a match is achieved with the ID numbers of the slave units 10-1 to 10-m in the information amount tables.

In the control unit 27 of the master unit 20, the enabling amounts G0i to G2i that allow the slave units 10-1 to 10-m to transmit the data signals of each service class as signals classified by service class are calculated at no more than specific maximum values k0 to k2 (bits) on the basis of the information amount tables of the storage unit 26.

Calculated first is the enabling amount G0i for a service class s0 with periodic data transmission requirements.

Here, the specific maximum value k0 is set such that the following relation is satisfied:

$$k0 \leq (r0\max \times t0) \div (\alpha 0 \times m) \quad (17),$$

where m is the total number of the slave units 10-1 to 10-m, $\alpha 0$ is the proportion of the currently active video signal input ports of the slave units 10-1 to 10-m ($0 < \alpha 0 \leq 1.0$), r0max (b/s) is the maximum value of the data transfer rate for the data signals of service class s0, and t0 (s) is the delay time allowed for data transmission and determined by the system. The allowed delay time t0 for service class s0 can be made equal to the period T. Specifically, $$t0 = T \quad (18)$$

The proportion a0 of the currently active data signal ports of the slave units 10-1 to 10-m in service class s0 is given by $$\alpha = (\text{Number of currently active slave units in service class } s0) \div m \quad (19),$$

where $\alpha 0 = 1.0$ when the data signal ports of all the slave units in service class s0 are currently active.

The value of r0max is set by the system in accordance with, among other things, the number of subscribers who transmit data signals in service class s0.

After a maximum value k0 has been established in such a manner for the data-signals of service class s0, the enabling amounts G1i and G2i that allow the slave units 10-1 to 10-m to transmit the data signals of other service classes are calculated by the control unit 27 of the master unit 20 at no more than the specific maximum values k1 and k2 (bits) on the basis of the information amount tables of the storage unit 26.

Here, the specific maximum value k1 (1=1, 2) is set such that the following relation is satisfied:

$$k1 \leq (r1\min \times t1) \div (\alpha 1 \times m) \quad (20),$$

where m is the total number of the slave units 10-1 to 10-m, $\alpha 1$ is the proportion of the-currently active service classes of the slave units 10-1 to 10-m ($0 < \alpha 1 \leq 1.0$), r1min (b/s) is the minimum value of the data transfer rate for the data signals of each service class, and t1 (s) is the delay time allowed for the data transmission of each service class and determined by the system.

The proportion $\alpha 1$ of currently active slave units is given by $$\alpha 1 = (\text{Number of currently active slave units in each service class}) \div m \quad (21),$$

where $\alpha 1 = 1.0$ when the service classes of all slave units are currently active.

$$r1\min + r2\min = r - r0\max \quad (22)$$

The allowed delay time for s0 is about 1 ms, assuming that, for example, regular telephone or ISDN signals are accommodated by a service class s0 in which data is transmitted at a specific period T. An allowed delay time of about 30 ms is considered appropriate for service class s1, taking into account the frame pitch of regular TV signals adopted for video transmissions.

With service class s1, therefore, data is actually transmitted at a period of about T=t1. In addition, service class 2 accommodates regular Internet access or another type of data-based service in which some delay is allowed, and a value of about 0.1–1 s is considered appropriate for the allowed delay time t1, taking into account, among other things, the imperceptible time that elapses until a signal transmission is completed.

As noted above, the tenth embodiment aspect is configured such that the delay time t1 allowed for data transmission is reduced in the case of the service class s2 because service class s1 is primarily used for transmitting data in real time. Consequently, the transfer rate will first be secured for the service class s1, and the remaining transfer rate will be allocated to the service class s2. The corresponding maximum transmittable information amounts k1 and k2 for s1 and s2 will therefore be $$k1 < k2 \quad (23)$$

This is because the information amount that can be continuously transmitted is reduced for a service with a low allowed delay value, and instructions to transmit are given to all the terminals that have stored the information signals of service class s1, for which transmission is to be completed in a comparatively short time.

Figure 70:
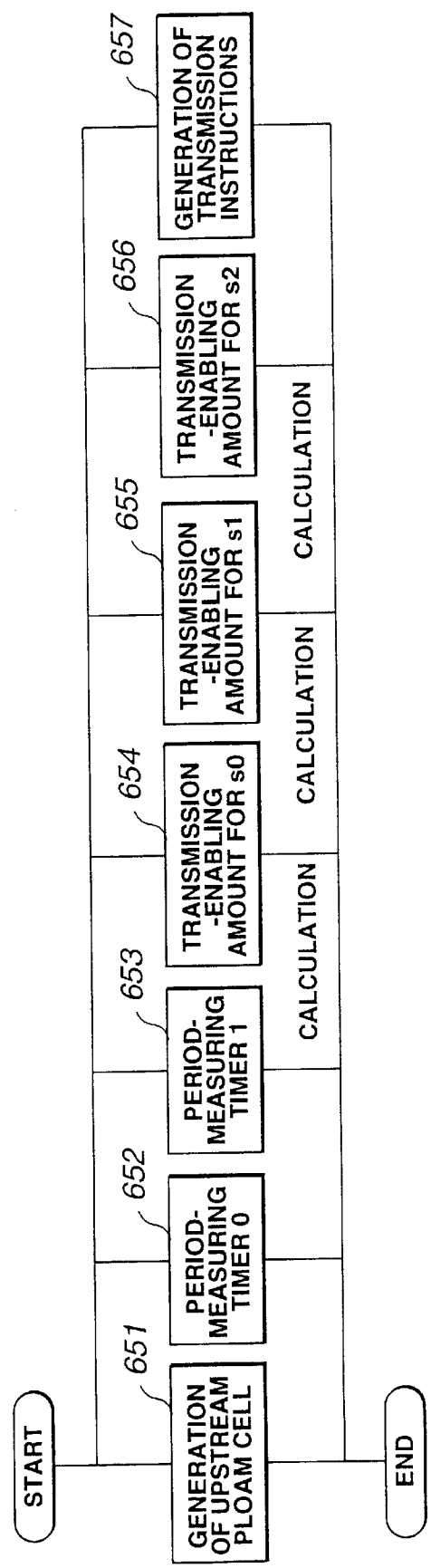
FIG. 70 is a flowchart depicting the overall relation among the procedures pertaining to transmission instructions in the tenth embodiment aspect of the present invention.

FIG. 70 is a flowchart depicting the overall relation among the procedures pertaining to transmission instructions in the tenth embodiment aspect.

The tenth embodiment aspect differs from the seventh embodiment aspect in that a procedure for calculating transmission-enabling amounts is performed for the data signals of all service classes (steps 654–656) and that the period-measuring timer operates for the service class 1 as well.

Figure 71:
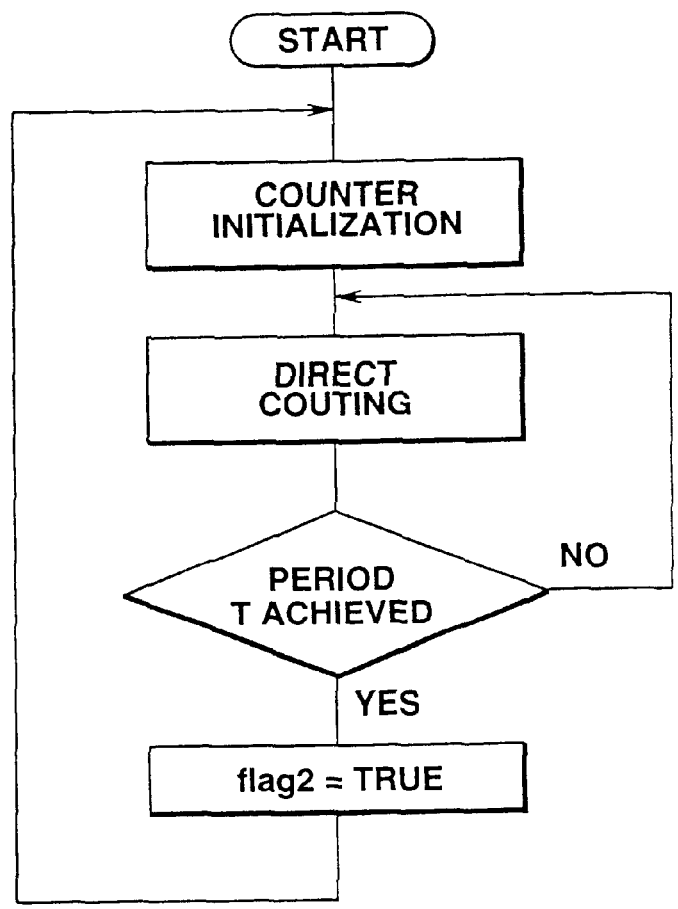
FIG. 71 is a flowchart depicting the period-measuring timer procedure for service class 1 shown in FIG. 70.

FIG. 71 is a flowchart depicting the period-measuring timer procedure for service class 1 shown in FIG. 70. The period-measuring timer procedure for service class s0 is the same as the procedure in the flowchart shown in FIG. 60.

The procedure in FIG. 71 for calculating the amounts that allow data to be transmitted can be arrived at by adopting the condition 1=1, 2 and substituting Gdi for D1i, Rdi for R1i, and k for k1 for each service class in the procedure in FIG. 61 for calculating the amounts that allow data to be transmitted.

Figure 72:
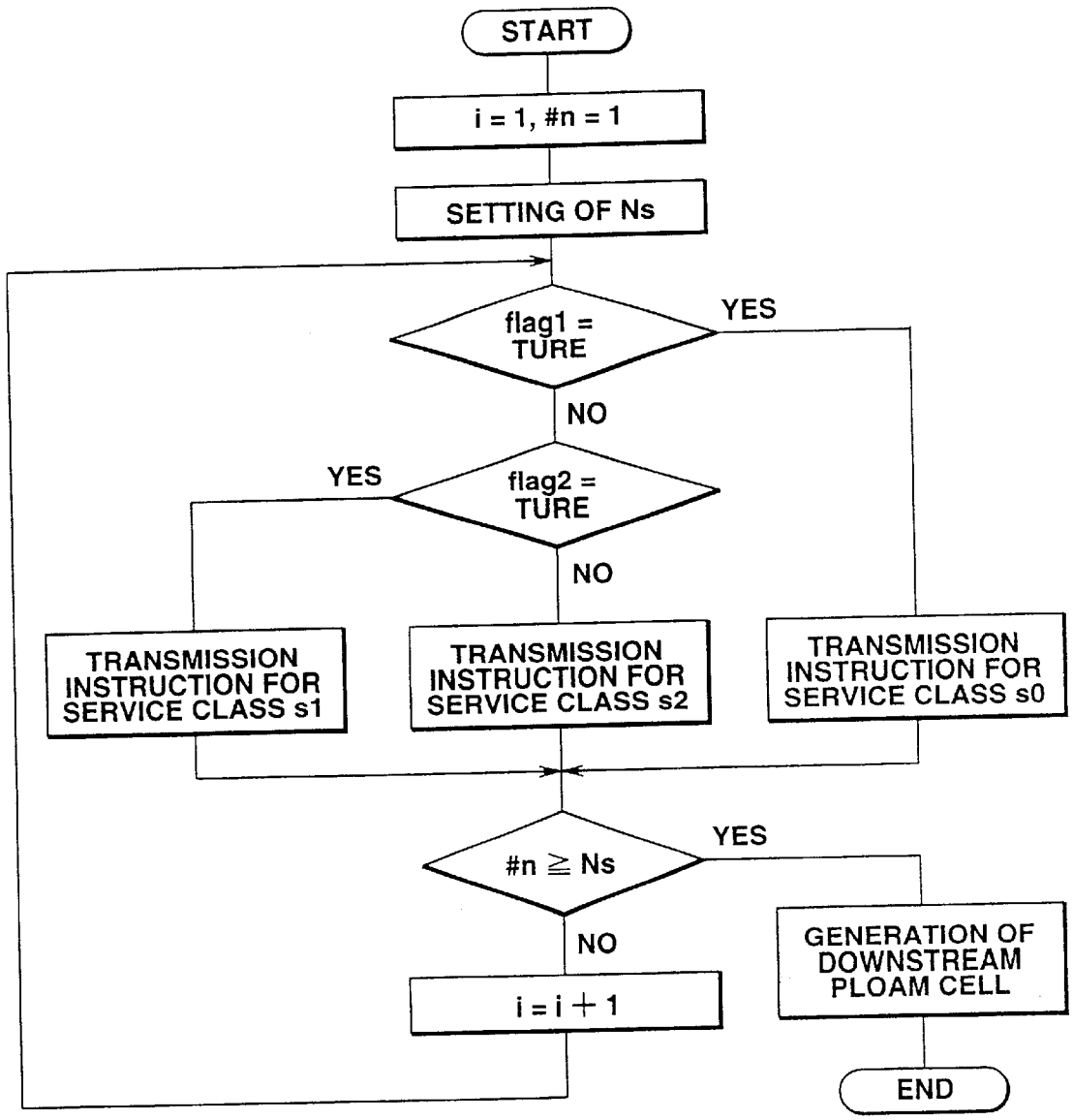
FIG. 72 is a flowchart depicting the entire procedure for issuing transmission instructions according to FIG. 70.

FIG. 72 is a flowchart depicting the entire procedure for issuing transmission instructions according to FIG. 70. In FIG. 72, transmission instructions for the service class s0 have the highest priority level, and transmission instructions are issued for the service classes s1 and s2 after transmission instructions have been issued for the service class s0.

Between the service classes s1 and s2, the service class s1 has a higher priority level, and instructions to transmit are issued at regular intervals for the service class s1 before they are issued for s2.

Figure 73:
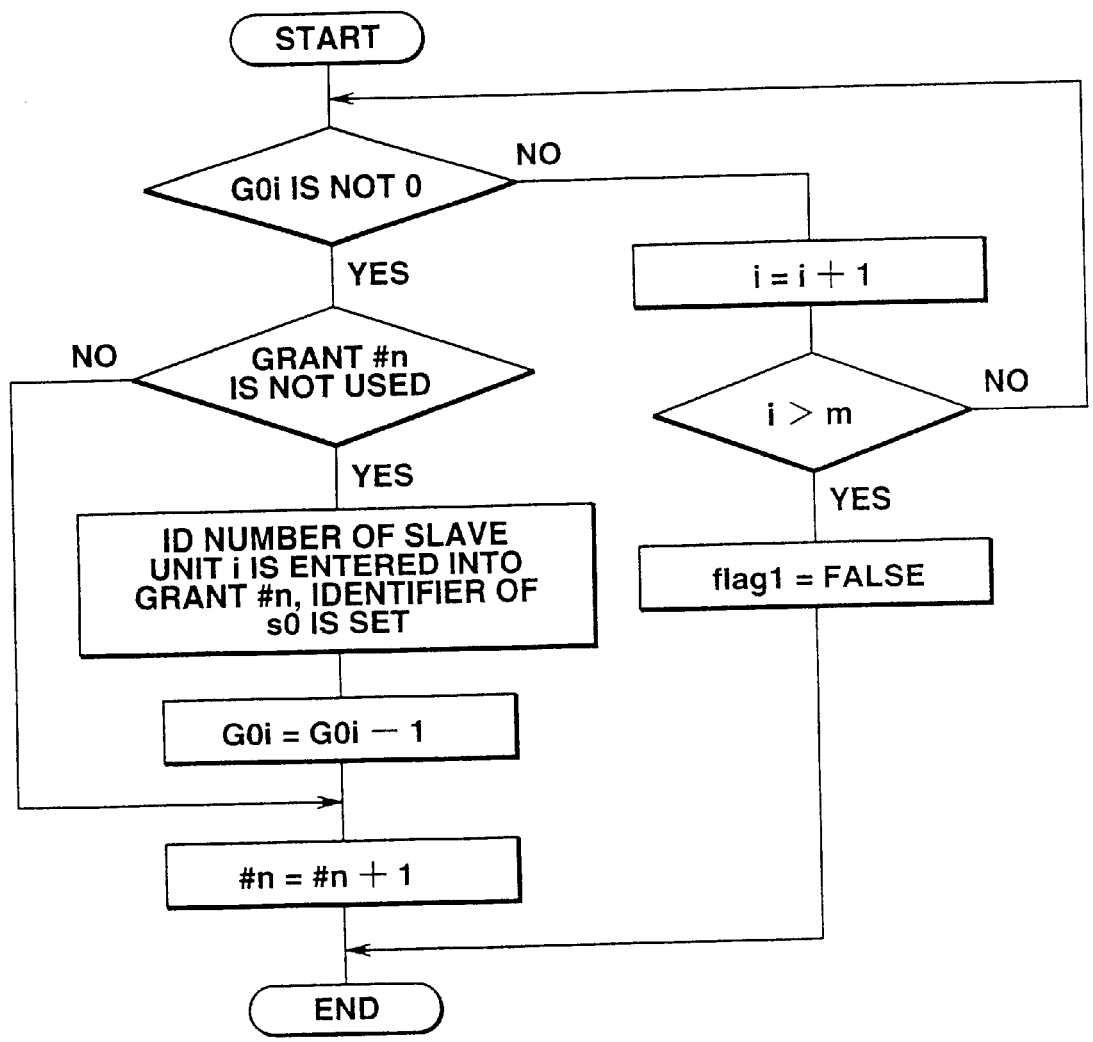
FIG. 73 is a flowchart depicting the instructions to transmit data signals for the service class s0 according to FIG. 72.

FIG. 73 is a diagram depicting the procedure for issuing instructions to transmit signals for the service class s0 according to FIG. 72. An instruction to transmit signals for the service class s0 can be obtained by substituting G0i for Gvi and using service class s0 identifiers instead voice signals identifiers in the instruction for transmitting voice signals according to FIG. 16.

Figure 74:
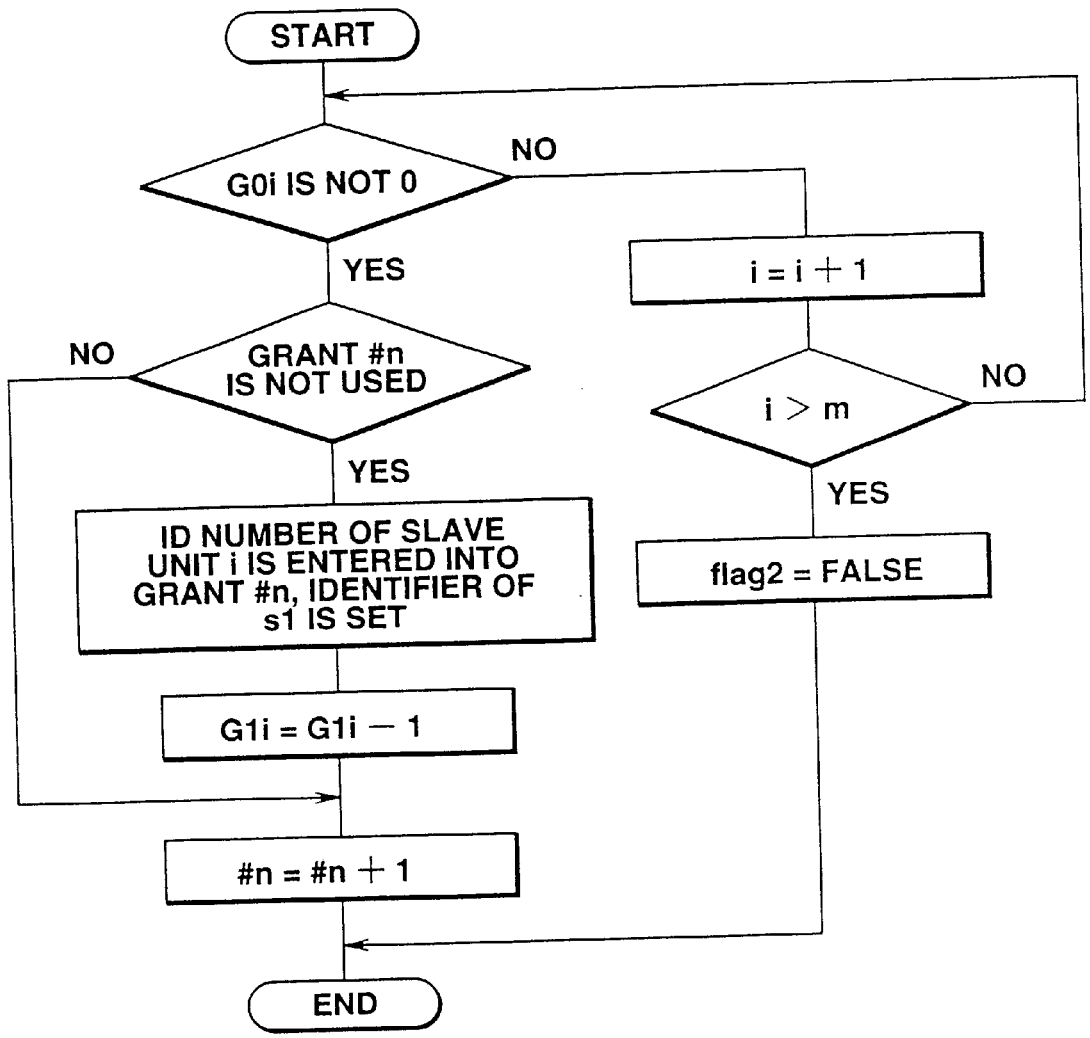
FIG. 74 is a flowchart depicting the instructions to transmit data signals for the service class s1 according to FIG. 72.

FIG. 74 is a flowchart depicting the procedure for issuing instructions to transmit data signals for the service class s1 according to FIG. 72. An instruction to transmit data signals for the service class s1 can be obtained by substituting G1i for Gvi (and flag 2 for flag 1) and providing the identifiers of the service class s1 instead of the identifiers for voice signals in the instruction to transmit voice signals according to FIG. 63.

An instruction to transmit signals for the service class s2 can be obtained by substituting G2i for Gvi in the instruction to transmit data signals according to FIG. 64.

Figure 75:
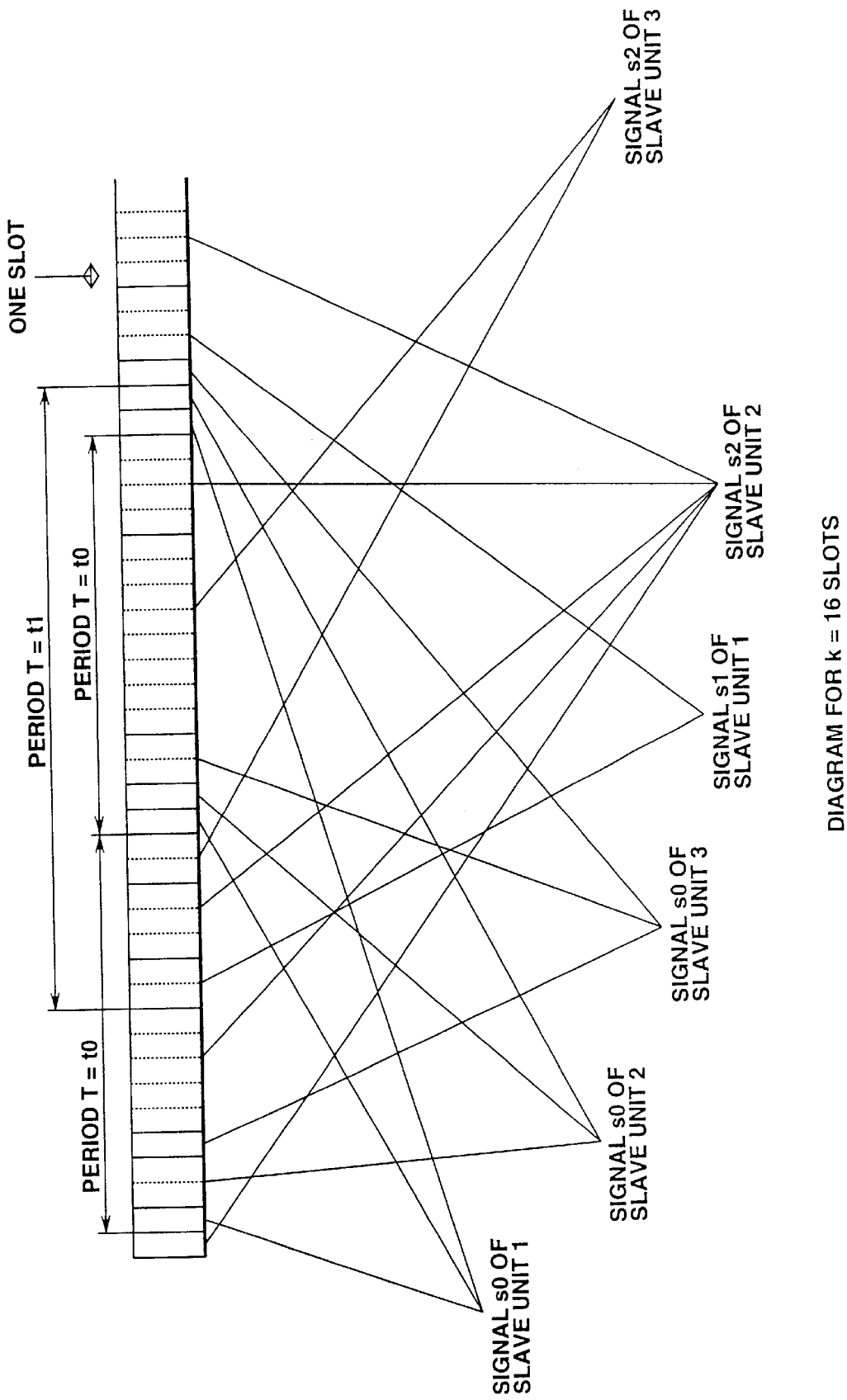
FIG. 75 is a frame block diagram depicting the frame structure of the point-to-multipoint communication system according to the tenth embodiment aspect of the present invention.

FIG. 75 is a diagram depicting the frame structure of the point-to-multipoint communication system according to the tenth embodiment aspect. FIG. 75 illustrates a case in which the slave unit 1 uses the service classes s0 and s1, and the slave units 2 and 3 use the service classes s0 and s2.

In the tenth embodiment aspect, bands are invariably allocated to the service class s0 at period T. In addition, transmission bands are allocated to the service class s1 after they are allocated to the service class s0.

The result is that a transmission instruction is issued for the service class s1 of the slave unit 1, and a transmission instruction is then issued for the service class s1 following the transmission of the service class s0, rather than being issued precisely after a period T1 has elapsed. With the service class s2, an instruction for a continuous transmission at G21 (G2i≦k) is given using the remaining bands after instructions to transmit have been given for the service classes s0 and s1.

In the tenth embodiment aspect, enabling amounts are initially calculated for the service class s0, which requires that data be periodically transmitted, and the enabling amounts of other service classes are then assigned with respect to the remaining bands. According to this protocol, the service class s0 is not necessarily a service class that has periodic data transmission requirements.

Specifically, preferential transmission instructions can be issued using a higher-priority service class or a service class with a short allowed delay time as the service class s0 of the fourth embodiment, and using the delay time allowed for this service class as the period T.

For the sake of simplicity, the maximum value k of the information amount that allows signals to be transmitted continuously is assumed to be the same for all the slave units 10-1 to 10-m in the seventh to tenth embodiment aspects. In actual practice, various k-values can be adopted, depending on the financial charges or priority level of the slave units 10-1 to 10-m.

Thus, the seventh to tenth embodiment aspects of the present invention allow slave units 10-1 to 10-m to transmit information signals in accordance with the information amount relayed from the master unit 20, so no signal collisions at all occur in the transmission line, and a throughput reduction such as that observed in the case of CSMA/CD is avoided when signals containing several megabytes of data are transmitted in bursts.

In this case, the information amount that allows information signals to be transmitted can be calculated dynamically and efficiently on the basis of reports from the slave units 10-1 to 10-m such that the data transfer rate is utilized with 100% efficiency, so high throughput can be obtained even under complex conditions created by greater burst traffic or an increased number of slave units 10-1 to 10-m.

In addition, information amount is reported by service class, and information transmission instructions are issued in sequence from higher-priority service classes, so the stringent delay requirements imposed on higher-priority service classes can be satisfied because the information transmission instructions are issued independently for the higher-priority service classes even when several megabytes or more are transmitted in bursts for a lower-priority service class.

Furthermore, the information amount reported by each slave unit 10-1 to 10-m is limited to one designed to issue instructions for transmitting signals within a certain time period. When a particular slave unit 10-1 to 10-m reports a high information amount in excess of several megabytes, the data transmission of this particular slave unit 10-1 to 10-m has very little effect on the transmission of other slave units 10-1 to 10-m because the transmission does not exceed a certain limiting value and because no instruction is issued concerning data transmission.

The maximum value k (bits) of data transmission within a certain time period is set such that the following relation is satisfied:

$$k \leq (r \times td)/m,$$

where m is the total number of slave units 10-1 to 10-m (m is an integer), r (b/s) is the data transfer rate, and td (s) is the delay time allowed for the data transmission and determined by the system. In the presence of inactive slave units 10-1 to 10-m, the proportion α of active slave units is assumed to be 0<α≦1.0, and the maximum value k of data transmission within a certain time period is determined such that the following relation is satisfied:

$$k \leq (r \times td)/(\alpha \times m)$$

The slave units 10-1 to 10-m can therefore continuously transmit large information signals because these stations have exclusive use of the upstream transmission line during the transmission of information signals whose maximum size is measured in k (bits). When the information amount is determined on the basis of the above equation, a time of td seconds is necessary to transmit signals if all the slave units 10-1 to 10-m transmit kilobits of data, making it possible to secure an allowed delay time td for data transmission by all the slave units 10-1 to 10-m.

In addition, all the slave units 10-1 to 10-m can invariably transmit their information signals within the allowed delay time td, and are thus assured access fairness.

An eleventh embodiment aspect will now be described.

The point-to-multipoint communication system of the eleventh embodiment aspect is configured such that when communication is performed for a plurality of service classes that transmit data at a variety of allowed delay times, the communication can be performed with high communications efficiency while the stringent communication quality requirements of the service classes are satisfied.

Figure 76:
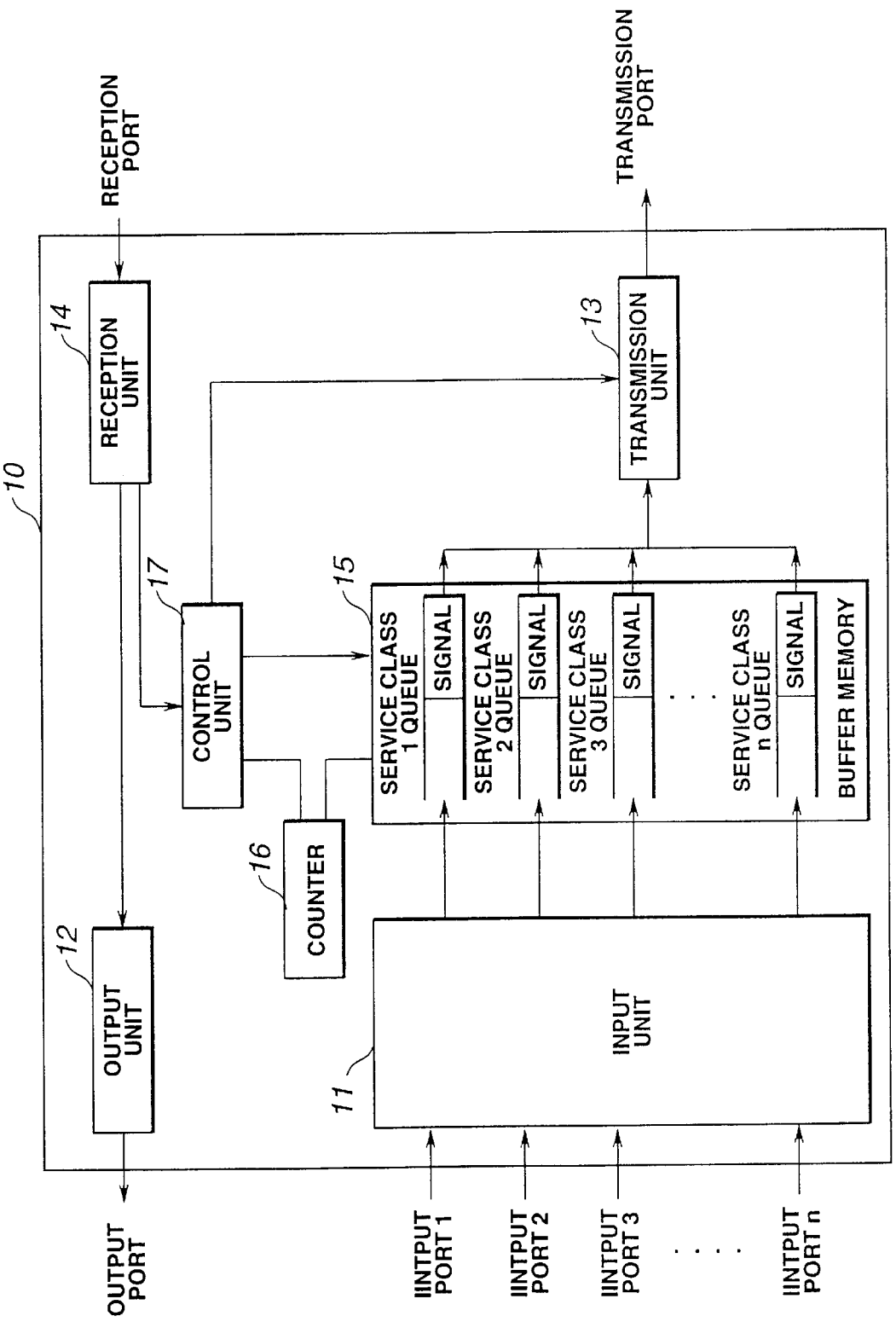
FIG. 76 is a block diagram depicting a detailed structure of a slave unit according to an eleventh embodiment aspect of the present invention.

FIG. 76 is a block diagram depicting a detailed structure of a slave unit for the point-to-multipoint communication system according to the eleventh embodiment aspect.

The overall structure of the point-to-multipoint communication system according to the eleventh embodiment aspect is the same as the structure shown in FIG. 1.

In FIG. 76, the slave unit 10 comprises an input unit 11 connected to a plurality of input ports; an output unit 12 connected to an output port; a transmission unit 13 connected to a transmission port; a reception unit 14 connected to a reception port; a buffer memory 15 for temporarily storing the signals of a plurality of service classes; a counter 16 for counting the information amount needed to transmit the signals stored in the buffer memory 15 for all the service classes; and a control unit 17 for submitting reports regarding the information amount counted by the counter 16 in accordance with the instructions from the master unit 20, transmitting the signals temporarily stored in the buffer memory 15, and performing other control procedures.

Although the buffer memory of FIG. 76 stores signals belonging to mutually different service classes using a plurality of logical queues, it is also possible to adopt an arrangement in which the storage is accomplished using a plurality of physical buffer memories.

The service classes should be established based on the allowed delay times of the signals transmitted by the slave units 10-1 to 10-m to the master unit 20. In the present embodiment aspect, signals having a comparatively short allowed delay time constitute a higher-priority service class, and signals having a comparatively long allowed delay time constitute a lower-priority service class.

The service classes may also be established based on the importance, traffic characteristics, and other properties of the signals transmitted to the master unit 20.

With the transmission of video signals coded, for example, by discreet cosine transform or another coding technique, it is possible to adopt an arrangement in which signals composed of low-frequency components (principal portion of an image) constitute a higher-priority service class, and signals composed of high-frequency components (detailed portions) constitute a lower-priority service class.

In the eleventh embodiment aspect, the transmission frames shown in FIG. 4 are adopted as the upstream and downstream transmission frames of the optical transmission line. Specifically, a downstream frame comprises 56 slots, and an upstream frame comprises 53 slots. Based on these transmission frames, 53- and 56-byte cells are exchanged downstream and upstream, respectively, in accordance with the TDM (Time Division Multiplex) multiplexing protocol in the case of the downstream transmission from the master unit to slave units, and in accordance with the TDMA (Time Division Multiple Access) multiplexing protocol in the case of the upstream transmission from the slave units to the master unit.

An upstream cell contains a 3-byte overhead, and downstream transmission frames contain two PLOAM cells per frame in a ratio of one cell for every 28 cells. The initial PLOAM cell 1 has 27 grants for requesting upstream cells from the slave units, and the second PLOAM cell 2 has 26 grants, to a total of 53 grants.

In addition, the frame shown in FIG. 25 is adopted as the correspondence between the grants of a PLOAM cell and the slots of an upstream transmission frame. Here, the initial PLOAM cell 1 of the downstream transmission frame has 27 grants for requesting upstream cells from the slave units, and the second PLOAM cell 2 has 26 grants, to a total of 53 grants.

The master unit 20 issues instructions as to which slave unit can transmit a cell to a particular slot inside the upstream transmission frame by performing a procedure whereby an identifier for the upstream cell of a particular slave unit is written to the PLOAM cell PLOAM1 or the PLOAM cell PLOAM2.

The slave units 10-1 to 10-m can transmit cells to those slots of the upstream transmission frame that correspond to the aforementioned grants when identifiers for requesting the upstream cells of these slave units 10-1 to 10-m are written to the PLOAM cell PLOAM1 or the PLOAM cell PLOAM2. This method makes it possible to avoid cell collisions in the optical transmission line and to transmit signals to the master unit.

In the upstream transmission frame shown in FIG. 4, cells from each of the slave units 10-1 to 10-m are transmitted as single slots, although it is also possible to transmit cells from a plurality of slave units 10-1 to 10-m as single slots by segmenting each slot into a plurality of mini-slots. These mini-slots are used to provide the master unit 20 with reports regarding the information amount necessary to transmit the signals stored in the buffer memories of the slave units 10-1 to 10-m.

The master unit 20 issues instructions as to which slave units 10-1 to 10-m can transmit a mini-cell to a particular mini-slot inside the upstream transmission frame by performing a procedure whereby an identifier for requesting the information amount of a particular slave units 10-1 to 10-m is written to a grant of the PLOAM cell PLOAM1 or the PLOAM cell PLOAM2.

The slave units 10-1 to 10-m can transmit mini-cells to those mini-slots of the upstream transmission frame that correspond to the aforementioned grants when identifiers for requesting the information amount of these slave units 10-1 to 10-m are written to the PLOAM cell PLOAM1 or the PLOAM cell PLOAM2. This method makes it possible to avoid mini-cell collisions in the optical transmission line 30 and to provide the master unit 20 with reports regarding the information amount necessary to transmit the signals of all service classes stored in the buffer memories.

The access protocol according to the point-to-multipoint communication system of the eleventh embodiment aspect will now be described.

First, ID numbers for identifying the slave units 10-1 to 10-m are managed by the master unit 20, and these ID numbers are conveyed during the initial stage to all the slave units 10-1 to 10-m participating in the operation of the system. By virtue of these ID numbers, the master unit 20 can trace a cell to a particular slave unit 10-1 to 10-m, and each of the slave units 10-1 to 10-m can determine whether the cell it has received is addressed to this station.

Signals such as voice, video, or data are input from a terminal or other network to a plurality of input ports of the slave unit 10 shown in FIG. 76, and these signals are sent to the buffer memory 15 via the input unit 11 and are temporarily stored in the logical queue of each service class in the buffer memory 15.

Each input port may be set up to uniquely define the input signals, as is the case with telephone, video, Ethernet, or ATM. The signals stored in the buffer memory 15 may be arranged in cells or packets while stored in the buffer memory 15, such as ATM cells or Ethernet packets, for example. Another feature of the eleventh embodiment aspect is that the input signals have good consistency when arranged as 53-byte units because each slot of the downstream transmission frame and each slot of the upstream transmission frame (excluding the overhead) has 53 bytes, as in the case of the transmission frames shown in FIG. 4.

When, for example, variable-length Ethernet packets are input, these packets should be segmented in the input unit 11 into fixed-length cells (each of which comprises 53 bytes), and stored in the queues in the buffer memory 15. In this case, the information for reconstructing the packets on the side of the master unit 20 may be included in some of the 53 bytes.

In the counter 16 of the slave unit 10 shown in FIG. 76, the information amount necessary to transmit the signals of all service classes temporarily stored in the buffer memory 15 causes the number of cells or slots necessary for such signal transmission to be counted in integral units. In the upstream transmission frame shown in FIG. 4, for example, the information amount is counted such that 53 bytes constitute one unit because the signals are transmitted using 53 bytes (excluding the overhead).

Examples of recommended counting methods include methods in which counting is performed as required in accordance with the input of signals to the buffer memory 15 and the output of signals from the buffer memory 15, and methods in which the counting is based on the difference between the start address and the end address of a signal stored as FIFO in the buffer memory 15. The information amount may be the absolute value of a signal stored in the buffer memory 15, or it may be a differential value based on the previous report.

Although the information amount may also be counted as an integral value using bits or bytes as units, counting this amount as the number of cells or slots needed to transmit a signal is effective because it reduces the values reported to the master unit 20. If the stored signal is less than 53 bytes, a single cell or slot may be counted as the one necessary for transmission, and the counting may be stopped before 53 bytes are reached.

Described below is a method in which the master unit 20 uses PLOAM cells to instruct slave units 10-1 to 10-m to issue reports regarding the information amount necessary to transmit. signals, and instructions to transmit signals are given based on the information amount reported by the slave units 10-1 to 10-m.

First, identifiers for requesting specific slave units 10-1 to 10-m to submit information amount reports are written by the master unit 20 to the grants of a PLOAM cell on the basis of the period with which the slave units 10-1 to 10-m are instructed to issue the information amount reports.

Next, enabling amounts-that allow the slave units 10-1 to 10-m to transmits signals are calculated at no more than a specific maximum value k (bits) in accordance with the information amount reported by the slave units 10-1 to 10-m, and identifiers for requesting the transmission of upstream cells to specific slave units 10-1 to 10-m are written on the basis of these enabling amounts.

Here, the specific maximum value k is set such that Eq. (1) is satisfied, where m is the total number of slave units 10-1 to 10-m, $\alpha$ is the proportion of currently active slave units ($0 < \alpha \leq 1.0$), r (b/s) is the data transfer rate, and td (s) is the delay time allowed for data transmission and determined by the system. The proportion $\alpha$ of currently active slave units 10-1 to 10-m is given by Eq. (2), where $\alpha=1.0$ when all the slave units 10-1 to 10-m are currently active.

The data transfer rate r in Eq. (1) is the rate at which signals can actually be transmitted as upstream transmission frames, and the delay time td allowed for data transmission is set on the basis of the type of service or the like handled by the system. The specifics of the method whereby the enabling amounts are calculated and the identifiers are written to the grants of PLOAM cells are the same as in the first embodiment aspect.

Following is a description of a method whereby the slave units 10-1 to 10-m provide the master unit 20 with reports regarding the information amount necessary to transmit the signals of all service classes, and a method whereby the signals stored by the buffer memory 15 are transmitted.

In the slave unit 10 shown in FIG. 76, cells are received by the reception unit 14 via the reception port. In the reception unit 14, it is determined based on the addresses written to the cells whether the received cells are addressed to the slave unit 10 in question. If the cells are indeed addressed to the slave unit 10 in question, cell type is determined based on the cell identifiers written to the cells. The identified cells are sent to the control unit 17 if they are PLOAM cells, and to the output unit 12 in all other cases.

Once the PLOAM cells are received by the control unit 17 via the reception unit 14, it is checked on the basis of the identifiers written to the grants of the PLOAM cells whether an instruction has been issued to transmit a signal or to submit an information amount report. If it is concluded that the information amount of these slave units 10-1 to 10-m has been requested by the master unit 20, a mini-cell containing at least the ID numbers of these slave units 10-1 to 10-m and the information amount counted by the counter 16 is created, and this mini-cell is sent via the transmission unit 13 by means of the mini-slots in the upstream transmission frame that correspond to the grants instructed to issue a report.

Information amount is reported using either one or both of the absolute values counted by the counter 16 and the differential values based on the previous report. If it is concluded that the upstream cells of the slave units 10-1 to 10-m have been requested by the master unit 20, signals are retrieved in sequence from the queues of the buffer memory for which the service class has the highest priority level, cells for transmitting these signals are created, and the cells thus created are transmitted via the transmission unit 13 by means of the slots in the upstream transmission frame that correspond to the grants instructed to issue a report.

Figure 77:
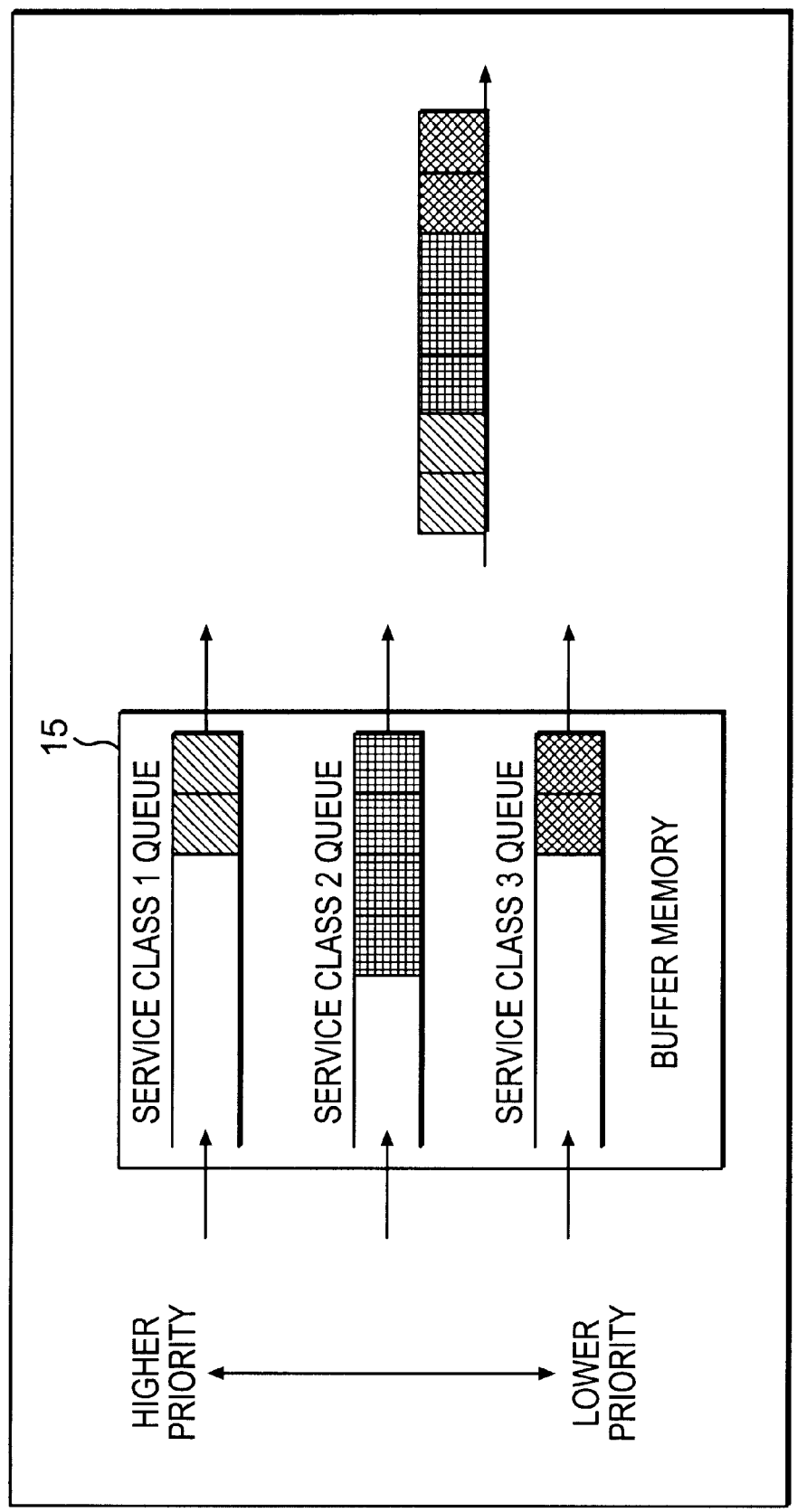
FIG. 77 is a diagram illustrating the operation of the eleventh embodiment aspect of the present invention.

When, for example, upstream cells amounting to 8 cells are requested by the master unit 20 in a case in which signals are stored in the queues of the service classes 1 to 3 in the buffer memories 15 of the slave units 10-1 to 10-m (as shown in FIG. 77), 2-, 4- and 2-cell signals are retrieved from the queues of the service classes 1, 2, and 3, respectively, and these signals are sequentially transmitted to the master unit 20. For a case in which signals are retrieved from the queues of a buffer memory 15, it is possible to adopt an arrangement in which the service classes involved are weighted, and signals stored in the queue of each service class are transmitted at an appropriate ratio.

With such a structure, the slave units 10-1 to 10-m have exclusive use of the upstream transmission line and can continuously transmit signals at no more than the enabling amounts indicated by the master unit 20 in sequence from signals belonging to a high-priority service class.

A twelfth embodiment aspect of the present invention will now be described.

The twelfth embodiment aspect allows communications efficiency to be improved by adopting a structure in which, for example, the interval at which the master unit 20 instructs the slave units 10-1 to 10-m to issue information amount reports is dynamically updated in the structure shown in FIG. 1, and instructions to submit information amount reports or to transmit signals are issued with the aid of the unused grants of the PLOAM cell PLOAM1 or the PLOAM cell PLOAM2.

The interval for issuing instructions to submit information amount reports is kept narrow by the control unit 17 of a slave unit 10 when, for example, the volume of traffic from the slave units 10-1 to 10-m shown in FIG. 76 to the master unit 20 is low, and the load on the transmission line is light. Variations in the information amount of the slave units 10-1 to 10-m can thus be identified by the master unit 20 at a higher speed. In addition, the master unit 20 can be more flexible in issuing signal transmission instructions under conditions of varying information amount from the slave units 10-1 to 10-m, making it possible to reduce the latency time elapsed before a slave unit 10-1 to 10-m transmits a signal.

Conversely, the interval for issuing instructions to submit information amount reports is kept wide when the volume of traffic from the slave units 10-1 to 10-m to the master unit 20 is high, and the load on the transmission line is considerable. The throughput can thus be increased even further because of the ability to broaden the transmission band within which signals can be transmitted along the transmission line.

Another feature is that when unused grants remain in a PLOAM cell after the master unit 20 has issued a signal transmission instruction for the information amount reported by all the slave unit 10-1 to 10-m, these slave units 10-1 to 10-m are instructed to submit information amount reports using these grants. The result is that communications efficiency can be improved by performing a look-ahead procedure for the information amount of each slave unit 10-1 to 10-m.

In addition, each slave unit 10-1 to 10-m is sequentially instructed to transmit signals by means of the unused grants of the PLOAM cell. In such an arrangement, signal transmission instructions are constantly received from the master unit 40, making it possible to reduce the latency time elapsed before the slave units 10-1 to 10-m can transmit signals.

Thus, the eleventh and twelfth embodiment aspects of the present invention are such that the slave units 10-1 to 10-m provide the master unit 20 with reports regarding the information amount necessary to transmit the signals of all service classes, and the master unit 20 issues signal transmission instructions on the basis of the information. amount reported by the slave units 10-1 to 10-m, making it possible to prevent any signal collisions from occurring in the transmission line, and the throughput from being reduced under conditions of increased traffic volume.

When, for example, comparatively large files are transferred while the slave units 10-1 to 10-m transmit images, the files can be transferred with high efficiency without compromising image quality. It is also possible to achieve further improvements in communications efficiency by dynamically updating the intervals at which the slave units 10-1 to 10-m are instructed to submit information amount reports, or by issuing instructions pertaining to the information amount or signal transmission by means of unused grants.

The enabling amounts that allow signals to be transmitted can be calculated dynamically and efficiently on the basis of reports from the slave units 10-1 to 10-m such that the data transfer rate is utilized with 100% efficiency, so high throughput can be obtained even under complex conditions created by greater burst traffic or an increased number of slave units. The maximum value k (bits) of the enabling amounts is set such that the following relation is satisfied:

$$k \leq (r \times td) \div (\alpha \times m),$$

where m is the total number of slave units (m is an integer), $\alpha$ is the proportion of currently active slave units ($0 < \alpha \leq 1.0$), r (b/s) is the data transfer rate, and td (s) is the delay time allowed for data transmission and determined by the system. The slave units 10-1 to 10-m can therefore have exclusive use of the upstream transmission line and continuously transmit large information signals at no more than the enabling amounts indicated by the master unit 20 in sequence from signals whose service classes have high priority during the transmission of signals whose maximum size is measured in k (bits). Another feature is that when an enabling amount is determined on the basis of the above equation, a time of td seconds is necessary for the transmission if all the slave units 10-1 to 10-m transmit k (bit) signals, making it possible to secure an allowed delay time td for the transmission of data by all the slave units 10-1 to 10-m. All the slave units 10-1 to 10-m can invariably transmit their signals within the allowed delay time of td seconds, making it possible to ensure access fairness and to yield the delay time allowed for data transmission.

Figure 78:
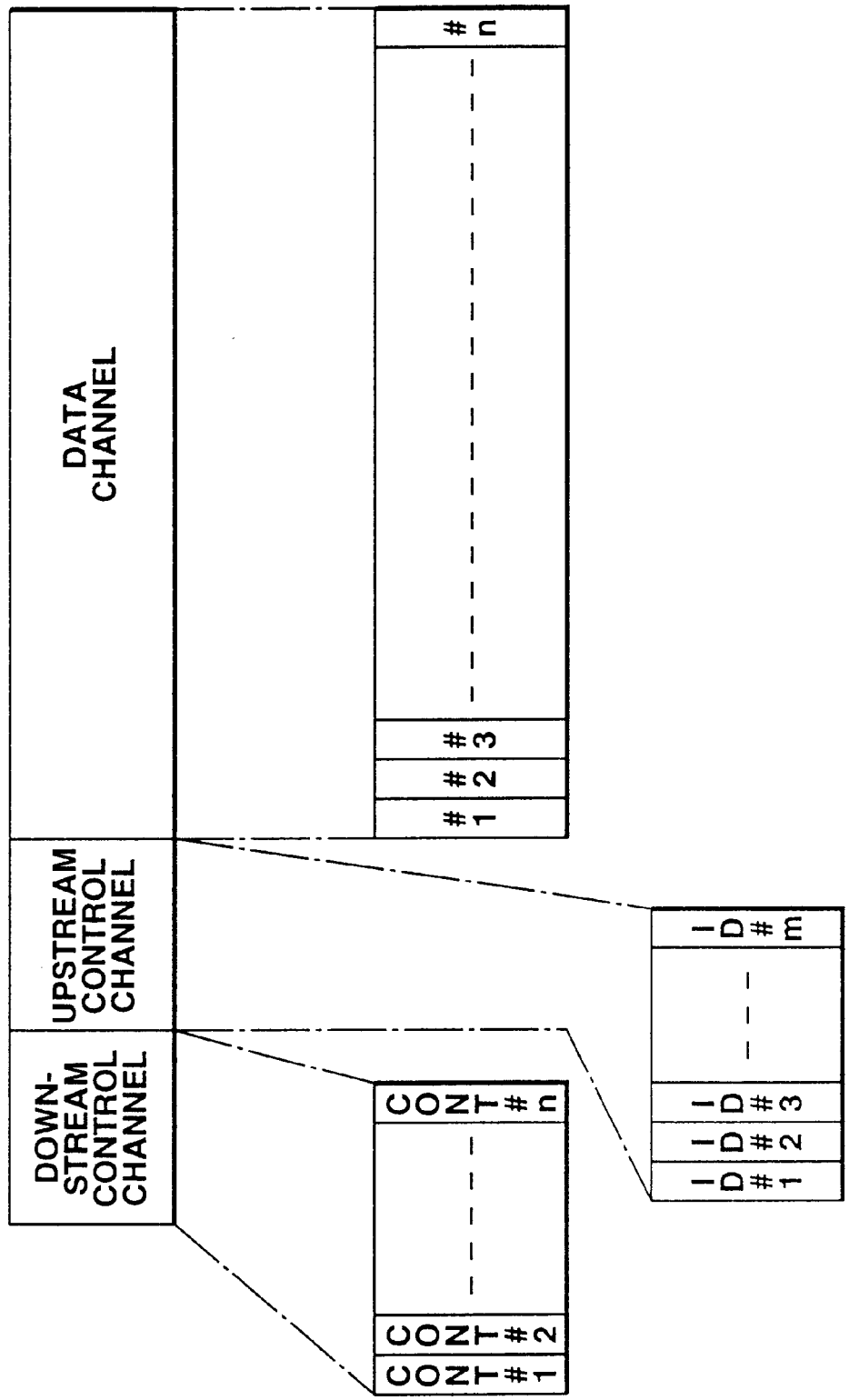
FIG. 78 is a frame block diagram depicting the transmission frames adopted in a thirteenth embodiment aspect of the present invention.
Figure 79:
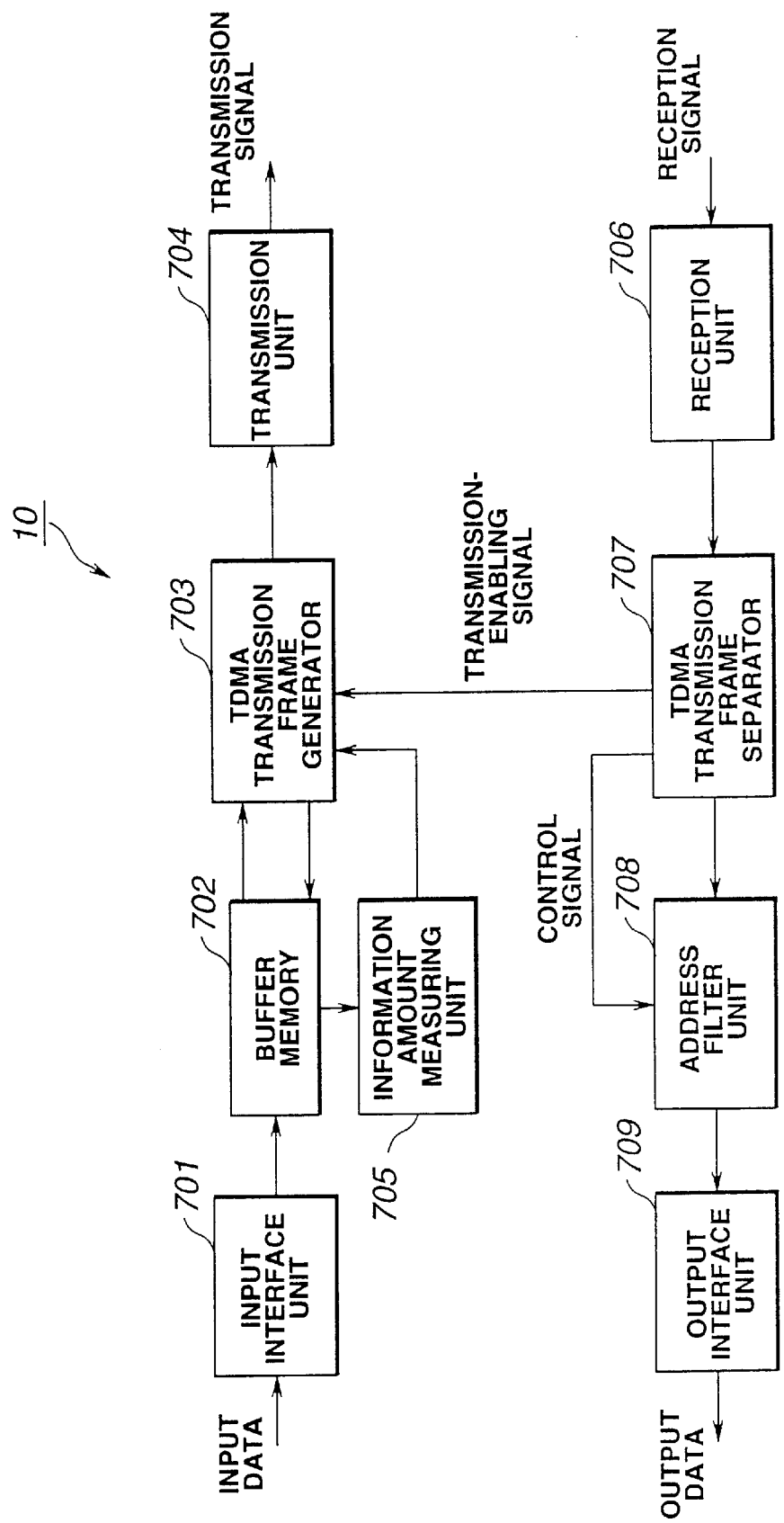
FIG. 79 is a block diagram depicting the structure of a slave unit adopted in the thirteenth embodiment aspect of the present invention.
Figure 80:
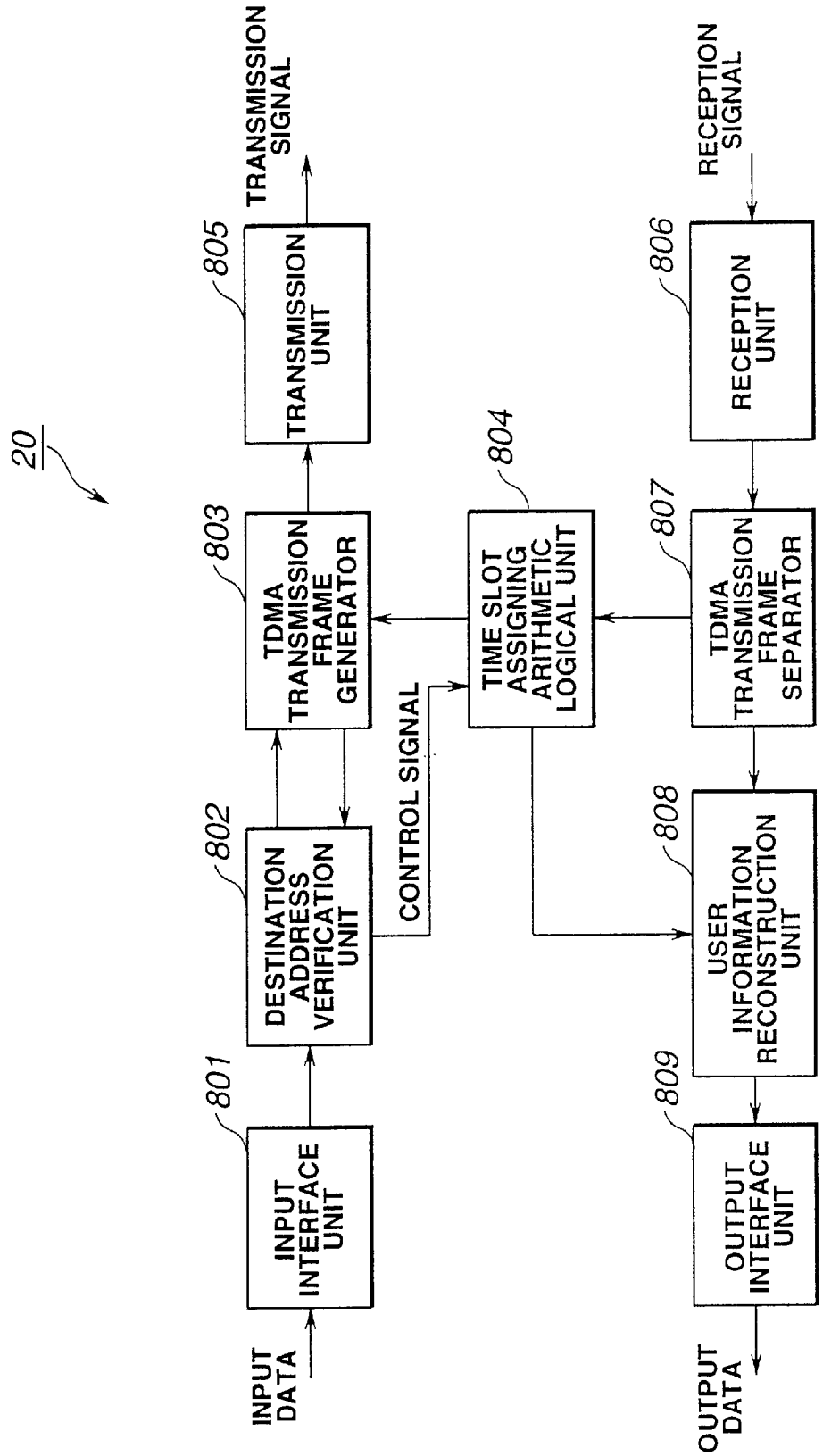
FIG. 80 is a block diagram depicting the structure of the master unit adopted in the thirteenth embodiment aspect of the present invention.

FIG. 78 is a diagram depicting the transmission frames adopted in a thirteenth embodiment aspect of the present invention, FIG. 79 is a diagram depicting the structure of a slave unit, and FIG. 80 is a diagram depicting the structure of the master unit.

In FIG. 78, the transmission frames adopted in the thirteenth embodiment aspect employ a time-division duplex (TDD) transmission protocol, and the following two types of signals are transmitted by being allocated unique time slots: downstream signals from the master unit 20 to the slave units 10-1 to 10-m, and upstream signals from the slave units 10-1 to 10-m to the master unit 20.

Specifically, a transmission frame is divided between a control channel and a data channel, with the front portion serving as the control channel.

Furthermore, the front portion of the control channel is used as a control channel for the downstream direction (the direction from the master unit 20 to the slave units 10-1 to 10-m; hereinafter referred to as "the downstream direction"), and the back portion is used as a control channel for the upstream direction (the direction from the slave units 10-1 to 10-m to the master unit 20; hereinafter referred to as "the upstream direction").

The control channel is assigned time slot numbers from #1 to #n. These time slots are adaptively distributed by the master unit 20 between the upstream direction and the downstream direction.

The number of bytes of information constituting a single time slot is determined depending on the system. For example, time slots containing 53 bytes of information are preferred for transferring data in an ATM (asynchronous transfer mode). Any other number of bytes does not pose any problems as long as the length is fixed.

A certain guard time is needed, considering that there are cases in which upstream signal time slots follow downstream signal time slots, or cases in which upstream time slots continuously arrive from various slave units 10-1 to 10-m. Reducing the number of bytes of information in a single time slot yields lower efficiency because of the resulting overhead.

The configuration information of a data channel is entered into the downstream control channel shown in FIG. 78. The time slots of the data channel are assigned numbers from #1 to #n, and the downstream control channel is provided with time slots whose amount corresponds to the quantity of time slot numbers in the data channel.

An identifier for specifying whether the time slot #j in the data channel is an upstream or downstream slot is first entered into the No. j slot (CONT #j; j=1, . . . , n) of the downstream control channel. Addresses indicating the slave units 10-1 to 10-m are then entered in the case of downstream data, and transmission-enabling addresses are entered in the case of upstream data.

The upstream control channel shown in FIG. 78 contains the amount of data and other parameters stored in the data buffer memories of the slave units 10-1 to 10-m. The number of time slots in the upstream control channel is not limited to the number of slave units 10-1 to 10-m. The arrangement may also comprise a plurality of transmission frames if the number of slave units 10-1 to 10-m exceeds the number of time slots.

Transmission frames were described here as one possible embodiment, but the transmission frames are not limited to the embodiment described herein. It is, for example, possible to transmit signals along different transmission lines or within different frequency bands upstream and downstream. In such cases, the downstream transmission frame comprises a downstream control channel and a downstream data channel, and the upstream transmission frame comprises an upstream control channel and an upstream data channel. In such cases, downstream signals are continuous frames (or TDM), and upstream signals are burst signals (or TDMA).

The main point here is that the time slots of the upstream control channel are preset, and the master unit 20 is configured such that the control information from the slave units 10-1 to 10-m (that is, the storage amounts of data or the like) can be traced to the specific slave unit 10-1 to 10-m that has sent this information.

In FIG. 79, data signals from a terminal unit connected to a slave unit 10 are stored in a buffer memory 702 via an input interface unit 701.

The data stored in the buffer memory 702 is read in accordance with memory read signals that are output by a TDMA transmission frame generator 703.

The data thus read is entered by the TDMA transmission frame generator 703 into the time slots of the data channel specified by the master unit 20, in accordance with the numbers of the time slots thus specified.

In a transmission unit 204, the signals from the TDMA transmission frame generator 703 are converted into signals to be transmitted along a transmission line.

In addition, the information amount stored in the buffer memory 702 is measured by an information amount measuring Eunit 705. Here, the difference between the read address and the write address for the buffer memory 702 is calculated, and the absolute value of the amount of stored data is measured. Both an absolute value and a differential value may also be calculated. The stored information amount thus measured is entered into specific time slots in the upstream control channel of the transmission frame in the TDMAA transmission frame generator 703.

Meanwhile, downstream signals from the master unit 20 are first received by a reception unit 706 and are then divided among control channels and data channels by a TDMA transmission frame separator 707.

In the TDMA transmission frame separator 707, control channels provided with downstream data identifiers are first extracted from among the identifiers that indicate whether the data in the downstream control channels is upstream data or downstream data, and the result is output as a control signal to an address filter unit 708.

In the address filter unit 708, only the time slots that pertain to the slave unit addresses corresponding to the addresses in question are extracted from the data channels on the basis of the aforementioned control signal.

The data signals extracted by the address filter unit 708 are output to a terminal unit via an output interface unit 709.

Another feature is that in the TDMA transmission frame separator 707, pertinent time slot numbers are transmitted as transmission-enabling signals to the TDMA transmission frame generator 703 if the addresses in question are among the identifiers for indicating upstream data in the downstream control channels.

A memory read signal is output to the buffer memory 702 when the time slot numbers arrive at the TDMA transmission frame generator 703. Data is read from the buffer memory 702, converted to transmission frame form, and output to the transmission unit 704.

In FIG. 80, the master unit 20 is connected to a backbone network unit, and data signals that are output from this backbone network unit are first transmitted and terminated by an input interface unit 801, and are then correlated by a destination address verification unit 802 with data signal addresses and physical slave unit addresses. In the case of data composed of IP (Internet Protocol) frames, for example, a map is provided for correlating IP frame addresses and slave unit addresses, and the slave unit address is derived in accordance with this match.

The destination address verification unit 802 outputs control signals having slave unit addresses in accordance with the match, and outputs data signals to a TDMA transmission frame generator 803. In the TDMA transmission frame generator 803, transmission frames are written to downstream control channels in accordance with signals from a time slot assigning arithmetic logical unit 804, downstream data signals are written to the time slots of the corresponding data channels, and the result is output to a transmission unit 805. Signals to be transmitted to slave unit 10 are output via the transmission unit 805.

Meanwhile, upstream signals from slave units 10 are input to a TDMA transmission frame separator 807 via a reception unit 806. In the TDMA transmission frame separator 807, the information amount stored in the buffer memory of each slave unit 10 is first detected by the upstream control channel. Here, the slave units #1 to #m about to transmit information signals to the master unit 20 provide the master unit 20 with a report regarding the storage amounts Ri of the information signals thus stored. Here, i indicates an individual slave unit 10, and i=1, 2, ..., m, where m is the total number of slave units (m is an integer).

Upon receipt of the reports from the slave units 10, the master unit 20 calculates, based on the storage amounts Ri thus reported, the information amount Ni that allows each slave unit 10 to transmit signals at no more than a specific maximum value K (bits). Here, the specific maximum value K is set such that the relation expressed by Eq. (1) above is satisfied.

The master unit 10 calculates the information amount Ni and, based on the information amount Ni, calculates the information amount ni that can be allocated in the course of a frame period. The information amount ni allows the time slots of upstream data to be continuously allocated, and the slave unit addresses of the corresponding downstream control channels to be written to the time slot numbers thus allocated. Here, the reason that ni is determined separately from Ni is that when the information amount Ni thus calculated exceeds the data transfer rate transmittable with a single frame, the control channel is straddled in relation to a slave unit i, and the information amount Ni is output from the slave units 10 by the head section of the subsequent data channel. Here, the operation whereby the slave units 10 are allowed to transmit signals (that is, the operation whereby time slots of upstream data are assigned) on the basis of the information amount supplied by the slave units 10 is performed by the time slot assigning arithmetic logical unit 804.

The time slot assigning arithmetic logical unit 804 also assigns the upstream and downstream time slots of the data channels in a transmission frame. Here, the following method can be suggested as an example of an algorithm to be executed: priority is given to the downstream data from the backbone network, and the data is assigned to upstream time slots in the destination address verification unit 802 if no downstream information is available.

It is also possible to suggest a method in which downstream time slot regions and upstream time slot regions are assigned in advance fixedly or semi-fixedly. Another apparent suggestion is the preferential allocation of upstream time slots. In the time slots of an upstream data channel, data is entered into the portions to which the time slots have been assigned by the master unit 20. Consequently, the corresponding slave unit addresses can be identified in a user information reconstruction unit 808 on the basis of the signals from the time slot assigning arithmetic logical unit 804. IP frames, for example, are transmitted after being divided among a plurality of time slots, and can thus be reconstructed here to a single IP frame. This data is input to the backbone network unit via an output interface 809.

It should be particularly stressed with regard to the thirteenth embodiment aspect that the upstream signals from slave units 10 are transmitted as continuous time slots to the master unit 20, and that the condition $Ri \leq k$ yields the following equation $$Tt = \sum_{i=1}^{\alpha*m} (Ri/r) \leq (k*\alpha*m)/r = td$$

where Tt is the transfer delay time of upstream data. This limits the upstream transfer delay-time of data by a specific time td. Specifically, transfer can be achieved at a delay time that does not exceed td even when the upstream traffic load from the terminal unit connected to a slave unit 10 is 100%. Not only does this satisfy QOS, but fairness among the slave units is also achieved.

In addition, continuous provision of time slots allows the average transfer delay time tda to satisfy the condition $tda \leq td/2$ (when $\alpha*m$ is sufficiently great)

This indicates that the average transfer delay time can be reduced by continuously allocating time slots to the same slave unit.

It was assumed with respect to the thirteenth embodiment aspect that the positions of the time slots for the upstream information signals and downstream information signals in a data channel were established by control from the master unit.

Guard time must be provided, however, between the time slots of upstream information signals and the time slots of downstream information signals. When the distance between the master unit 40 and a plurality of slave units 10 varies, the minimum required guard time is a round-trip delay time corresponding to the magnitude of the distance variation.

The time slots of upstream information signals and downstream information signals may therefore be separated in advance, and a guard time be provided between them. In this case, delay time compensation can be achieved for the absolute value of the propagation delay time between the master unit 20 and the slave units 10.

To achieve this, it may be suggested, for example, that the round-trip propagation time from the master unit 20 to the slave units 10 be measured, and appropriate delay specified for the instructions from the master unit 20 to the slave units 10.

Rather than using a TDD protocol, in which upstream and downstream multiplexing is achieved temporally, it is possible to use different transmission lines, which involves employing different lines, optical wavelength division multiplexing, or the like in the case of a landline, and different frequency bands in the case of a wireless line. In such cases, a downstream data channel is entered subsequent to a downstream control channel, and signals are continuously directed toward the slave units. In the upstream direction, upstream burst data channels can be transmitted to the slave units following transmission of upstream control channels.

A fourteenth embodiment aspect of the present invention will now be described.

In the fourteenth embodiment aspect, a circuit-switching guaranteed service is added to the best effort service provided in the thirteenth embodiment aspect.

Figure 81:
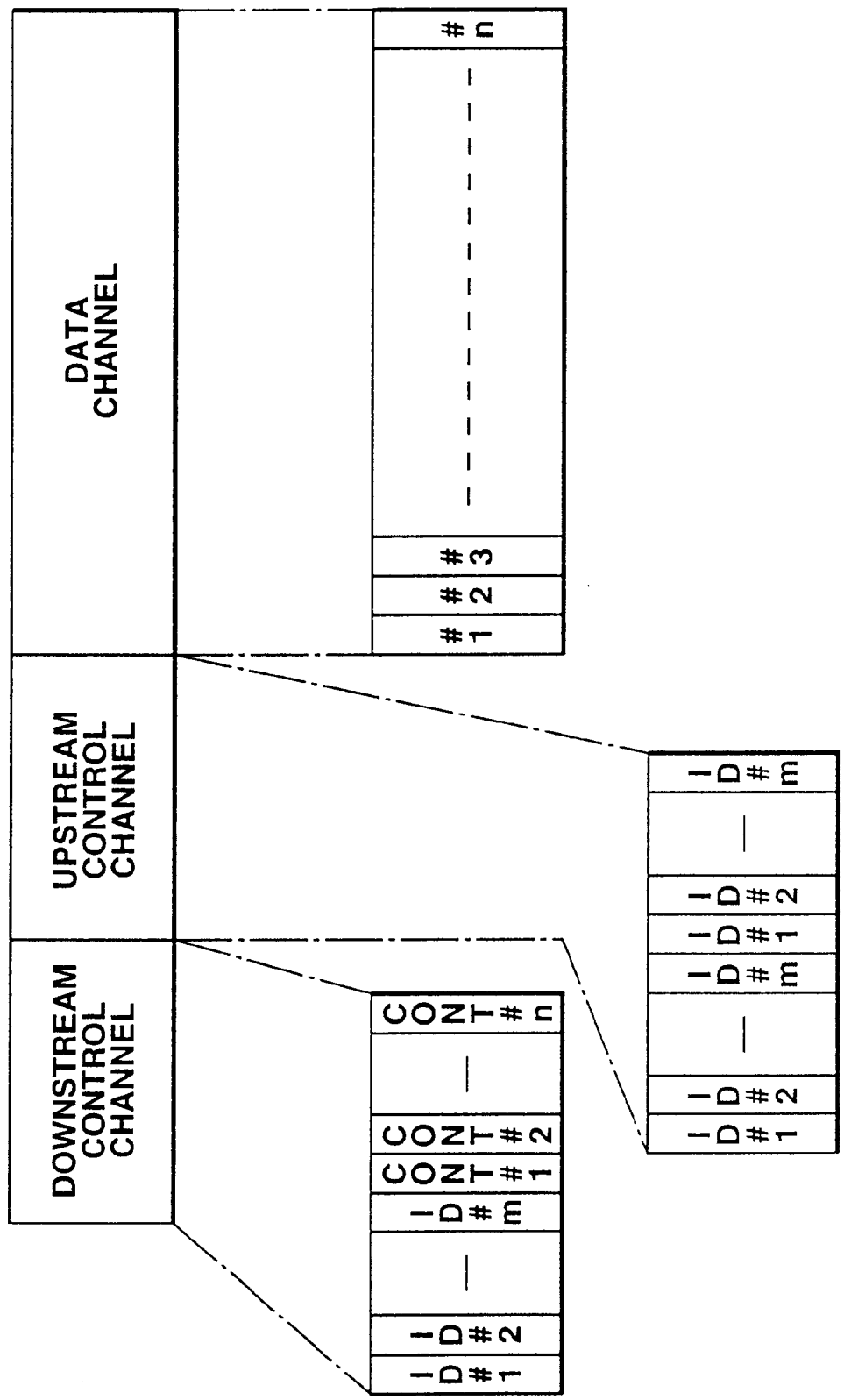
FIG. 81 is a frame block diagram depicting the transmission frames adopted for a fourteenth embodiment aspect of the present invention.

FIG. 81 is a diagram depicting the transmission frames adopted for the fourteenth embodiment aspect.

In FIG. 81, the portion obtained by general classification into a downstream control channel, upstream control channel, and data channel is the same as in the thirteenth embodiment aspect. However, the downstream control channel is supplemented with a downstream control channel used for a guaranteed service, and the upstream control channel is supplemented with a guaranteed-service control channel.

The downstream control channel for a guaranteed service is used for the purpose of performing circuit control aimed at providing a data channel. Specifically, this channel is used to exchange circuit request signals from slave units 10, corresponding ACK/NACK signals from the master unit 20, circuit disconnect requests, corresponding ACKACK signals, and the like.

An actual data channel for a guaranteed service can be created using the time-slot control portion of the downstream control channel. A data channel broken up with n time slots is indicated, including upstream and downstream data. This portion is the same as in the thirteenth embodiment aspect.

Figure 82:
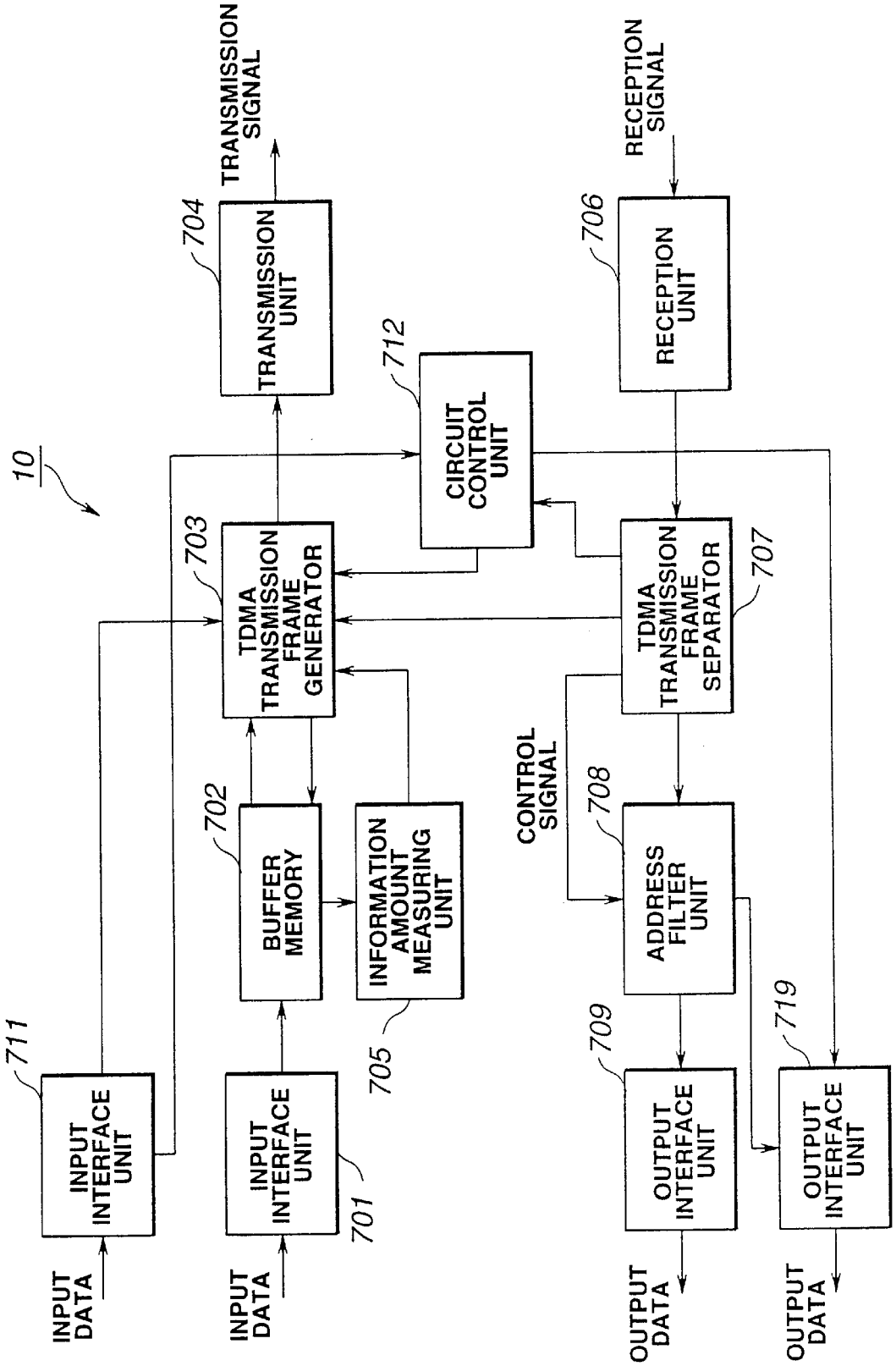
FIG. 82 is a block diagram depicting the structure of a slave unit adopted for the fourteenth embodiment aspect of the present invention.

FIG. 82 depicts the structure of a slave unit 10 adopted for the fourteenth embodiment aspect. Here, the portion associated with the best-effort service is the same as in the thirteenth embodiment aspect.

With guaranteed service, guaranteed-service input data from a terminal unit is first terminated at an input interface unit 711. The input interface unit 711 informs a circuit control unit 712 of a circuit setup request in accordance with a circuit setup request from the terminal unit. In the. circuit control unit 712, the circuit setup request is sensed, and a signal indicating that a request is in progress is returned to the terminal unit via the output interface unit 711 of the guaranteed service. In the input interface unit 711, the circuit setup request is output to the circuit control unit 712, and the circuit control unit 712 sends out a circuit setup request for a TDMA transmission frame generator 703.

In the TDMA transmission frame generator 703, the circuit setup request is written to the local-station ID number time slots corresponding to the upstream control channel guaranteed service of the transmission frame, and a signal is transmitted to the master unit.

In the TDMA transmission frame separator 707, meanwhile, an ACK/NACK signal from the master unit 20 is dropped into the local-station ID number time slots of guaranteed service for the downstream control channel, and the result is output to the circuit control unit 712.

If ACK has been returned, a channel setup request signal is output by the circuit control unit 712. If NACK has returned, a busy signal is output by the circuit control unit 712 toward an output interface unit 719.

After the ACK has returned and the channel setup request signal has been output to the master unit 20, an upstream signal flag of the guaranteed service is written to the time slot control section of the downstream control channel, and a local station ID is written to the corresponding time slot number. This is done together with a circuit setup confirmation notification from the master unit 20.

In the slave unit 10, data from the input interface unit 711 of the guaranteed service is transmitted according to the aforementioned flag and ID. With the downstream signals of the guaranteed service, the service type and upstream-downstream differences are identified by the time slot control of the downstream control channel. This identification is performed by an address filter/service separator 708. In the case of guaranteed service, the results are divided by the output interface unit 719 of the guaranteed service.

A circuit disconnect procedure is performed using a control channel in the same manner as for the above-described circuit setup. There is also a circuit setup procedure from the master unit 20. This circuit setup procedure is based on signaling from the backbone network. From the master unit 20, a circuit setup signal flows into a local-station ID time slot in the guaranteed service region of the downstream control channel. Upon receipt of this signal, the circuit control unit 712 outputs a connection request to a terminal unit via the output interface unit 719. The terminal unit that has received this signal commonly returns a response signal, and this response signal is returned to the circuit control unit 712 via the input interface unit 711.

In the circuit control unit 712, this is used as an ACK signal, and this ACK signal is output to the time slot of the local station ID corresponding to the guaranteed service region of the upstream control channel. An NACK signal is output in the circuit control unit 712 in the absence of a response from the terminal unit.

A flag indicating that the service is a guaranteed service, and a flag specifying whether the signal data is of an upstream or downstream nature are subsequently displayed by the master unit 20 in the time slot control region of the downstream control channel.

With the time slot numbers of a data channel, downstream signals are assigned by the master unit 20 in sequence from the lower numbers of vacant time slots. Upstream signals are assigned to subsequent time slot numbers. The slave units 10 output upstream data to the master unit according to the upstream-assigned time slot numbers. The circuit disconnect procedure is performed using control channels.

Figure 83:
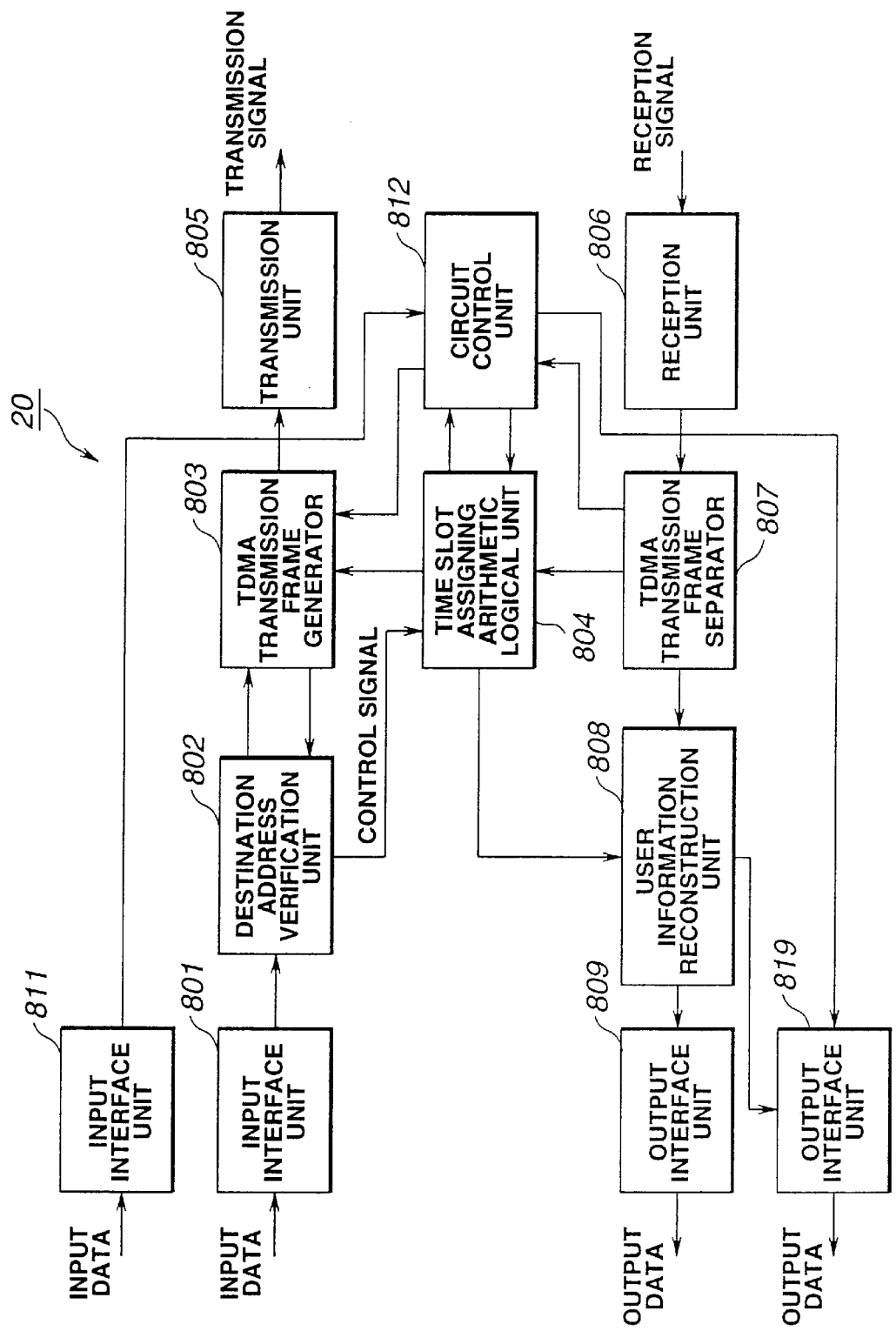
FIG. 83 is a block diagram depicting the structure of the master unit adopted for the fourteenth embodiment aspect of the present invention.

FIG. 83 depicts the structure of the master unit adopted for the fourteenth embodiment aspect. In this case as well, a guaranteed service will be described because a best effort service has already been described with reference to the thirteenth embodiment aspect.

With guaranteed service, the equipment connected on the backbone network side is primarily a switching system.

Data from the switching system is input to the input interface unit 811 of the guaranteed service. Signaling information, which is information concerning connection objects, is separated by the input interface unit 811 and input to a circuit control unit 812.

In the circuit control unit 812, a circuit setup signal is output toward a slave unit 10 via the TDMA transmission frame generator 803 using the time slots of a slave unit ID corresponding to the guaranteed service region of a downstream control channel.

In accordance with this signal, ACK/NACK are repeatedly directed by time slots from the corresponding slave unit 10 to the ID of the corresponding slave unit in the guaranteed service region of the upstream control channel. If NACK has returned, a busy signal is returned from the circuit control unit 812 to the switching system via an output interface unit 819.

If ACK has returned, a downstream signal flag, a slave unit ID, and a flag for identifying the type of guaranteed service are written together with a circuit setup completion signal in sequence from the lower number of the time slots not used for the time slot control region of the downstream control channel, and the result is output to the TDMA transmission frame generator 803. Data is written at the same time to the region accommodating the time slot numbers of the data channel described above, and the result is output toward a slave unit 10.

In the circuit control unit 812, an upstream data channel is assigned at the same time to the subsequent time slots of the downstream data channel. The designated slave unit 10 sends data according to the upstream transmission-enabling signals in the time slot control region of the control channel.

This data is separated by the user information reconstruction unit 808 in accordance with signals from the time slot assigning arithmetic logical unit 804, and is output to the switching system via an output interface unit 819. Multiplexing is performed in this case in accordance with the multiplexing format of a preset switching system interface.

The above-described sequence is a circuit setup sequence performed on the backbone side for a single slave unit 10. This sequence is simultaneously set for a plurality of slave units. The setting procedure does not pose any problems in terms of control channel because different time slots have been pre-assigned.

In the circuit control unit 812, earlier numbers of data channel time slots are assigned in sequence from the earlier instants of circuit setting. As circuits are broken, earlier time slot numbers are searched and assigned by the circuit control unit 812. Data can therefore be incorporated into best effort service areas by the time slot assigning arithmetic logical unit 804 if vacant time slots are created by the line being disconnected at specific instants. The circuit setting of the guaranteed service takes precedence, however, so the same treatment as that used for vacant circuits is performed by the circuit control unit 812 with respect to the time slot numbers used for the best effort service.

To set up a circuit from a slave unit 10, a circuit setup request is subsequently entered into the guaranteed service region of the upstream control channel. In the master unit 20, this request is input to the circuit control unit 812 via the TDMA transmission frame separator 807.

In the circuit control unit 812, it is checked whether a condition in which none of the time slots in the data channel are used for a guaranteed service is satisfied, and ACK or NACK is returned to the slave unit 10 using a guaranteed region of the downstream control channel.

If an ACK has been returned, a channel setup request signal is presented by a slave unit 10.

At this time, the master unit 20 sends a connection request to the backbone-side switching system via the circuit control unit 812 and the output interface unit 819. Where a connection completion notification has been issued by the switching system side via the input interface unit 811, a circuit setup confirmation notification is returned to the slave unit 10 by the circuit control unit 812 using the guaranteed service region or the downstream control channel.

At the same time, the ID number of the corresponding slave unit, an upstream/downstream identification flag, and a flag for indicating that the service is a guaranteed service are written to the vacant time slot numbers of the time slot control region in the downstream control channel. At this time, the time slot numbers are used in sequence from lower numbers of vacant time slots. In addition, subsequent time slot numbers are concurrently designated as the time slot numbers for upstream data. Furthermore, downstream data is concurrently written to the TDMA transmission frame generator 803 and is output toward the slave unit 10.

Here, the best effort service is treated the same way as vacant time slots when the time slots of data are assigned. The circuit disconnect procedure is also performed using upstream and downstream control channels.

The fourteenth embodiment aspect was described with reference to a case in which the time slots of a data channel were a mixed upstream/downstream type. When the distance from the master unit 20 to a plurality of slave units 10 varies, the minimum required guard time should be the round-trip delay time corresponding to the magnitude of the distance variation. The time slots of upstream information signals and downstream information signals may therefore be separated in advance, and a guard time be provided between them. In this case, delay time compensation can be achieved for the absolute value of the propagation delay time between the master unit 20 and the slave units 10.

To achieve this, it may be suggested, for example, that the round-trip propagation time from the master unit 20 to the slave units 10 be measured, and appropriate delay specified for the instructions from the master unit 20 to the slave units 10.

Rather than using a TDD protocol, in which upstream and downstream multiplexing is achieved temporally, it is possible to use different transmission lines, which involves employing different lines, optical wavelength division multiplexing, or the like in the case of a landline, and different frequency bands in the case of a wireless line. In such cases, a downstream data channel is entered subsequent to a downstream control channel, and signals are continuously directed toward the slave units. In the upstream direction, upstream burst data channels can be transmitted to the slave units following transmission of upstream control channels.

Thus, the thirteenth embodiment aspect is such that the master unit 20 allows slave units 10 to transmit information signals in accordance with the information amount reported by the slave units 10, making it possible to efficiently use the data transfer rate determined by the system and to ensure fairness for the upstream signals of the slave units 10. It is also possible to secure worst-case transfer delay time for the average time needed to transfer upstream data from the slave units to the master unit.

Another feature of the fourteenth embodiment aspect is that best effort transmission service can be delivered while circuit switching or another type of guaranteed service is performed according to demand assignment TDMA. In addition, the best effort service can have all the effects of the thirteenth embodiment aspect.

A fifteenth embodiment aspect of the present invention will now be described.

The point-to-multipoint communication system according to the fifteenth embodiment aspect of the present invention is configured such that variable-length packets can be transmitted flexibly and efficiently.

Specifically, the point-to-multipoint communication system according to the fifteenth embodiment aspect is such that the master unit 20 segments terminal-addressed input packets and attaches headers to create fixed-length cells.

Each header contains the addresses of slave units 10-1 to 10-m for use in the point-to-multipoint communication system and retrieved based on the terminal addresses contained in the input packets. Because the slave units 10-1 to 10-m operate such that data is retrieved only when the addresses contained in the aforementioned headers match the addresses of the local stations, the transfer rate in the downstream direction for each of the slave units 10-1 to 10-m can be varied in a simple manner using the master unit alone.

In addition, a short bit length is used and the transfer rate can be utilized efficiently because the addresses of the slave units 10-1 to 10-m used in each header are those that have significance solely inside a point-to-multipoint communication system.

Furthermore, the address architecture used in the point-to-multipoint communication system is hierarchized, and the addresses are set such that a subnet is used and the slave units 10-1 to 10-m constitute a single network within the entire point-to-multipoint communication system.

The structure of the master unit can thus be simplified because the subnet-identifying portion of a terminal address can be used directly as the address of a slave unit 10-1 to 10-m.

The same structure as the system structure shown in FIG. 1 can be adopted for the point-to-multipoint communication system of the fifteenth embodiment aspect.

Figure 84:
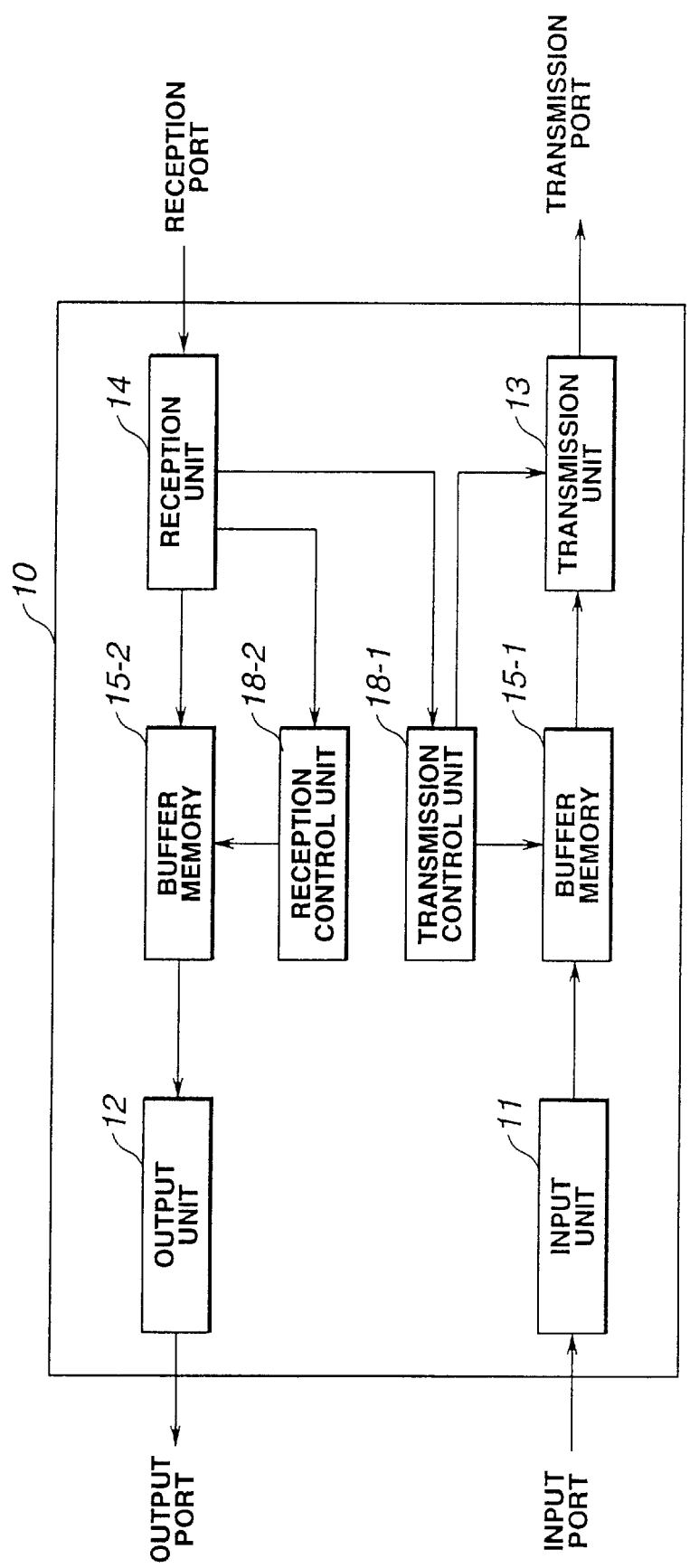
FIG. 84 is a block diagram depicting the structure of a slave unit adopted for a fifteenth embodiment aspect of the present invention.

FIG. 84 depicts the structure of a slave unit 10 (10-1 to 10-m) adopted for the point-to-multipoint communication system of the fifteenth embodiment aspect.

In FIG. 84, the slave unit 10 comprises an input unit 11 connected to an input port; an output unit 12 connected to an output port; a transmission unit 13 connected to a transmission port; a reception unit 14 connected to a reception port; a buffer memory 15-2 for temporarily storing information signals from the reception unit 14; a reception control unit 18-2 for reconstructing into packets the information signals stored in the buffer memory 15-2; a buffer memory 15-1 for temporarily storing the information signals from the input port that are input by means of the input unit 11; and a transmission control unit 18-1 for controlling, among other things, the division of the packets stored in the transmission buffer memory in accordance with the assignment of upstream transmission slots from the master unit 20.

Figure 85:
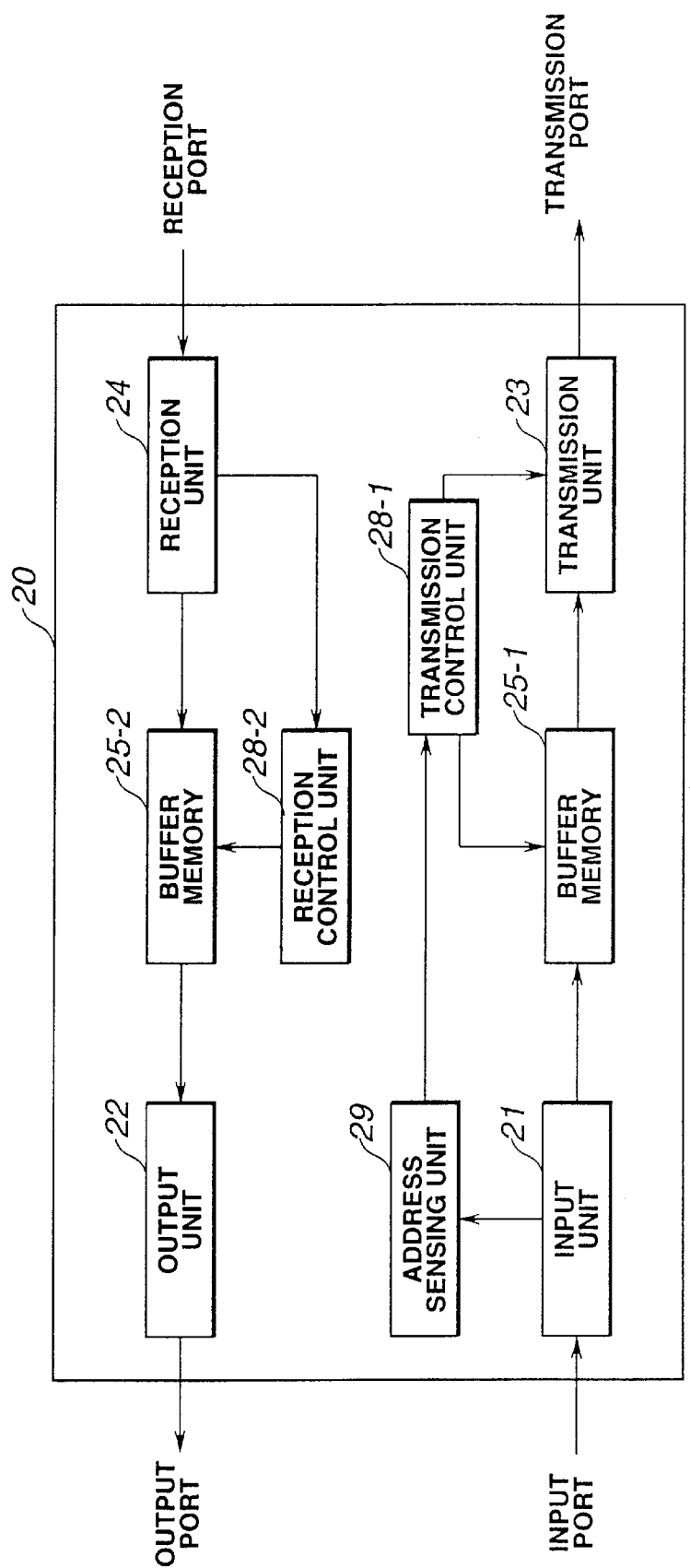
FIG. 85 is a block diagram depicting the structure of the master unit adopted for the fifteenth embodiment aspect of the present invention.

FIG. 85 is a block diagram depicting a detailed structure of the master unit 20 adopted for the fifteenth embodiment aspect.

In FIG. 85, the master unit 20 comprises an input unit 21 connected to an input port; an output unit 22 connected to an output port; a transmission unit 23 connected to a transmission port; a reception unit 24 connected to a reception port; a buffer memory 25-2 for temporarily storing information signals from the reception unit 24; a reception control unit 28-2 for reconstructing into packets the information signals stored in the buffer memory 25-2; a buffer memory 25-1 for temporarily storing the information signals from the input port that are input by means of the input unit 21; an address sensing unit 29 for searching out the address of the destination slave unit 10 from among the addresses of packets delivered from the input port and entered by means of the input unit 21; and a transmission control unit 28-1 for controlling, among other things, the division of the packets stored in the buffer memory 25-1 and adding the addresses of slave units 10 sensed by the address sensing unit 29.

The upstream and downstream transmission frames in the transmission line of the fifteenth embodiment aspect are configured as shown in FIG. 4. For the sake of convenience, the transfer rate, cell length, and frame format used here conform to the tentative guidelines G.983 in ITU-T SG15. It should be noted, however, that tentative guidelines G.983 specify using ATM cells per se as the cells being transmitted, whereas the cells used in the fifteenth embodiment aspect are obtained by segmenting input packets by the method described below. In addition, the transfer rate of the optical transmission line is 155.52 Mb/s both for the downstream transmission from the master unit 20 to the slave units 10-1 to 10-m and for the upstream transmission from the slave units 10-1 to 10-m to the master unit 20.

A downstream frame comprises 56 slots, and an upstream frame comprises 53 slots. Based on these transmission frames, 53 bytes and 56 bytes are exchanged downstream and upstream, respectively, in accordance with the TDM (Time Division Multiplex) multiplexing protocol in the case of the downstream transmission from the master unit 20 to the slave units 10-1 to 10-m, and in accordance with the TDMA (Time Division Multiple Access) multiplexing protocol in the case of the upstream transmission to the master unit 20 from the slave units 10-1 to 10-m.

An upstream cell contains a 3-byte overhead for burst transmission, and downstream transmission frames contain two PLOAM cells per frame in a ratio of one cell for every 28 cells. The initial PLOAM cell (PLOAML) has 27 grants for allowing upstream cell transmission from the slave units 10-1 to 10-m, and the second PLOAM cell (PLOAM2) has 26 grants, to a total of 53 grants. The grants of a PLOAM cell and the slots of an upstream transmission frame are related to each other as shown in FIG. 5.

The master unit 20 issues instructions as to which slave unit 10-1 to 10-m can transmit a cell to a particular slot inside an upstream transmission frame by performing a procedure whereby the ID numbers or other identifiers of slave units 10-1 to 10-m are written to the grants of the PLOAM cells shown in FIG. 5.

The slave units 10-1 to 10-m can transmit cells to those slots of the upstream transmission frame that correspond to the aforementioned grants when the identifiers of the slave units 10-1 to 10-m are written to the PLOAM cells. This method makes it possible to avoid cell collisions in the optical transmission line.

The fifteenth embodiment aspect is not limited to instruction methods involving upstream transmissions, and methods such as those described below may also be used as the upstream transmission methods.

One example is a method in which, in a frame structure in which there is a one-to-one correspondence between downstream slots and upstream slots, upstream transmissions are specified for each service class by providing each upstream slot corresponding to a downstream slot with the ID numbers of the slave units 10-1 to 10-m using these downstream slots, and with identifiers that specify these service classes.

Instructions regarding upstream transmissions can also be given by issuing notifications regarding the number of slots that allows signals to be continuously transmitted by specific slave units 10-1 to 10-m for specific service classes with the aid of downstream slots.

Figure 86:
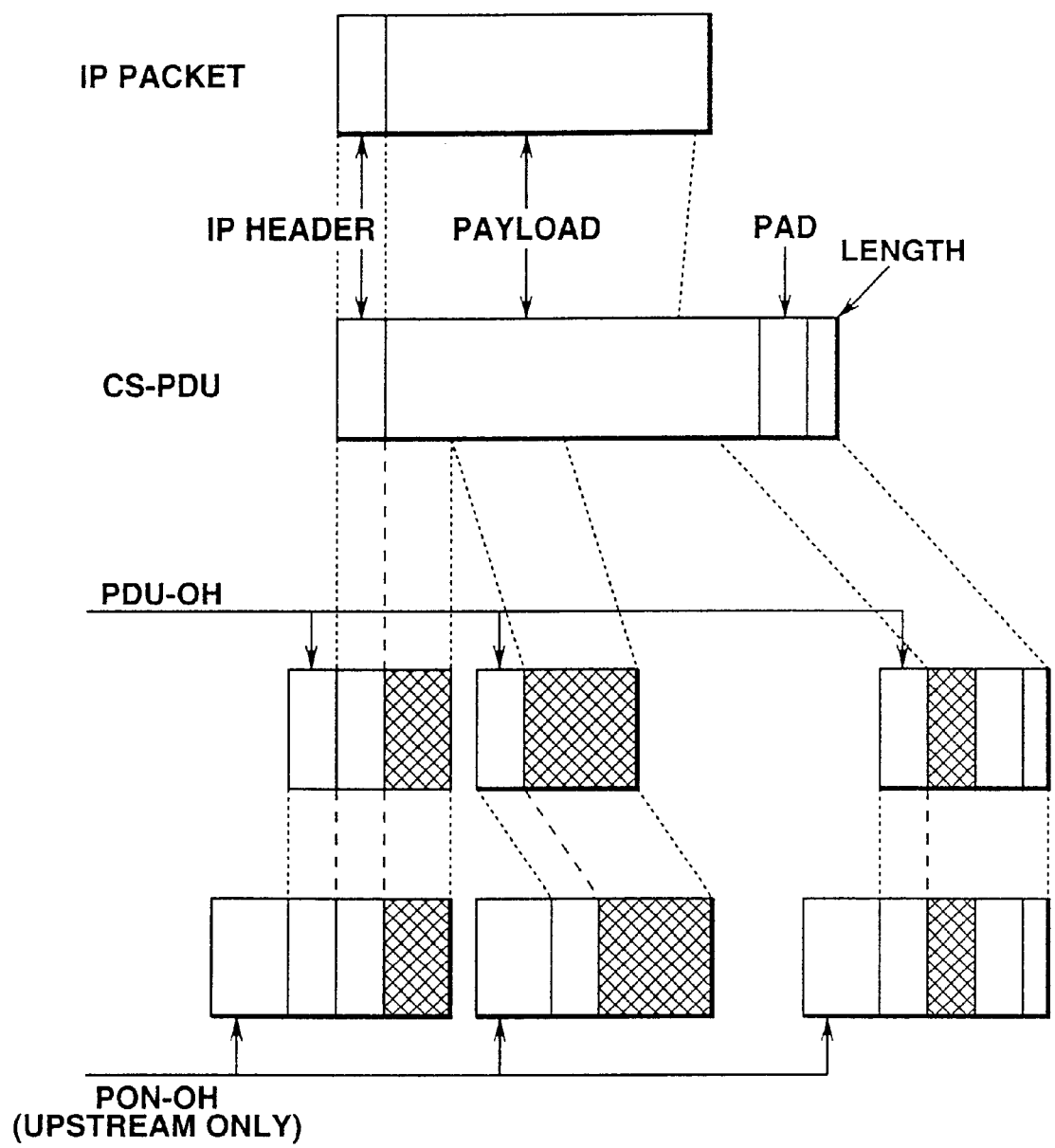
FIG. 86 is a diagram depicting packet segmenting and assembly for a case in which the input packets are IP packets in the fifteenth embodiment aspect of the present invention.

Packet segmenting and assembly for a case in which the input packets are IP packets are depicted in FIG. 86. In FIG. 86, PADs and length are first assigned to the input packets, yielding CS-PDUs with segmented data units. The PADs are provided in order to create redundancy during the separation of packets into fixed-length cells, and the number of segmented data units is an integral multiple of cell data length.

In addition, length is provided in order separate the data on the receiving side by indicating the actually used data length within the data region expanded by the PADs.

The segmented data units are then segmented into fixed-length cells, and headers are attached. In the case considered here, both the headers and the data accommodated by the cells have fixed length. On occasion, the headers may have variable length, and the length of the data accommodated by each cell may be varied in accordance with the header length, making it possible to maintain a fixed length for the cells as a whole.

Figure 87:
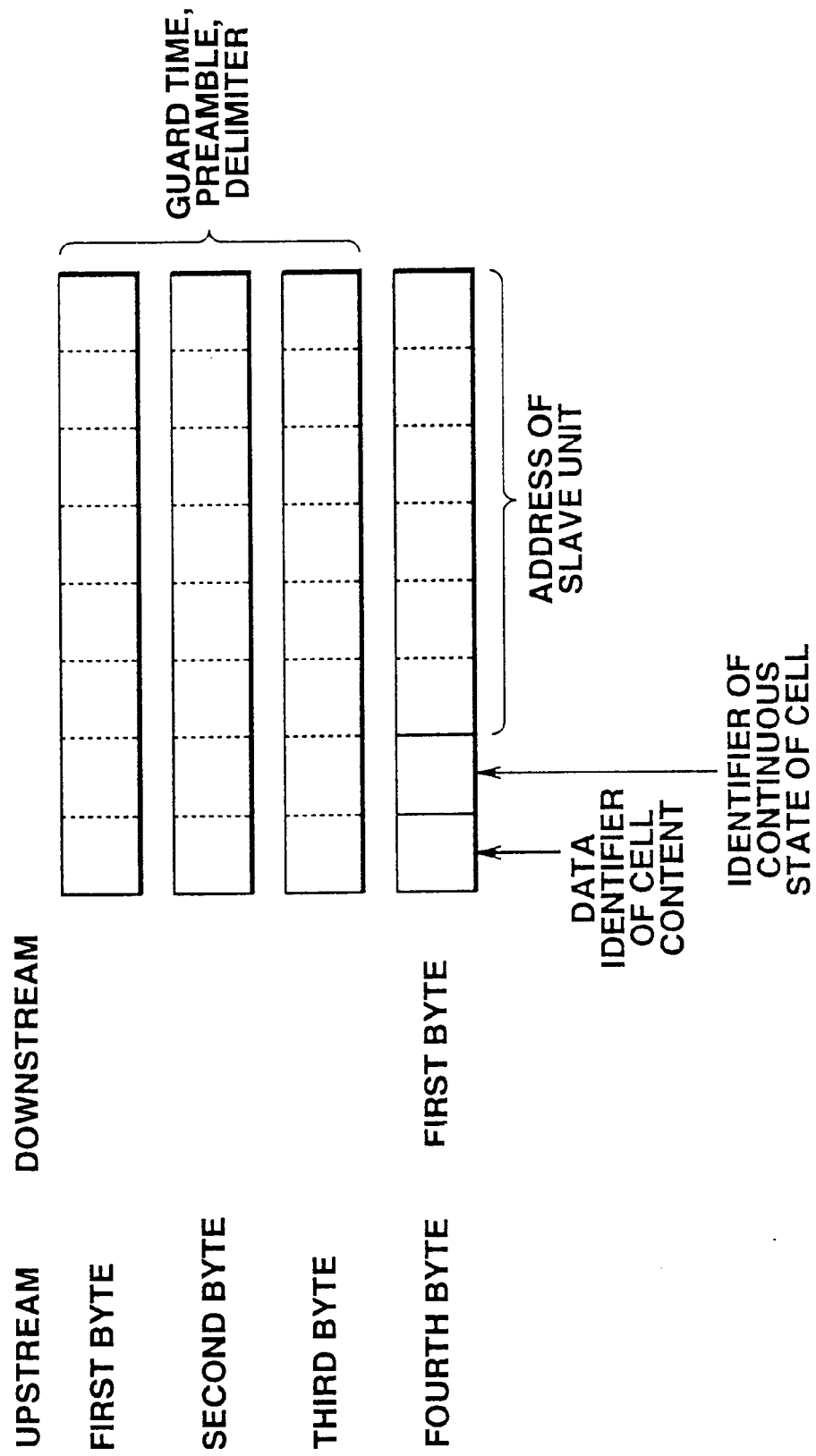
FIG. 87 is a diagram depicting the structure of the header in the fifteenth embodiment aspect of the present invention.

The structure of a header is shown in FIG. 87. The header shown here pertains to a case in which 64 slave units 10-1 to 10-m are connected to the master unit 20. The header typically becomes longer with an increase in the number of slave units 10-1 to 10-m.

Headers can be divided into passive optical network overheads (PON-OH), which are used in burst transmission applications and are required solely for upstream headers, and PDU-OH, which are payload headers and which are required for upstream and downstream headers. This is because downstream cells can be continuously transmitted from the master unit, dispensing with the need for the guard time, preambles, or delimiters described below.

A passive optical network overhead (PON-OH) comprises a guard time for preventing collisions among cells, a preamble for extracting clock signals, and a delimiter for separating the preamble and subsequent cells and ensuring byte synchronization. Furthermore, a PDU-OH (payload header) is composed of a single byte comprising addresses of the slave units 10-1 to 10-m, cell content identifiers, and identifiers of the continuous state of the cell.

The minimum number of addresses of the slave units 10-1 to 10-m must be equal to the number of the slave units 10-1 to 10-m. Six bits are assigned in the case under consideration. A cell content identifier indicates whether the data contained in a cell is significant data or invalid data. Invalid data is transmitted in cases in which the buffer memory 15-1 does not contain any data that is to be transmitted when an instruction to transmit has been issued by the master unit 20 to the slave units 10-1 to 10-m. The identifier of the continuous state of a cell is one that indicates that the segmented cell corresponds to the end data of the original packet or that the packet received can be accommodated by a single cell without being segmented.

Packet reconstruction is performed in reverse order in relation to the above-described packet segmenting and assembly. Specifically, cells addressed to a local station are temporarily stored in the buffer memory 15-2 or 25-2. In the case of the master unit 20, information is stored in the buffer memory 25-2 for each of the slave units 10-1 to 10-m that has sent out a cell. If it is detected based on a continuous state identifier that the received cell is a unit cell or the end data of an original packet, it is concluded that the entire original packet has been received, and this packet is therefore reconstructed. At this time, the data length of the original packet is identified on the basis of the length attached to the end of the final cell, and the PAD attached to the back is deleted and is output as a packet by the output unit 12 or 22.

Here, the header structure is the same for the upstream and downstream arrangements, as shown in FIG. 87. In the upstream direction, the addresses of the slave units 10-1 to 10-m can sometimes be dispensed with, however. When, for example, a plurality of master units 20 are provided using a redundancy configuration or the like, the addresses of these master units 20 are entered into the corresponding regions of upstream headers in order to identify these master units 20.

The addresses of slave units 10-1 to 10-m attached to the headers may have a short bit length because they have significance solely in a point-to-multipoint communication system. Correspondence between destination addresses and the addresses of the slave units 10-1 to 10-m allows the addresses of the terminals connected to the slave units 10-1 to 10-m in advance to be retained as tables for each of the slave units 10-1 to 10-m, to search for the tables by packet input, and to assign to headers the addresses of the slave units 10-1 to 10-m.

A simple method for detecting the addresses of slave units 10-1 to 10-m can be found by devising an optimum address assignment method. An example will be described herein. The description that follows refers to the use of IP packets as the aforementioned packets, but the fifteenth embodiment aspect is also applicable to the use of packets governed by other protocols.

32-bit IP addresses can commonly be divided into network addresses and host addresses, and classes A, B, and C are primarily used, depending on the length of each region. Recently, methods for specifying the length of a network address independently from conventional classification have come to be used.

Figure 88:
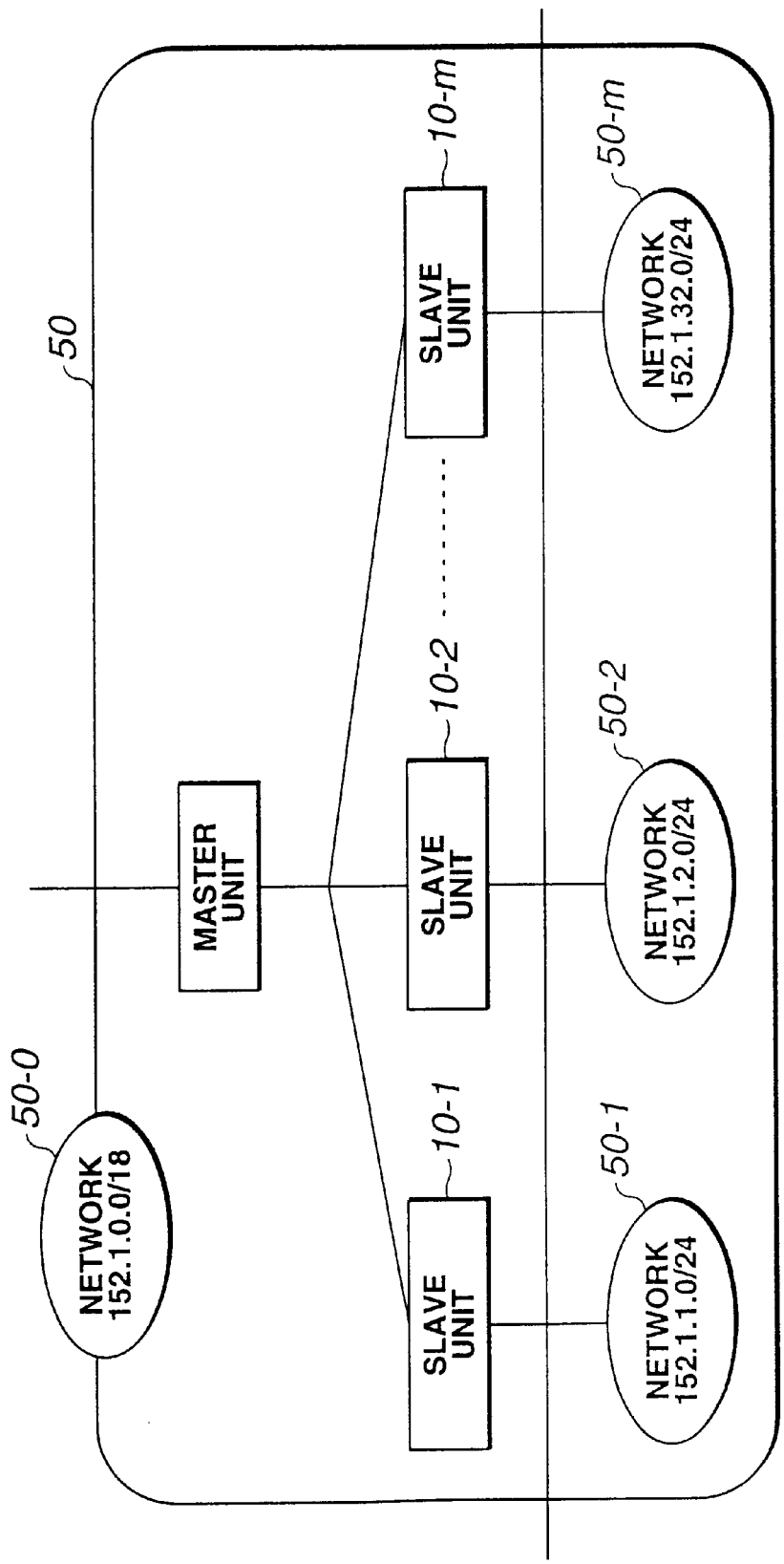
FIG. 88 is a diagram depicting an example of an IP address assignment in the fifteenth embodiment aspect of the present invention.

An example of an IP address assignment in the fifteenth embodiment aspect is shown in FIG. 88. The network address of the entire point-to-multipoint communication system of the fifteenth embodiment aspect may, for example, be set to <152.1.0.0/18>. As used herein, the numbers in quotation marks are numbers in decimal notation obtained by dividing the ordinarily binary-coded 32-bit addresses into 8-bit units.

In addition, "/18" indicates that the 18 bits of the MSB in an IP address are treated as a network address. Similarly, the network addresses connected to slave units 10-1 to 10-m are assumed to range from <152.1.10/24> to <152.1.32.0/24>.

Here, "/24" indicates that the upper 24 bits of an IP address are treated as a network address. It is assumed here that a single subnetwork is connected to each of the 32 slave units 10-1 to 10-m. If each of the slave units 10-1 to 10-m requires a plurality of network addresses, the IP addresses assigned to the slave units 10-1 to 10-m should be subnetworked using an even finer segmenting arrangement.

Allocating IP addresses in such a manner allows networks 50-1 to 50-m connected to the slave units 10-1 to 10-m to be treated as a plurality of networks connected to a single master unit 20.

In addition, six bits (from eighteenth to twenty-third) of a network address serve as an address for distinguishing among the subnetworks 50-1 to 50-m. Because the subnetworks 50-1 to 50-m are assigned to each slave unit 10-1 to 10-m, the addresses for distinguishing these subnetworks 50-1 to 50-m can be used as the addresses of the slave units 10-1 to 10-m.

Consequently, the lower bits of the network addresses of IP packages transmitted to the slave units 10-1 to 10-m can be directly used as the addresses of the slave units 10-1 to 10-m in the address detecting unit of the master unit 20 by means of such a hierarchical address allocation. Therefore, the search data for retrieve slave unit addresses from IP addresses can be dispensed with, and the master unit 20 can be configured as a simple structure.

INDUSTRIAL APPLICABILITY

The present invention provides a point-to-multipoint communication system in which a master unit and a plurality of slave units are connected by means of a transmission line, and point-to-multipoint communication is performed between the master unit and the plurality of slave units. When the slave units are about to transmit signals, these signals are temporarily stored, and the information amount of the stored signals is counted. The master unit instructs each slave unit to report its information amount. The slave units that have received these instructions from the master unit inform the master unit about the information amount according to the instructions. The master unit, upon receipt of the reports from the slave units, calculates enabling amounts that allow the slave units to transmit signals below a specific maximum value on the basis of the information amount thus reported, and instructs the slave units to transmit the signals on the basis of the enabling amounts thus calculated. Upon receipt of the instructions from the master unit, the slave units present the master unit with signals stored in accordance with the instructions. Furthermore, the master unit dynamically updates the period for giving the slave units instructions on reporting the information amount. A point-to-multipoint communication system capable of providing adequate communication can thus be constructed even when data signals on the order of several megabytes are transmitted in bursts.

What is claimed is:

1. A point-to-multipoint communication system, in which a master unit and a plurality of slave units are connected by means of a transmission line, and point-to-multipoint communication is performed between the master unit and the plurality of slave units, characterized in that:

the slave units each comprise information amount reporting means for presenting the master unit with reports regarding information amount necessary to transmit signals; and the master unit comprises calculation means for determining a maximum transmittable information amount of each currently active slave unit by allocating among the currently active slave units the maximum transmittable information amount that can be transmitted from the slave units to the master unit, calculating as a transmission-enabling information amount the information amount reported by the slave units if the information amount thus reported does not reach the maximum transmittable information amount, and calculating as the transmission-enabling information amount the maximum transmittable information amount if the information amount reported by the slave units exceeds the maximum transmittable information amount, and signal transmission instruction means for instructing each of the slave units to transmit signals on the basis of the transmission-enabling information amount calculated by the calculation means.

2. The point-to-multipoint communication system according to claim 1, characterized in that the information amount reporting means comprises:

data signal storage means for temporarily storing data signals transmitted to the master unit;

storage amount counting means for counting the storage amounts of the data signals stored in the data signal storage means; and storage amount reporting means whereby the storage amounts counted by the storage amount counting means are reported to the master unit as the information amount necessary for transmission of the signals.

3. The point-to-multipoint communication system according to claim 2, characterized in that the storage amount counting means comprises:

absolute value counting means whereby the storage amounts of data signals stored in the data signal storage means are counted as absolute values; and the storage amount reporting means provides the master unit with reports regarding the absolute values of the storage amounts of data signals counted by the absolute value counting means.

4. The point-to-multipoint communication system according to claim 2, characterized in that the storage amount counting means comprises:
   differential value counting means whereby the storage amounts of data signals stored in the data signal storage means are counted as differential values obtained based on a previous report; and
   the storage amount reporting means provides the master unit with reports regarding the absolute values of the storage amounts of data signals counted by the absolute value counting means.

5. The point-to-multipoint communication system according to claim 2, characterized in that the storage amount counting means comprises absolute value counting means whereby the storage amounts of data signals stored by the data signal storage means are counted as absolute values, and differential value counting means whereby the storage amounts of data signals stored in the data signal storage means are counted as differential values obtained based on a previous report; and
   the storage amount reporting means provides the master unit with reports regarding the absolute values of the storage amounts of data signals counted by the absolute value counting means, and the absolute values of the storage amounts of data signals counted by the differential value counting means.

6. The point-to-multipoint communication system according to claim 1, characterized in that an overall transmittable information amount that can be transmitted from the slave units to the master unit is calculated based on an allowed delay time and the rate of transmission from the slave units to the master unit.

7. The point-to-multipoint communication system according to claim 1, characterized in that the maximum transmittal information amount is calculated by equally allocating an overall transmittable information amount among currently active slave units.

8. The point-to-multipoint communication system according to claim 1, characterized in that the maximum transmittable information amount is calculated by individually allocating an overall transmittable information amount among currently active slave units.

9. The point-to-multipoint communication system according to claim 1, characterized in that the signal transmission instruction means continuously instructs the slave units to transmit signals at no more than the transmission-enabling information amount calculated by the calculation means.

10. The point-to-multipoint communication according to claim 1, characterized in that the information amount reporting means reports the information amount necessary to transmit the signals for each service class to the master unit; and
    the calculation means calculates for each service class the overall transmittable information amount that can be transmitted from the slave units to the master unit on the basis of the allowed delay time and the rate of transfer from the slave units to the master unit for each of the service classes, calculates the reported storage amounts as the transmission-enabling information amount for each of the service classes when the storage amounts reported by the slave units for each of the service classes are less than the maximum transmittable information amount for each of the service classes, and calculates the maximum transmittable information amount as the transmission-enabling information amount for each of the service classes when the storage amounts reported by the slave units for each of the service classes exceeds the maximum transmittable information amount.

11. The point-to-multipoint communication system according to claim 1, characterized in that the master unit further comprises information amount report instruction means for instructing the slave units to issue reports regarding the information amount necessary to transmit the signals; and
    the information amount reporting means presents the master unit with reports regarding the information amount necessary to transmit the signals in accordance with the instructions from the information amount report instruction means.

12. The point-to-multipoint communication system according to claim 11, characterized in that the information amount report instruction means comprises information amount report period setting means for setting the period with which the slave units are instructed to report the information amount; and
    the slave units are instructed to issue reports regarding the information amount necessary to transmit the signals with the period that is set by the information amount report period setting means.

13. The point-to-multipoint communication system according to claim 12, characterized in that the information amount report period setting means sets the period with which the information amount is to be reported by the slave units on the basis of the counted value of the information amount reported by the information amount reporting means.

14. The point-to-multipoint communication system according to claim 12, characterized in that the master unit further comprises transmission line monitoring means for monitoring the load state of the transmission line; and
    the information amount report period setting means sets the period with which the slave units are instructed to report the information amount on the basis of the load state of the transmission line monitored by the transmission line monitoring means.

15. A point-to-multipoint communication system, in which a master unit and a plurality of slave units are connected by means of a transmission line, and point-to-multipoint communication is performed between the master unit and the plurality of slave units, wherein the point-to-multipoint communication system is characterized in that the slave units each comprise information amount reporting means for presenting the master unit with reports regarding the information amount necessary to transmit signals; and
    the master unit comprises calculation means for calculating an overall transmittable information amount that can be transmitted from the slave units to the master unit on the basis of an allowed delay time and a rate of transfer from the slave units to the master unit, determining a maximum transmittable information amount of each currently active slave unit by allocating the overall maximum transmittable information amount among the currently active slave units, calculating the reported storage amounts as the transmission-enabling information amount when the storage amounts reported by the slave units are less than the maximum transmittable information amount, and calculating the maximum transmittable information amount as the transmission-enabling information amount when the storage amounts reported by the slave units exceeds the maximum transmittable information amount, and transmission-enabling information amount notification means for notifying each of the slave units about the transmission-enabling information amount calculated by the calculation means, the slave units exercising control over transmissions to the master unit on the basis of the transmission-enabling information amount relayed by the transmission-enabling information amount notification means.

16. The point-to-multipoint communication system according to claim 15, characterized in that the information amount reporting means operates such that reports regarding the information amount necessary for signal transmission are submitted to the master unit with a first period; and the transmission-enabling information amount notification means operates such that the transmission-enabling information amount calculated by the calculation means is conveyed to the slave units with a second period.

17. The point-to-multipoint communication system according to claim 15, characterized in that information signals are transmitted from the slave units to the master unit as frame units of fixed data length; and the transmission-enabling notification means segments the transmission-enabling information amount calculated by the calculation means and issues notifications for the slave units when the transmission-enabling information amount is greater than the information amount that can be transmitted in a single session with the frame.

18. The point-to-multipoint communication system according to claim 15, characterized in that the information amount reporting means reports, separately for each service class, the information amount necessary for transmitting the signals;

the calculation means calculates, separately for each of the service classes, the overall transmittable information amount that can be transmitted from the slave units to the master unit on the basis of the allowed delay time and the rate of transfer from the slave units to the master unit in each service class, determines the maximum transmittable information amount of each currently active slave unit in each of the service classes by allocating the calculated overall maximum transmittable information amount among the currently active slave units in each of the service classes, calculates the reported storage amounts as the transmission-enabling information amount of each of the service classes when the storage amounts reported by the slave units in each of the service classes are less than the maximum transmittable information amount of each of the service classes, and calculates the maximum transmittable information amount as the transmission-enabling information amount of each of the service classes when the storage amounts reported by the slave units in each of the service classes exceeds the maximum transmittable information amount;

the transmission-enabling information amount notification means notifies each of the slave units about the transmission-enabling information amount calculated by the calculation means for each of the service classes; and the slave units control the transmission of the information amount to the master unit in each of the service classes on the basis of the transmission-enabling information amount relayed in each of the service classes by the transmission-enabling information amount notification means.

19. A point-to-multipoint communication system, in which a master unit and a plurality of slave units are connected by means of a transmission line, and point-to-multipoint communication is performed between the master unit and the plurality of slave units, wherein the point-to-multipoint communication system is characterized in that the slave units comprise information amount reporting means for submitting reports regarding the information amount necessary to transmit signals according to instructions from the master unit;

the master unit comprises signal transmission instruction means for instructing the slave units to transmit signals on the basis of the information amount reported by the slave units with the aid of the information amount reporting means;

the signal transmission instruction means comprises continuous transmission instruction means for continuously instructing the slave units to transmit signals at no more than a specific maximum value on the basis of information amount reported by the slave units, and sequential transmission instruction means for instructing each slave unit to transmit signals in a sequential manner;

the continuous transmission instruction means calculates an overall transmittable information amount that can be transmitted from the slave units to the master unit on the basis of an allowed delay time and a rate of transfer from the slave units to the master unit, determines a maximum transmittable information amount of each slave unit by allocating the overall transmittable information amount among the slave units, continuously issues instructions to transmit signals at no more than the information amount reported by the slave units when the information amount thus reported is less than the maximum transmittable information amount, and continuously issues instructions to transmit signals at less than the maximum transmittable information amount when the information amount reported by the slave units exceeds the maximum transmittable information amount; and the sequential transmission instruction means issues sequential instructions to transmit signals to each slave unit when the overall transmittable information amount still has a margin after instructions to transmit signals have been issued by the continuous transmission instruction means for the information amount reported by all the slave units.

20. The point-to-multipoint communication system according to claim 19, characterized in that the sequential transmission instruction means issues sequential instructions to transmit signals for currently active slave units.

21. A point-to-multipoint communication system, in which a master unit and a plurality of slave units are connected by means of a transmission line, and point-to-multipoint communication is performed between the master unit and the plurality of slave units, wherein the point-to-multipoint communication system is characterized in that the slave units comprise information amount reporting means for providing the master unit with reports regarding the information amount of transmission data in each service class according to instructions from the master unit;

the master unit comprises information amount retrieval means for issuing instructions on the reporting of the information amount necessary to transmit signals for the slave units, and transmission instruction means for calculating an overall transmittable information amount that can be transmitted in each service class from the master unit to slave units, determining a maximum transmittable information amount of each slave unit per service class by allocating the overall transmittable information amount of each service class to each of the service classes inside the slave units, issuing instructions to transmit signals in the service classes as signals equal to or less than the information amount of each service class retrieved from the slave units when the information amount thus retrieved in each service class is less than the maximum transmittable information amount in each of the service classes, and issuing instructions to transmit signals at no more than the maximum transmittable information amount of each service class when the information amount of each service class received from the slave units exceeds the maximum transmittable information amount in each of the service classes, on the basis of the information amount reported by the slave units in each service class; and the slave units control the transmission of the information amount to the master unit in each service class on the basis of the transmission instructions of service class from the master unit.

22. The point-to-multipoint communication system according to claim 21, characterized in that the slave units comprise data storage means for temporarily storing data by service class, and storage amount counting means for counting, separately for each service class, the storage amount of data stored by the data storage means; and the information amount reporting means operates such that the storage amounts counted by the storage amount counting means separately for each service class are reported to the master unit in accordance with instructions from the master unit.

23. The point-to-multipoint communication system according to claim 21, characterized in that the maximum transmittable information amount of each service class is calculated by equally allocating the overall transmittable information amount of each service class among slave units in each service class.

24. The point-to-multipoint communication system according to claim 21, characterized in that the maximum transmittable information amount of each service class is calculated by individually allocating the overall transmittable information amount of each service class among slave units separately for each service class.

25. The point-to-multipoint communication system according to claim 21, characterized in that the service classes comprise a plurality of service classes having mutually different priority levels and requirements regarding the data transmission delay time; and the transmission instruction means issues instructions to transmit signals separately for each service class in sequence according to the priority levels and requirements regarding the delay time.

26. The point-to-multipoint communication system according to claim 21, characterized in that the service classes comprise service classes with periodic data transmission requirements, and service classes with sporadic data transmissions; and the transmission instruction means operates such that in the case of service classes with periodic data transmission requirements, instructions are issued to transmit data for these service classes with the period required by these service classes, and in the case of service classes with sporadic data transmissions, instructions are issued to transmit data for the service classes with sporadic data transmissions at the transfer rate remaining after instructions have been issued to transmit data for the service classes with periodic data transmission requirements.

27. The point-to-multipoint communication system according to claim 26, characterized in that the service classes with periodic data transmission requirements are service classes that require fixed-length data to be periodically transmitted.

28. The point-to-multipoint communication system according to claim 21, characterized in that the service classes comprise service classes with periodic data transmission requirements, and service classes with sporadic data transmissions;

the service classes with sporadic data transmissions further comprise one or more service classes with different priority levels and requirements regarding the data transmission delay time; and in the case of service classes with sporadic data transmissions, instructions are issued to transmit data separately for each service class in sequence according to the priority levels and requirements regarding the data transmission delay time at the transfer rate remaining after instructions have been issued to transmit data for the service classes with periodic data transmission requirements.

29. The point-to-multipoint communication system according to claim 28, characterized in that the transmission instruction means issues instructions to transmit data by service class in sequence according to the maximum transmittable information amount for each service class.

30. A point-to-multipoint communication system, in which a master unit and a plurality of slave units are connected by means of a transmission line, and the slave units transmit signals belonging to a plurality of service classes according to instructions from the master unit, wherein the point-to-multipoint communication system is characterized in that the master unit comprises information amount report instruction means for instructing the slave units to issue reports regarding the information amount necessary to transmit signals, and signal transmission instruction means for instructing the slave units to transmit signals on the basis of the information amount reported by the slave units;

the slave units comprise service class setting means for setting a signal service class, information amount reporting means for submitting reports regarding the information amount necessary to transmit signals according to reporting instructions from the master unit, and signal transmission means for transmitting signals according to transmission instructions from the master unit;

the information amount report instruction means instructs the slave units to issue reports regarding the information amount necessary to transmit signals;

the information amount reporting means presents the master unit with reports regarding the information amount necessary to transmit the signals of all of the service classes in accordance with the instructions from the master unit; and the signal transmission instruction means calculates the overall transmittable information amount that can be transmitted from the slave units to the master unit on the basis of the allowed delay time of signals and the rate of transfer from the slave units to the master unit, determines the maximum transmittable information amount of each slave unit by allocating the overall transmittable information amount among the slave units, issues instructions to transmit signals at no more than the information amount reported by the slave units for all of the service classes when the information amount thus reported is less than the maximum transmittable information amount, and issues instructions to transmit signals at less than the maximum transmittable information amount when the information amount reported by the slave units for all of the service classes exceeds the maximum transmittable information amount.

31. The point-to-multipoint communication system according to claim 30, characterized in that the service class setting means comprises means for setting the service class of signals transmitted to the master unit on the basis of differences in the allowed delay times of signals, wherein signals for which the allowed delay time is comparatively short are classified as belonging to a high-priority service class, and signals for which the allowed delay time is comparatively long are classified as belonging to a low priority service class.

32. The point-to-multipoint communication system according to claim 30, characterized in that the signal transmission means first transmits signals of the high priority service classes when instructions to transmit signals are received from the master unit.

33. A point-to-multipoint communication system, in which a master unit and a plurality of slave units are connected by means of a transmission line, and the slave units transmit information signals by authorization from the master unit, wherein the point-to-multipoint communication system is characterized in that the slave units comprise measurement means for measuring the information amount to be transmitted, and first notification means for notifying the master unit of the measurement results obtained by the measurement means;

the master unit comprises calculation means for calculating a transmission-enabling information amount that allows each slave unit to transmit signals at no more than a specific maximum value by determining a maximum overall transmittable information amount of each currently active slave unit by allocating among the currently active slave units the maximum transmittable information amount that can be transmitted from the slave units to the master unit, calculating as the transmission-enabling information amount the information amount reported by the slave units if the information amount thus reported does not reach the maximum transmittable information amount, and calculating as the transmission-enabling information amount the maximum transmittable information amount if the information amount reported by the slave units exceeds the maximum transmittable information amount, and second notification means for assigning the transmission line as time slot units to the slave units on the basis of the transmission-enabling information amount calculated by the calculation means, and notifying the slave units about the results of this assigning; and the slave units that have received the notifications from the second notification means transmit data signals in the time slot units thus assigned.

34. The point-to-multipoint communication system according to claim 33, characterized in that the first notification means notifies the master unit of the measurement results obtained by the measurement means, using pre-assigned control time slots.

35. The point-to-multipoint communication system according to claim 33, characterized in that the second notification means assigns one or more continuous time slots to the slave units on the basis of the transmission-enabling information amount calculated by the calculation means, and notifies the slave units about the results of this assigning using pre-assigned control time slots.

36. A point-to-multipoint communication system, in which a master unit and a plurality of slave units are connected by means of a transmission line, the slave units transmit information signals by authorization from the master unit, and there are two types of service classes for the allowed delay times of these information signals: guaranteed service, which guarantees a delay time, and best effort service, in which there is no compensation for the delay time, wherein the point-to-multipoint communication system is characterized in that in the case of guaranteed service, the slave units comprise first notification means for notifying the master unit of circuit requests;

the master unit comprises second notification means for assigning the transmission line as time slot units to the slave units on the basis of the circuit requests conveyed by the slave units, and notifying the slave units about the results of this assigning; and the slave units receiving the notifications from the second notification means transmit data signals as the time slot units thus assigned; and in the case of best effort service, the slave units comprise measurement means for measuring the information amount to be transmitted, and third notification means for notifying the master unit of the measurement results obtained by the measurement means;

the master unit comprises calculation means for calculating a transmission-enabling information amount that allows each slave unit to transmit signals at no more than a specific maximum value on the basis of an information amount conveyed from the slave units by the third notification means, and fourth notification means for assigning the transmission line as time slot units to the slave units on the basis of the transmission-enabling information amount calculated by the calculation means, and notifying the slave units about the results of this assigning;

the slave units that have received the notifications from the fourth notification means transmit data signals in the time slot units thus assigned; and the master unit gives preference to the guaranteed service in assigning the time slots.

* * * * *